US012493792B2

(12) United States Patent
Tremblay et al.

(10) Patent No.: US 12,493,792 B2
(45) Date of Patent: Dec. 9, 2025

(54) REINFORCEMENT LEARNING OF TACTILE GRASP POLICIES

(71) Applicant: NVIDIA Corporation, Santa Clara, CA (US)

(72) Inventors: Jonathan Tremblay, Redmond, WA (US); Visak Chadalavada Vijay Kumar, Seattle, WA (US); Tucker Hermans, Salt Lake City, UT (US)

(73) Assignee: NVIDIA Corporation, Santa Clara, CA (US)

( * ) Notice: Subject to any disclaimer, the term of this patent is extended or adjusted under 35 U.S.C. 154(b) by 515 days.

(21) Appl. No.: 16/663,222

(22) Filed: Oct. 24, 2019

(65) Prior Publication Data

US 2021/0125052 A1 Apr. 29, 2021

(51) Int. Cl.
| | |
|---|---|
| G06N 3/00 | (2023.01) |
| B25J 9/16 | (2006.01) |
| B25J 18/00 | (2006.01) |
| G06F 18/214 | (2023.01) |
| G06N 3/08 | (2023.01) |
| G06N 3/084 | (2023.01) |
| G06T 7/62 | (2017.01) |

(52) U.S. Cl.
CPC ............ *G06N 3/084* (2013.01); *B25J 9/1612* (2013.01); *B25J 18/00* (2013.01); *G06F 18/214* (2023.01); *G06N 3/08* (2013.01); *G06T 7/62* (2017.01); *G06T 2210/12* (2013.01)

(58) Field of Classification Search
CPC ........ B25J 9/1697; B25J 9/163; B25J 9/1612; B25J 9/02; B25J 9/0003; B25J 13/089; B25J 19/023; B25J 15/0009; B25J 9/1664; B25J 13/08; B25J 13/02; G06T 7/62; G06T 2210/12; G06N 3/0454; G06N 3/08; G06K 9/6256
See application file for complete search history.

(56) References Cited

U.S. PATENT DOCUMENTS 4,551,817 A * 11/1985 Ishikawa ................. G06G 7/14
708/805
4,957,320 A * 9/1990 Ulrich ................. B25J 15/0009
294/111

(Continued)

FOREIGN PATENT DOCUMENTS

| CN | 105598965 A | 5/2016 |
|---|---|---|
| CN | 108885715 A | 11/2018 |

(Continued)

OTHER PUBLICATIONS

Andrychowicz et al., "Learning Dexterous In-Hand Manipulation," Aug. 28, 2018, 27 pages.

(Continued)

*Primary Examiner* — Martin Mushambo
(74) *Attorney, Agent, or Firm* — Davis Wright Tremaine LLP

(57) ABSTRACT

Apparatuses, systems, and techniques to perform a grasp of on object using an articulated robotic hand equipped with one or more tactile sensors. In at least one embodiment, a machine-learned model trained in simulation to grasp a cuboid using signals received from tactile sensors is applied to grasping objects of various shapes in a real-world environment.

29 Claims, 65 Drawing Sheets

(56) References Cited

U.S. PATENT DOCUMENTS

| | | | | |
|---|---|---|---|---|
| 9,321,176 | B1* | 4/2016 | Sun | B25J 15/0028 |
| 9,687,982 | B1* | 6/2017 | Jules | B25J 9/1612 |
| 10,058,995 | B1* | 8/2018 | Sampedro | B25J 9/0084 |
| 10,089,575 | B1* | 10/2018 | Redmon | G06N 3/08 |
| 10,131,051 | B1* | 11/2018 | Goyal | B25J 9/1697 |
| 10,549,928 | B1* | 2/2020 | Chavez | B25J 9/1687 |
| 10,562,190 | B1* | 2/2020 | Lee | G01L 5/226 |
| 10,635,944 | B2* | 4/2020 | Jang | B25J 9/1697 |
| 10,730,181 | B1* | 8/2020 | Rajkumar | G06N 3/045 |
| 10,981,272 | B1* | 4/2021 | Nagarajan | B25J 9/1669 |
| 2004/0078114 | A1* | 4/2004 | Cordell | B25J 9/1692 |
| | | | | 700/258 |
| 2007/0227267 | A1* | 10/2007 | Loeb | B25J 13/084 |
| | | | | 73/862.046 |
| 2010/0286827 | A1* | 11/2010 | Franzius | G06F 18/213 |
| | | | | 382/153 |
| 2011/0029470 | A1* | 2/2011 | Hartmann | G01B 5/20 |
| | | | | 706/15 |
| 2012/0072022 | A1* | 3/2012 | Kim | B25J 9/1666 |
| | | | | 700/255 |
| 2012/0123589 | A1* | 5/2012 | Kim | B25J 13/084 |
| | | | | 901/33 |
| 2014/0163731 | A1* | 6/2014 | Shi | B25J 9/0096 |
| | | | | 700/250 |
| 2014/0372116 | A1* | 12/2014 | Smith | B25J 13/003 |
| | | | | 704/235 |
| 2015/0019013 | A1* | 1/2015 | Rose | B25J 13/08 |
| | | | | 702/41 |
| 2017/0168586 | A1* | 6/2017 | Sinha | G06N 20/00 |
| 2017/0252924 | A1 | 9/2017 | Vijayanarasimhan et al. | |
| 2017/0330091 | A1* | 11/2017 | Hawkins | G06N 20/00 |
| 2017/0334066 | A1 | 11/2017 | Levine et al. | |
| 2018/0032840 | A1* | 2/2018 | Yu | G06V 10/774 |
| 2018/0056520 | A1* | 3/2018 | Ozaki | B25J 13/084 |
| 2018/0330200 | A1* | 11/2018 | Shibata | G06F 18/241 |
| 2018/0356301 | A1* | 12/2018 | Tomita | G01L 1/04 |
| 2019/0087687 | A1* | 3/2019 | Danielsson | G06V 10/82 |
| 2019/0208979 | A1* | 7/2019 | Bassa | G06V 30/19173 |
| 2019/0212752 | A1* | 7/2019 | Fong | G06V 10/82 |
| 2019/0224844 | A1* | 7/2019 | Tsuda | B25J 9/1676 |
| 2019/0355150 | A1* | 11/2019 | Tremblay | G06T 7/73 |
| 2019/0385022 | A1* | 12/2019 | Jang | G06F 18/214 |
| 2020/0030979 | A1* | 1/2020 | Bank | B25J 13/08 |
| 2020/0078935 | A1* | 3/2020 | Kimura | B65B 5/105 |
| 2020/0078955 | A1* | 3/2020 | Fernando | B25J 13/088 |
| 2020/0184305 | A1* | 6/2020 | Cao | G06V 10/82 |
| 2020/0215685 | A1* | 7/2020 | Jamali | B25J 9/1697 |
| 2020/0306980 | A1* | 10/2020 | Choi | B25J 9/1697 |
| 2020/0311855 | A1* | 10/2020 | Tremblay | G06T 1/0014 |
| 2020/0311956 | A1* | 10/2020 | Choi | G06V 10/454 |
| 2020/0376675 | A1* | 12/2020 | Bai | G06T 7/73 |

FOREIGN PATENT DOCUMENTS

| | | |
|---|---|---|
| CN | 109074513 A | 12/2018 |
| CN | 109906132 A | 6/2019 |
| CN | 109983433 A | 7/2019 |
| CN | 110065085 A | 7/2019 |
| CN | 110271007 A | 9/2019 |
| DE | 202017106506 U1 | 4/2018 |
| EP | 2455198 B1 | 5/2015 |
| EP | 2158454 B1 | 8/2018 |
| JP | 2019529135 A | 10/2019 |
| KR | 20130081875 A | 7/2013 |
| KR | 20190070385 A | 6/2019 |
| KR | 20190101043 A | 8/2019 |
| WO | 2017206066 A1 | 12/2017 |
| WO | 2019055883 A1 | 3/2019 |
| WO | 2019060632 A1 | 3/2019 |

OTHER PUBLICATIONS

Bard et al., "Achieving Dextrous Grasping by Integrating Planning and Vision-Based Sensing," International Journal of Robotics Research, No. 5, Oct. 14, 1995, 20 pages.

Calandra et al., "More Than a Feeling: Learning to Grasp and Regrasp using Vision and Touch," May 28, 2018, 8 pages.

Caldera et al., "Review of Deep Learning Methods in Robotic Grasp Detection," Multimodal Technologies and Interaction, 2(3):57, May 31, 2018, 24 pages.

Calli et al., "The YCB Object and Model Set," In IEEE International Conference on Advanced Robotics, 2015, pp. 510-517.

Chen et al., "An Adaptive Compliant Multi-Finger Approach-to-grasp Strategy for Objects with Position Uncertainties," IEEE International Conference on Robotics and Automation, IEEE, 2015, pp. 4911-4918.

Dai et al., "Synthesis and Optimization of Force Closure Grasps via Sequential Semidefinite Programming," 2015, 16 pages.

Fang et al., "Learning Taskoriented Grasping for Tool Manipulation with Simulated Self-supervision," In Robotics Science and Systems, 2018.

IEEE "IEEE Standard for Floating-Point Arithmetic", Microprocessor Standards Committee of the IEEE Computer Society, IEEE Std 754-2008, dated Jun. 12, 2008.

International Search Report mailed Jan. 29, 2021, for International Application No. PCT/US2020/056177, Oct. 16, 2020, 21 pages.

Iqbal et al., "Hand Pose Estimation via Latent 2.5D Heatmap Regression," Apr. 25, 2018, 20 pages.

Johannink et al., "Residual Reinforcement Learning for Robot Control," Dec. 18, 2018, 8 pages.

Kappler et al., "Leveraging Big Data for Grasp Planning," IEEE, 2015, pp. 4304-4311.

Kober et al., "Reinforcement Learning to Adjust Robot Movements to New Situations," International Joint Conference on Artificial Intelligence, 2011, pp. 2650-2655.

Kopicki et al., "One Shot Learning and Generation of Dexterous Grasps for Novel Objects," The International Journal of Robotics Research, 35(8): 2016, pp. 959-976.

Lee et al., "Making Sense of Vision and Touch: Self-supervised Learning of Multimodal Representations for Contact-Rich Tasks," Oct. 24, 2018, 8 pages.

Levine et al., "Learning Hand-Eye Coordination for Robotic Grasping with Deep Learning and Large-Scale Data Collection," International Journal of Robotics Research, 37(4-5): 2018, 16 pages.

Liu et al., "Generating grasp poses for a high-dof gripper using neural networks," Aug. 2, 2019, 8 pages.

Lu et al., Modeling grasp type improves learning-based grasp planning. IEEE Robotics and Automation Letters, 4(2): 2019, 784-791.

Lu et al., "Planning Multi-Fingered Grasps as Probabilistic Inference in a Learned Deep Network," In International Symposium on Robotics Research, 2018, 16 pages.

Mahler et al., "Dex-Net "1.0: A Cloud-Based Network of 3D Objects for Robust Grasp Planning Using a Multi-Armed Bandit Model with Correlated Rewards," IEEE International Conference on Robotics and Automation (ICRA), 2016, pp. 1957-1964.

Manuelli et al., "kPAM: Keypoint Affordances for Category Level Robotic Manipulation," Oct. 29, 2019, 26 pages.

Osa et al., "Experiments with Hierarchical Reinforcement Learning of Multiple Grasping Policies," 2017, 12 pages.

Osa et al., "Hierarchical Reinforcement Learning of Multiple Grasping Strategies with Human Instructions," Advanced Robotics, 32(18): 2018, 955-968.

Peng et al. "Deepmimic: Example-Guided Deep Reinforcement Learning of Physics-Based Character Skills", Jul. 27, 2018, 18 pages.

Platt et al., "Null-Space Grasp Control: Theory and Experiments," IEEE Transactions on Robotics, 26(2): 2010, pp. 282-295.

Quillen et al., "Deep Reinforcement Learning for Vision-Based Robotic Grasping: A Simulated Comparative Evaluation of Off-Policy Methods," Mar. 28, 2018, 8 pages.

Sadeghi et al., "Cad2RL: Real Single-Image Flight without a Single Real Image," Jun. 8, 2017, 12 pages.

(56) References Cited

OTHER PUBLICATIONS

Sahbani et al., "An Overview of 3D Object Grasp Synthesis Algorithms," Robotics and Autonomous Systems, 60(3): 2012, pp. 326-336.
Schulman et al., "Proximal policy optimization algorithms," Jul. 20, 2017, 12 pages.
Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Sutton et al., "Reinforcement Learning : An Introduction," MIT Press, 1998, 352 pages.
Thomas et al., "Learning Robotic Assembly from CAD," Jul. 24, 2018, 8 pages.
Tobin et al., "Domain Randomization and Generative Models for Robotic Grasping," IEEE/RSJ International Conference on Intelligent Robots and Systems, Apr. 3, 2018, pp. 3482-3489.
Tobin et al., "Domain Randomization for Transferring Deep Neural Networks from Simulation to the Real World," IEEE/RSJ International Conference on Intelligent Robots and Systems (IROS), Mar. 20, 2017, pp. 23-30.
Tremblay et al., "Deep Object Pose Estimation for Semantic Robotic Grasping of Household Objects," In Conference on Robot Learning, Sep. 27, 2018, 11 pages.
Varley et al., "Generating Multi-Fingered Robotic Grasps via Deep Learning," International Conference on Intelligent Robots and Systems, 2015, pp. 4415-4420.
Wang et al., "Densefusion: 6D Object Pose Estimation by Iterative Dense Fusion," Jan. 15, 2019, 11 pages.
Yu et al., "Sim-to-Real Transfer for Biped Locomotion," Aug. 25, 2019, 8 pages.
Zeng et al., "Learning Synergies Between Pushing and Grasping with Self-supervised Deep Reinforcement Learning," IEEE/RSJ International Conference on Intelligent Robots and Systems, 2018, pp. 4238-4245.
Office Action for German Application No. 112020005156.0, mailed Sep. 6, 2023, 8 pages.
Office Action for United Kingdom Application No. GB2205308.6, mailed May 23, 2023, 4 pages.
Office Action for Chinese Application No. 202080089194.0, mailed Dec. 8, 2023, 25 pages.
Office Action for Chinese Application No. 202080089194.0, mailed Nov. 26, 2024, 9 pages.
Office Action for Korean Application No. 10-2022-7015892, mailed Dec. 26, 2024, 7 pages.
Office Action for German Application No. 112020007912.0, mailed Sep. 19, 2024, 12 pages.
Office Action for Japanese Application No. 2022-523944, mailed Aug. 2, 2024, 10 pages.
Office Action for Korean Application No. 10-2022-7015892, mailed May 17, 2024, 20 pages.
Yuan et al., "Iterative Transformer Network for 3D Point Cloud," 2019, 14 pages.
Notice of Decision to Grant for German Application No. 112020005156.0, mailed May 15, 2024, 12 pages.

* cited by examiner

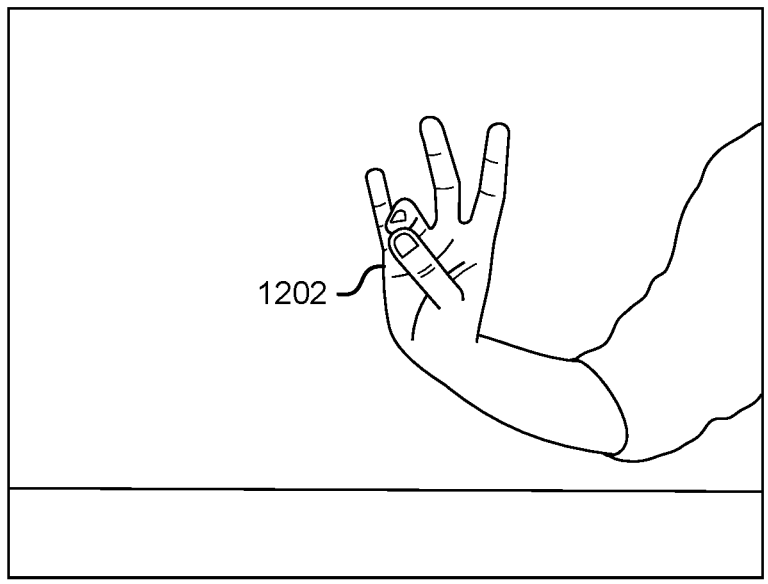
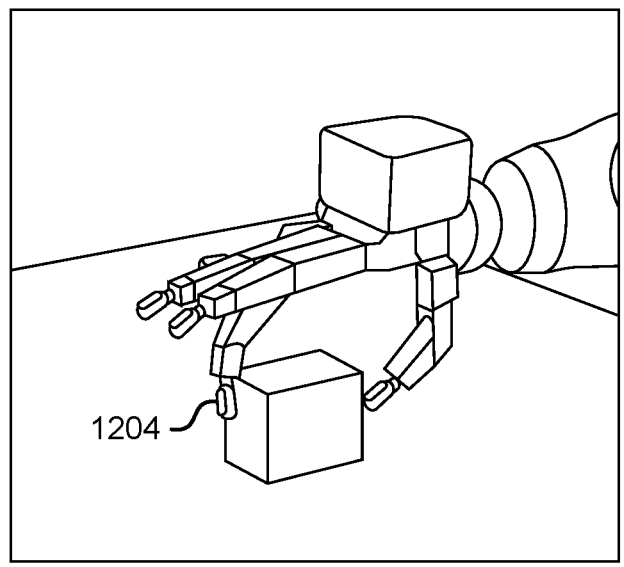
FIG. 12

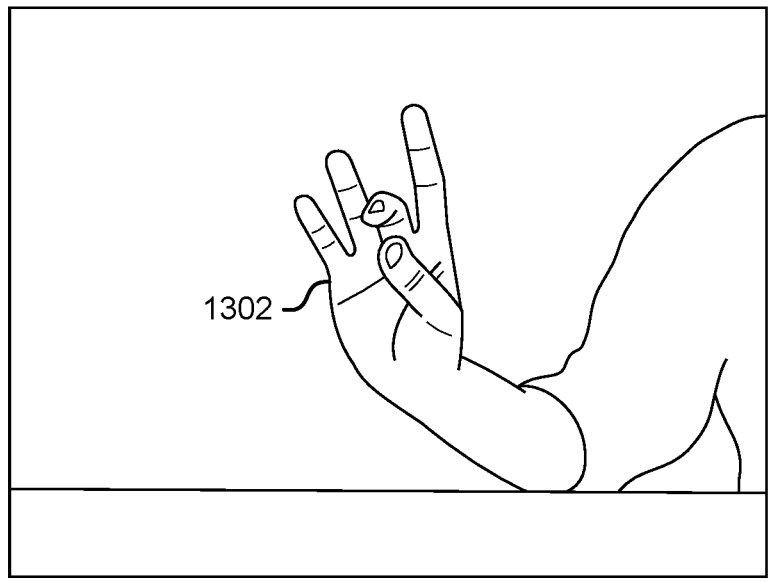
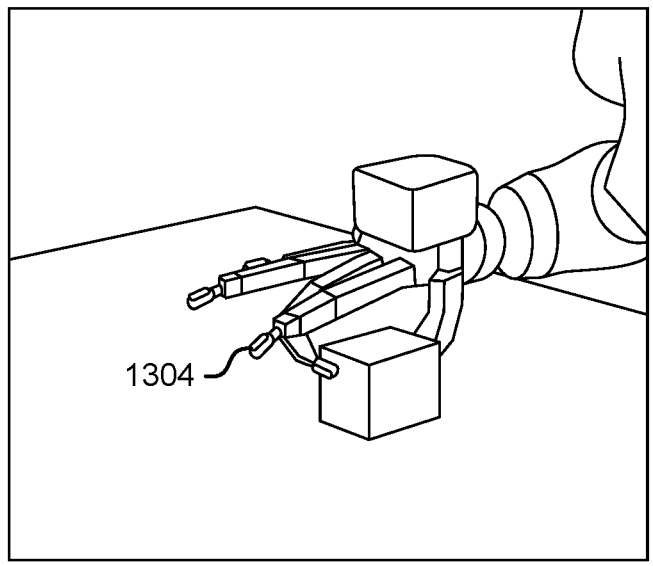
FIG. 13

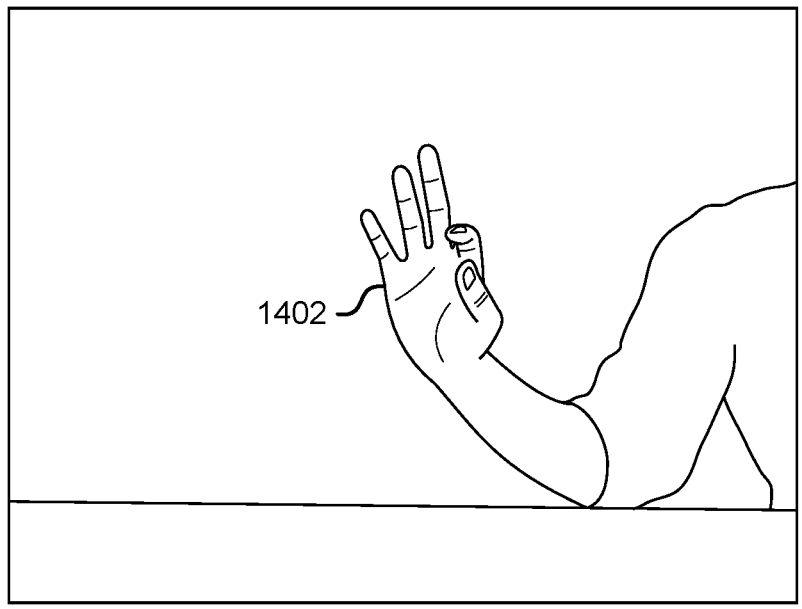
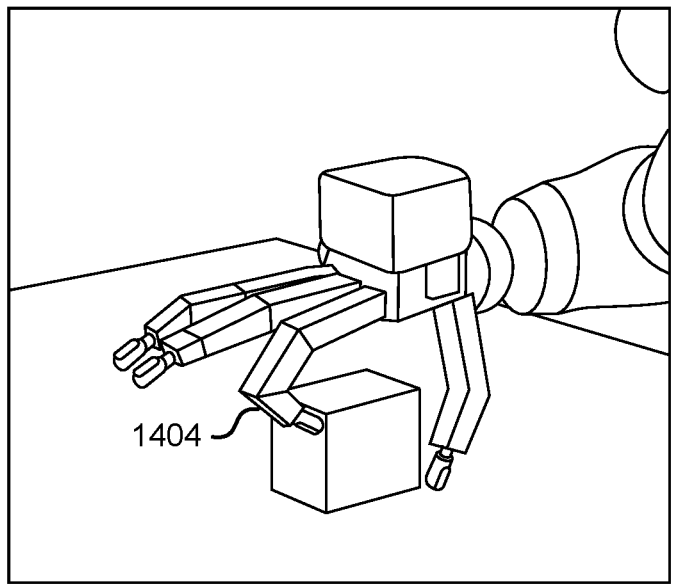
FIG. 14

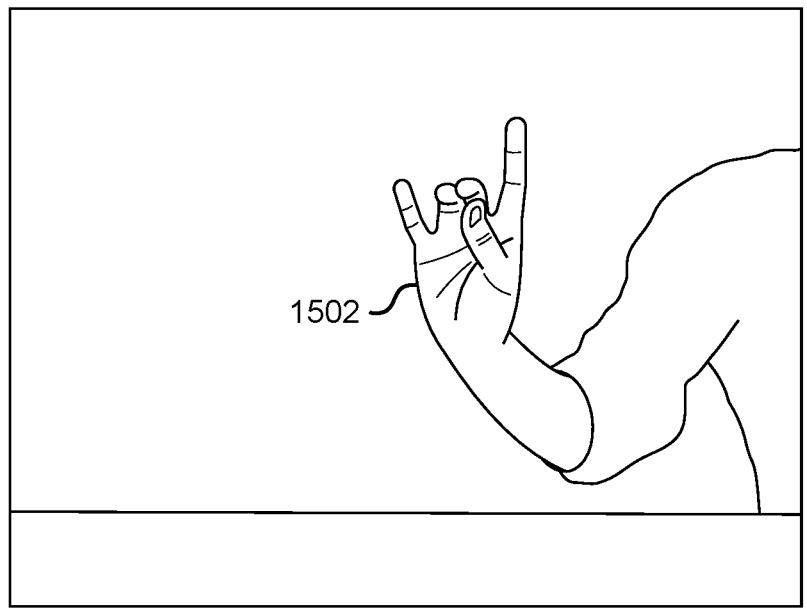
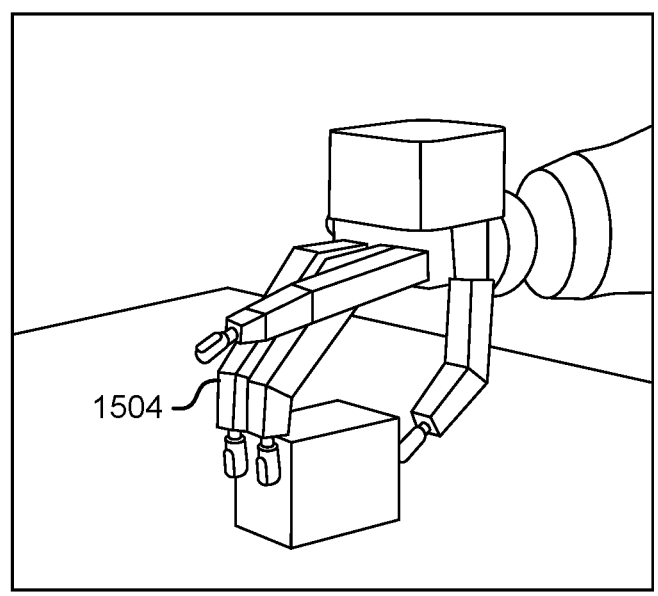
FIG. 15

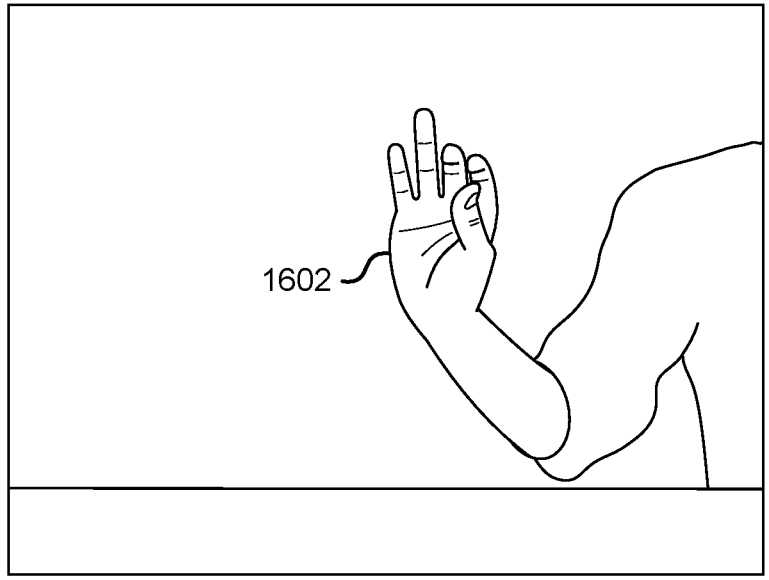
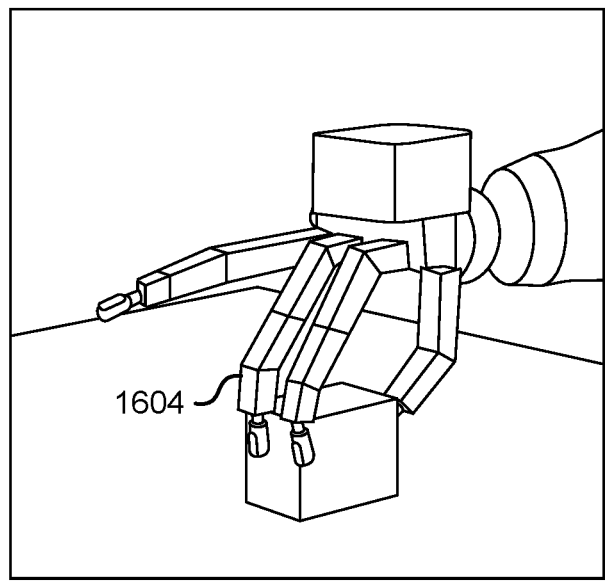
FIG. 16

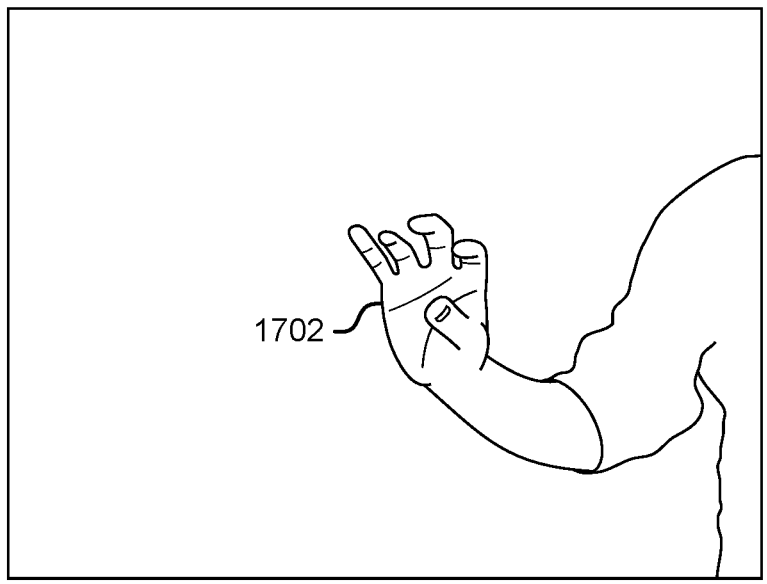
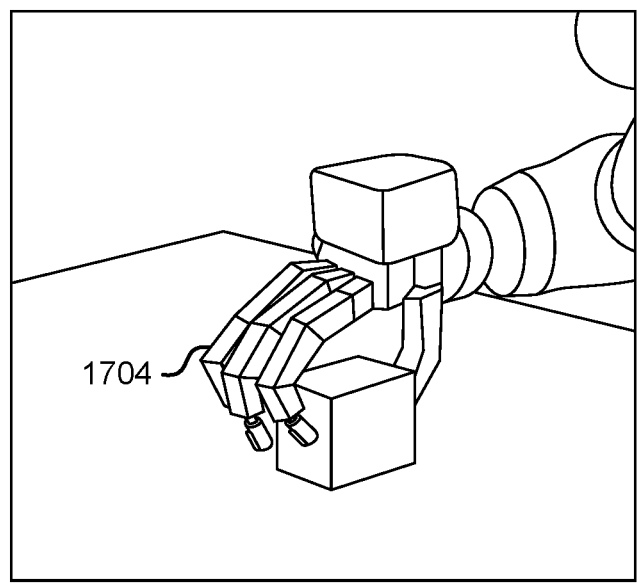
FIG. 17

REINFORCEMENT LEARNING OF TACTILE GRASP POLICIES

FIELD

At least one embodiment pertains to processing resources used to perform and facilitate a robotic control system. For example, at least one embodiment pertains to processors or computing systems used to train a neural network capable of controlling a tactile robotic grasp.

BACKGROUND

Robotic automation is a developing area of technology that has great potential. An important problem within a field of automation is a robotic manipulation of physical objects. In general, to manipulate a physical object, a robotic control system determines position and orientation of a robot relative to a position and orientation of an object, and then positions a robot so that an object can be grasped by a mechanical hand or gripper. Based on characteristics of an object, grasps from a particular direction or grasps on a particular part of an object can result in a more or less secure grip. Establishing a secure grip can be very challenging, given a wide variety of objects and potential orientations. Therefore, improving robotic control systems so that they are capable of executing a grasp on a wide variety of objects is an important problem.

BRIEF DESCRIPTION OF DRAWINGS

FIG. 12 illustrates training a policy to grasp using grasp styles representing a two-finger grasp, according to at least one embodiment;

FIG. 13 illustrates training a policy to grasp using grasp styles representing a two-finger grasp, according to at least one embodiment;

FIG. 14 illustrates training a policy to grasp using grasp styles representing a two-finger grasp, according to at least one embodiment;

FIG. 15 illustrates training a policy to grasp using grasp styles representing a three-finger grasp, according to at least one embodiment;

FIG. 16 illustrates training a policy to grasp using grasp styles representing a three-finger grasp, according to at least one embodiment;

FIG. 17 illustrates training a policy to grasp using grasp styles representing a four-finger grasp, according to at least one embodiment;

DETAILED DESCRIPTION

Figure 1:
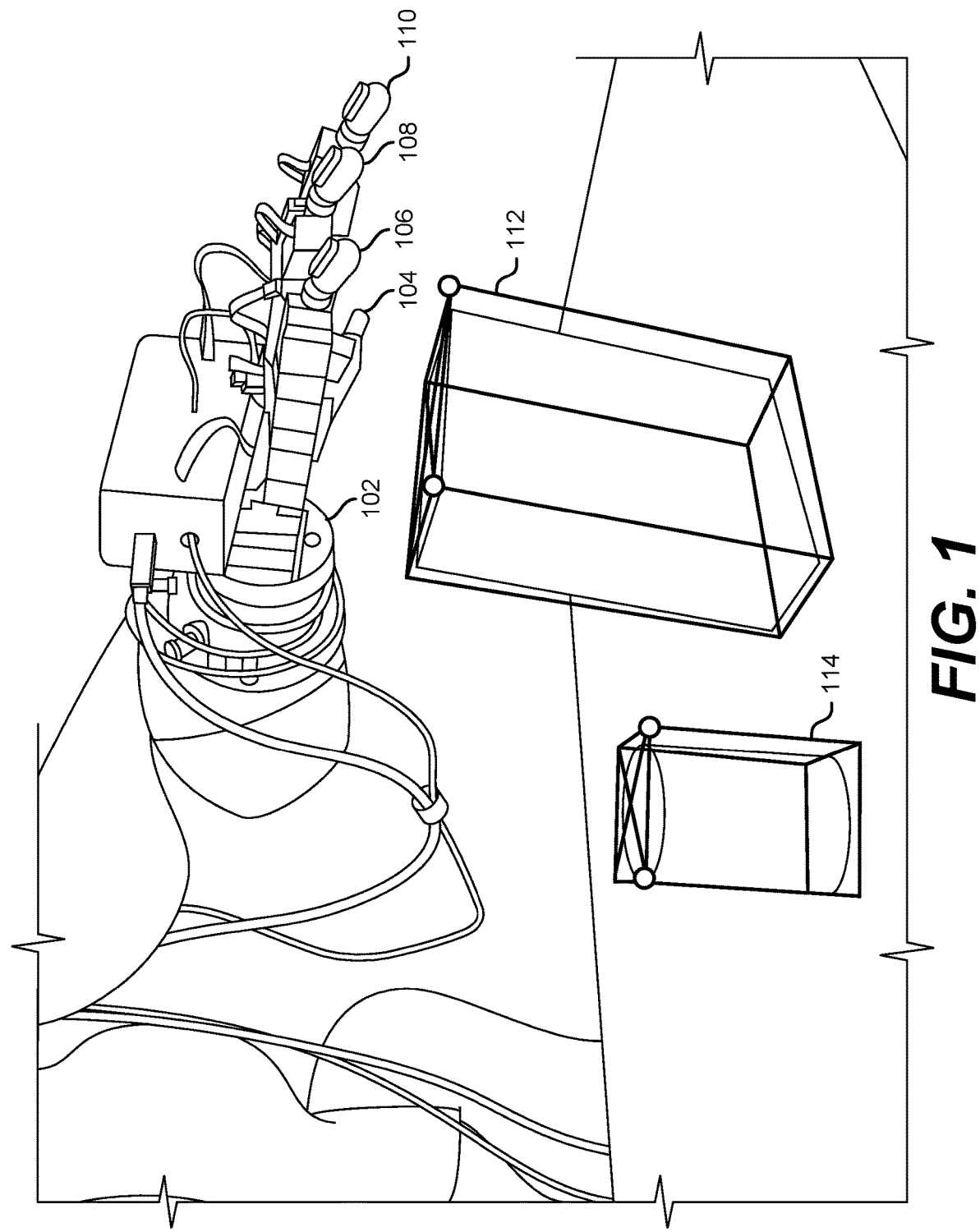
FIG. 1 illustrates visualization of context variables keypoints for two objects' inference and/or training logic, according to at least one embodiment.

Directing robots to autonomously grasp objects of varying shape and size with multi-fingered articulated robotic hands is an important part of performing manipulation skills such as pick-and-place tasks, human handover, and dexterous tool use. In at least one embodiment, solutions to this problem take a model-based planning and control approach. In at least one embodiment, a pipeline estimates object pose, given either a 3D point cloud or mesh of an object, then plans a set of contact locations and hand configuration to define grasps, and finally generates a motion plan to reach and grasp an object. In at least one embodiment, such systems are sensitive to perception and calibration errors and often require significant computational time to plan and execute, which may cause such a system to misbehave and fail to grasp an object.

In at least one embodiment, an improved grasp is produced by learning a policy to grasp objects of varying geometry and scale with a multi-finger gripper using deep reinforcement learning ("RL"). In at least one embodiment, a few important challenges arise in formulating multi-fingered grasping problem as an RL problem. In at least one embodiment, a system copes with a relatively high dimension of a multi-fingered hand's configuration space in order to effectively explore a space of possible grasping policies. In at least one embodiment, a system represents an object to be grasped in a way that effectively generalizes across objects of varying shape, while still being succinct enough to train efficiently. In at least one embodiment, a system determines how a policy can be learned purely in simulation with no need to fine tune a policy for use in a physical world.

In at least one embodiment, in order to efficiently search over a high-dimensional space of grasping policies, recent advancements in camera-based human hand pose estimation and imitation learning are applied to provide human grasping demonstrations from an RGB camera. In at least one embodiment, a system uses grasping demonstrations as a component in a reward function, providing a prior for preferred grasping trajectories to a learner in simulation.

In at least one embodiment, using these keypoints explicitly as a context variable and training over a variable set of object shapes enables a policy to adapt to different block-shaped objects upon deployment without a need for further training.

In at least one embodiment, however, this does not enable a robot to robustly compensate for object geometries, such as cylinders or cones, not tightly captured by bounding box. In at least one embodiment, tactile sensing is used to provide contact information as part of a robot's state. In at least one embodiment, this enables a policy to learn that making—and maintaining—contact is necessary for grasping. In at least one embodiment, this has further benefit of aiding in bridging a sim-to-real gap, where tactile sensors on a physical robot compensate not only for object shape mismatch but also localization and calibration error from visual sensing. In at least one embodiment, a final learned policy is deployed onto a real-world system where visual input to a policy comes from an RGB pose estimator and contact information is retrieved from BioTac tactile sensors.

In at least one embodiment, a system seeks to learn separate grasping policies for each grasp style from a single human hand demonstration without relying on any planning algorithms for grasp execution.

In at least one embodiment, grasping is a fundamental problem in robotics. In at least one embodiment, applying a method to learn grasping policies using a physically-based simulator and demonstration opens up possibilities for learning more complex behaviors in future.

In at least one embodiment, using simulation to train robot manipulation policies provides a large amount of training data, generated safely out of harm's way. One challenge of using simulation is to bridge a reality gap, so that policies trained in simulation can be deployed in a real world situation. In at least one embodiment, a reality gap in context of learning a contextual policy for multi-fingered robotic grasping is provided. In at least one embodiment, a Grasping Objects Approach for Tactile ("GOAT") robotic hands, learning to overcome a reality gap problem is presented. In at least one embodiment, a system uses human hand motion demonstration to initialize and reduce search space for learning. In at least one embodiment, a policy is provided with bounding cuboid dimensions of an object of interest, which allows said policy to work on a more flexible representation than directly using an image or point cloud. In at least one embodiment, leveraging fingertip touch sensors in a hand allows a policy to overcome a reduction in geometric information introduced by a coarse bounding box, as well as pose estimation uncertainty. In at least one embodiment, a learned policy successfully runs on a real-world robot without fine tuning, thus bridging a reality gap.

In at least one embodiment, enabling robots to autonomously grasp objects of varying shape and size with multi-fingered hands provides more general manipulation skills such as pick-and-place tasks, human handover, and dexterous tool use. In at least one embodiment, techniques described herein overcome these constraints by learning a policy to grasp objects of varying geometry and scale with a multi-finger gripper using deep reinforcement learning ("RL"). In at least one embodiment, challenges arise in formulating a multi-fingered grasping problem as an RL problem. In at least one embodiment, various advantages are provided such as: ability to cope with relatively high dimension of multi-fingered hand's configuration space that effectively explores space of possible grasping policies; a representation of an object that can be grasped in a way that effectively generalizes across objects of varying shape, while still being succinct enough to train efficiently; and an ability to learn a policy purely in simulation with no need to fine tune a policy for use in a physical world.

In at least one embodiment, in order to efficiently search over a high-dimensional space of grasping policies, a system provides human grasping demonstrations from an RGB camera. In at least one embodiment, these grasping demonstrations are used as a component in a reward function, providing a prior for preferred grasping trajectories to a learner in simulation.

In at least one embodiment, problems of object representation and sim-to-real transfer are addressed by proposing a bounding-box-based object representation. In at least one embodiment, location of 8 vertices of a cuboid enveloping an object are extracted to provide an object's pose, general shape, and size as a context variable to a policy.

In at least one embodiment, using these keypoints explicitly as a context variable and training over a variable set of object shapes enables a policy to adapt to different block-shaped objects upon deployment without a need for further training.

In at least one embodiment, a system makes use of tactile sensing to provide contact information as part of a robot's state, which enables a robot to robustly compensate for object geometries, such as cylinders or cones, not tightly captured by a bounding box. In at least one embodiment, this enables a policy to learn that making and maintaining contact is necessary for grasping. In at least one embodiment, this has a further benefit of aiding in bridging a sim-to-real gap, where tactile sensors on a physical robot compensate not only for object shape mismatch but also localization and calibration error from visual sensing. In at least one embodiment, a final learned policy is deployed onto a real world system where visual input to a policy comes from an RGB pose estimator and contact information is retrieved from BioTac tactile sensors.

In at least one embodiment, a system abstracts away uncertain object appearance and geometry into a succinct set of geometric features. In at least one embodiment, to account for a coarse approximation these features induce, a system leverages tactile sensors in a robot's fingertips to observe contacts explicitly as part of a state. In at least one embodiment, this differs also from standard approaches to grasp learning where richer visual features are leveraged to understand an object geometry at a relatively high resolution; where these features are either learned or handcrafted.

In at least one example, a system leverages human demonstrations of grasping, reinforcement learning and sim-2-real to accomplish a multi-finger grasp task on a real-world system. In at least one example, a system generalizes to unseen shapes in a real-world without fine tuning.

In at least one embodiment, a system fuses visual and tactile information in learned grasp policies, using 3D keypoints for context variables encoding object shape and binary contact signals within an object state. In at least one embodiment, robotic manipulator includes force-sensor that measure force information at the tips of the manipulator. In at least one embodiment, force information may be digital, binary, or analog information. In at least one embodiment, this allows a policy to reason about object size and orientation implicitly creating a versatile policy that can adapt locally by leveraging sensed contact information.

In at least one embodiment, empirical results demonstrating benefits of various embodiments are provided herein. In at least one embodiment, a keypoint representation coupled with tactile feedback can successfully grasp objects of varying shape not seen in training. In at least one embodiment, benefits of using human hand grasping demonstration motions in learning a multi-fingered grasping policy is quantified. In at least one embodiment, a learned policy achieves comparable results to a hand-engineered policy on a real-world, physical robot without any fine tuning. In at least one embodiment, an ability to grasp with varying grasp styles simply by changing human demonstrations provided during training is demonstrated. In at least one embodiment, a dataset of captured human hand motions used to teach a robot to grasp with style upon publication is provided.

In at least one embodiment, robotic grasping is approached either through analytical, model-based methods or data driven methods using either supervised or reinforcement learning. In at least one embodiment, analytical methods focus on constructing grasps that satisfy specific conditions such as gripper configuration, object contact points, force closure, and task completion. In at least one embodiment, learning-based methods learn from annotated datasets, or from a robot interacting with its environment. In at least one embodiment, learned grasping behaviors tend to generalize better to unseen objects and situations. In at least one embodiment, techniques described herein leverage simulation to train a policy to be deployed in a real world.

In at least one embodiment, a system learns grasping policy for different grasping styles using reinforcement learning initialized by human demonstrations. In at least one embodiment, grasping style is a function of a surface mesh similarity to those seen during training and, as such, won't be able to enforce a specific style a priori. In at least one embodiment, a system seeks to learn separate grasping policies for each grasp style from a single human hand demonstration without relying on any planning algorithms for grasp execution.

In at least one embodiment, representation plays an important role for learning in robotics manipulation. In at least one embodiment, choosing a right representation allows for completion of learning downstream tasks. In at least one embodiment, state representation also includes finger contact information to overcome shape and pose uncertainty. In at least one embodiment, a system explores using visual keypoints coupled with tactile-feedback in order to learn grasping behaviors with RL.

In at least one embodiment, an approach to learning grasping policies for multi-fingered hands is provided. In at least one embodiment, a grasping problem is encoded into a contextual policy search framework. In at least one embodiment, policies informed from demonstration are learned using RL. In at least one embodiment, a policy is deployed on a physical robot.

In at least one embodiment, a task of multi-finger grasping is formulated as a contextual policy search problem. In at least one embodiment, this differs from a Markov Decision Process ("MDP") in that an agent (robot) observes some context variable κ at a beginning of an episode which parameterizes a reward function r: $S \times A \mapsto \mathbb{R}$ where S and A define state action spaces respectively. In at least one embodiment, an objective of a contextual policy search problem remains similar to that of standard reinforcement learning, namely to find a policy π: $S \mapsto A$, that maximizes an expected accumulated reward, conditioned on an observed context κ:

$$J(\pi_\theta) = \mathbb{E}_{s_0, a_0, \ldots, s_T} \sum_{t=0}^{T} \gamma^t r(s_t, a_t; \kappa)$$

where $s_0 \sim p_0$, $a_t \sim \pi_\theta(s_t; \kappa)$, and $s_{t+1} = \mathcal{T}(a_t, a_t)$. In at least one embodiment, remaining components of MDP also exist in a problem formulation; specifically $\mathcal{T}: S \times A \mapsto S$ is a transition function, $p_0$ is an initial state distribution and γ is a discount factor. In at least one embodiment, policy parameters θ are made explicit, which seeks to learn through roll-outs of a system.

In at least one embodiment, context variables κ are defined for a multi-fingered grasping problem as keypoints of a bounding box surrounding an object of interest at its pose at a beginning of an episode (see FIG. 1). In at least one embodiment, this defines a low dimensional feature representation to encode object geometry. It at least one embodiment, there are several ways to infer these features at runtime such as using pose estimation of known objects. In at least one embodiment, by providing this information of an object's pose at a beginning of a trial, a need to explicitly track an object during execution is removed. In at least one embodiment, this is an advantage as stably tracking an object, even when a known model exists, remains challenging, because of possible (partial) occlusion of an object caused by a hand interacting with it. In at least one embodiment, since an initial estimate may be inaccurate and an object will likely move during execution, binary contact information for each robot fingertip is provided as part of a robot's state space.

FIG. 1 illustrates visualization of context variables keypoints for two objects' inference and/or training logic, according to at least one embodiment. In at least one embodiment, a robotic hand 102 is used to grasp one or more objects. In at least one embodiment, robotic hand 102 is an articulated hand having a plurality of digits or fingers. In at least one embodiment, robotic hand 102 includes a first digit 104, a second digit 106, a third digit 108 and a fourth digit 110. In at least one embodiment, each digit includes a tactile sensor that indicates contact between end of a digit and an object. In at least one embodiment, each digit is able to be articulated under control of electronic logic that includes a neural network.

In at least one embodiment, robotic hand 102 is able to grasp an object under control of electronic control logic. In at least one embodiment, electronic control logic includes a processor and memory storing executable instructions that, as a result of being executed by processor, cause robotic hand to grasp an object. In at least one embodiment, objects are located using a cuboid bounding box. In at least one embodiment, a cuboid bounding box is established by estimating a 6D pose (orientation and position) of an object. In at least one embodiment, a first cuboid bounding box 112 identifies a location of a box. In at least one embodiment, a second bolt cuboid bounding box 114 identifies a location of a cylinder.

In at least one embodiment, a neural network is trained to direct robotic hand 102 to grasp an object by relying primarily on tactile information. In at least one embodiment, approximate location and size of an object is determined by a bounding box provided to an electronic control system. In at least one embodiment, as precise location and shape of an object may not be known, a neural network learns to rely primarily on tactile feedback rather than absolute position of individual digits.

In at least one embodiment, in simulation, contacts can be directly observed using a model of a robot and object. In at least one embodiment, on a physical system contact is estimated using pressure sensors of BioTac sensors embedded in each fingertip. In at least one embodiment, in addition to localizing an object, contact information provides an extremely useful signal in learning stable grasps that can generalize across different objects geometries. In at least one embodiment, a state space includes a Cartesian palm location denoted by $P_{xyz} \in \mathbb{R}^3$ and orientation $u \in \mathbb{R}^4$ all defined in a robot base frame, joint positions and velocities of 16 DOF four-fingered hand represented as $q_h$ ($\mathbb{R}^{16}$) and $\dot{q}_h$ ($\mathbb{R}^{16}$) and contact vector c which contains binary contact information about four fingertips $\mathbb{Z}_2^4$. In at least one embodiment, this results in final state space of dimension 43. In at least one embodiment, context variable κ is 24 dimensional, it contains Cartesian x, y, z ($\mathbb{R}^3$) locations of each corner of a cuboid in a robot base frame. In at least one embodiment, a robot action space is defined as a desired Cartesian hand pose and desired joint positions of fingers. In at least one embodiment, a robot action space has 22 dimensions.

In at least one embodiment, a task of reaching and grasping a wide range of objects with a multi-fingered hand is not trivial and as such reward terms are introduced to overcome several different challenges. In at least one embodiment, each reward term is presented in turn below. In at least one embodiment, a final reward is defined as a sum of these terms with weights selected such that each component has relatively equal scale.

Hand location with respect to object: In at least one embodiment, a first reward component encourages moving a palm of a hand close enough to an object to enable contact. In at least one embodiment, assuming a valid object pose estimate, keypoint locations of an object k are computed in a robot base frame. In at least one embodiment, an average of 4 keypoint locations on a top surface of an object are used, denoted $\kappa_{offset}$, to compute a following reward.

$$\mathcal{R}_{pos} = \exp\{-w_1 \|P_{xyz} - \kappa_{offset}\|\} \quad (1)$$

Hand motion: In at least one embodiment, a second reward component serves to focus a policy search on likely-to-work motions in order to overcome a relatively high-dimensional configuration space of multi-fingered hands (16 DOF for an Allegro hand). In at least one embodiment, to tackle this issue, human demonstrations are used, captured from a hand pose estimator, as useful prior information for policy learning. In at least one embodiment, this, however, introduces another concern as a kinematic structure of a human hand is different from a robot's. In at least one embodiment, to resolve this issue, a policy is rewarded when a robot's fingertip locations $q^e$ track a fingertip locations obtained from a human hand pose estimator $\hat{q}_i^e$.

$$\mathcal{R}_{hand} = \exp\left\{-w_2 \sum_{i=1}^{4} \|q_i^e - \hat{q}_i^e\|\right\} \quad (2)$$

Task success: In at least one embodiment, once a robot grasps an object, a policy is rewarded if it can successfully lift an object to a position, $p_y^o$, above its starting location, $p_y^s$.

$$\mathcal{R}_{lift} = \begin{cases} w_3, & \text{if } p_y^o > p_y^s \\ 0, & \text{otherwise} \end{cases} \quad (3)$$

Contact: In at least one embodiment, a reward function encourages a robot to make fingertip contact with an object. In at least one embodiment, contact information greatly improves an ability to learn a stable grasping policy across objects of varying size and geometry. In at least one embodiment, variable $c_i$ is defined to have value 1 if fingertip i is in contact and 0 otherwise.

$$\mathcal{R}_{contact} = \sum_{i=1}^{4} c_i \quad (4)$$

In at least one embodiment, a proximal policy optimization (PPO) algorithm is used to learn a policy. In at least one embodiment, a policy is represented as a simple multi-layered perceptron (MLP) with 2 hidden layers containing 128 neurons each. In at least one embodiment, during training, at a beginning of each rollout a new cuboid object is generated with dimensions uniformly sampled from a pre-specified range, keypoints of an object are estimated—noise is sampled and added to keypoint locations to simulate sensor noise present in a physical system—and passed as context to a policy. In at least one embodiment, keypoint values then remain same throughout that rollout. In at least one embodiment, to deploy a policy learned in simulation on a real robot, domain randomization is applied to objects to account for a discrepancy between a simulator and physical world. In at least one embodiment, in addition to keypoint location noise, uniform noise is added to object mass, friction coefficients between fingers and object, PD gains of a robot, and damping coefficients of robot joints. In at least one embodiment, range of uniform distribution is manually specified based on initial results on a robot.

In at least one embodiment, a goal is to learn a policy that generalizes to objects of non-cuboid shapes not seen during training. In at least one embodiment, a new object implies a new context for a policy. In at least one embodiment, while a bounding box of a novel object may be to extract keypoints defining context variables, this may not work well for objects with a shape that differs significantly from said bounding box. In at least one embodiment, techniques described herein are optimized over context variables in order to find values which will enable a pre-trained policy to succeed. In at least one embodiment, a restriction that keypoints define a recta-linear box is removed, thereby allowing them to take any point in 3D.

In at least one embodiment, given a policy trained in simulation over a uniform distribution of contexts, when presented with a new object a policy network is fixed and searched over context variables using CMA-ES. In at least one embodiment, keypoints are initialized using an object bounding box. In at least one embodiment, an objective function is evaluated by running a rollout in simulation and provide a height reached by an object once lifted as a continuous reward for a planner to maximize.

In at least one embodiment, techniques described here are evaluated both in simulation and on a real robot. In at least one embodiment, experiments answer following overarching questions: how important is hand demonstration data to learn an effective policy; how does including contact information change effectiveness of a grasp; how sensitive is a policy learning to object feature representation; and can a policy successfully transfer to a real robot without adaptation?

In at least one embodiment, parametrization search over a keypoint representation improves a learned policy's performance. In at least one embodiment, experiments show that techniques described herein can be used to grasp objects with 6 different styles and evaluate effectiveness of different grasp styles.

In at least one embodiment, in order to fully evaluate a proposed method, three baselines are identified to compare against:

Baseline 1. In at least one embodiment, a baseline does not use contact information in policy and setting in Eq. (4) to 0; local contact information is important in adapting to non-cuboid shapes and for identifying stable grasps once a robot hand makes contact with an object.

Baseline 2. In at least one embodiment, contact information is included; however, a policy is not rewarded for tracking human hand demonstrations—i.e. weight is set in Eq. (2) to 0. In at least one embodiment, importance of demonstration data in learning in this high-dimensional action space is tested, which, combined with sparse nature of a reward, makes it a difficult reinforcement learning problem.

Baseline 3. In at least one embodiment, a context variable κ is changed to a single 6-DoF pose vector of an object's center. In at least one embodiment, using keypoint information as context variable provides a coarse representation of object geometry enabling a policy to adapt to objects of varying shape.

In at least one embodiment, to compare effectiveness of a method to that of policies trained using baseline methods, two different tests are performed. In at least one embodiment, 100 random objects unseen by policies during training are generated and test grasps for each object from 5 random poses on a table are produced. In at least one embodiment, a number of successful grasps out of these 500 resulting trials is measured.

Figure 2:
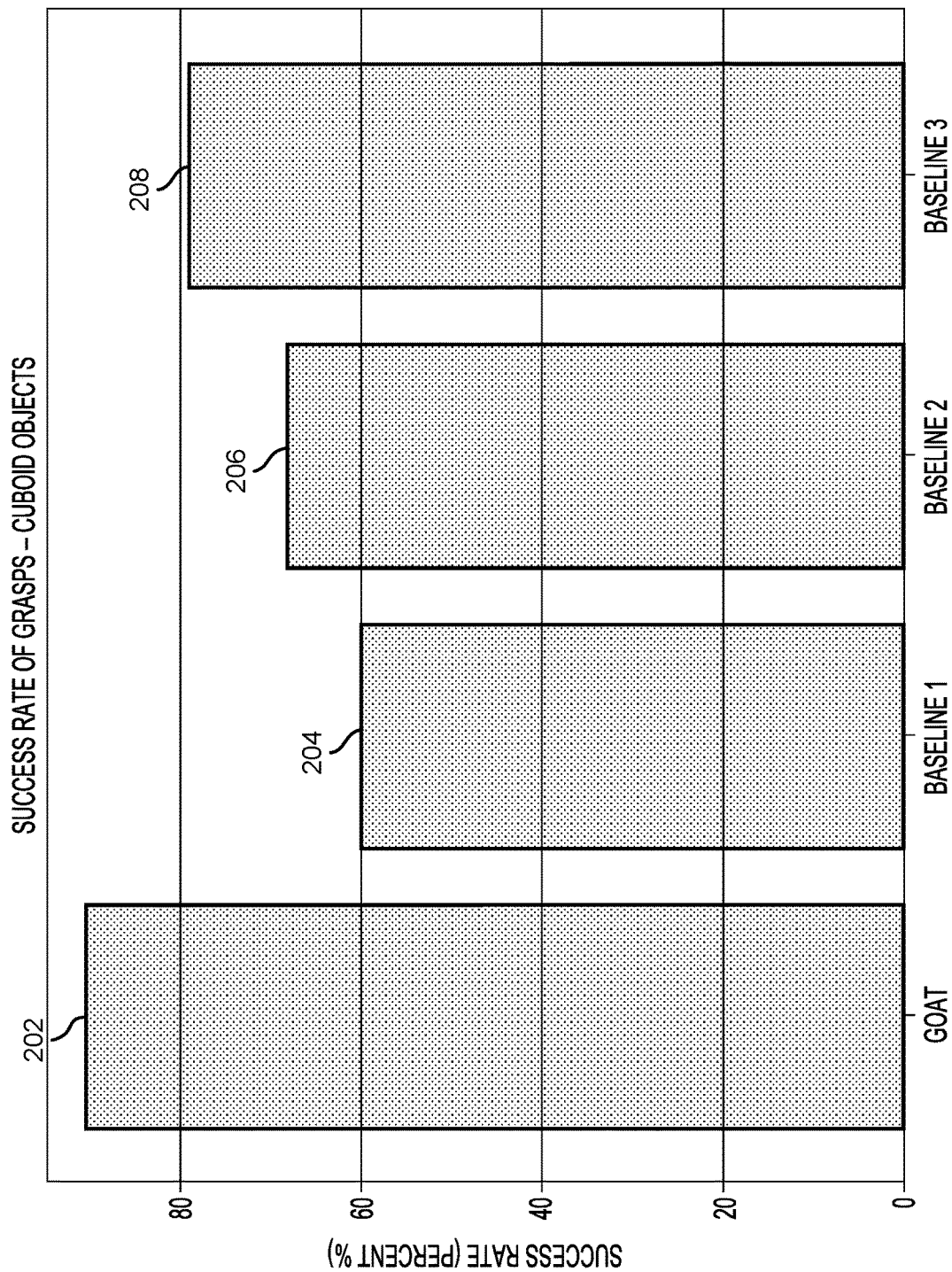
FIG. 2 illustrates effectiveness of the techniques described herein compared to other baselines for cuboid objects, according to at least one embodiment.

In at least one embodiment, FIG. 2 illustrates a number of successful grasps achieved by each method. In at least one embodiment, techniques described here achieve an 88% grasping successful rate beating out three baseline approaches. In at least one embodiment, baseline 1 204, which has no access to contact information, performs worst. In at least one embodiment, baseline 2 206 which has no demonstration data, but does include contact information, performs marginally better, showing that contact information provides a stronger learning signal for this task than demonstrations. In at least one embodiment, baseline 3 208, performs best.

FIG. 2 illustrates effectiveness of GOAT 202 compared to other baselines for cuboid objects, according to at least one embodiment. In at least one embodiment, FIG. 2 illustrates grasp success rate of trained policies in simulation. In at least one embodiment, FIG. 2 demonstrates effectiveness of GOAT compared to other baselines for cuboid objects.

Figure 3:
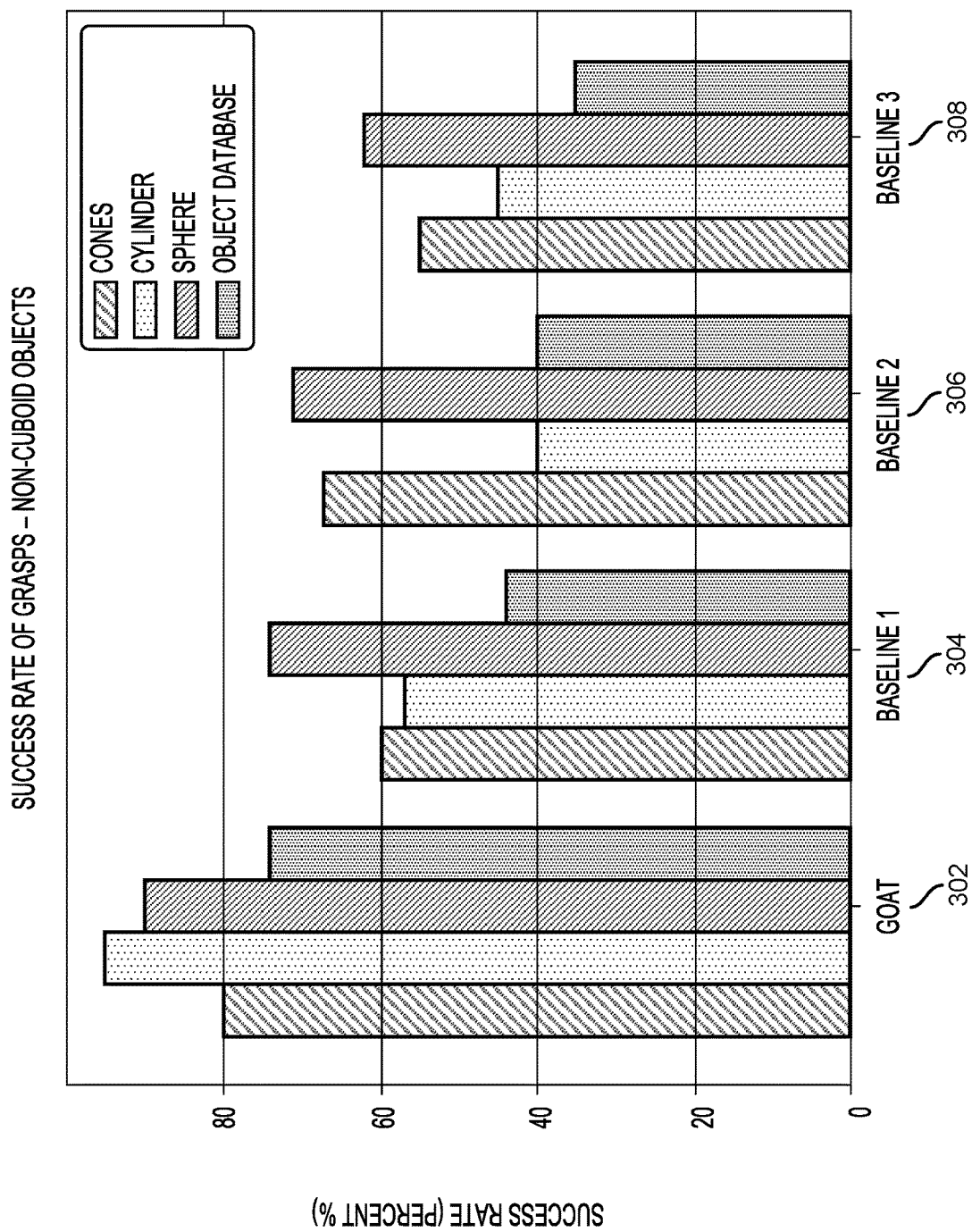
FIG. 3 illustrates success rate of different methods for non-cuboid shapes, according to at least one embodiment.

FIG. 3 illustrates success rate of different methods for non-cuboid shapes, according to at least one embodiment. In at least one embodiment, FIG. 3 shows success rate of different methods for non-cuboid shapes, which is more challenging for a policy, since these objects are not seen during training. In at least one embodiment, FIG. 3 illustrates that GOAT 302, which relies at least in part on tactile sensing, has superior performance to either baseline 1 304, baseline 2 306, or baseline 3 308.

Figure 4:
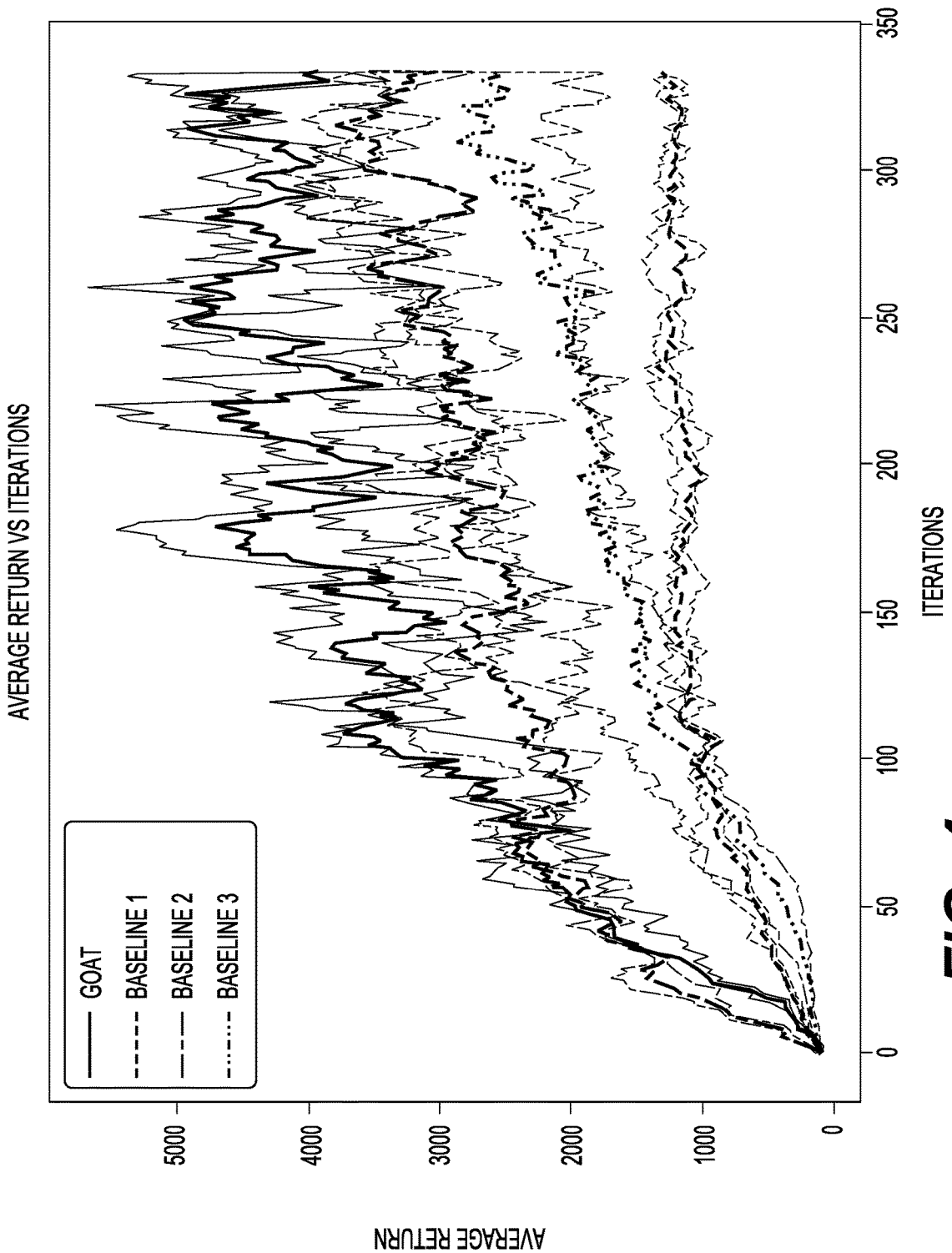
FIG. 4 illustrates average reward achieved during learning for different methods averaged over 4 initial seeds, according to at least one embodiment.

FIG. 4 illustrates average reward achieved during learning for different methods averaged over 4 initial seeds, according to at least one embodiment. In at least one embodiment, FIG. 4 shows average reward achieved during learning for different methods averaged over 4 initial seeds.

In at least one embodiment, baseline 3 does fairly well achieving a 70% success rate. In at least one embodiment, this success is attributed to its access to both contact information and hand demonstration data during training, however it lacks a similar level of geometric information as a full approach, using only an object pose as a context variable. In at least one embodiment, however, a shortcoming of this method is even more prominent when testing objects with non-cuboid shapes where geometry plays a more significant role.

In at least one embodiment, a second test demonstrates effectiveness of a policy to grasp previously unseen objects. In at least one embodiment, in this experiment 20 objects with 5 different non-cuboid shapes are selected. In at least one embodiment, each of these objects are initialized at 5 random poses and a similar grasp test is performed. FIG. 3 shows a number of successful grasps achieved by each method separated by a kind of object: cone, sphere, cylinder, and objects from a grasp database. In at least one embodiment, GOAT achieves highest performance, showing robustness to grasping novel shapes. In at least one embodiment, representative grasps generated by a method are shown in FIGS. 5-8.

Figure 5:
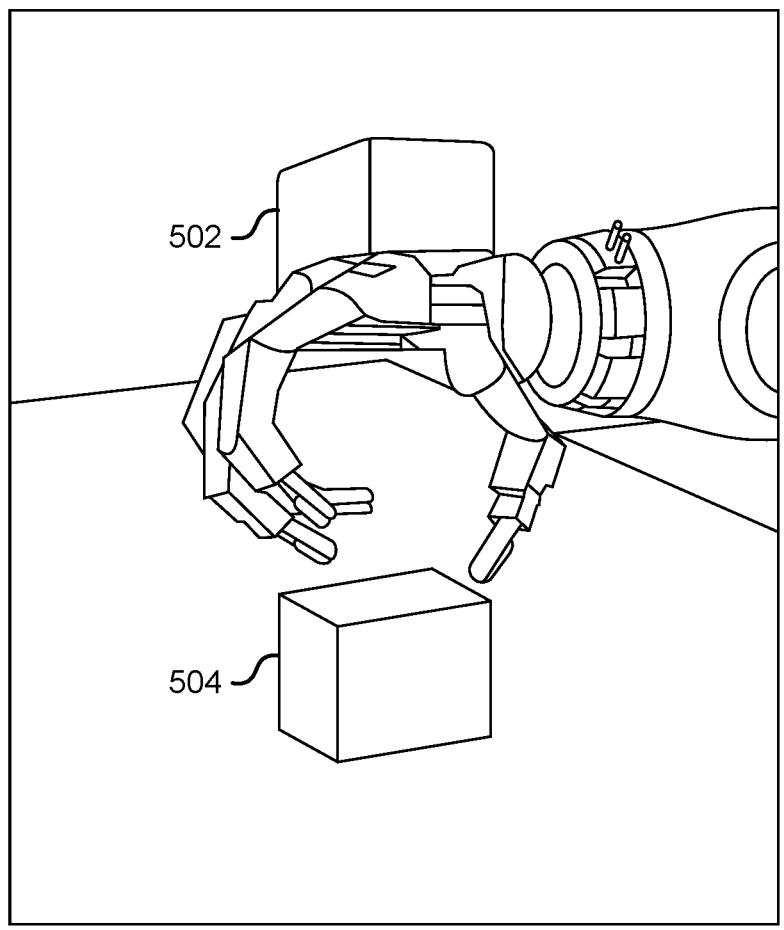
FIG. 5 illustrates representative grasps generated by a policy trained on cuboid objects, but tested on a rectangular object, according to at least one embodiment.

FIG. 5 illustrates a representative grasp generated by a policy trained on cuboid objects, but tested on a rectangular object, according to at least one embodiment. In at least one embodiment, a robotic hand 502 attempts to grasp a cuboid object 504.

Figure 6:
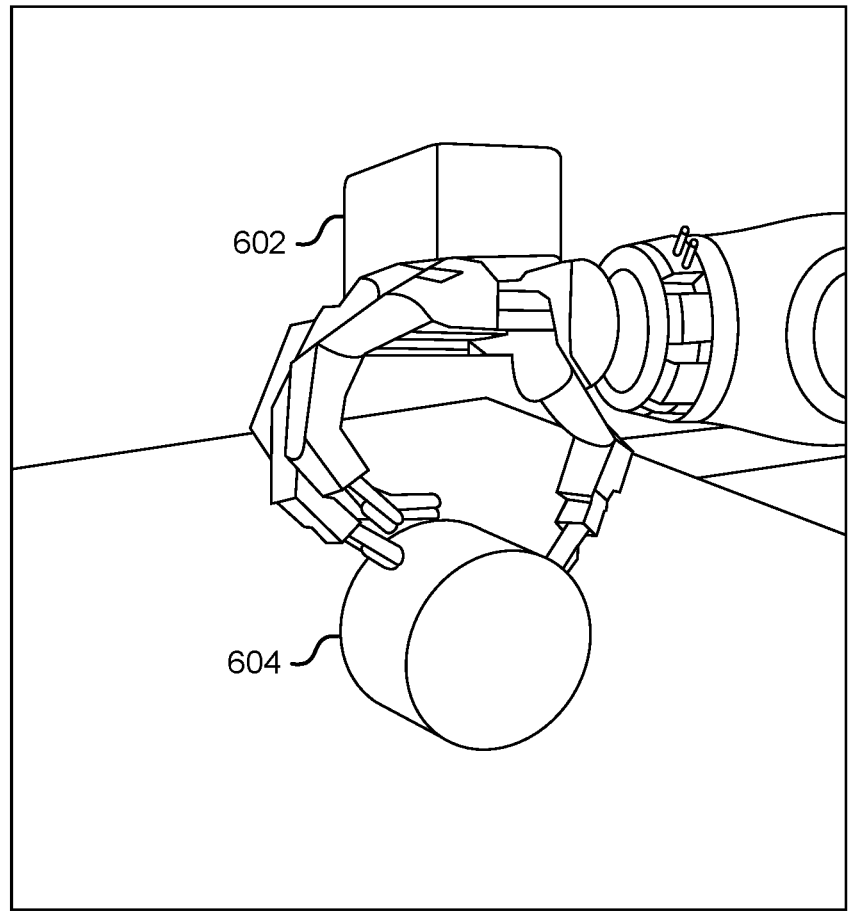
FIG. 6 illustrates representative grasps generated by a policy trained on cuboid objects, but tested on a cylindrical object, according to at least one embodiment.

FIG. 6 illustrates a representative grasp generated by a policy trained on cuboid objects, but tested on a cylindrical object, according to at least one embodiment. In at least one embodiment, a robotic hand 602 attempts to grasp a cylindrical object 604.

Figure 7:
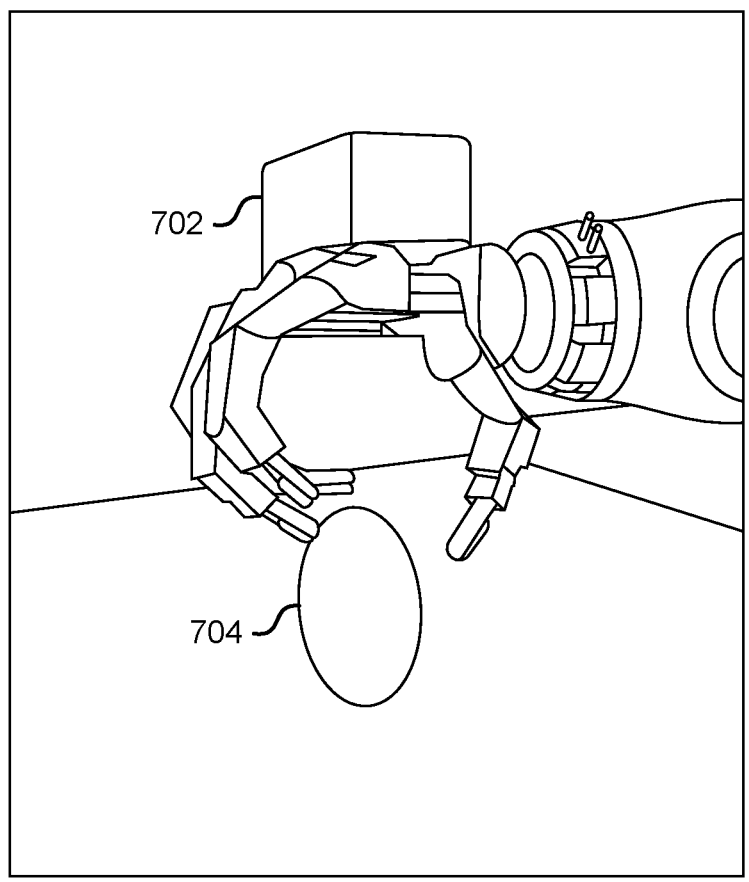
FIG. 7 illustrates representative grasps generated by a policy trained on cuboid objects, but tested on an oval object, according to at least one embodiment.

FIG. 7 illustrates a representative grasp generated by a policy trained on cuboid objects, but tested on an oval object, according to at least one embodiment. In at least one embodiment, a robotic hand 702 attempts to grasp an oval object 704.

Figure 8:
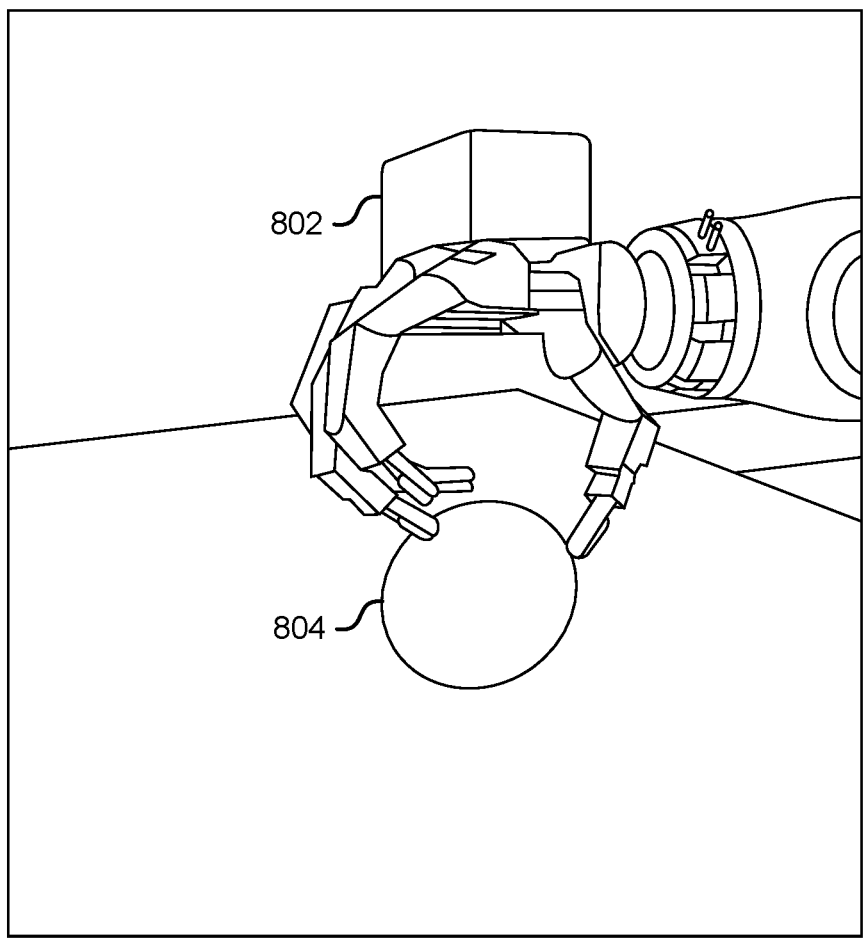
FIG. 8 illustrates representative grasps generated by a policy trained on cuboid objects, but tested on a spherical object, according to at least one embodiment.

FIG. 8 illustrates a representative grasp generated by a policy trained on cuboid objects, but tested on a spherical object, according to at least one embodiment. In at least one embodiment, a robotic hand 802 attempts to grasp a spherical object 804.

In at least one embodiment, learning curves for average reward achieved by each method during training are shown in FIG. 4. In at least one embodiment, learning curve results represent an average and variance over 4 different seeds.

In at least one embodiment, in a previous experiment with unseen objects, a trained policy is tested with context parameters selected from an object bounding box provided by a simulator. In at least one embodiment, experiments were performed to investigate effect of keypoint adaptation approach.

Figure 9:
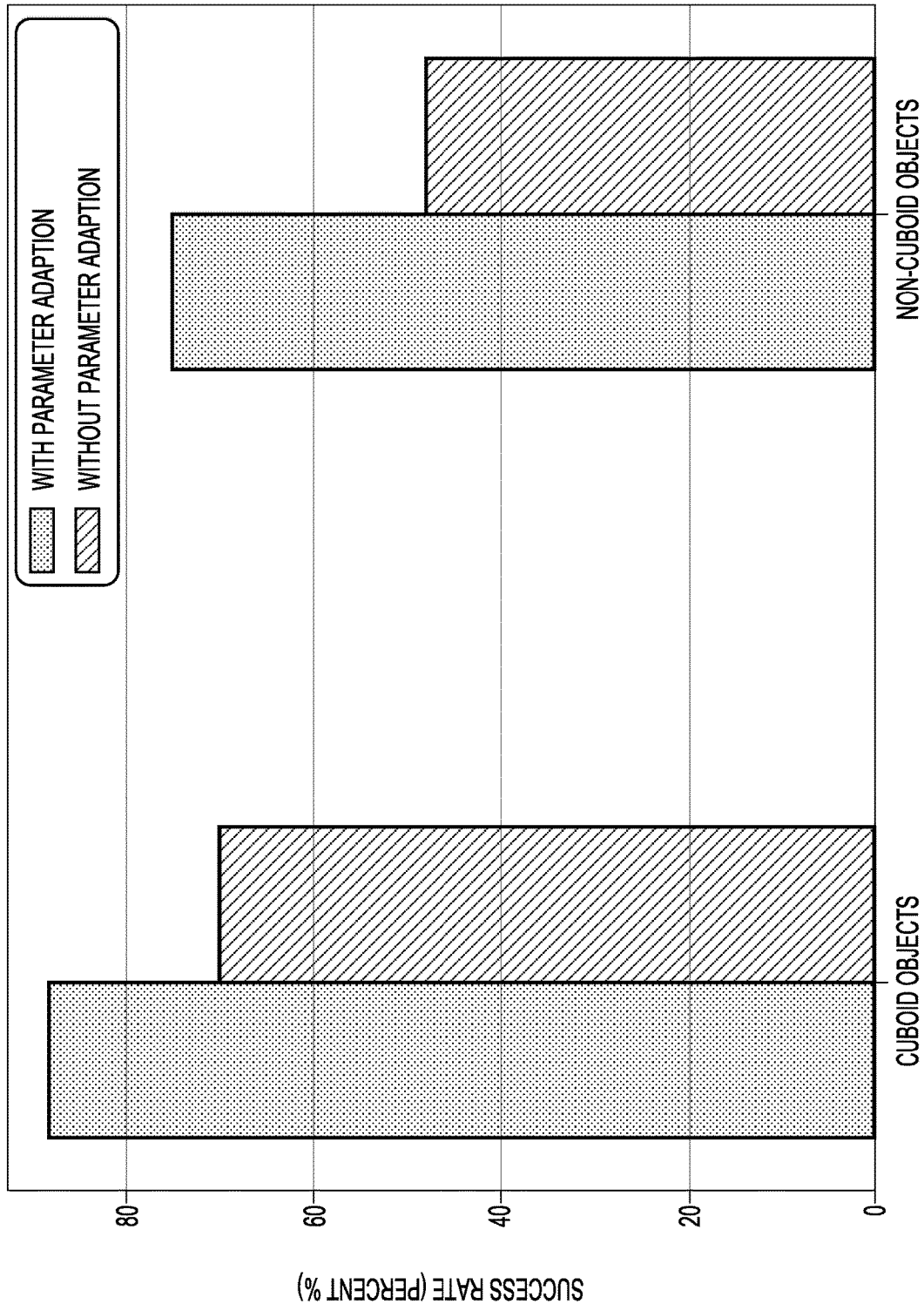
FIG. 9 illustrates benefit of performing parameter adaptation on keypoints to improve performance of a policy, according to at least one embodiment.
Figure 10:
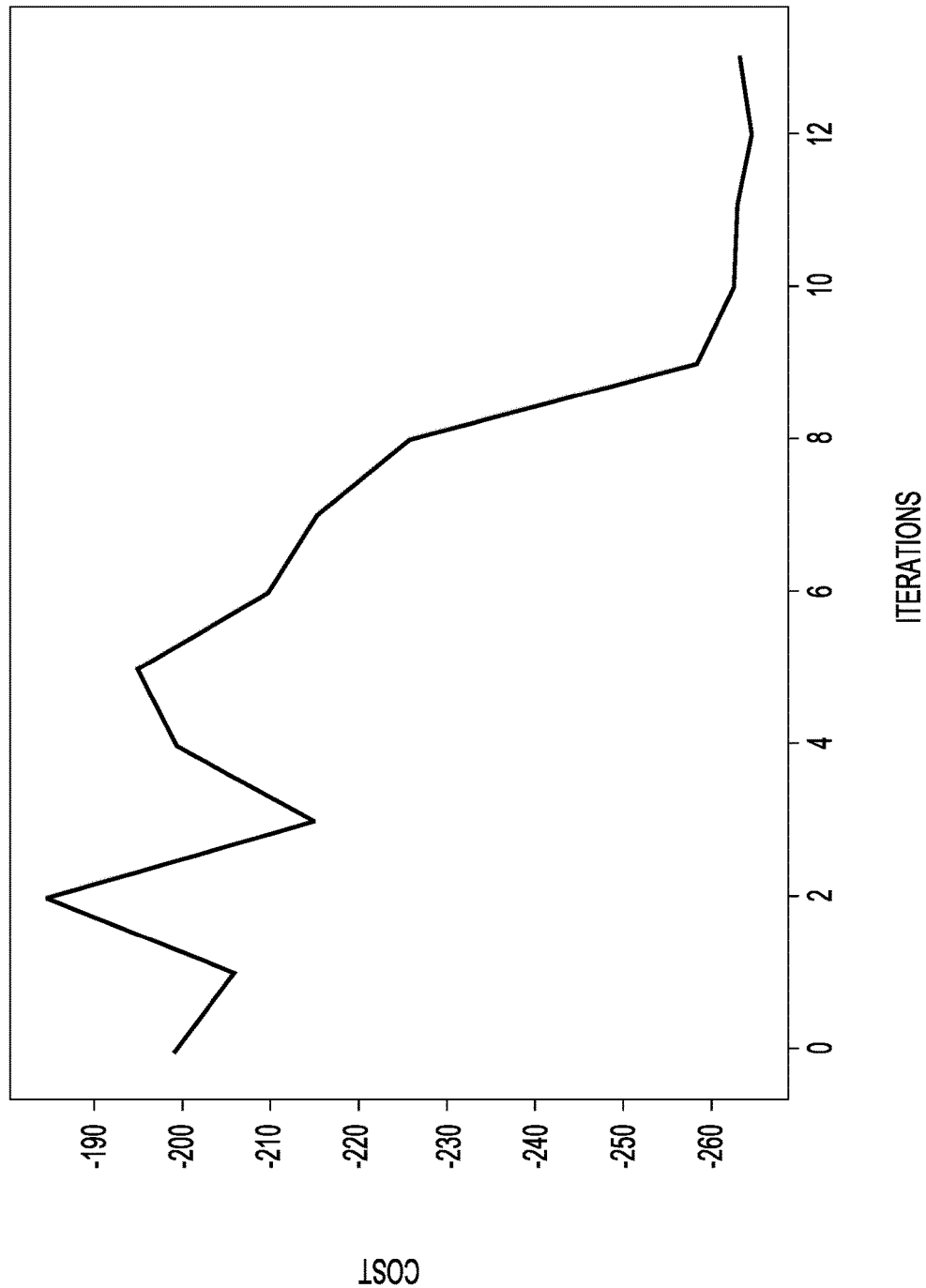
FIG. 10 illustrates how a loss curve changes during an example run of a CMA-ES optimization process which converges after 13 iterations, according to at least one embodiment.

FIG. 9 illustrates a benefit of performing parameter adaptation on keypoints to improve performance of a policy, according to at least one embodiment. In at least one embodiment, FIG. 9 shows improvement in grasp success rate after parameter adaptation for both cuboid and non-cuboid objects. In at least one embodiment, FIG. 10 illustrates how optimization loss reduces during parameter adaption process. In at least one embodiment, it takes on average≈10 iterations of CMA-ES to identify keypoint inputs that enable a policy to pick up novel objects. FIG. 10 illustrates how a loss curve changes during an example run of CMA-ES optimization process which converges after 13 iterations, according to at least one embodiment.

In at least one embodiment, to leverage hand pose data made available by a hand pose estimator, different grasping styles are learned. In at least one embodiment, 6 different styles, seen in FIGS. 12-17, can be trained to grasp objects.

Figure 11:
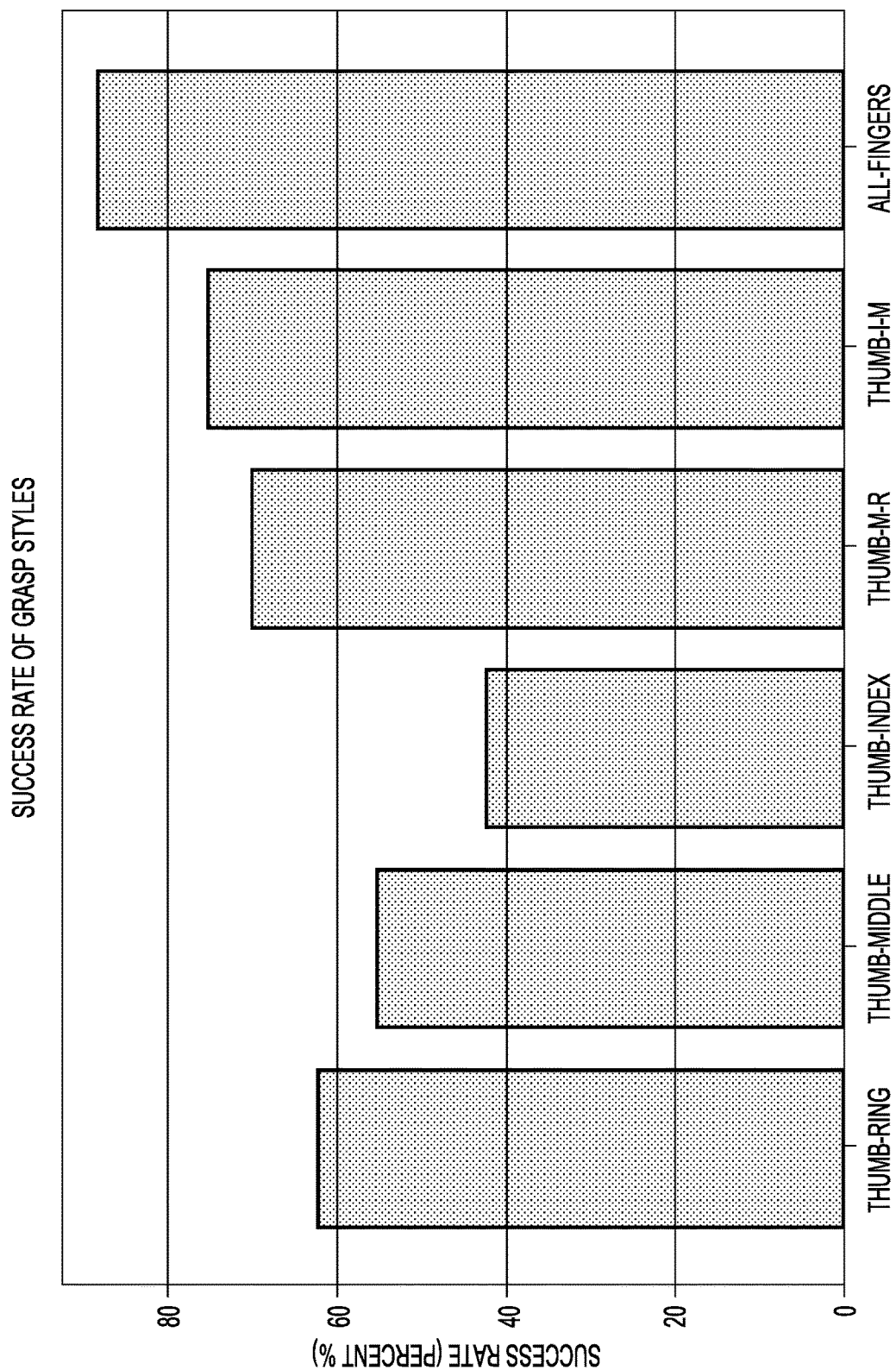
FIG. 11 illustrates a grasp success rate of each of different styles, according to at least one embodiment.

FIG. 11 illustrates grasp success rate of each of different styles, according to at least one embodiment. In at least one embodiment, two fingered grasps are not as successful as grasps with three or four fingers. In at least one embodiment, objects used for this test were a mixture of 50% cuboid and 50% non-cuboid shapes. In at least one embodiment, a policy is trained to grasp using grasp styles representing different finger combinations.

FIG. 12 illustrates training a policy to grasp using grasp styles representing a two-finger grasp, according to at least one embodiment. In at least one embodiment, a human hand 1202 provides a demonstrated grasp that is provided as an example to reward function of neural network training system. In at least one embodiment, a robotic hand 1204, under control of a trained neural network, mimics demonstrated grasp 1202.

FIG. 13 illustrates training a policy to grasp using grasp styles representing a two-finger grasp, according to at least one embodiment. In at least one embodiment, a human hand 1302 provides a demonstrated grasp that is provided as an example to reward function of neural network training system. In at least one embodiment, a robotic hand 1304, under control of a trained neural network, mimics demonstrated grasp 1302.

FIG. 14 illustrates training a policy to grasp using grasp styles representing a two-finger grasp, according to at least one embodiment. In at least one embodiment, a human hand 1402 provides a demonstrated grasp that is provided as an example to reward function of neural network training system. In at least one embodiment, a robotic hand 1404, under control of a trained neural network, mimics demonstrated grasp 1402.

FIG. 15 illustrates training a policy to grasp using grasp styles representing a three-finger grasp, according to at least one embodiment. In at least one embodiment, a human hand 1502 provides a demonstrated grasp that is provided as an example to reward function of neural network training system. In at least one embodiment, a robotic hand 1504, under control of a trained neural network, mimics demonstrated grasp 1502.

FIG. 16 illustrates training a policy to grasp using grasp styles representing a three-finger grasp, according to at least one embodiment. In at least one embodiment, a human hand 1602 provides a demonstrated grasp that is provided as an example to reward function of neural network training system. In at least one embodiment, a robotic hand 1604, under control of a trained neural network, mimics demonstrated grasp 1602.

FIG. 17 illustrates training a policy to grasp using grasp styles representing a four-finger grasp, according to at least one embodiment. In at least one embodiment, a human hand 1702 provides a demonstrated grasp that is provided as an example to reward function of neural network training system. In at least one embodiment, a robotic hand 1704, under control of a trained neural network, mimics demonstrated grasp 1702.

In at least one embodiment, one test for GOAT is whether a learned policy can be deployed onto a real world robot. In at least one embodiment, an Allegro robotic hand with 4 BioTac sensors mounted on 7DOF LBR iiwa Kuka arm is used. In at least one embodiment, DOPE is used to localize an object and generate its bounding box keypoint locations. In at least one embodiment, 5 objects DOPE can detect from a YCB dataset: cracker box, meat, mustard, soup, and sugar box are used. In at least one embodiment, three different noise levels are modeled, no noise, 1 mm, and 10 mm, where no noise refers to natural noise caused by DOPE, and latter two refer to variance used when adding noise to translation values. In at least one embodiment, for each noise value and object an object is randomly placed within a robot's workplace five times with a random in plane orientation between −30° and 30° where 0° means object's axes is aligned with a robot base.

In at least one embodiment, a method is compared against a hand written grasping policy, denoted baseline. In at least one embodiment, a baseline simply moves to a position 6 cm above estimated center of an object. In at least one embodiment, once it reaches this location, a hand begins closing its fingers towards an object. In at least one embodiment, each finger stops moving when it detects contact with an object. In at least one embodiment, once all fingers have touched an object a hand exerts more force on an object before lifting it up 7 cm.

TABLE 1

Experiments showing GOAT performance on a real world against a hand tuned baseline.

| objects | no noise baseline | no noise GOAT | noise = 0.001 baseline | noise = 0.001 GOAT | noise = 0.01 baseline | noise = 0.01 GOAT |
|---|---|---|---|---|---|---|
| cracker box | 5 | 5 | 5 | 5 | 3 | 5 |
| meat | 5 | 5 | 5 | 5 | 2 | 2 |
| mustard | 5 | 4 | 5 | 3 | 3 | 3 |
| soup | 5 | 4 | 3 | 4 | 0 | 1 |
| sugar box | 5 | 5 | 5 | 5 | 4 | 4 |
| all | 25/25 | 23/25 | 23/25 | 22/25 | 12/25 | 14/25 |

In at least one embodiment, Table 1 depicts results that show that GOAT performs similarly to baseline under different noise levels. In at least one embodiment, soup is a challenging object for performing a top grasp, but GOAT moves its finger in such a way that it searches for an object and achieves a stable grasp with a cylinder even though it was not trained on such a physical object. In at least one embodiment, representative grasps generated by a policy are shown for each object in FIGS. 18-22.

Figure 18:
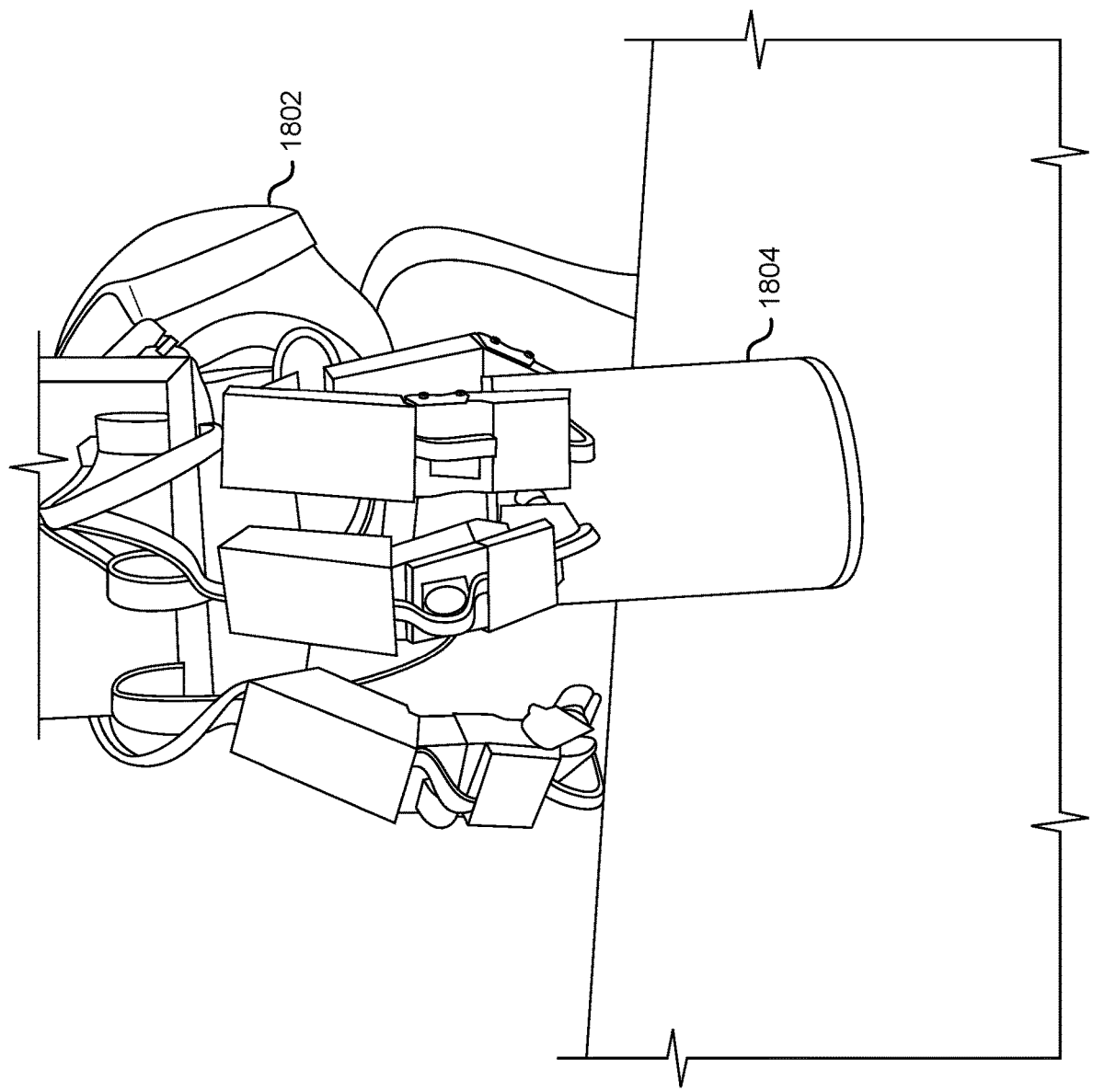
FIG. 18 illustrates a representative grasp of a soup can generated by a policy executed on a physical robot, according to at least one embodiment.

FIG. 18 illustrates a representative grasp of a soup can generated by a policy executed on a physical robot, according to at least one embodiment. In at least one embodiment, a robotic hand 1802 grasps a can 1804. In at least one embodiment, can 1804 is located by providing a control system with a bounding box (or cuboid) approximately encompassing object. In at least one embodiment, robotic hand 1802 grasps can 1804 under control of a neural network, where neural network is provided with a cuboid approximately encompassing can 1804. In at least one embodiment, neural network is not trained explicitly using an object shaped like can 1804.

Figure 19:
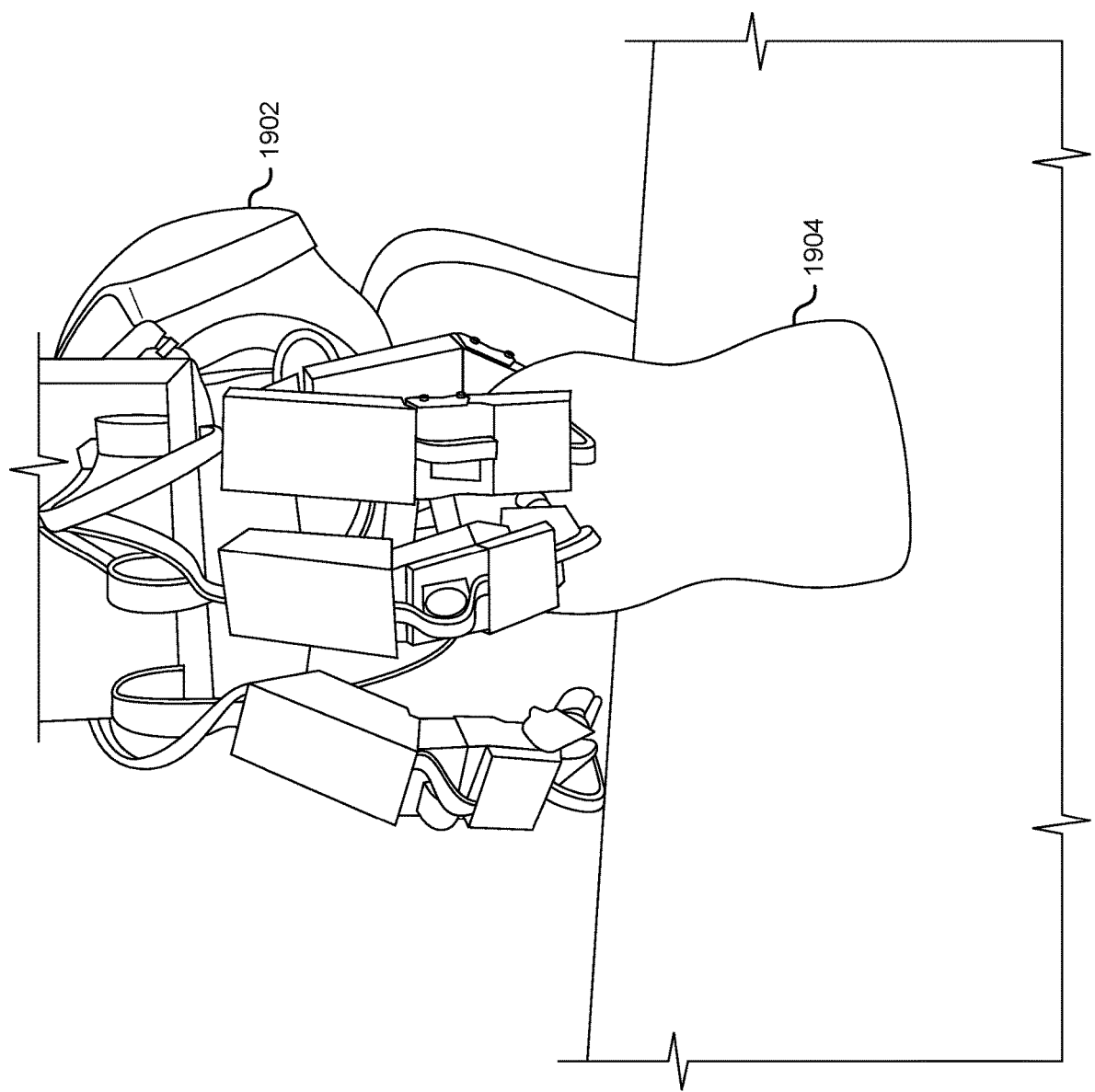
FIG. 19 illustrates a representative grasp of a soft bottle can generated by a policy executed on a physical robot, according to at least one embodiment.

FIG. 19 illustrates a representative grasp of a soft bottle can generated by a policy executed on a physical robot, according to at least one embodiment. In at least one embodiment, a robotic hand 1902 grasps a plastic bottle 1904. In at least one embodiment, plastic bottle 1904 is located by providing a control system with a bounding box (or cuboid) approximately encompassing object. In at least one embodiment, robotic hand 1902 grasps plastic bottle 1904 under control of a neural network, where neural network is provided with a cuboid approximately encompassing plastic bottle 1904. In at least one embodiment, neural network is not trained explicitly using an object shaped like plastic bottle 1904.

Figure 20:
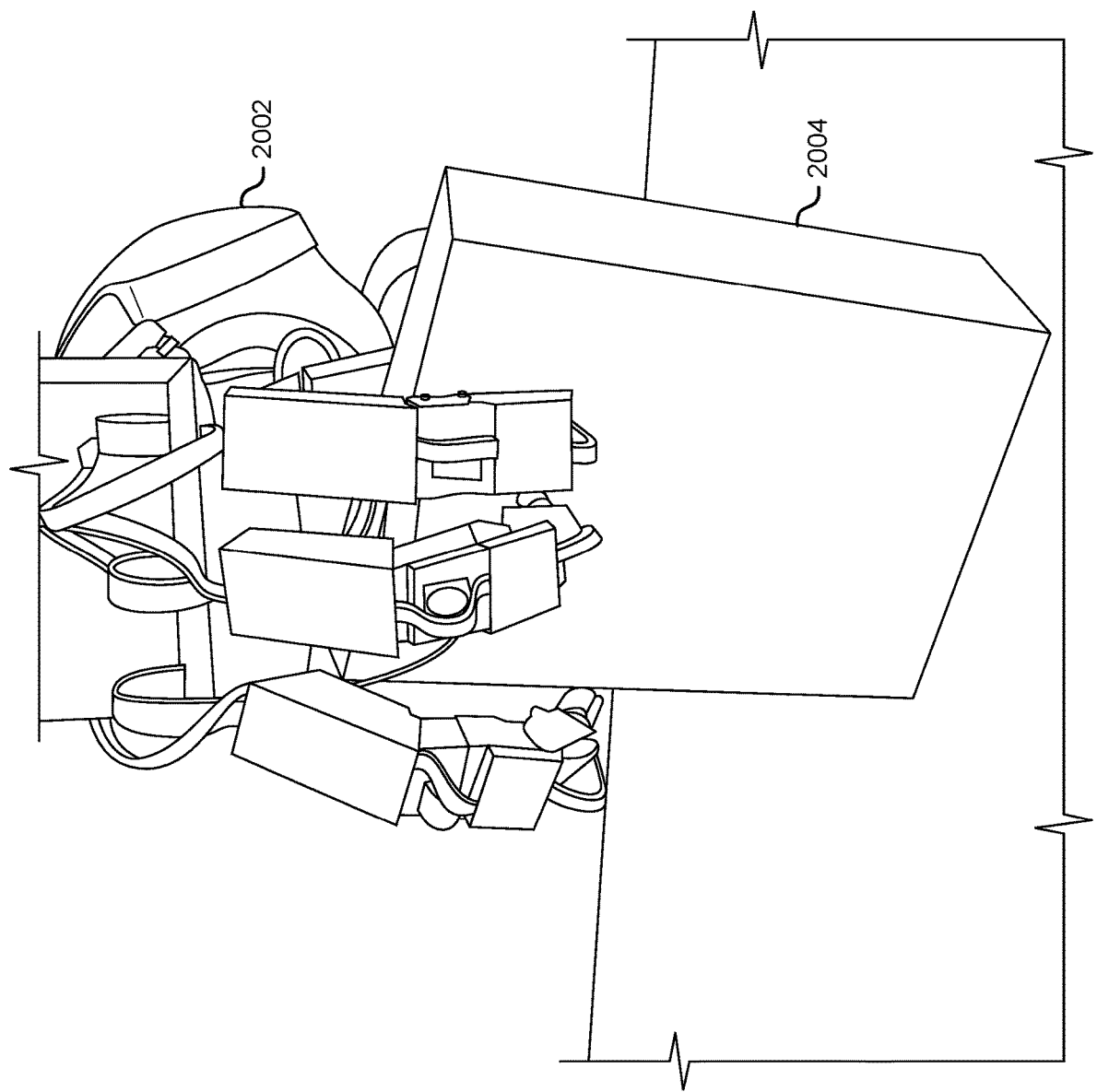
FIG. 20 illustrates a representative grasp of a rectangular box generated by a policy executed on a physical robot, according to at least one embodiment.

FIG. 20 illustrates a representative grasp of a rectangular box generated by a policy executed on a physical robot, according to at least one embodiment. In at least one embodiment, a robotic hand 2002 grasps a box 2004. In at least one embodiment, box 2004 is located by providing a control system with a bounding box (or cuboid) approximately encompassing object. In at least one embodiment, robotic hand 2002 grasps box 2004 under control of a neural network, where neural network is provided with a cuboid approximately encompassing box 2004. In at least one embodiment, neural network is not trained explicitly using an object shaped like box 2004.

Figure 21:
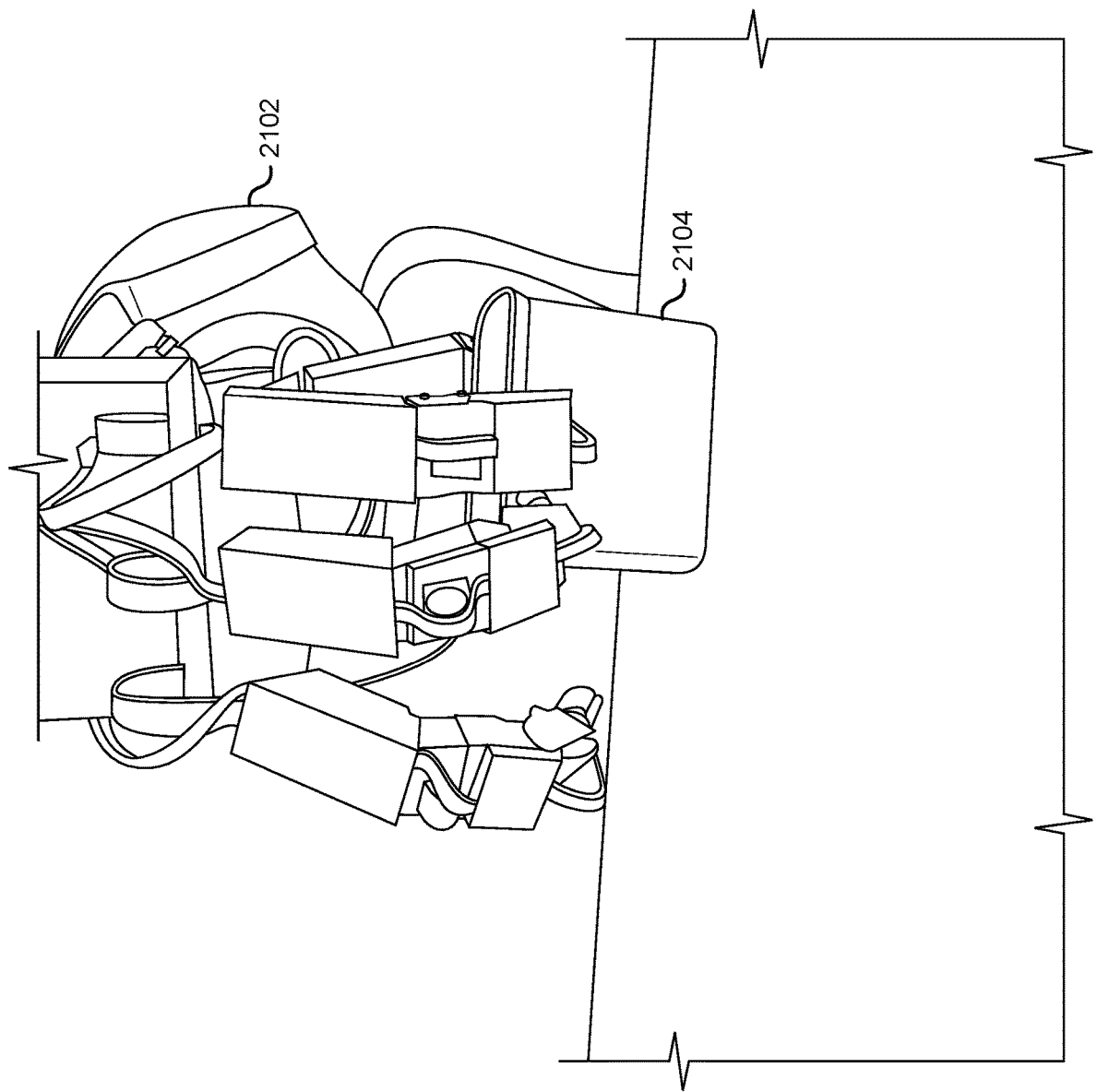
FIG. 21 illustrates a representative grasp of a rounded-rectangle-shaped can generated by a policy executed on a physical robot, according to at least one embodiment.

FIG. 21 illustrates a representative grasp of a rounded-rectangle-shaped can generated by a policy executed on a physical robot, according to at least one embodiment. In at least one embodiment, a robotic hand 2102 grasps a square can 2104. In at least one embodiment, square can 2104 is located by providing a control system with a bounding box (or cuboid) approximately encompassing object. In at least one embodiment, robotic hand 2102 grasps can 2104 under control of a neural network, where neural network is provided with a cuboid approximately encompassing square can 2104. In at least one embodiment, neural network is not trained explicitly using an object shaped like square can 2104.

Figure 22:
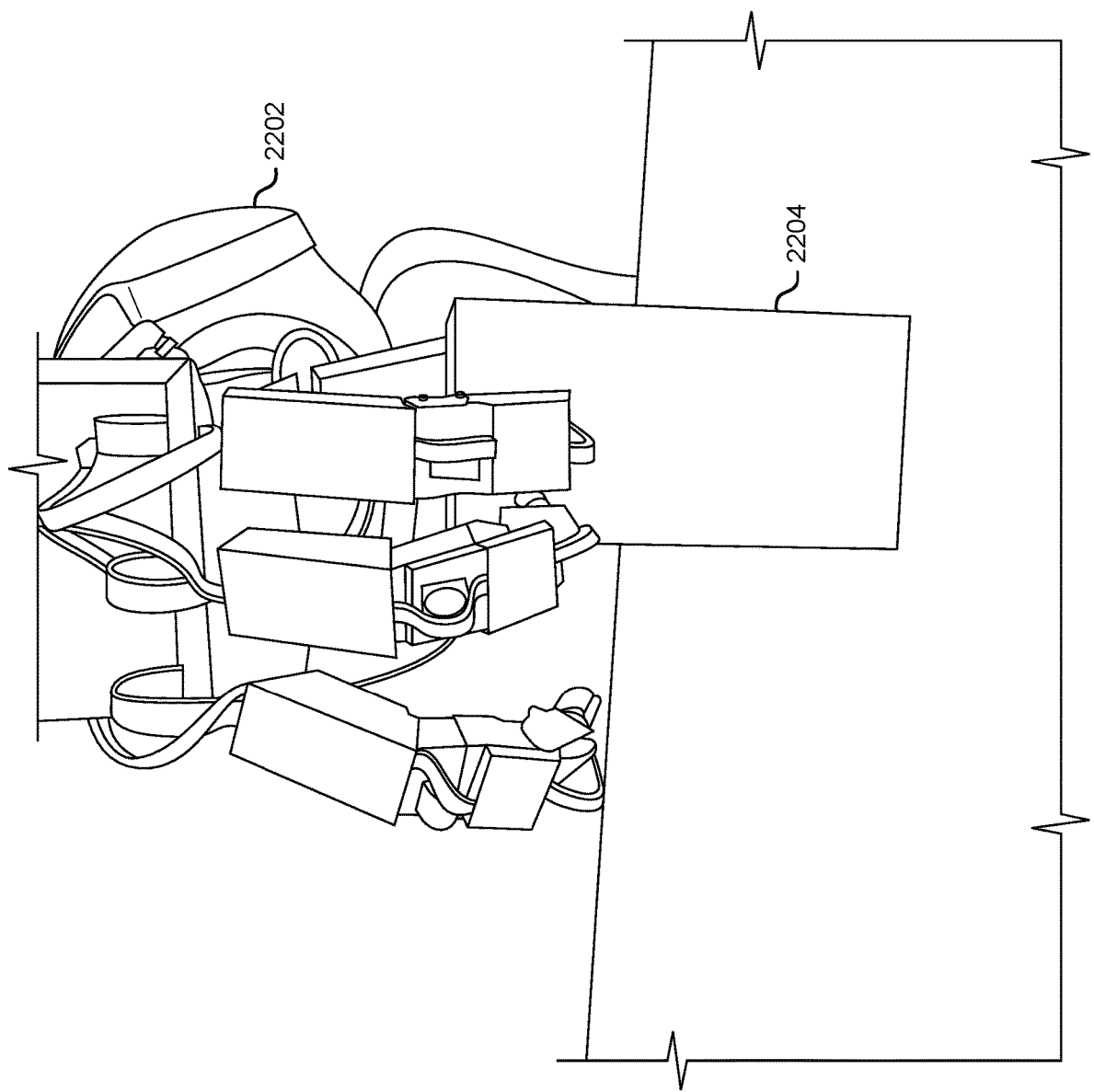
FIG. 22 illustrates a representative grasp of a box generated by a policy executed on a physical robot, according to at least one embodiment.

FIG. 22 illustrates a representative grasp of a box generated by a policy executed on a physical robot, according to at least one embodiment. In at least one embodiment, a robotic hand 2202 grasps a tall box 2204. In at least one embodiment, tall box 2204 is located by providing a control system with a bounding box (or cuboid) approximately encompassing object. In at least one embodiment, robotic hand 2202 grasps tall box 2204 under control of a neural network, where neural network is provided with a cuboid approximately encompassing tall box 2204. In at least one embodiment, neural network is not trained explicitly using an object shaped like tall box 2204.

In at least one embodiment, a contextual policy search approach to learning policies for grasping unknown objects with multi-fingered hands is provided. In at least one embodiment, an approach is shown to be able to train purely in simulation and be successfully deployed in a real world on a physical robot. In at least one embodiment, use of bounding box keypoints as a contextual representation for a reward and, in turn, a policy is introduced. In at least one embodiment, coupling this keypoint representation with contact sensing in a policy allows a robot to adapt to previously unseen shapes and overcome uncertainty in object pose estimation arising from noisy visual sensing. In at least one embodiment, for objects with shape deviating greatly from that of a bounding box (e.g. a cone) techniques described herein are optimized over context variables to enable greater grasping performance without needing to retrain a learned policy.

In at least one embodiment, a processor comprising one or more processing circuits to perform a grasp of an object using a robotic gripper that has one or more tactile sensors using a neural network, said neural network trained, at least in part, by performing, in simulation, a plurality of grasps on objects having different shapes. A system, comprising one or more processors to direct a robotic hand equipped with one or more tactile sensors to grasp a first object using one or more neural networks trained, at least in part, by simulating a grasp of a second object having a different shape than said first object; and one or more memories to store said one or more neural networks.

In at least one embodiment, A method of grasping an object comprising using a neural network trained, at least in part, by simulating a robotic hand with one or more tactile sensors using a neural network, said neural network trained, at least in part, by evaluating in simulation, a plurality of grasps on objects having different shapes.

In at least one embodiment, techniques described herein are used to implement a robotic picking and/or placement system. In at least one embodiment, a robotic hand is directed to grasp an object from a bin or container containing objects of various shapes and sizes. In at least one embodiment, a robotic hand places picked objects into a box or container. In at least one embodiment, a warehouse automation system utilizes above pick and place system for automated inventory control.

Inference and Training Logic

Figure 23A:
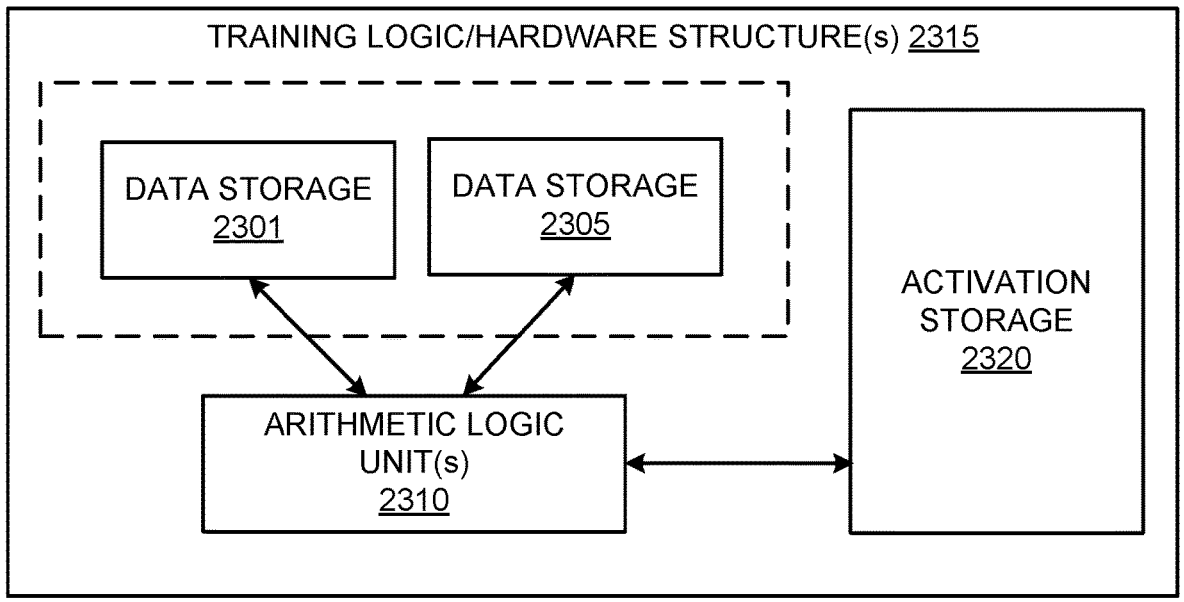
FIG. 23A illustrates inference and/or training logic, according to at least one embodiment.

FIG. 23A illustrates inference and/or training logic 2315 used to perform inferencing and/or training operations associated with one or more embodiments. Details regarding inference and/or training logic 2315 are provided below in conjunction with FIGS. 23A and/or 23B.

In at least one embodiment, inference and/or training logic 2315 may include, without limitation, code and/or data storage 2301 to store forward and/or output weight and/or input/output data, and/or other parameters to configure neurons or layers of a neural network trained and/or used for inferencing in aspects of one or more embodiments. In at least one embodiment, training logic 2315 may include, or be coupled to code and/or data storage 2301 to store graph code or other software to control timing and/or order, in which weight and/or other parameter information is to be loaded to configure logic, including integer and/or floating point units (collectively, arithmetic logic units (ALUs)). In at least one embodiment, code, such as graph code, loads weight or other parameter information into processor ALUs based on an architecture of a neural network to which code corresponds. In at least one embodiment code and/or data storage 2301 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2301 may be included with other on-chip or off-chip data storage, including a processor's L1, L2, or L3 cache or system memory.

In at least one embodiment, any portion of code and/or data storage 2301 may be internal or external to one or more processors or other hardware logic devices or circuits. In at least one embodiment, code and/or code and/or data storage 2301 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 2301 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2315 may include, without limitation, a code and/or data storage 2305 to store backward and/or output weight and/or input/output data corresponding to neurons or layers of a neural network trained and/or used for inferencing in aspects of one or more embodiments. In at least one embodiment, code and/or data storage 2305 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2315 may include, or be coupled to code and/or data storage 2305 to store graph code or other software to control timing and/or order, in which weight and/or other parameter information is to be loaded to configure logic, including integer and/or floating point units (collectively, arithmetic logic units (ALUs)). In at least one embodiment, code, such as graph code, loads weight or other parameter information into processor ALUs based on an architecture of a neural network to which code corresponds. In at least one embodiment, any portion of code and/or data storage 2305 may be included with other on-chip or off-chip data storage, including a processor's L1, L2, or L3 cache or system memory. In at least one embodiment, any portion of code and/or data storage 2305 may be internal or external to on one or more processors or other hardware logic devices or circuits. In at least one embodiment, code and/or data storage 2305 may be cache memory, DRAM, SRAM, non-volatile memory (e.g., Flash memory), or other storage. In at least one embodiment, choice of whether code and/or data storage 2305 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2301 and code and/or data storage 2305 may be separate storage structures. In at least one embodiment, code and/or data storage 2301 and code and/or data storage 2305 may be same storage structure. In at least one embodiment, code and/or data storage 2301 and code and/or data storage 2305 may be partially same storage structure and partially separate storage structures. In at least one embodiment, any portion of code and/or data storage 2301 and code and/or data storage 2305 may be included with other on-chip or off-chip data storage, including a processor's L1, L2, or L3 cache or system memory.

In at least one embodiment, inference and/or training logic 2315 may include, without limitation, one or more arithmetic logic unit(s) ("ALU(s)") 2310, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2320 that are functions of input/output and/or weight parameter data stored in code and/or data storage 2301 and/or code and/or data storage 2305. In at least one embodiment, activations stored in activation storage 2320 are generated according to linear algebraic and or matrix-based mathematics performed by ALU(s) 2310 in response to performing instructions or other code, wherein weight values stored in code and/or data storage 2305 and/or data 2301 are used as operands along with other values, such as bias values, gradient information, momentum values, or other parameters or hyperparameters, any or all of which may be stored in code and/or data storage 2305 or code and/or data storage 2301 or another storage on or off-chip.

In at least one embodiment, ALU(s) 2310 are included within one or more processors or other hardware logic devices or circuits, whereas in another embodiment, ALU(s) 2310 may be external to a processor or other hardware logic device or circuit that uses them (e.g., a co-processor). In at least one embodiment, ALUs 2310 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 2301, code and/or data storage 2305, and activation storage 2320 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 2320 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2320 may be cache memory, DRAM, SRAM, non-volatile memory (e.g., Flash memory), or other storage. In at least one embodiment, activation storage 2320 may be completely or partially within or external to one or more processors or other logical circuits. In at least one embodiment, choice of whether activation storage 2320 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 2315 illustrated in FIG. 23A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 2315 illustrated in FIG. 23A may be used in conjunction with central processing unit ("CPU") hardware, graphics processing unit ("GPU") hardware or other hardware, such as field programmable gate arrays ("FPGAs").

Figure 23B:
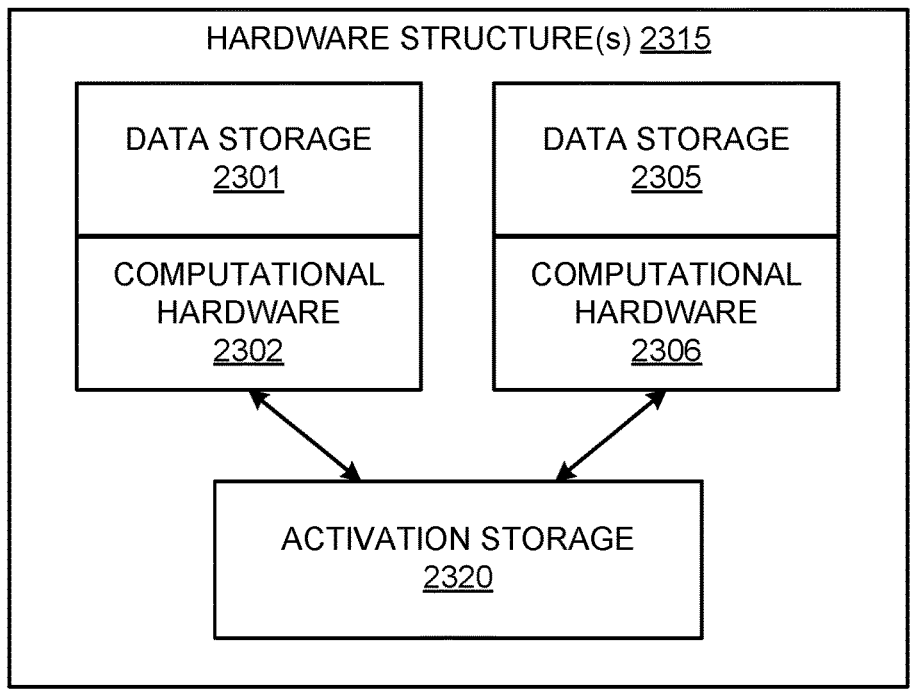
FIG. 23B illustrates inference and/or training logic, according to at least one embodiment.

FIG. 23B illustrates inference and/or training logic 2315, according to at least one embodiment various. In at least one embodiment, inference and/or training logic 2315 may include, without limitation, hardware logic in which computational resources are dedicated or otherwise exclusively used in conjunction with weight values or other information corresponding to one or more layers of neurons within a neural network. In at least one embodiment, inference and/or training logic 2315 illustrated in FIG. 23B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 2315 illustrated in FIG. 23B may be used in conjunction with central processing unit (CPU) hardware, graphics processing unit (GPU) hardware or other hardware, such as field programmable gate arrays (FPGAs). In at least one embodiment, inference and/or training logic 2315 includes, without limitation, code and/or data storage 2301 and code and/or data storage 2305, which may be used to store code (e.g., graph code), weight values and/or other information, including bias values, gradient information, momentum values, and/or other parameter or hyperparameter information. In at least one embodiment illustrated in FIG. 23B, each of code and/or data storage 2301 and code and/or data storage 2305 is associated with a dedicated computational resource, such as computational hardware 2302 and computational hardware 2306, respectively. In at least one embodiment, each of computational hardware 2302 and computational hardware 2306 comprises one or more ALUs that perform mathematical functions, such as linear algebraic functions, only on information stored in code and/or data storage 2301 and code and/or data storage 2305, respectively, result of which is stored in activation storage 2320.

In at least one embodiment, each of code and/or data storage 2301 and 2305 and corresponding computational hardware 2302 and 2306, respectively, correspond to different layers of a neural network, such that resulting activation from one "storage/computational pair 2301/2302" of code and/or data storage 2301 and computational hardware 2302 is provided as an input to next "storage/computational pair 2305/2306" of code and/or data storage 2305 and computational hardware 2306, in order to mirror conceptual organization of a neural network. In at least one embodiment, each of storage/computational pairs 2301/2302 and 2305/2306 may correspond to more than one neural network layer. In at least one embodiment, additional storage/computation pairs (not shown) subsequent to or in parallel with storage computation pairs 2301/2302 and 2305/2306 may be included in inference and/or training logic 2315.

Neural Network Training and Deployment

Figure 24:
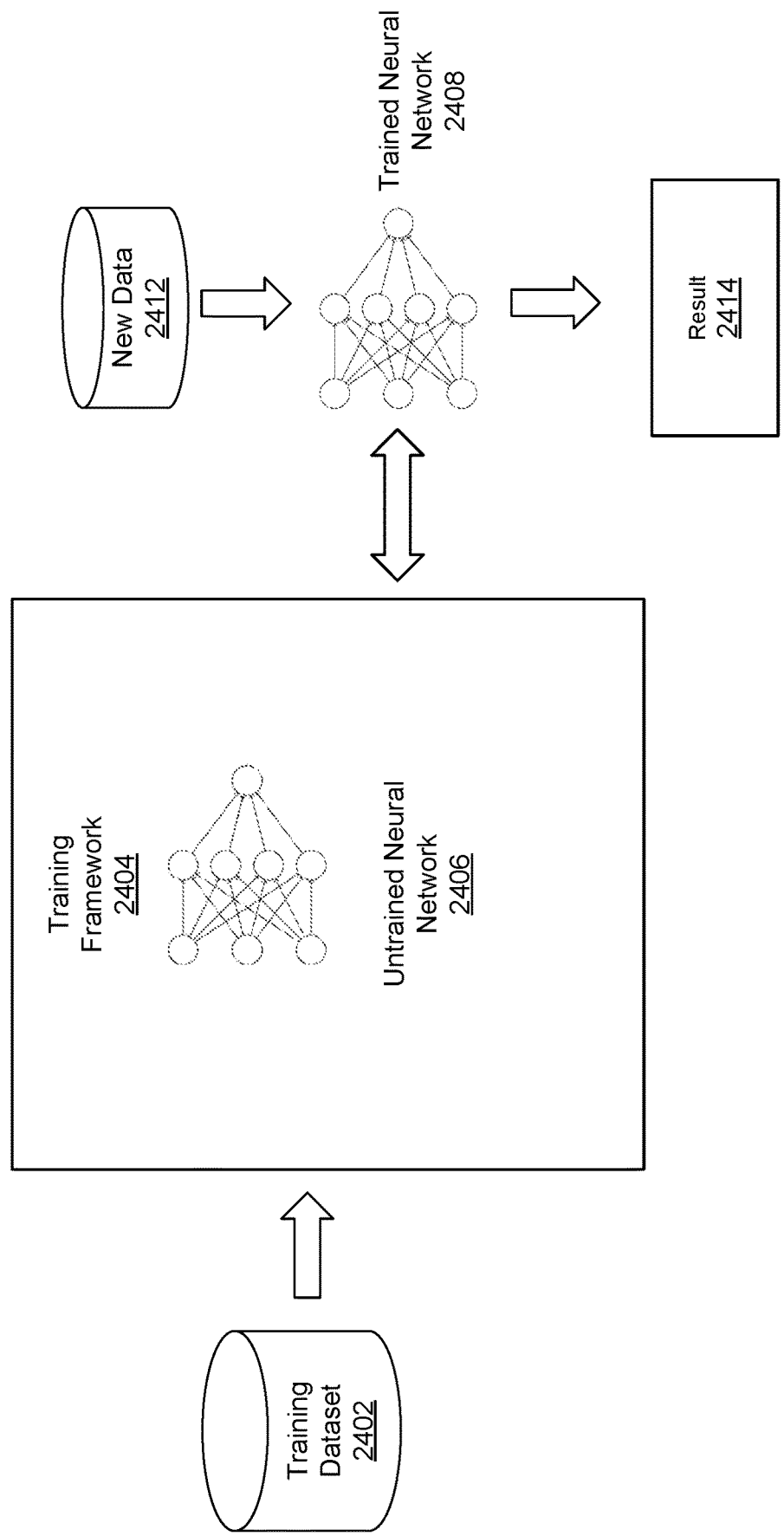
FIG. 24 illustrates training and deployment of a neural network, according to at least one embodiment.

FIG. 24 illustrates training and deployment of a deep neural network, according to at least one embodiment. In at least one embodiment, untrained neural network 92406 is trained using a training dataset 2402. In at least one embodiment, training framework 2404 is a PyTorch framework, whereas in other embodiments, training framework 2404 is a Tensorflow, Boost, Caffe, Microsoft Cognitive Toolkit/ CNTK, MXNet, Chainer, Keras, Deeplearning4j, or other training framework. In at least one embodiment training framework 2404 trains an untrained neural network 2406 and enables it to be trained using processing resources described herein to generate a trained neural network 2408. In at least one embodiment, weights may be chosen randomly or by pre-training using a deep belief network. In at least one embodiment, training may be performed in either a supervised, partially supervised, or unsupervised manner.

In at least one embodiment, untrained neural network 2406 is trained using supervised learning, wherein training dataset 2402 includes an input paired with a desired output for an input, or where training dataset 2402 includes input having a known output and an output of neural network 2406 is manually graded. In at least one embodiment, untrained neural network 2406 is trained in a supervised manner, processes inputs from training dataset 2402 and compares resulting outputs against a set of expected or desired outputs. In at least one embodiment, errors are then propagated back through untrained neural network 2406. In at least one embodiment, training framework 2404 adjusts weights that control untrained neural network 2406. In at least one embodiment, training framework 2404 includes tools to monitor how well untrained neural network 2406 is converging towards a model, such as trained neural network 2408, suitable to generating correct answers, such as in result 2414, based on known input data, such as new data 2412. In at least one embodiment, training framework 2404 trains untrained neural network 2406 repeatedly while adjusting weights to refine an output of untrained neural network 2406 using a loss function and adjustment algorithm, such as stochastic gradient descent. In at least one embodiment, training framework 2404 trains untrained neural network 2406 until untrained neural network 2406 achieves a desired accuracy. In at least one embodiment, trained neural network 2408 can then be deployed to implement any number of machine learning operations.

In at least one embodiment, untrained neural network 2406 is trained using unsupervised learning, wherein untrained neural network 2406 attempts to train itself using unlabeled data. In at least one embodiment, unsupervised learning training dataset 2402 will include input data without any associated output data or "ground truth" data. In at least one embodiment, untrained neural network 2406 can learn groupings within training dataset 2402 and can determine how individual inputs are related to untrained dataset 2402. In at least one embodiment, unsupervised training can be used to generate a self-organizing map, which is a type of trained neural network 2408 capable of performing operations useful in reducing dimensionality of new data 2412. In at least one embodiment, unsupervised training can also be used to perform anomaly detection, which allows identification of data points in a new dataset 2412 that deviate from normal patterns of new dataset 2412.

In at least one embodiment, semi-supervised learning may be used, which is a technique in which in training dataset 2402 includes a mix of labeled and unlabeled data. In at least one embodiment, training framework 2404 may be used to perform incremental learning, such as through transferred learning techniques. In at least one embodiment, incremental learning enables trained neural network 2408 to adapt to new data 2412 without forgetting knowledge instilled within network during initial training.

Data Center

Figure 25:
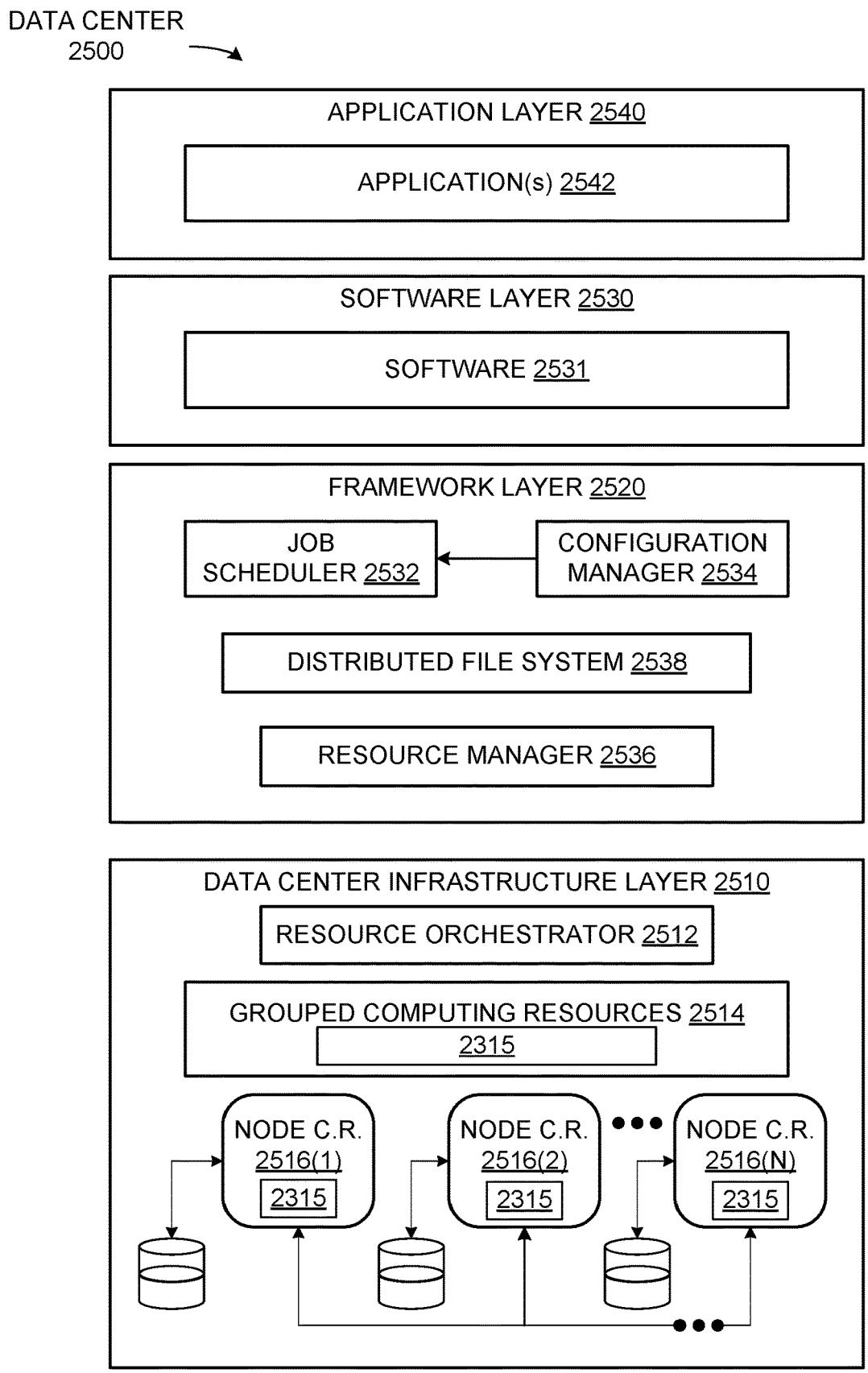
FIG. 25 illustrates an example data center system, according to at least one embodiment.

FIG. 25 illustrates an example data center 2500, in which at least one embodiment may be used. In at least one embodiment, data center 2500 includes a data center infrastructure layer 2510, a framework layer 2520, a software layer 2530 and an application layer 2540.

In at least one embodiment, as shown in FIG. 25, data center infrastructure layer 2510 may include a resource orchestrator 2512, grouped computing resources 2514, and node computing resources ("node C.R.s") 2516(1)-2516(N), where "N" represents any whole, positive integer. In at least one embodiment, node C.R.s 2516(1)-2516(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 2516(1)-2516(N) may be a server having one or more of above-mentioned computing resources.

In at least one embodiment, grouped computing resources 2514 may include separate groupings of node C.R.s housed within one or more racks (not shown), or many racks housed in data centers at various geographical locations (also not shown). Separate groupings of node C.R.s within grouped computing resources 2514 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 2512 may configure or otherwise control one or more node C.R.s 2516(1)-2516(N) and/or grouped computing resources 2514. In at least one embodiment, resource orchestrator 2512 may include a software design infrastructure ("SDI") management entity for data center 2500. In at least one embodiment, resource orchestrator may include hardware, software or some combination thereof.

In at least one embodiment, as shown in FIG. 25, framework layer 2520 includes a job scheduler 2532, a configuration manager 2534, a resource manager 2536 and a distributed file system 2538. In at least one embodiment, framework layer 2520 may include a framework to support software 2531 of software layer 2530 and/or one or more application(s) 2542 of application layer 2540. In at least one embodiment, software 2532 or application(s) 2542 may respectively include web-based service software or applications, such as those provided by Amazon Web Services, Google Cloud and Microsoft Azure. In at least one embodiment, framework layer 2520 may be, but is not limited to, a type of free and open-source software web application framework such as Apache Spark™ (hereinafter "Spark") that may utilize distributed file system 2538 for large-scale data processing (e.g., "big data"). In at least one embodiment, job scheduler 2532 may include a Spark driver to facilitate scheduling of workloads supported by various layers of data center 2500. In at least one embodiment, configuration manager 2534 may be capable of configuring different layers such as software layer 2530 and framework layer 2520 including Spark and distributed file system 2538 for supporting large-scale data processing. In at least one embodiment, resource manager 2536 may be capable of managing clustered or grouped computing resources mapped to or allocated for support of distributed file system 2538 and job scheduler 2532. In at least one embodiment, clustered or grouped computing resources may include grouped computing resource 2514 at data center infrastructure layer 2510. In at least one embodiment, resource manager 2536 may coordinate with resource orchestrator 2512 to manage these mapped or allocated computing resources.

In at least one embodiment, software 2532 included in software layer 2530 may include software used by at least portions of node C.R.s 2516(1)-2516(N), grouped computing resources 2514, and/or distributed file system 2538 of framework layer 2520. One or more types of software may include, but are not limited to, Internet web page search software, e-mail virus scan software, database software, and streaming video content software.

In at least one embodiment, application(s) 2542 included in application layer 2540 may include one or more types of applications used by at least portions of node C.R.s 2516(1)-2516(N), grouped computing resources 2514, and/or distributed file system 2538 of framework layer 2520. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 2534, resource manager 2536, and resource orchestrator 2512 may implement any number and type of self-modifying actions based on any amount and type of data acquired in any technically feasible fashion. In at least one embodiment, self-modifying actions may relieve a data center operator of data center 2500 from making possibly bad configuration decisions and possibly avoiding underutilized and/or poor performing portions of a data center.

In at least one embodiment, data center 2500 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 2500. In at least one embodiment, trained machine learning models corresponding to one or more neural networks may be used to infer or predict information using resources described above with respect to data center 2500 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or perform inferencing of information, such as image recognition, speech recognition, or other artificial intelligence services.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 25 for inferencing or predicting operations based, at least in part, on weight parameters calculated using neural network training operations, neural network functions and/or architectures, or neural network use cases described herein. In at least one embodiment, a robotic grasping system may use training and inferencing hardware described above to control a tactile hand.

Autonomous Vehicle

Figure 26A:
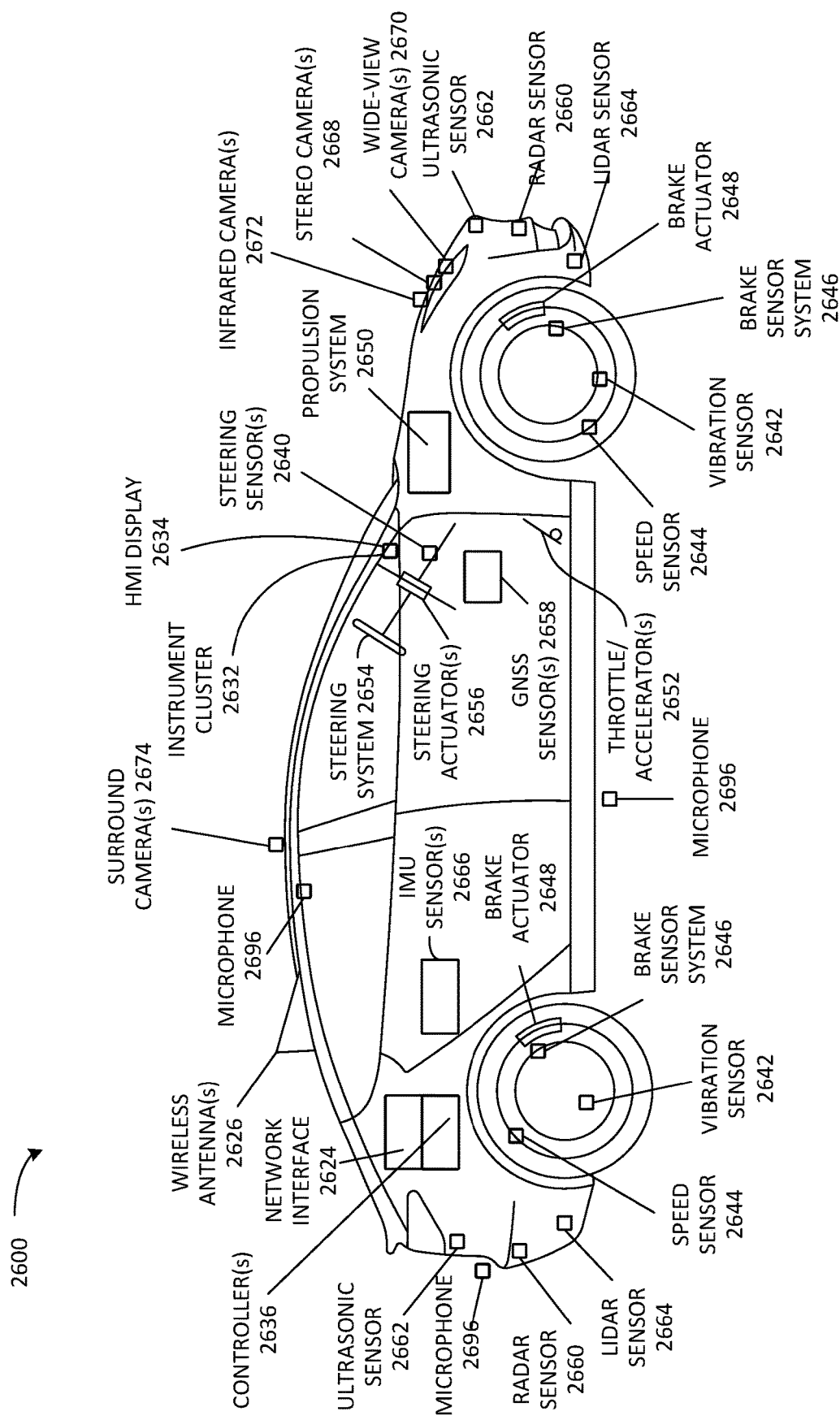
FIG. 26A illustrates an example of an autonomous vehicle, according to at least one embodiment.

FIG. 26A illustrates an example of an autonomous vehicle 2600, according to at least one embodiment. In at least one embodiment, autonomous vehicle 2600 (alternatively referred to herein as "vehicle 2600") may be, without limitation, a passenger vehicle, such as a car, a truck, a bus, and/or another type of vehicle that accommodates one or more passengers. In at least one embodiment, vehicle 2600 may be a semi-tractor-trailer truck used for hauling cargo. In at least one embodiment, vehicle 2600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 2600 may be capable of functionality in accordance with one or more of level 1-level 5 of autonomous driving levels. For example, in at least one embodiment, vehicle 2600 may be capable of conditional automation (Level 3), high automation (Level 4), and/or full automation (Level 5), depending on embodiment.

In at least one embodiment, vehicle 2600 may include, without limitation, components such as a chassis, a vehicle body, wheels (e.g., 2, 4, 6, 8, 18, etc.), tires, axles, and other components of a vehicle. In at least one embodiment, vehicle 2600 may include, without limitation, a propulsion system 2650, such as an internal combustion engine, hybrid electric power plant, an all-electric engine, and/or another propulsion system type. In at least one embodiment, propulsion system 2650 may be connected to a drive train of vehicle 2600, which may include, without limitation, a transmission, to enable propulsion of vehicle 2600. In at least one embodiment, propulsion system 2650 may be controlled in response to receiving signals from a throttle/accelerator(s) 2652.

In at least one embodiment, a steering system 2654, which may include, without limitation, a steering wheel, is used to steer a vehicle 2600 (e.g., along a desired path or route) when a propulsion system 2650 is operating (e.g., when vehicle is in motion). In at least one embodiment, a steering system 2654 may receive signals from steering actuator(s) 2656. Steering wheel may be optional for full automation (Level 5) functionality. In at least one embodiment, a brake sensor system 2646 may be used to operate vehicle brakes in response to receiving signals from brake actuator(s) 2648 and/or brake sensors.

In at least one embodiment, controller(s) 2636, which may include, without limitation, one or more system on chips ("SoCs") (not shown in FIG. 26A) and/or graphics processing unit(s) ("GPU(s)"), provide signals (e.g., representative of commands) to one or more components and/or systems of vehicle 2600. For instance, in at least one embodiment, controller(s) 2636 may send signals to operate vehicle brakes via brake actuators 2648, to operate steering system 2654 via steering actuator(s) 2656, to operate propulsion system 2650 via throttle/accelerator(s) 2652. Controller(s) 2636 may include one or more onboard (e.g., integrated) computing devices (e.g., supercomputers) that process sensor signals, and output operation commands (e.g., signals representing commands) to enable autonomous driving and/or to assist a human driver in driving vehicle 2600. In at least one embodiment, controller(s) 2636 may include a first controller 2636 for autonomous driving functions, a second controller 2636 for functional safety functions, a third controller 2636 for artificial intelligence functionality (e.g., computer vision), a fourth controller 2636 for infotainment functionality, a fifth controller 2636 for redundancy in emergency conditions, and/or other controllers. In at least one embodiment, a single controller 2636 may handle two or more of above functionalities, two or more controllers 2636 may handle a single functionality, and/or any combination thereof.

In at least one embodiment, controller(s) 2636 provide signals for controlling one or more components and/or systems of vehicle 2600 in response to sensor data received from one or more sensors (e.g., sensor inputs). In at least one embodiment, sensor data may be received from, for example and without limitation, global navigation satellite systems ("GNSS") sensor(s) 2658 (e.g., Global Positioning System sensor(s)), RADAR sensor(s) 2660, ultrasonic sensor(s) 2662, LIDAR sensor(s) 2664, inertial measurement unit ("IMU") sensor(s) 2666 (e.g., accelerometer(s), gyroscope(s), magnetic compass(es), magnetometer(s), etc.), microphone(s) 2696, stereo camera(s) 2668, wide-view camera(s) 2670 (e.g., fisheye cameras), infrared camera(s) 2672, surround camera(s) 2674 (e.g., 360 degree cameras), long-range cameras (not shown in FIG. 26A), mid-range camera(s) (not shown in FIG. 26A), speed sensor(s) 2644 (e.g., for measuring speed of vehicle 2600), vibration sensor(s) 2642, steering sensor(s) 2640, brake sensor(s) (e.g., as part of brake sensor system 2646), and/or other sensor types.

In at least one embodiment, one or more of controller(s) 2636 may receive inputs (e.g., represented by input data) from an instrument cluster 2632 of vehicle 2600 and provide outputs (e.g., represented by output data, display data, etc.) via a human-machine interface ("HMI") display 2634, an audible annunciator, a loudspeaker, and/or via other components of vehicle 2600. In at least one embodiment, outputs may include information such as vehicle velocity, speed, time, map data (e.g., a High Definition map (not shown in FIG. 26A), location data (e.g., vehicle's 2600 location, such as on a map), direction, location of other vehicles (e.g., an occupancy grid), information about objects and status of objects as perceived by controller(s) 2636, etc. For example, in at least one embodiment, HMI display 2634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 2600 further includes a network interface 2624 which may use wireless antenna(s) 2626 and/or modem(s) to communicate over one or more networks. For example, in at least one embodiment, network interface 2624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 2626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 26A for inferencing or predicting operations based, at least in part, on weight parameters calculated using neural network training operations, neural network functions and/or architectures, or neural network use cases described herein. In at least one embodiment, a robotic grasping system described above may be used to assemble an autonomous vehicle.

Figure 26B:
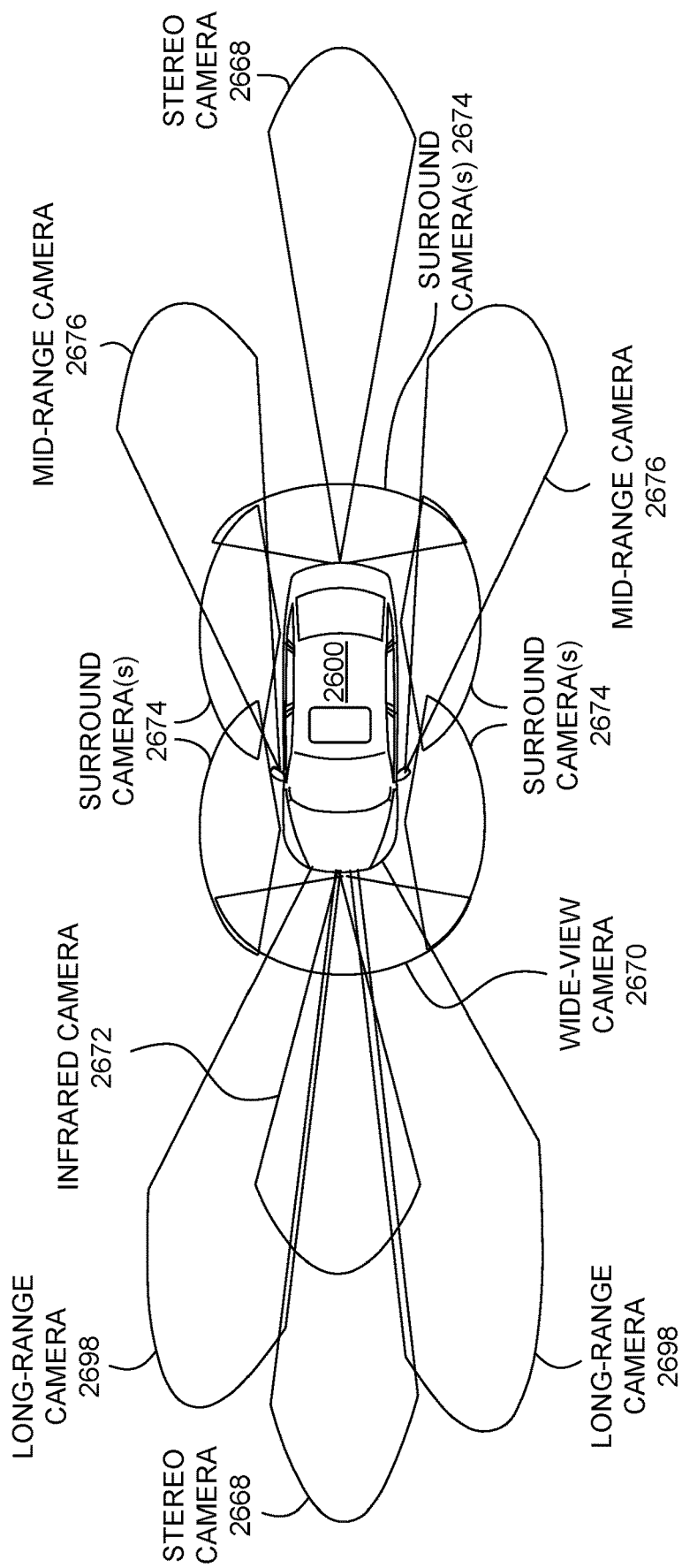
FIG. 26B illustrates an example of camera locations and fields of view for an autonomous vehicle of FIG. 26A, according to at least one embodiment.

FIG. 26B illustrates an example of camera locations and fields of view for autonomous vehicle 2600 of FIG. 26A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 2600.

In at least one embodiment, camera types for cameras may include, but are not limited to, digital cameras that may be adapted for use with components and/or systems of vehicle 2600. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab in at least one embodiment.

In at least one embodiment, cameras with a field of view that include portions of environment in front of vehicle 2600 (e.g., front-facing cameras) may be used for surround view, to help identify forward facing paths and obstacles, as well as aid in, with help of one or more of controllers 2636 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 2670 may be used to perceive objects coming into view from periphery (e.g., pedestrians, crossing traffic or bicycles). Although only one wide-view camera 2670 is illustrated in FIG. 26B, in other embodiments, there may be any number (including zero) of wide-view camera(s) 2670 on vehicle 2600. In at least one embodiment, any number of long-range camera(s) 2698 (e.g., a long-view stereo camera pair) may be used for depth-based object detection, especially for objects for which a neural network has not yet been trained. In at least one embodiment, long-range camera(s) 2698 may also be used for object detection and classification, as well as basic object tracking.

In at least one embodiment, any number of stereo camera(s) 2668 may also be included in a front-facing configuration. In at least one embodiment, one or more of stereo camera(s) 2668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 2600, including a distance estimate for all points in image. In at least one embodiment, one or more of stereo camera(s) 2668 may include, without limitation, compact stereo vision sensor(s) that may include, without limitation, two camera lenses (one each on left and right) and an image processing chip that may measure distance from vehicle 2600 to target object and use generated information (e.g., metadata) to activate autonomous emergency braking and lane departure warning functions. In at least one embodiment, other types of stereo camera(s) 2668 may be used in addition to, or alternatively from, those described herein.

In at least one embodiment, cameras with a field of view that include portions of environment to side of vehicle 2600 (e.g., side-view cameras) may be used for surround view, providing information used to create and update occupancy grid, as well as to generate side impact collision warnings. For example, in at least one embodiment, surround camera(s) 2674 (e.g., four surround cameras 2674 as illustrated in FIG. 26B) could be positioned on vehicle 2600. Surround camera(s) 2674 may include, without limitation, any number and combination of wide-view camera(s) 2670, fisheye camera(s), 360 degree camera(s), and/or like. For instance, in at least one embodiment, four fisheye cameras may be positioned on front, rear, and sides of vehicle 2600.

In at least one embodiment, vehicle 2600 may use three surround camera(s) 2674 (e.g., left, right, and rear), and may leverage one or more other camera(s) (e.g., a forward-facing camera) as a fourth surround-view camera.

In at least one embodiment, cameras with a field of view that include portions of environment to rear of vehicle 2600 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 2698 and/or mid-range camera(s) 2676, stereo camera(s) 2668), infrared camera(s) 2672, etc.), as described herein.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 26B for inferencing or predicting operations based, at least in part, on weight parameters calculated using neural network training operations, neural network functions and/or architectures, or neural network use cases described herein. In at least one embodiment, a robotic grasping system may use training and inferencing hardware described above to control a tactile hand.

Figure 26C:
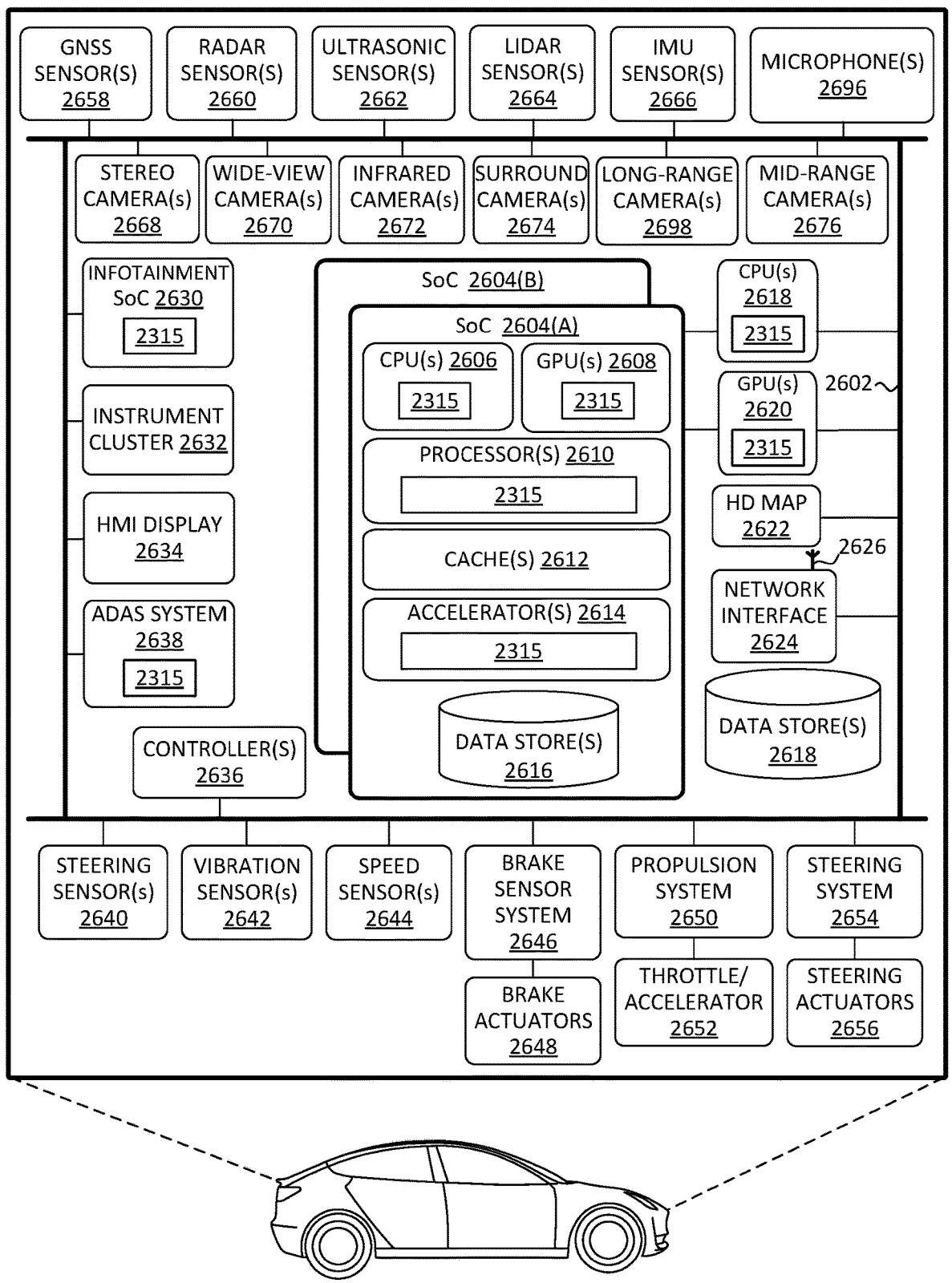
FIG. 26C is a block diagram illustrating an example system architecture for an autonomous vehicle of FIG. 26A, according to at least one embodiment.

FIG. 26C is a block diagram illustrating an example system architecture for autonomous vehicle 2600 of FIG. 26A, according to at least one embodiment. In at least one embodiment, each of components, features, and systems of vehicle 2600 in FIG. 26C are illustrated as being connected via a bus 2602. In at least one embodiment, bus 2602 may include, without limitation, a CAN data interface (alternatively referred to herein as a "CAN bus"). In at least one embodiment, a CAN may be a network inside vehicle 2600 used to aid in control of various features and functionality of vehicle 2600, such as actuation of brakes, acceleration, braking, steering, windshield wipers, etc. In at least one embodiment, bus 2602 may be configured to have dozens or even hundreds of nodes, each with its own unique identifier (e.g., a CAN ID). In at least one embodiment, bus 2602 may be read to find steering wheel angle, ground speed, engine revolutions per minute ("RPMs"), button positions, and/or other vehicle status indicators. In at least one embodiment, bus 2602 may be a CAN bus that is ASIL B compliant.

In at least one embodiment, in addition to, or alternatively from CAN, FlexRay and/or Ethernet may be used. In at least one embodiment, there may be any number of buses 2602, which may include, without limitation, zero or more CAN buses, zero or more FlexRay buses, zero or more Ethernet buses, and/or zero or more other types of buses using a different protocol. In at least one embodiment, two or more buses 2602 may be used to perform different functions, and/or may be used for redundancy. For example, a first bus 2602 may be used for collision avoidance functionality and a second bus 2602 may be used for actuation control. In at least one embodiment, each bus 2602 may communicate with any of components of vehicle 2600, and two or more buses 2602 may communicate with same components. In at least one embodiment, each of any number of system(s) on chip(s) ("SoC(s)") 2604, each of controller(s) 2636, and/or each computer within vehicle may have access to same input data (e.g., inputs from sensors of vehicle 2600), and may be connected to a common bus, such CAN bus.

In at least one embodiment, vehicle 2600 may include one or more controller(s) 2636, such as those described herein with respect to FIG. 26A. Controller(s) 2636 may be used for a variety of functions. In at least one embodiment, controller(s) 2636 may be coupled to any of various other components and systems of vehicle 2600, and may be used for control of vehicle 2600, artificial intelligence of vehicle 2600, infotainment for vehicle 2600, and/or like.

In at least one embodiment, vehicle 2600 may include any number of SoCs 2604. Each of SoCs 2604 may include, without limitation, central processing units ("CPU(s)") 2606, graphics processing units ("GPU(s)") 2608, processor(s) 2610, cache(s) 2612, accelerator(s) 2614, data store(s) 2616, and/or other components and features not illustrated. In at least one embodiment, SoC(s) 2604 may be used to control vehicle 2600 in a variety of platforms and systems. For example, in at least one embodiment, SoC(s) 2604 may be combined in a system (e.g., system of vehicle 2600) with a High Definition ("HD") map 2622 which may obtain map refreshes and/or updates via network interface 2624 from one or more servers (not shown in FIG. 26C).

In at least one embodiment, CPU(s) 2606 may include a CPU cluster or CPU complex (alternatively referred to herein as a "CCPLEX"). In at least one embodiment, CPU(s) 2606 may include multiple cores and/or level two ("L2") caches. For instance, in at least one embodiment, CPU(s) 2606 may include eight cores in a coherent multi-processor configuration. In at least one embodiment, CPU(s) 2606 may include four dual-core clusters where each cluster has a dedicated L2 cache (e.g., a 2 MB L2 cache). In at least one embodiment, CPU(s) 2606 (e.g., CCPLEX) may be configured to support simultaneous cluster operation enabling any combination of clusters of CPU(s) 2606 to be active at any given time.

In at least one embodiment, one or more of CPU(s) 2606 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 2606 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 2608 may include an integrated GPU (alternatively referred to herein as an "iGPU"). In at least one embodiment, GPU(s) 2608 may be programmable and may be efficient for parallel workloads. In at least one embodiment, GPU(s) 2608, may use an enhanced tensor instruction set. In one embodiment, GPU(s) 2608 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 2608 may include at least eight streaming microprocessors. In at least one embodiment, GPU(s) 2608 may use compute application programming interface(s) (API(s)). In at least one embodiment, GPU(s) 2608 may use one or more parallel computing platforms and/or programming models (e.g., NVIDIA's CUDA).

In at least one embodiment, one or more of GPU(s) 2608 may be power-optimized for best performance in automotive and embedded use cases. For example, in one embodiment, GPU(s) 2608 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 2608 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 2608 may include unified memory technology. In at least one embodiment, address translation services ("ATS") support may be used to allow GPU(s) 2608 to access CPU(s) 2606 page tables directly. In at least one embodiment, when GPU(s) 2608 memory management unit ("MMU") experiences a miss, an address translation request may be transmitted to CPU(s) 2606. In response, CPU(s) 2606 may look in its page tables for virtual-to-physical mapping for address and transmit translation back to GPU(s) 2608, in at least one embodiment. In at least one embodiment, unified memory technology may allow a single unified virtual address space for memory of both CPU(s) 2606 and GPU(s) 2608, thereby simplifying GPU(s) 2608 programming and porting of applications to GPU(s) 2608.

In at least one embodiment, GPU(s) 2608 may include any number of access counters that may keep track of frequency of access of GPU(s) 2608 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 2604 may include any number of cache(s) 2612, including those described herein. For example, in at least one embodiment, cache(s) 2612 could include a level three ("L3") cache that is available to both CPU(s) 2606 and GPU(s) 2608 (e.g., that is connected both CPU(s) 2606 and GPU(s) 2608). In at least one embodiment, cache(s) 2612 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 2604 may include one or more accelerator(s) 2614 (e.g., hardware accelerators, software accelerators, or a combination thereof). In at least one embodiment, SoC(s) 2604 may include a hardware acceleration cluster that may include optimized hardware accelerators and/or large on-chip memory. In at least one embodiment, large on-chip memory (e.g., 4 MB of SRAM) may enable hardware acceleration cluster to accelerate neural networks and other calculations. In at least one embodiment, hardware acceleration cluster may be used to complement GPU(s) 2608 and to off-load some of tasks of GPU(s) 2608 (e.g., to free up more cycles of GPU(s) 2608 for performing other tasks). In at least one embodiment, accelerator(s) 2614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 2614 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 2696; a CNN for facial recognition and vehicle owner identification using data from camera sensors; and/or a CNN for security and/or safety related events.

In at least one embodiment, DLA(s) may perform any function of GPU(s) 2608, and by using an inference accelerator, for example, a designer may target either DLA(s) or GPU(s) 2608 for any function. For example, in at least one embodiment, designer may focus processing of CNNs and floating point operations on DLA(s) and leave other functions to GPU(s) 2608 and/or other accelerator(s) 2614.

In at least one embodiment, accelerator(s) 2614 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 2638, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 2606. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 2614 (e.g., hardware acceleration cluster) may include a computer vision network on-chip and static random-access memory ("SRAM"), for providing a high-bandwidth, low latency SRAM for accelerator(s) 2614. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 2604 may include a real-time ray-tracing hardware accelerator. In at least one embodiment, a real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 2614 (e.g., hardware acceleration cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 2600, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 2666 that correlates with vehicle 2600 orientation, distance, 3D location estimates of object obtained from neural network and/or other sensors (e.g., LIDAR sensor(s) 2664 or RADAR sensor(s) 2660), among others.

In at least one embodiment, one or more of SoC(s) 2604 may include data store(s) 2616 (e.g., memory). In at least one embodiment, data store(s) 2616 may be on-chip memory of SoC(s) 2604, which may store neural networks to be executed on GPU(s) 2608 and/or DLA. In at least one embodiment, data store(s) 2616 may be large enough in capacity to store multiple instances of neural networks for redundancy and safety. In at least one embodiment, data store(s) 2612 may comprise L2 or L3 cache(s).

In at least one embodiment, one or more of SoC(s) 2604 may include any number of processor(s) 2610 (e.g., embedded processors). Processor(s) 2610 may include a boot and power management processor that may be a dedicated processor and subsystem to handle boot power and management functions and related security enforcement. In at least one embodiment, boot and power management processor may be a part of SoC(s) 2604 boot sequence and may provide runtime power management services. In at least one embodiment, boot power and management processor may provide clock and voltage programming, assistance in system low power state transitions, management of SoC(s) 2604 thermals and temperature sensors, and/or management of SoC(s) 2604 power states. In at least one embodiment, each temperature sensor may be implemented as a ring-oscillator whose output frequency is proportional to temperature, and SoC(s) 2604 may use ring-oscillators to detect temperatures of CPU(s) 2606, GPU(s) 2608, and/or accelerator(s) 2614. In at least one embodiment, if temperatures are determined to exceed a threshold, then boot and power management processor may enter a temperature fault routine and put SoC(s) 2604 into a lower power state and/or put vehicle 2600 into a chauffeur to safe stop mode (e.g., bring vehicle 2600 to a safe stop).

In at least one embodiment, processor(s) 2610 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 2610 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 2610 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 2610 may further include a real-time camera engine that may include, without limitation, a dedicated processor subsystem for handling real-time camera management. In at least one embodiment, processor(s) 2610 may further include a high-dynamic range signal processor that may include, without limitation, an image signal processor that is a hardware engine that is part of camera processing pipeline.

In at least one embodiment, processor(s) 2610 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 2670, surround camera(s) 2674, and/or on in-cabin monitoring camera sensor(s). In at least one embodiment, in-cabin monitoring camera sensor(s) are preferably monitored by a neural network running on another instance of SoC 2604, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 2608 are not required to continuously render new surfaces. In at least one embodiment, when GPU(s) 2608 are powered on and active doing 3D rendering, video image compositor may be used to offload GPU(s) 2608 to improve performance and responsiveness.

In at least one embodiment, one or more of SoC(s) 2604 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 2604 may further include an input/output controller(s) that may be controlled by software and may be used for receiving I/O signals that are uncommitted to a specific role.

In at least one embodiment, one or more of SoC(s) 2604 may further include a broad range of peripheral interfaces to enable communication with peripherals, audio encoders/decoders ("codecs"), power management, and/or other devices. SoC(s) 2604 may be used to process data from cameras (e.g., connected over Gigabit Multimedia Serial Link and Ethernet), sensors (e.g., LIDAR sensor(s) 2664, RADAR sensor(s) 2660, etc. that may be connected over Ethernet), data from bus 2602 (e.g., speed of vehicle 2600, steering wheel position, etc.), data from GNSS sensor(s) 2658 (e.g., connected over Ethernet or CAN bus), etc. In at least one embodiment, one or more of SoC(s) 2604 may further include dedicated high-performance mass storage controllers that may include their own DMA engines, and that may be used to free CPU(s) 2606 from routine data management tasks.

In at least one embodiment, SoC(s) 2604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 2604 may be faster, more reliable, and even more energy-efficient and space-efficient than conventional systems. For example, in at least one embodiment, accelerator(s) 2614, when combined with CPU(s) 2606, GPU(s) 2608, and data store(s) 2616, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 2620) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 2608.

In at least one embodiment, a CNN for facial recognition and vehicle owner identification may use data from camera sensors to identify presence of an authorized driver and/or owner of vehicle 2600. In at least one embodiment, an always-on sensor processing engine may be used to unlock vehicle when owner approaches driver door and turn on lights, and, in security mode, to disable vehicle when owner leaves vehicle. In this way, SoC(s) 2604 provide for security against theft and/or carjacking.

In at least one embodiment, a CNN for emergency vehicle detection and identification may use data from microphones 2696 to detect and identify emergency vehicle sirens. In at least one embodiment, SoC(s) 2604 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 2658. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 2662, until emergency vehicle(s) passes.

In at least one embodiment, vehicle 2600 may include CPU(s) 2618 (e.g., discrete CPU(s), or dCPU(s)), that may be coupled to SoC(s) 2604 via a high-speed interconnect (e.g., PCIe). In at least one embodiment, CPU(s) 2618 may include an X86 processor, for example. CPU(s) 2618 may be used to perform any of a variety of functions, including arbitrating potentially inconsistent results between ADAS sensors and SoC(s) 2604, and/or monitoring status and health of controller(s) 2636 and/or an infotainment system on a chip ("infotainment SoC") 2630, for example.

In at least one embodiment, vehicle 2600 may include GPU(s) 2620 (e.g., discrete GPU(s), or dGPU(s)), that may be coupled to SoC(s) 2604 via a high-speed interconnect (e.g., NVIDIA's NVLINK). In at least one embodiment, GPU(s) 2620 may provide additional artificial intelligence functionality, such as by executing redundant and/or different neural networks, and may be used to train and/or update neural networks based at least in part on input (e.g., sensor data) from sensors of vehicle 2600.

In at least one embodiment, vehicle 2600 may further include network interface 2624 which may include, without limitation, wireless antenna(s) 2626 (e.g., one or more wireless antennas 2626 for different communication protocols, such as a cellular antenna, a Bluetooth antenna, etc.). In at least one embodiment, network interface 2624 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 260 and other vehicle and/or an indirect link may be established (e.g., across networks and over Internet). In at least one embodiment, direct links may be provided using a vehicle-to-vehicle communication link. Vehicle-to-vehicle communication link may provide vehicle 2600 information about vehicles in proximity to vehicle 2600 (e.g., vehicles in front of, on side of, and/or behind vehicle 2600). In at least one embodiment, aforementioned functionality may be part of a cooperative adaptive cruise control functionality of vehicle 2600.

In at least one embodiment, network interface 2624 may include an SoC that provides modulation and demodulation functionality and enables controller(s) 2636 to communicate over wireless networks. In at least one embodiment, network interface 2624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 2600 may further include data store(s) 2628 which may include, without limitation, off-chip (e.g., off SoC(s) 2604) storage. In at least one embodiment, data store(s) 2628 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 2600 may further include GNSS sensor(s) 2658 (e.g., GPS and/or assisted GPS sensors), to assist in mapping, perception, occupancy grid generation, and/or path planning functions. In at least one embodiment, any number of GNSS sensor(s) 2658 may be used, including, for example and without limitation, a GPS using a USB connector with an Ethernet to Serial (e.g., RS-232) bridge.

In at least one embodiment, vehicle 2600 may further include RADAR sensor(s) 2660. RADAR sensor(s) 2660 may be used by vehicle 2600 for long-range vehicle detection, even in darkness and/or severe weather conditions. In at least one embodiment, RADAR functional safety levels may be ASIL B. RADAR sensor(s) 2660 may use CAN and/or bus 2602 (e.g., to transmit data generated by RADAR sensor(s) 2660) for control and to access object tracking data, with access to Ethernet to access raw data in some examples. In at least one embodiment, a wide variety of RADAR sensor types may be used. For example, and without limitation, RADAR sensor(s) 2660 may be suitable for front, rear, and side RADAR use. In at least one embodiment, one or more of RADAR sensors(s) 2660 are Pulse Doppler RADAR sensor(s).

In at least one embodiment, RADAR sensor(s) 2660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 2660 may help in distinguishing between static and moving objects, and may be used by ADAS system 2638 for emergency brake assist and forward collision warning. Sensors 2660(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 2600 surroundings at higher speeds with minimal interference from traffic in adjacent lanes. In at least one embodiment, other two antennae may expand field of view, making it possible to quickly detect vehicles entering or leaving vehicle's 2600 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 2660 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 2638 for blind spot detection and/or lane change assist.

In at least one embodiment, vehicle 2600 may further include ultrasonic sensor(s) 2662. Ultrasonic sensor(s) 2662, which may be positioned at front, back, and/or sides of vehicle 2600, may be used for park assist and/or to create and update an occupancy grid. In at least one embodiment, a wide variety of ultrasonic sensor(s) 2662 may be used, and different ultrasonic sensor(s) 2662 may be used for different ranges of detection (e.g., 2.5 m, 4 m). In at least one embodiment, ultrasonic sensor(s) 2662 may operate at functional safety levels of ASIL B.

In at least one embodiment, vehicle 2600 may include LIDAR sensor(s) 2664. LIDAR sensor(s) 2664 may be used for object and pedestrian detection, emergency braking, collision avoidance, and/or other functions. In at least one embodiment, LIDAR sensor(s) 2664 may be functional safety level ASIL B. In at least one embodiment, vehicle 2600 may include multiple LIDAR sensors 2664 (e.g., two, four, six, etc.) that may use Ethernet (e.g., to provide data to a Gigabit Ethernet switch).

In at least one embodiment, LIDAR sensor(s) 2664 may be capable of providing a list of objects and their distances for a 360-degree field of view. In at least one embodiment, commercially available LIDAR sensor(s) 2664 may have an advertised range of approximately 100 m, with an accuracy of 2 cm-3 cm, and with support for a 100 Mbps Ethernet connection, for example. In at least one embodiment, one or more non-protruding LIDAR sensors 2664 may be used. In such an embodiment, LIDAR sensor(s) 2664 may be implemented as a small device that may be embedded into front, rear, sides, and/or corners of vehicle 2600. In at least one embodiment, LIDAR sensor(s) 2664, in such an embodiment, may provide up to a 120-degree horizontal and 35-degree vertical field-of-view, with a 200 m range even for low-reflectivity objects. In at least one embodiment, front-mounted LIDAR sensor(s) 2664 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 2600 up to approximately 200 m. In at least one embodiment, a flash LIDAR unit includes, without limitation, a receptor, which records laser pulse transit time and reflected light on each pixel, which in turn corresponds to range from vehicle 2600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 2600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 2666. In at least one embodiment, IMU sensor(s) 2666 may be located at a center of rear axle of vehicle 2600, in at least one embodiment. In at least one embodiment, IMU sensor(s) 2666 may include, for example and without limitation, accelerometer(s), magnetometer(s), gyroscope(s), magnetic compass(es), and/or other sensor types. In at least one embodiment, such as in six-axis applications, IMU sensor(s) 2666 may include, without limitation, accelerometers and gyroscopes. In at least one embodiment, such as in nine-axis applications, IMU sensor(s) 2666 may include, without limitation, accelerometers, gyroscopes, and magnetometers.

In at least one embodiment, IMU sensor(s) 2666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 2666 may enable vehicle 2600 to estimate heading without requiring input from a magnetic sensor by directly observing and correlating changes in velocity from GPS to IMU sensor(s) 2666. In at least one embodiment, IMU sensor(s) 2666 and GNSS sensor(s) 2658 may be combined in a single integrated unit.

In at least one embodiment, vehicle 2600 may include microphone(s) 2696 placed in and/or around vehicle 2600. In at least one embodiment, microphone(s) 2696 may be used for emergency vehicle detection and identification, among other things.

In at least one embodiment, vehicle 2600 may further include any number of camera types, including stereo camera(s) 2668, wide-view camera(s) 2670, infrared camera(s) 2672, surround camera(s) 2674, long-range camera(s) 2698, mid-range camera(s) 2676, and/or other camera types. In at least one embodiment, cameras may be used to capture image data around an entire periphery of vehicle 2600. In at least one embodiment, types of cameras used depends upon vehicle 2600. In at least one embodiment, any combination of camera types may be used to provide necessary coverage around vehicle 2600. In at least one embodiment, number of cameras may differ depending on embodiment. For example, in at least one embodiment, vehicle 2600 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 26A and FIG. 26B.

In at least one embodiment, vehicle 2600 may further include vibration sensor(s) 2642. Vibration sensor(s) 2642 may measure vibrations of components of vehicle 2600, such as axle(s). For example, in at least one embodiment, changes in vibrations may indicate a change in road surfaces. In at least one embodiment, when two or more vibration sensors 2642 are used, differences between vibrations may be used to determine friction or slippage of road surface (e.g., when difference in vibration is between a power-driven axle and a freely rotating axle).

In at least one embodiment, vehicle 2600 may include ADAS system 2638. ADAS system 2638 may include, without limitation, an SoC, in some examples. In at least one embodiment, ADAS system 2638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 2660, LIDAR sensor(s) 2664, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 2600 and automatically adjusts speed of vehicle 2600 to maintain a safe distance from vehicles ahead. In at least one embodiment, lateral ACC system performs distance keeping, and advises vehicle 2600 to change lanes when necessary. In at least one embodiment, lateral ACC is related to other ADAS applications such as LC and CW.

In at least one embodiment, CACC system uses information from other vehicles that may be received via network interface 2624 and/or wireless antenna(s) 2626 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 2600), while I2V communication concept provides information about traffic further ahead. In at least one embodiment, CACC system may include either or both I2V and V2V information sources. In at least one embodiment, given information of vehicles ahead of vehicle 2600, CACC system may be more reliable and has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 2660, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 2660, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 2600 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 2600 if vehicle 2600 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 2660, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 2600 is backing up. In at least one embodiment, RCTW system includes AEB system to ensure that vehicle brakes are applied to avoid a crash. In at least one embodiment, RCTW system may use one or more rear-facing RADAR sensor(s) 2660, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 2600 itself decides, in case of conflicting results, whether to heed result from a primary computer or a secondary computer (e.g., first controller 2636 or second controller 2636). For example, in at least one embodiment, ADAS system 2638 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 2638 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 2604.

In at least one embodiment, ADAS system 2638 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 2638 may be fed into primary computer's perception block and/or primary computer's dynamic driving task block. For example, in at least one embodiment, if ADAS system 2638 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 2600 may further include infotainment SoC 2630 (e.g., an in-vehicle infotainment system (IVI)). Although illustrated and described as an SoC, infotainment system 2630, in at least one embodiment, may not be an SoC, and may include, without limitation, two or more discrete components. In at least one embodiment, infotainment SoC 2630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 2600. For example, infotainment SoC 2630 could include radios, disk players, navigation systems, video players, USB and Bluetooth connectivity, carputers, in-car entertainment, WiFi, steering wheel audio controls, hands free voice control, a heads-up display ("HUD"), HMI display 2634, a telematics device, a control panel (e.g., for controlling and/or interacting with various components, features, and/or systems), and/or other components. In at least one embodiment, infotainment SoC 2630 may further be used to provide information (e.g., visual and/or audible) to user(s) of vehicle, such as information from ADAS system 2638, autonomous driving information such as planned vehicle maneuvers, trajectories, surrounding environment information (e.g., intersection information, vehicle information, road information, etc.), and/or other information.

In at least one embodiment, infotainment SoC 2630 may include any amount and type of GPU functionality. In at least one embodiment, infotainment SoC 2630 may communicate over bus 2602 (e.g., CAN bus, Ethernet, etc.) with other devices, systems, and/or components of vehicle 2600. In at least one embodiment, infotainment SoC 2630 may be coupled to a supervisory MCU such that GPU of infotainment system may perform some self-driving functions in event that primary controller(s) 2636 (e.g., primary and/or backup computers of vehicle 2600) fail. In at least one embodiment, infotainment SoC 2630 may put vehicle 2600 into a chauffeur to safe stop mode, as described herein.

In at least one embodiment, vehicle 2600 may further include instrument cluster 2632 (e.g., a digital dash, an electronic instrument cluster, a digital instrument panel, etc.). Instrument cluster 2632 may include, without limitation, a controller and/or supercomputer (e.g., a discrete controller or supercomputer). In at least one embodiment, instrument cluster 2632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 2630 and instrument cluster 2632. In at least one embodiment, instrument cluster 2632 may be included as part of infotainment SoC 2630, or vice versa.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 26C for inferencing or predicting operations based, at least in part, on weight parameters calculated using neural network training operations, neural network functions and/or architectures, or neural network use cases described herein. In at least one embodiment, a robotic grasping system may use training and inferencing hardware described above to control a tactile hand.

Figure 26D:
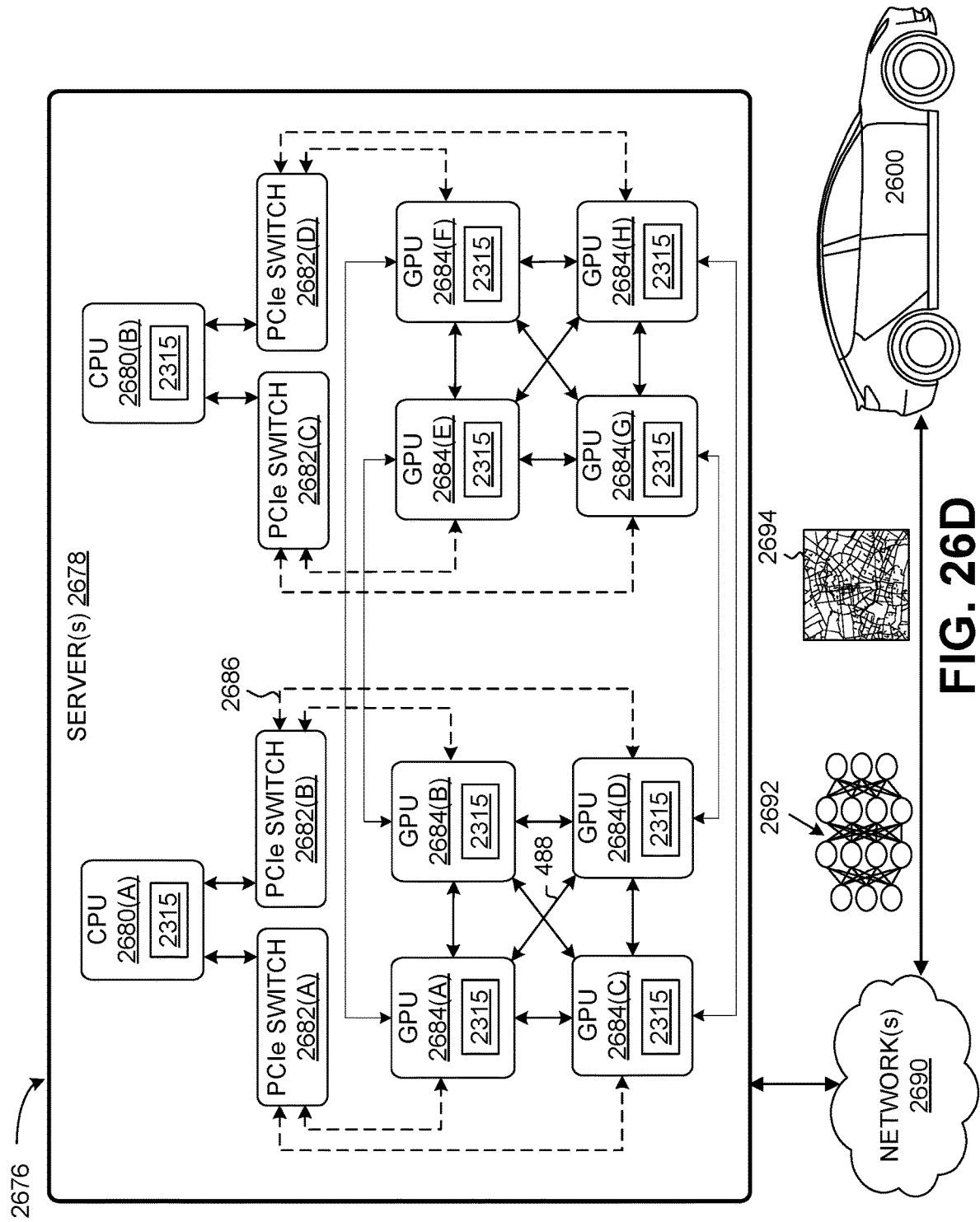
FIG. 26D is a diagram illustrating a system for communication between cloud-based server(s) and an autonomous vehicle of FIG. 26A, according to at least one embodiment.

FIG. 26D is a diagram of a system 2676 for communication between cloud-based server(s) and autonomous vehicle 2600 of FIG. 26A, according to at least one embodiment. In at least one embodiment, system 2676 may include, without limitation, server(s) 2678, network(s) 2690, and any number and type of vehicles, including vehicle 2600. Server(s) 2678 may include, without limitation, a plurality of GPUs 2684(A)-2684(H) (collectively referred to herein as GPUs 2684), PCIe switches 2682(A)-2682(H) (collectively referred to herein as PCIe switches 2682), and/or CPUs 2680(A)-2680(B) (collectively referred to herein as CPUs 2680). GPUs 2684, CPUs 2680, and PCIe switches 2682 may be interconnected with high-speed interconnects such as, for example and without limitation, NVLink interfaces 2688 developed by NVIDIA and/or PCIe connections 2686. In at least one embodiment, GPUs 2684 are connected via an NVLink and/or NVSwitch SoC and GPUs 2684 and PCIe switches 2682 are connected via PCIe interconnects. In at least one embodiment, although eight GPUs 2684, two CPUs 2680, and four PCIe switches 2682 are illustrated, this is not intended to be limiting. In at least one embodiment, each of server(s) 2678 may include, without limitation, any number of GPUs 2684, CPUs 2680, and/or PCIe switches 2682, in any combination. For example, in at least one embodiment, server(s) 2678 could each include eight, sixteen, thirty-two, and/or more GPUs 2684.

In at least one embodiment, server(s) 2678 may receive, over network(s) 2690 and from vehicles, image data representative of images showing unexpected or changed road conditions, such as recently commenced road-work. In at least one embodiment, server(s) 2678 may transmit, over network(s) 2690 and to vehicles, neural networks 2692, updated neural networks 2692, and/or map information 2694, including, without limitation, information regarding traffic and road conditions. In at least one embodiment, updates to map information 2694 may include, without limitation, updates for HD map 2622, such as information regarding construction sites, potholes, detours, flooding, and/or other obstructions. In at least one embodiment, neural networks 2692, updated neural networks 2692, and/or map information 2694 may have resulted from new training and/or experiences represented in data received from any number of vehicles in environment, and/or based at least in part on training performed at a data center (e.g., using server(s) 2678 and/or other servers).

In at least one embodiment, server(s) 2678 may be used to train machine learning models (e.g., neural networks) based at least in part on training data. Training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 2690, and/or machine learning models may be used by server(s) 2678 to remotely monitor vehicles.

In at least one embodiment, server(s) 2678 may receive data from vehicles and apply data to up-to-date real-time neural networks for real-time intelligent inferencing. In at least one embodiment, server(s) 2678 may include deep-learning supercomputers and/or dedicated AI computers powered by GPU(s) 2684, such as a DGX and DGX Station machines developed by NVIDIA. However, in at least one embodiment, server(s) 2678 may include deep learning infrastructure that use CPU-powered data centers.

In at least one embodiment, deep-learning infrastructure of server(s) 2678 may be capable of fast, real-time inferencing, and may use that capability to evaluate and verify health of processors, software, and/or associated hardware in vehicle 2600. For example, in at least one embodiment, deep-learning infrastructure may receive periodic updates from vehicle 2600, such as a sequence of images and/or objects that vehicle 2600 has located in that sequence of images (e.g., via computer vision and/or other machine learning object classification techniques). In at least one embodiment, deep-learning infrastructure may run its own neural network to identify objects and compare them with objects identified by vehicle 2600 and, if results do not match and deep-learning infrastructure concludes that AI in vehicle 2600 is malfunctioning, then server(s) 2678 may transmit a signal to vehicle 2600 instructing a fail-safe computer of vehicle 2600 to assume control, notify passengers, and complete a safe parking maneuver.

In at least one embodiment, server(s) 2678 may include GPU(s) 2684 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 2315 are used to perform one or more embodiments. Details regarding hardware structure(x) 2315 are provided herein in conjunction with FIGS. 23A and/or 23B.

Computer Systems

Figure 27:
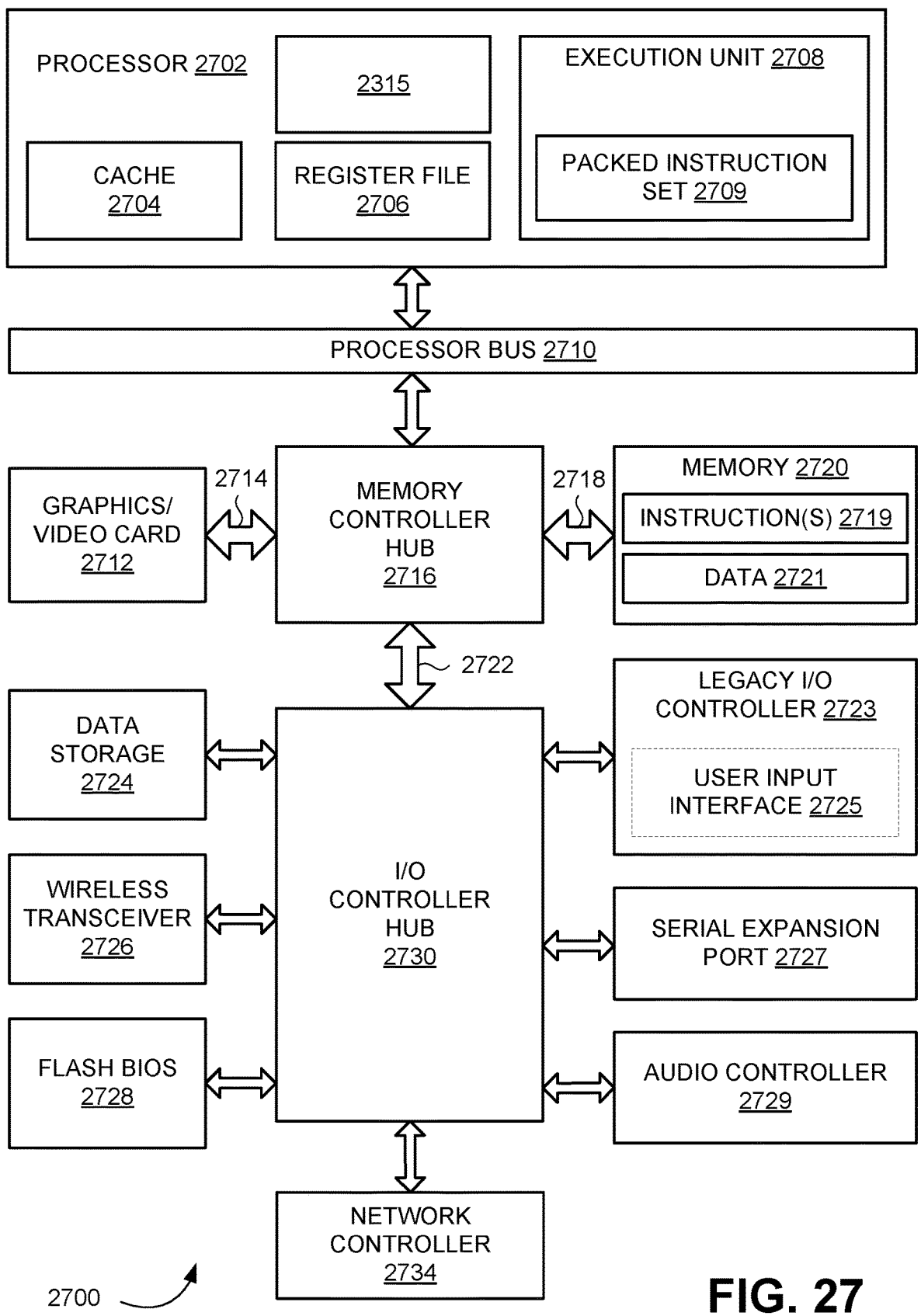
FIG. 27 is a block diagram illustrating a computer system, according to at least one embodiment.

FIG. 27 is a block diagram illustrating an exemplary computer system, which may be a system with interconnected devices and components, a system-on-a-chip ("SOC") or some combination thereof 2700 formed with a processor that may include execution units to execute an instruction, according to at least one embodiment. In at least one embodiment, computer system 2700 may include, without limitation, a component, such as a processor 2702 to employ execution units including logic to perform algorithms for process data, in accordance with present disclosure, such as in embodiment described herein. In at least one embodiment, computer system 2700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2700 may execute a version of WINDOWS operating system available from Microsoft Corporation of Redmond, Wash., although other operating systems (UNIX and Linux for example), embedded software, and/or graphical user interfaces may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 2700 may include, without limitation, processor 2702 that may include, without limitation, one or more execution units 2708 to perform machine learning model training and/or inferencing according to techniques described herein. In at least one embodiment, system 2700 is a single processor desktop or server system, but in another embodiment system 2700 may be a multiprocessor system. In at least one embodiment, processor 2702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 2702 may be coupled to a processor bus 2710 that may transmit data signals between processor 2702 and other components in computer system 2700.

In at least one embodiment, processor 2702 may include, without limitation, a Level 1 ("L1") internal cache memory ("cache") 2704. In at least one embodiment, processor 2702 may have a single internal cache or multiple levels of internal cache. In at least one embodiment, cache memory may reside external to processor 2702. Other embodiments may also include a combination of both internal and external caches depending on particular implementation and needs. In at least one embodiment, register file 2706 may store different types of data in various registers including, without limitation, integer registers, floating point registers, status registers, and instruction pointer register.

In at least one embodiment, execution unit 2708, including, without limitation, logic to perform integer and floating point operations, also resides in processor 2702. Processor 2702 may also include a microcode ("ucode") read only memory ("ROM") that stores microcode for certain macro instructions. In at least one embodiment, execution unit 2708 may include logic to handle a packed instruction set 2709. In at least one embodiment, by including packed instruction set 2709 in instruction set of a general-purpose processor 2702, along with associated circuitry to execute instructions, operations used by many multimedia applications may be performed using packed data in a general-purpose processor 2702. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 2708 may also be used in microcontrollers, embedded processors, graphics devices, DSPs, and other types of logic circuits. In at least one embodiment, computer system 2700 may include, without limitation, a memory 2720. In at least one embodiment, memory 2720 may be implemented as a Dynamic Random Access Memory ("DRAM") device, a Static Random Access Memory ("SRAM") device, flash memory device, or other memory device. Memory 2720 may store instruction(s) 2719 and/or data 2721 represented by data signals that may be executed by processor 2702.

In at least one embodiment, system logic chip may be coupled to processor bus 2710 and memory 2720. In at least one embodiment, system logic chip may include, without limitation, a memory controller hub ("MCH") 2716, and processor 2702 may communicate with MCH 2716 via processor bus 2710. In at least one embodiment, MCH 2716 may provide a high bandwidth memory path 2718 to memory 2720 for instruction and data storage and for storage of graphics commands, data and textures. In at least one embodiment, MCH 2716 may direct data signals between processor 2702, memory 2720, and other components in computer system 2700 and to bridge data signals between processor bus 2710, memory 2720, and a system I/O 2722. In at least one embodiment, system logic chip may provide a graphics port for coupling to a graphics controller. In at least one embodiment, MCH 2716 may be coupled to memory 2720 through a high bandwidth memory path 2718 and graphics/video card 2712 may be coupled to MCH 2716 through an Accelerated Graphics Port ("AGP") interconnect 2714.

In at least one embodiment, computer system 2700 may use system I/O 2722 that is a proprietary hub interface bus to couple MCH 2716 to I/O controller hub ("ICH") 2730. In at least one embodiment, ICH 2730 may provide direct connections to some I/O devices via a local I/O bus. In at least one embodiment, local I/O bus may include, without limitation, a high-speed I/O bus for connecting peripherals to memory 2720, chipset, and processor 2702. Examples may include, without limitation, an audio controller 2729, a firmware hub ("flash BIOS") 2728, a wireless transceiver 2726, a data storage 2724, a legacy I/O controller 2723 containing user input and keyboard interfaces, a serial expansion port 2727, such as Universal Serial Bus ("USB"), and a network controller 2734. Data storage 2724 may comprise a hard disk drive, a floppy disk drive, a CD-ROM device, a flash memory device, or other mass storage device.

In at least one embodiment, FIG. 27 illustrates a system, which includes interconnected hardware devices or "chips", whereas in other embodiments, FIG. 27 may illustrate an exemplary System on a Chip ("SoC"). In at least one embodiment, devices illustrated in FIG. 27 may be interconnected with proprietary interconnects, standardized interconnects (e.g., PCIe) or some combination thereof. In at least one embodiment, one or more components of system 2700 are interconnected using compute express link (CXL) interconnects.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 27 for inferencing or predicting operations based, at least in part, on weight parameters calculated using neural network training operations, neural network functions and/or architectures, or neural network use cases described herein. In at least one embodiment, a robotic grasping system may use a computer system component as described above to control a tactile hand.

Figure 28:
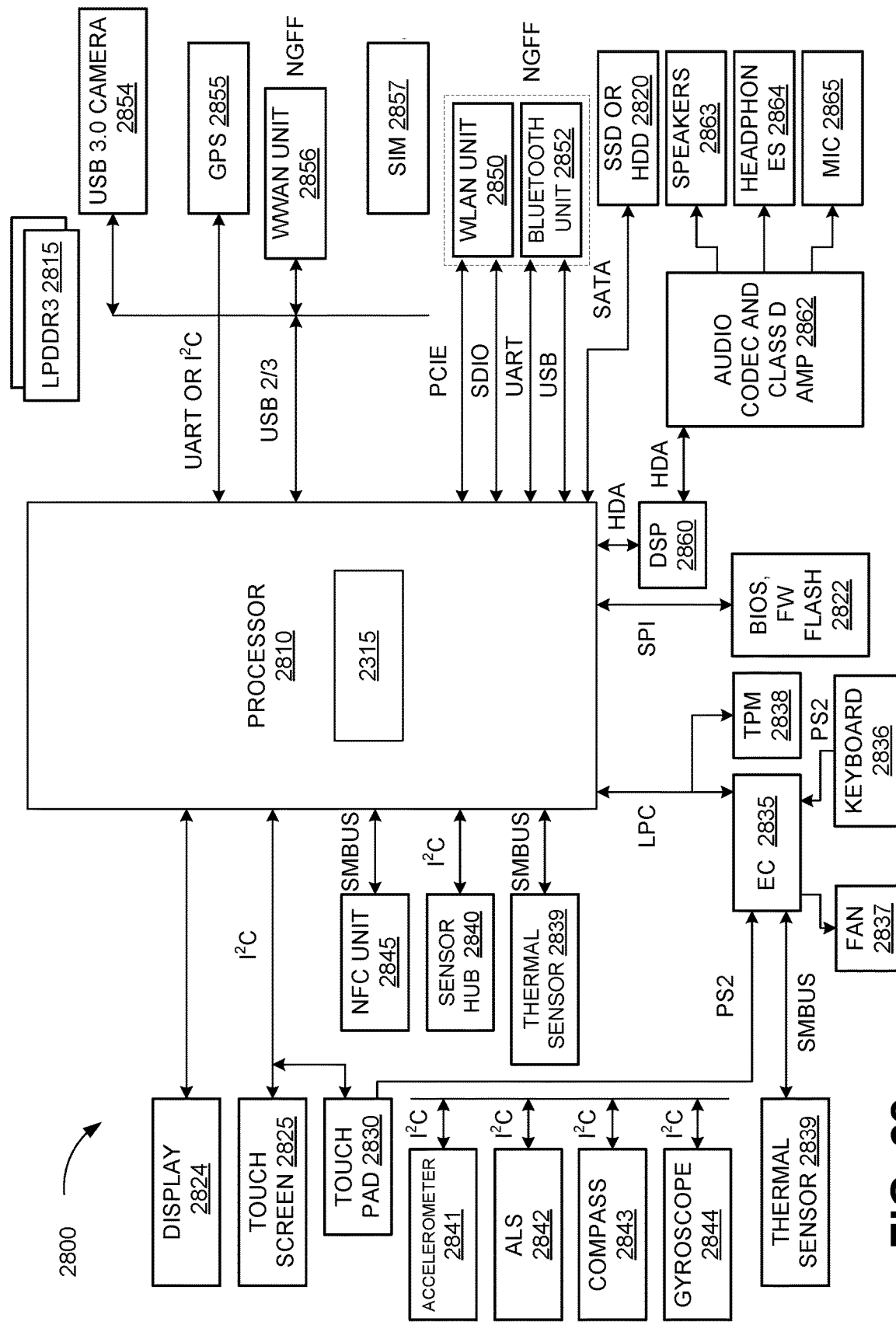
FIG. 28 is a block diagram illustrating a computer system, according to at least one embodiment.

FIG. 28 is a block diagram illustrating an electronic device 2800 for utilizing a processor 2810, according to at least one embodiment. In at least one embodiment, electronic device 2800 may be, for example and without limitation, a notebook, a tower server, a rack server, a blade server, a laptop, a desktop, a tablet, a mobile device, a phone, an embedded computer, or any other suitable electronic device.

In at least one embodiment, system 2800 may include, without limitation, processor 2810 communicatively coupled to any suitable number or kind of components, peripherals, modules, or devices. In at least one embodiment, processor 2810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 28 illustrates a system, which includes interconnected hardware devices or "chips", whereas in other embodiments, FIG. 28 may illustrate an exemplary System on a Chip ("SoC"). In at least one embodiment, devices illustrated in FIG. 28 may be interconnected with proprietary interconnects, standardized interconnects (e.g., PCIe) or some combination thereof. In at least one embodiment, one or more components of FIG. 28 are interconnected using compute express link (CXL) interconnects.

In at least one embodiment, FIG. 28 may include a display 2824, a touch screen 2825, a touch pad 2830, a Near Field Communications unit ("NFC") 2845, a sensor hub 2840, a thermal sensor 2846, an Express Chipset ("EC") 2835, a Trusted Platform Module ("TPM") 2838, BIOS/firmware/ flash memory ("BIOS, FW Flash") 2822, a DSP 2860, a drive "SSD or HDD") 2820 such as a Solid State Disk ("SSD") or a Hard Disk Drive ("HDD"), a wireless local area network unit ("WLAN") 2850, a Bluetooth unit 2852, a Wireless Wide Area Network unit ("WWAN") 2856, a Global Positioning System (GPS) 2855, a camera ("USB 3.0 camera") 2854 such as a USB 3.0 camera, or a Low Power Double Data Rate ("LPDDR") memory unit ("LPDDR3") 2815 implemented in, for example, LPDDR3 standard. These components may each be implemented in any suitable manner.

In at least one embodiment, other components may be communicatively coupled to processor 2810 through components discussed above. In at least one embodiment, an accelerometer 2841, Ambient Light Sensor ("ALS") 2842, compass 2843, and a gyroscope 2844 may be communicatively coupled to sensor hub 2840. In at least one embodiment, thermal sensor 2839, a fan 2837, a keyboard 2846, and a touch pad 2830 may be communicatively coupled to EC 2835. In at least one embodiment, speaker 2863, a headphones 2864, and a microphone ("mic") 2865 may be communicatively coupled to an audio unit ("audio codec and class d amp") 2864, which may in turn be communicatively coupled to DSP 2860. In at least one embodiment, audio unit 2864 may include, for example and without limitation, an audio coder/decoder ("codec") and a class D amplifier. In at least one embodiment, SIM card ("SIM") 2857 may be communicatively coupled to WWAN unit 2856. In at least one embodiment, components such as WLAN unit 2850 and Bluetooth unit 2852, as well as WWAN unit 2856 may be implemented in a Next Generation Form Factor ("NGFF").

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 28 for inferencing or predicting operations based, at least in part, on weight parameters calculated using neural network training operations, neural network functions and/or architectures, or neural network use cases described herein. In at least one embodiment, a robotic grasping system may use a computer system component as described above to control a tactile hand.

Figure 29:
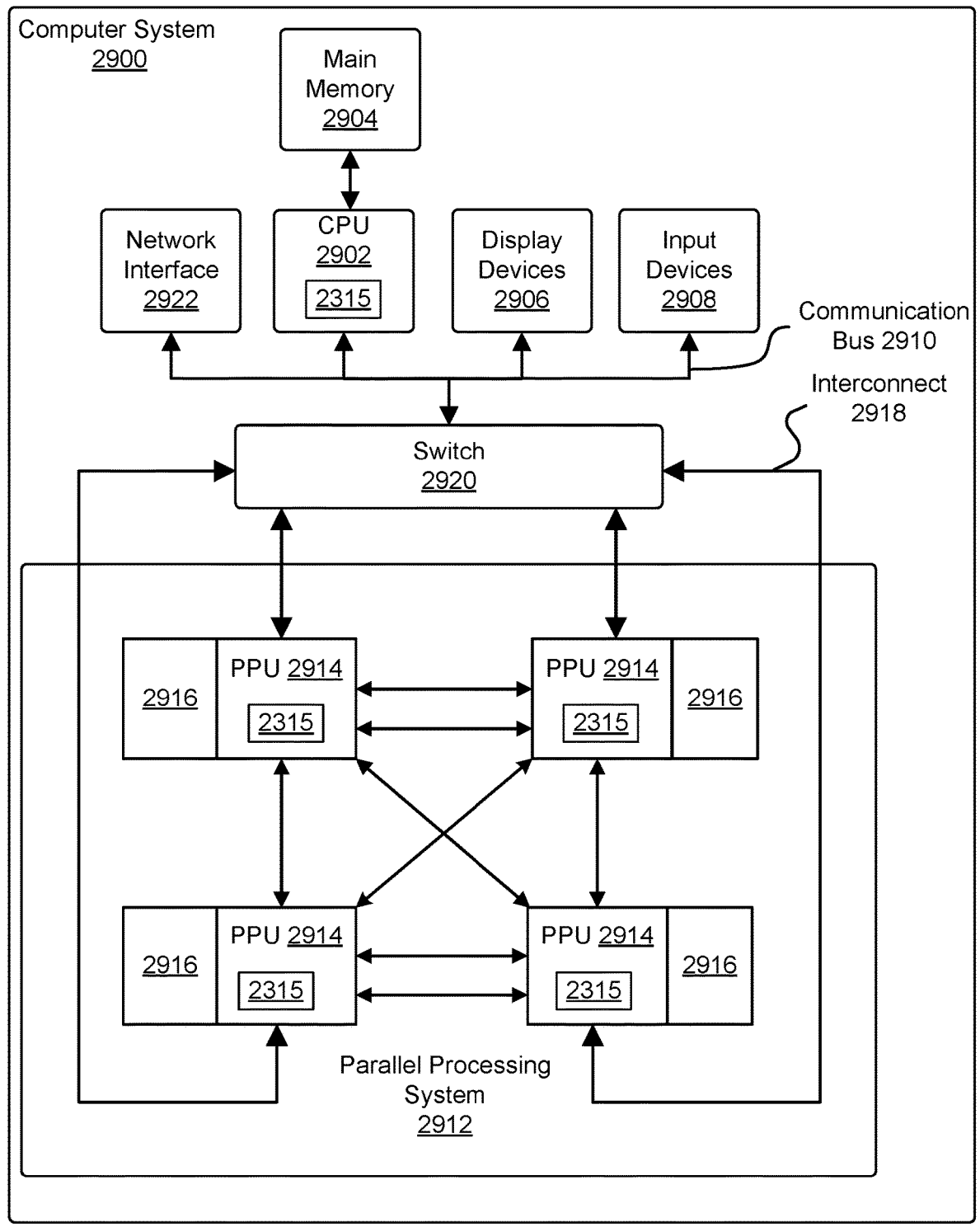
FIG. 29 illustrates a computer system, according to at least one embodiment.

FIG. 29 illustrates a computer system 2900, according to at least one embodiment. In at least one embodiment, computer system 2900 is configured to implement various processes and methods described throughout this disclosure.

In at least one embodiment, computer system 2900 comprises, without limitation, at least one central processing unit ("CPU") 2902 that is connected to a communication bus 2910 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2900 includes, without limitation, a main memory 2904 and control logic (e.g., implemented as hardware, software, or a combination thereof) and data are stored in main memory 2904 which may take form of random access memory ("RAM"). In at least one embodiment, a network interface subsystem ("network interface") 2922 provides an interface to other computing devices and networks for receiving data from and transmitting data to other systems from computer system 2900.

In at least one embodiment, computer system 2900 includes, without limitation, input devices 2908, parallel processing system 2912, and display devices 2906 which can be implemented using a conventional cathode ray tube ("CRT"), liquid crystal display ("LCD"), light emitting diode ("LED"), plasma display, or other suitable display technologies. In at least one embodiment, user input is received from input devices 2908 such as keyboard, mouse, touchpad, microphone, and more. In at least one embodiment, each of foregoing modules can be situated on a single semiconductor platform to form a processing system.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 29 for inferencing or predicting operations based, at least in part, on weight parameters calculated using neural network training operations, neural network functions and/or architectures, or neural network use cases described herein. In at least one embodiment, a robotic grasping system may use a computer system as described above to control a tactile hand.

Figure 30:
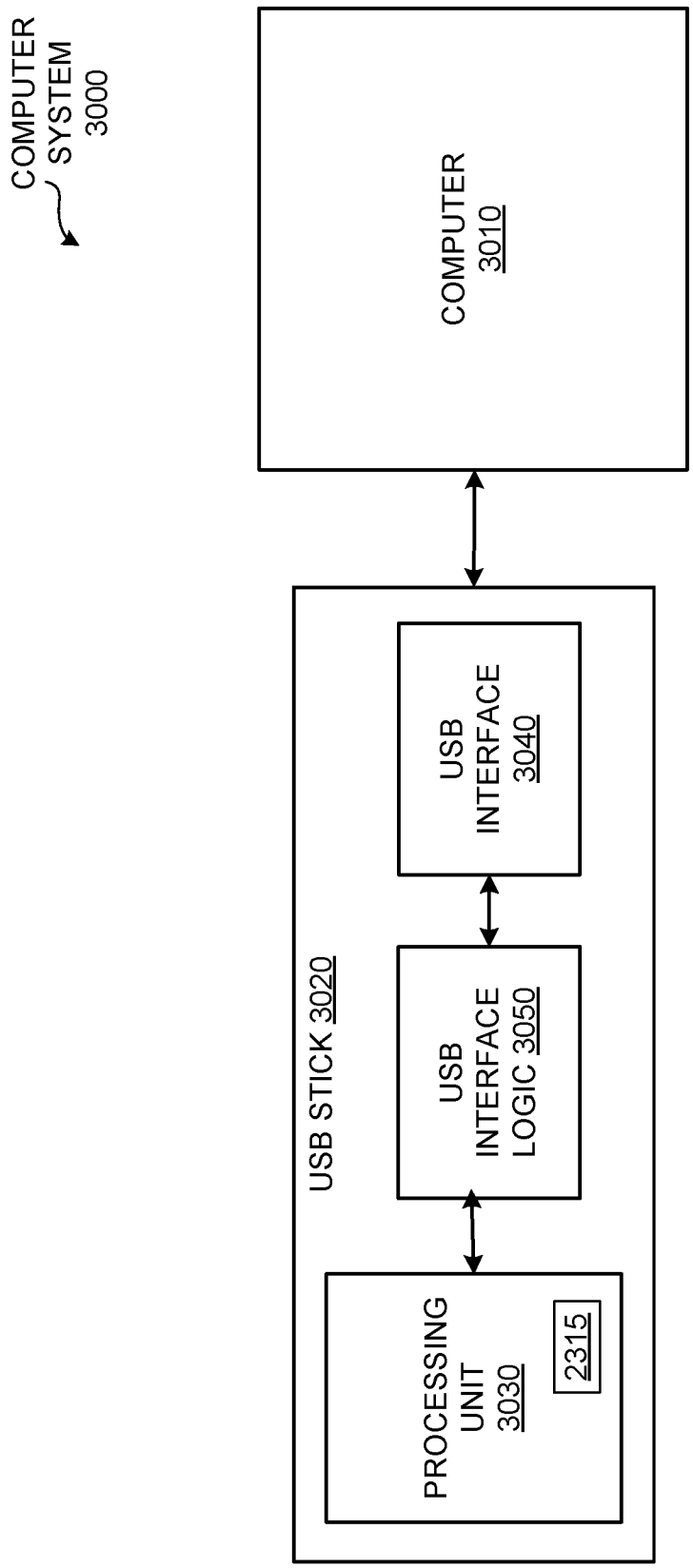
FIG. 30 illustrates a computer system, according to at least one embodiment.

FIG. 30 illustrates a computer system 3000, according to at least one embodiment. In at least one embodiment, computer system 3000 includes, without limitation, a computer 3010 and a USB stick 3020. In at least one embodiment, computer 3010 may include, without limitation, any number and type of processor(s) (not shown) and a memory (not shown). In at least one embodiment, computer 3010 includes, without limitation, a server, a cloud instance, a laptop, and a desktop computer.

In at least one embodiment, USB stick 3020 includes, without limitation, a processing unit 3030, a USB interface 3040, and USB interface logic 3050. In at least one embodiment, processing unit 3030 may be any instruction execution system, apparatus, or device capable of executing instructions. In at least one embodiment, processing unit 3030 may include, without limitation, any number and type of processing cores (not shown). In at least one embodiment, processing core 3030 comprises an application specific integrated circuit ("ASIC") that is optimized to perform any amount and type of operations associated with machine learning. For instance, in at least one embodiment, processing core 3030 is a tensor processing unit ("TPC") that is optimized to perform machine learning inference operations. In at least one embodiment, processing core 3030 is a vision processing unit ("VPU") that is optimized to perform machine vision and machine learning inference operations.

In at least one embodiment, USB interface 3040 may be any type of USB connector or USB socket. For instance, in at least one embodiment, USB interface 3040 is a USB 3.0 Type-C socket for data and power. In at least one embodiment, USB interface 3040 is a USB 3.0 Type-A connector. In at least one embodiment, USB interface logic 3050 may include any amount and type of logic that enables processing unit 3030 to interface with or devices (e.g., computer 3010) via USB connector 3040.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system FIG. 30 for inferencing or predicting operations based, at least in part, on weight parameters calculated using neural network training operations, neural network functions and/or architectures, or neural network use cases described herein. In at least one embodiment, a robotic grasping system may use a multi-core processor as described above to control a tactile hand.

Figure 31A:
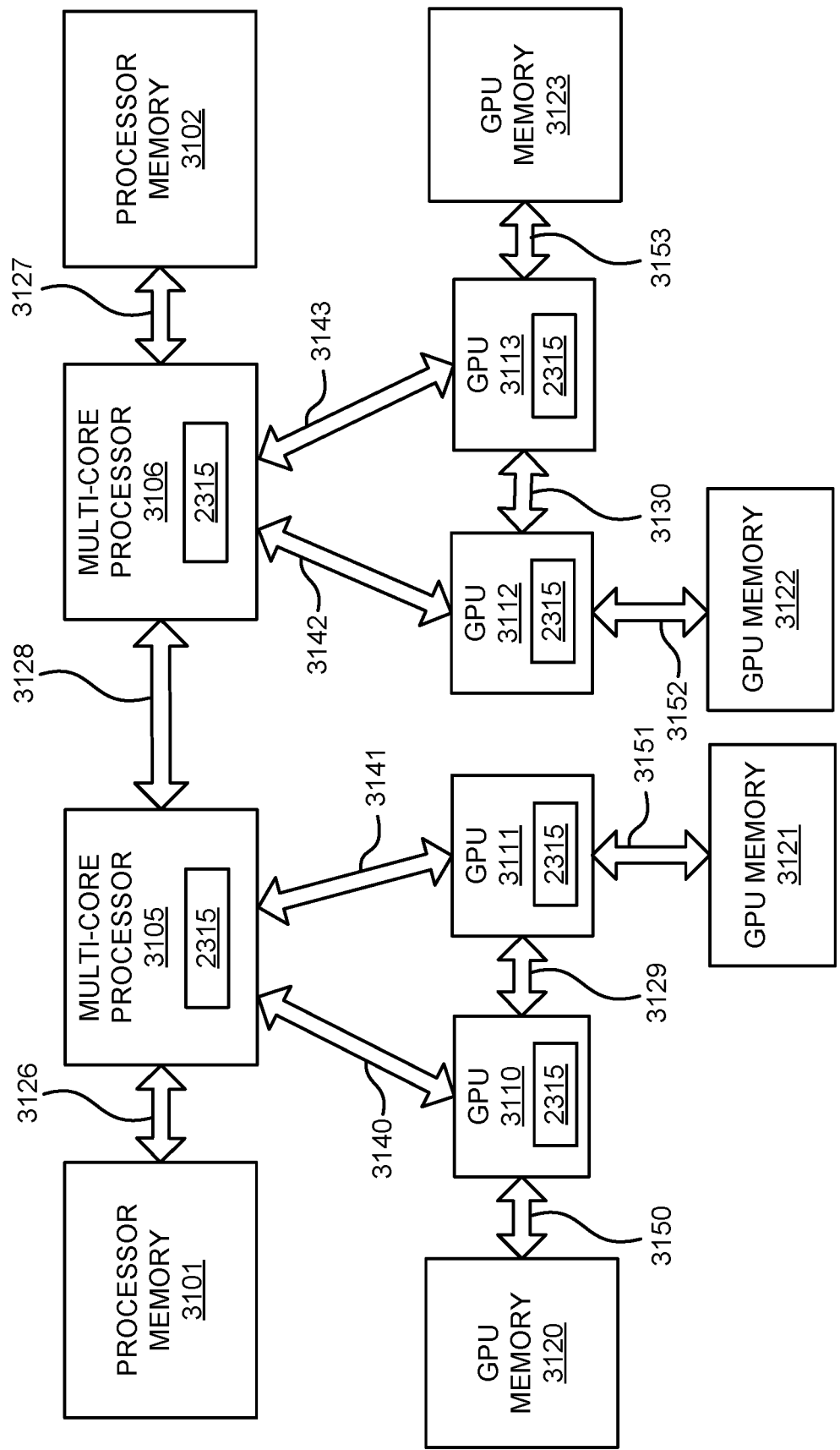
FIG. 31A illustrates a computer system, according to at least one embodiment.

FIG. 31A illustrates an exemplary architecture in which a plurality of GPUs 3110-3113 is communicatively coupled to a plurality of multi-core processors 3105-3106 over high-speed links 3140-3143 (e.g., buses, point-to-point interconnects, etc.). In one embodiment, high-speed links 3140-3143 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 3110-3113 are interconnected over high-speed links 3129-3130, which may be implemented using same or different protocols/links than those used for high-speed links 3140-3143. Similarly, two or more of multi-core processors 3105-3106 may be connected over high speed link 3128 which may be symmetric multi-processor (SMP) buses operating at 20 GB/s, 30 GB/s, 120 GB/s or higher. Alternatively, all communication between various system components shown in FIG. 31A may be accomplished using same protocols/links (e.g., over a common interconnection fabric).

In one embodiment, each multi-core processor 3105-3106 is communicatively coupled to a processor memory 3101-3102, via memory interconnects 3126-3127, respectively, and each GPU 3110-3113 is communicatively coupled to GPU memory 3120-3123 over GPU memory interconnects 3150-3153, respectively. Memory interconnects 3126-3127 and 3150-3153 may utilize same or different memory access technologies. By way of example, and not limitation, processor memories 3101-3102 and GPU memories 3120-3123 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 3101-3102 may be volatile memory and another portion may be non-volatile memory (e.g., using a two-level memory (2LM) hierarchy).

As described herein, although various processors 3105-3106 and GPUs 3110-3113 may be physically coupled to a particular memory 3101-3102, 3120-3123, respectively, a unified memory architecture may be implemented in which a same virtual system address space (also referred to as "effective address" space) is distributed among various physical memories. For example, processor memories 3101-3102 may each comprise 64 GB of system memory address space and GPU memories 3120-3123 may each comprise 32 GB of system memory address space (resulting in a total of 256 GB addressable memory in this example).

Figure 31B:
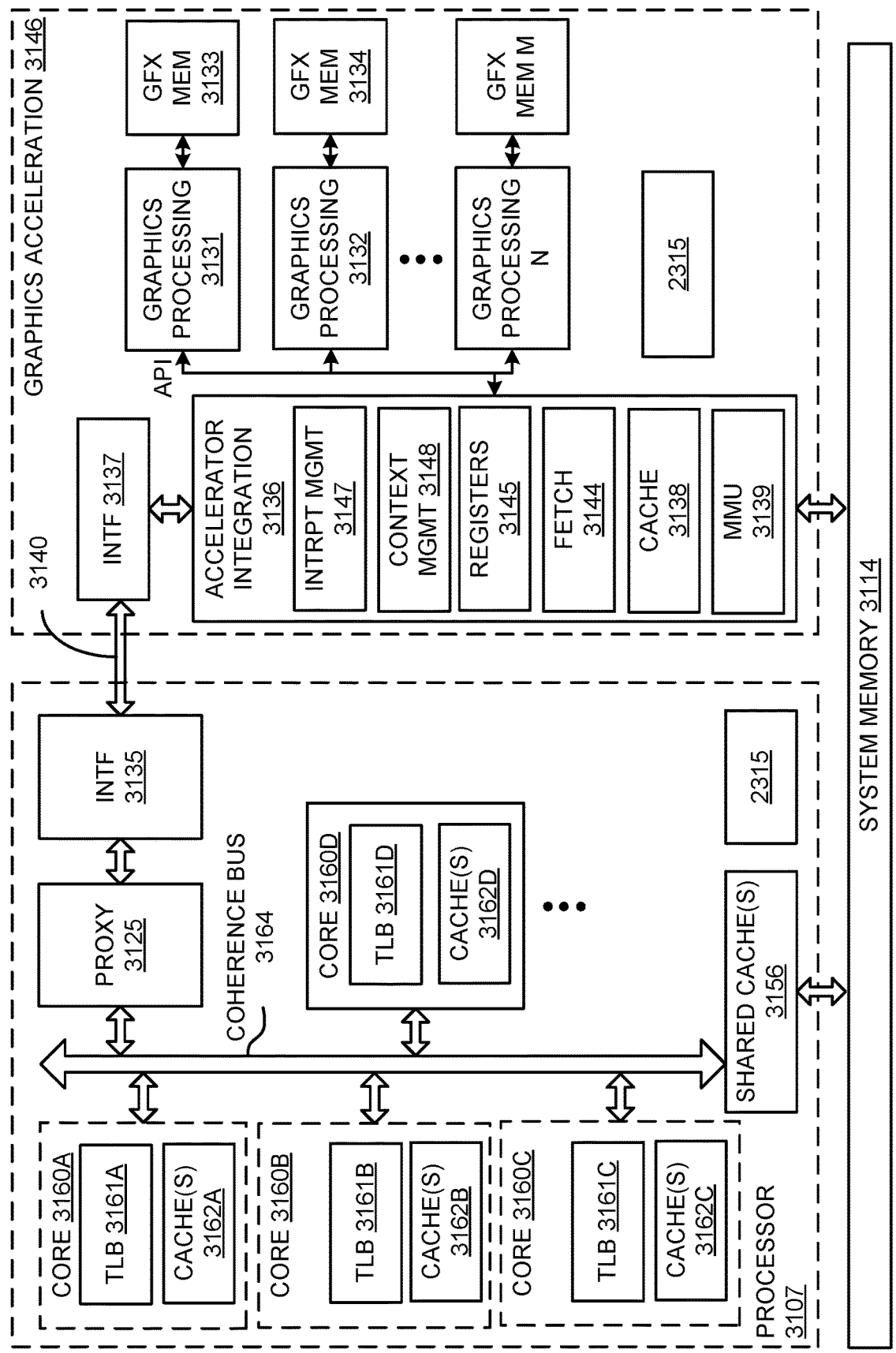
FIG. 31B illustrates a computer system, according to at least one embodiment.

FIG. 31B illustrates additional details for an interconnection between a multi-core processor 3107 and a graphics acceleration module 3146 in accordance with one exemplary embodiment. Graphics acceleration module 3146 may include one or more GPU chips integrated on a line card which is coupled to processor 3107 via high-speed link 3140. Alternatively, graphics acceleration module 3146 may be integrated on a same package or chip as processor 3107.

In at least one embodiment, illustrated processor 3107 includes a plurality of cores 3160A-3160D, each with a translation lookaside buffer 3161A-3161D and one or more caches 3162A-3162D. In at least one embodiment, cores 3160A-3160D may include various other components for executing instructions and processing data which are not illustrated. Caches 3162A-3162D may comprise level 1 (L1) and level 2 (L2) caches. In addition, one or more shared caches 3156 may be included in caches 3162A-3162D and shared by sets of cores 3160A-3160D. For example, one embodiment of processor 3107 includes 24 cores, each with its own L1 cache, twelve shared L2 caches, and twelve shared L3 caches. In this embodiment, one or more L2 and L3 caches are shared by two adjacent cores. Processor 3107 and graphics acceleration module 3146 connect with system memory 3114, which may include processor memories 3101-3102 of FIG. 31A.

Coherency is maintained for data and instructions stored in various caches 3162A-3162D, 3156 and system memory 3114 via inter-core communication over a coherence bus 3164. For example, each cache may have cache coherency logic/circuitry associated therewith to communicate to over coherence bus 3164 in response to detected reads or writes to particular cache lines. In one implementation, a cache snooping protocol is implemented over coherence bus 3164 to snoop cache accesses.

In one embodiment, a proxy circuit 3125 communicatively couples graphics acceleration module 3146 to coherence bus 3164, allowing graphics acceleration module 3146 to participate in a cache coherence protocol as a peer of cores 3160A-3160D. In particular, an interface 3135 provides connectivity to proxy circuit 3125 over high-speed link 3140 (e.g., a PCIe bus, NVLink, etc.) and an interface 3137 connects graphics acceleration module 3146 to link 3140.

In one implementation, an accelerator integration circuit 3136 provides cache management, memory access, context management, and interrupt management services on behalf of a plurality of graphics processing engines 3131, 3132, N of graphics acceleration module 3146. Graphics processing engines 3131, 3132, N may each comprise a separate graphics processing unit (GPU). Alternatively, graphics processing engines 3131, 3132, N may comprise different types of graphics processing engines within a GPU such as graphics execution units, media processing engines (e.g., video encoders/decoders), samplers, and blit engines. In at least one embodiment, graphics acceleration module 3146 may be a GPU with a plurality of graphics processing engines 3131-3132, N or graphics processing engines 3131-3132, N may be individual GPUs integrated on a common package, line card, or chip.

In one embodiment, accelerator integration circuit 3136 includes a memory management unit (MMU) 3139 for performing various memory management functions such as virtual-to-physical memory translations (also referred to as effective-to-real memory translations) and memory access protocols for accessing system memory 3114. MMU 3139 may also include a translation lookaside buffer (TLB) (not shown) for caching virtual/effective to physical/real address translations. In one implementation, a cache 3138 stores commands and data for efficient access by graphics processing engines 3131-3132, N. In one embodiment, data stored in cache 3138 and graphics memories 3133-3134, M is kept coherent with core caches 3162A-3162D, 3156 and system memory 3114. As mentioned, this may be accomplished via proxy circuit 3125 on behalf of cache 3138 and memories 3133-3134, M (e.g., sending updates to cache 3138 related to modifications/accesses of cache lines on processor caches 3162A-3162D, 3156 and receiving updates from cache 3138).

A set of registers 3145 store context data for threads executed by graphics processing engines 3131-3132, N and a context management circuit 3148 manages thread contexts. For example, context management circuit 3148 may perform save and restore operations to save and restore contexts of various threads during contexts switches (e.g., where a first thread is saved and a second thread is stored so that a second thread can be executed by a graphics processing engine). For example, on a context switch, a context management circuit 3148 may store current register values to a designated region in memory (e.g., identified by a context pointer). It may then restore register values when returning to a context. In one embodiment, an interrupt management circuit 3147 receives and processes interrupts received from system devices.

In one implementation, virtual/effective addresses from a graphics processing engine 3131 are translated to real/physical addresses in system memory 3114 by MMU 3139. One embodiment of accelerator integration circuit 3136 supports multiple (e.g., 4, 8, 16) graphics accelerator modules 3146 and/or other accelerator devices. Graphics accelerator module 3146 may be dedicated to a single application executed on processor 3107 or may be shared between multiple applications. In one embodiment, a virtualized graphics execution environment is presented in which resources of graphics processing engines 3131-3132, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 3136 performs as a bridge to a system for graphics acceleration module 3146 and provides address translation and system memory cache services. In addition, accelerator integration circuit 3136 may provide virtualization facilities for a host processor to manage virtualization of graphics processing engines 3131-3132, interrupts, and memory management.

Because hardware resources of graphics processing engines 3131-3132, N are mapped explicitly to a real address space seen by host processor 3107, any host processor can address these resources directly using an effective address value. One function of accelerator integration circuit 3136, in one embodiment, is physical separation of graphics processing engines 3131-3132, N so that they appear to a system as independent units.

In at least one embodiment, one or more graphics memories 3133-3134, M are coupled to each of graphics processing engines 3131-3132, N, respectively. Graphics memories 3133-3134, M store instructions and data being processed by each of graphics processing engines 3131-3132, N. Graphics memories 3133-3134, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 3140, biasing techniques are used to ensure that data stored in graphics memories 3133-3134, M is data which will be used most frequently by graphics processing engines 3131-3132, N and preferably not used by cores 3160A-3160D (at least not frequently). Similarly, a biasing mechanism attempts to keep data needed by cores (and preferably not graphics processing engines 3131-3132, N) within caches 3162A-3162D, 3156 of cores and system memory 3114.

Figure 31C:
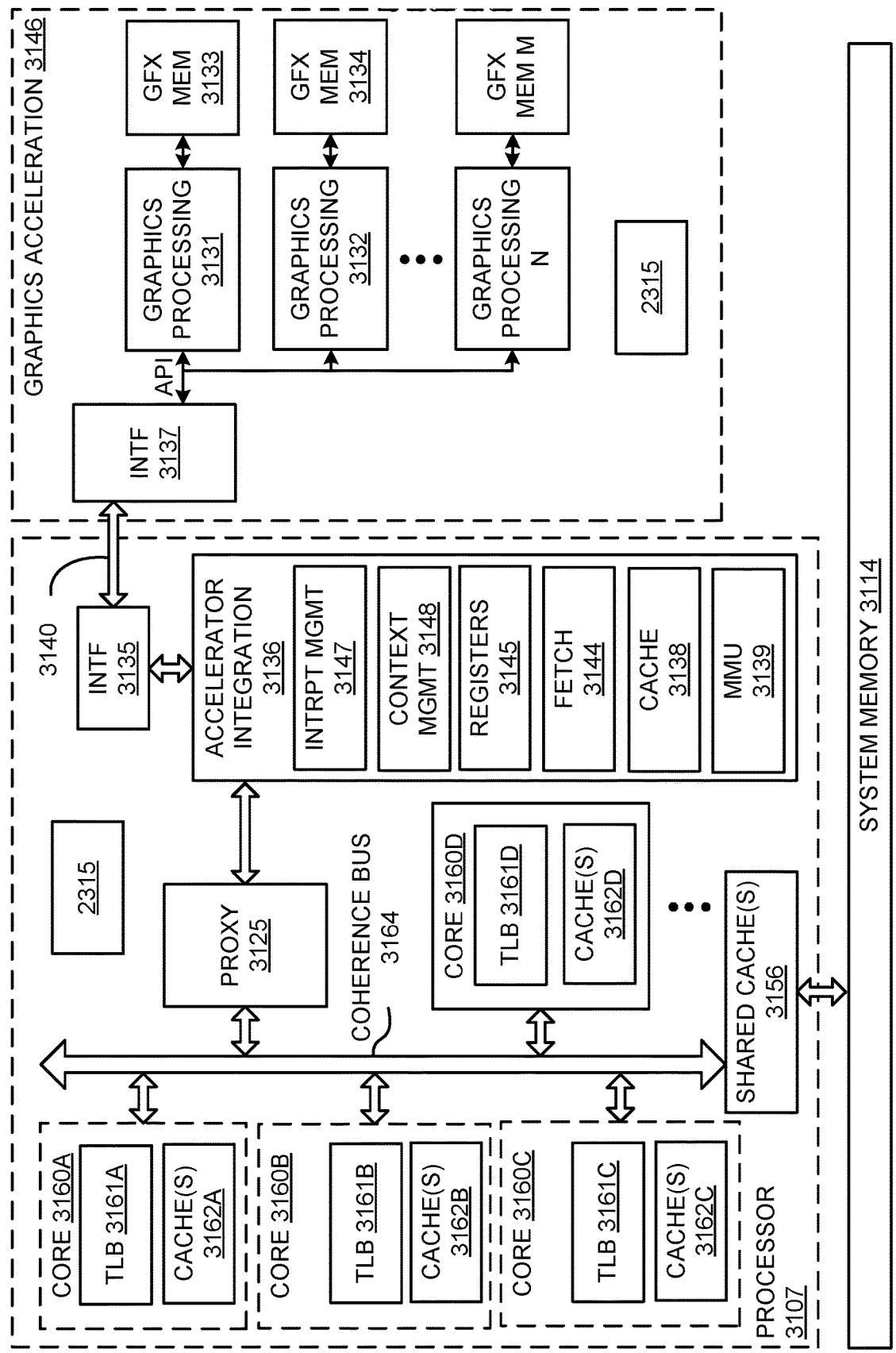
FIG. 31C illustrates a computer system, according to at least one embodiment.

FIG. 31C illustrates another exemplary embodiment in which accelerator integration circuit 3136 is integrated within processor 3107. In this embodiment, graphics processing engines 3131-3132, N communicate directly over high-speed link 3140 to accelerator integration circuit 3136 via interface 3137 and interface 3135 (which, again, may utilize any form of bus or interface protocol). Accelerator integration circuit 3136 may perform same operations as those described with respect to FIG. 31B, but potentially at a higher throughput given its close proximity to coherence bus 3164 and caches 3162A-3162D, 3156. One embodiment supports different programming models including a dedicated-process programming model (no graphics acceleration module virtualization) and shared programming models (with virtualization), which may include programming models which are controlled by accelerator integration circuit 3136 and programming models which are controlled by graphics acceleration module 3146.

In at least one embodiment, graphics processing engines 3131-3132, N are dedicated to a single application or process under a single operating system. In at least one embodiment, a single application can funnel other application requests to graphics processing engines 3131-3132, N, providing virtualization within a VM/partition.

In at least one embodiment, graphics processing engines 3131-3132, N, may be shared by multiple VM/application partitions. In at least one embodiment, shared models may use a system hypervisor to virtualize graphics processing engines 3131-3132, N to allow access by each operating system. For single-partition systems without a hypervisor, graphics processing engines 3131-3132, N are owned by an operating system. In at least one embodiment, an operating system can virtualize graphics processing engines 3131-3132, N to provide access to each process or application.

In at least one embodiment, graphics acceleration module 3146 or an individual graphics processing engine 3131-3132, N selects a process element using a process handle. In one embodiment, process elements are stored in system memory 3114 and are addressable using an effective address to real address translation techniques described herein. In at least one embodiment, a process handle may be an implementation-specific value provided to a host process when registering its context with graphics processing engine 3131-3132, N (that is, calling system software to add a process element to a process element linked list). In at least one embodiment, a lower 16-bits of a process handle may be an offset of a process element within a process element linked list.

Figure 31D:
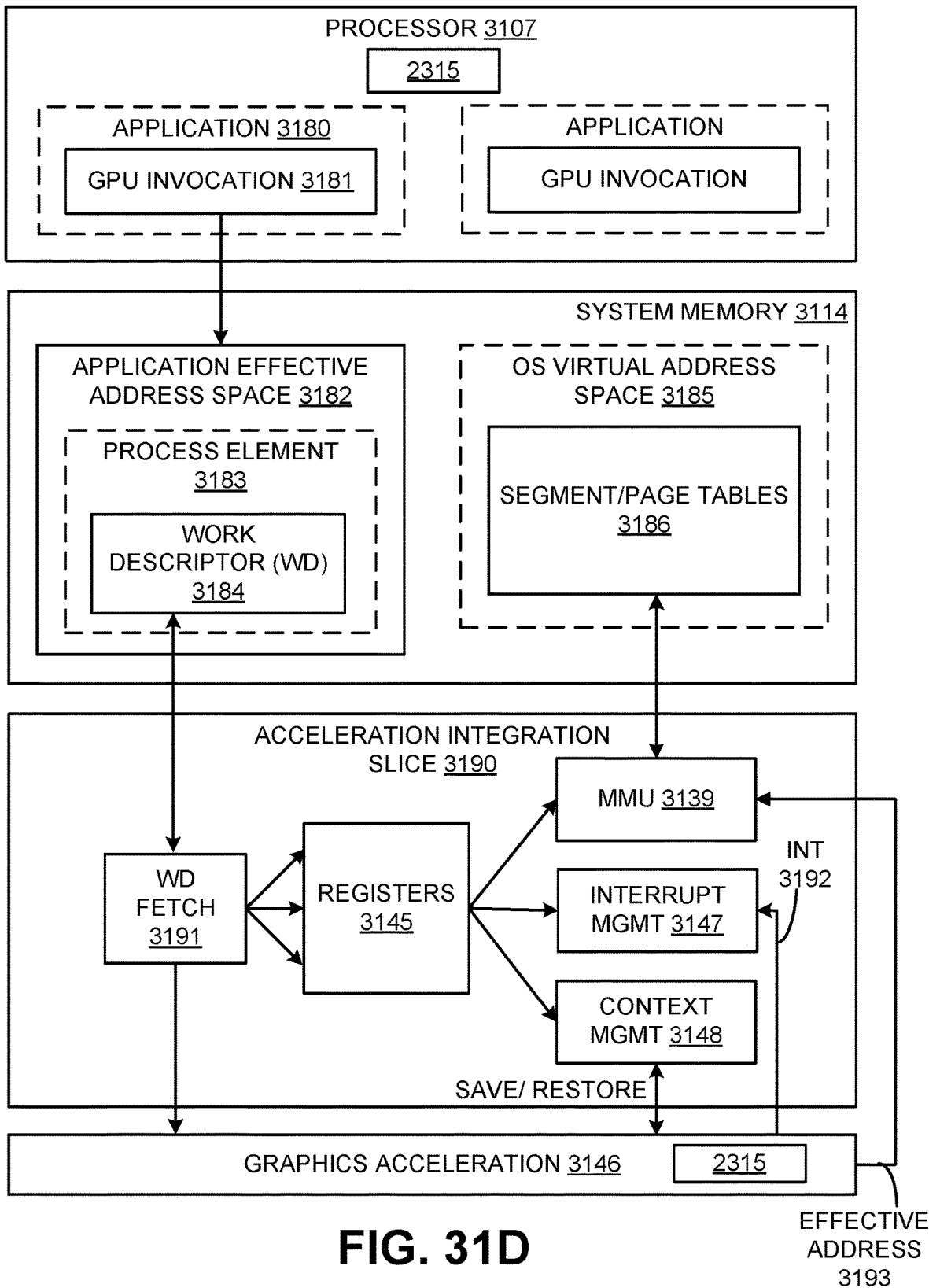
FIG. 31D illustrates a computer system, according to at least one embodiment.

FIG. 31D illustrates an exemplary accelerator integration slice 3190. As used herein, a "slice" comprises a specified portion of processing resources of accelerator integration circuit 3136. Application effective address space 3182 within system memory 3114 stores process elements 3183. In one embodiment, process elements 3183 are stored in response to GPU invocations 3181 from applications 3180 executed on processor 3107. A process element 3183 contains process state for corresponding application 3180. A work descriptor (WD) 3184 contained in process element 3183 can be a single job requested by an application or may contain a pointer to a queue of jobs. In at least one embodiment, WD 3184 is a pointer to a job request queue in an application's address space 3182.

Graphics acceleration module 3146 and/or individual graphics processing engines 3131-3132, N can be shared by all or a subset of processes in a system. In at least one embodiment, an infrastructure for setting up process state and sending a WD 3184 to a graphics acceleration module 3146 to start a job in a virtualized environment may be included.

In at least one embodiment, a dedicated-process programming model is implementation-specific. In this model, a single process owns graphics acceleration module 3146 or an individual graphics processing engine 3131. Because graphics acceleration module 3146 is owned by a single process, a hypervisor initializes accelerator integration circuit 3136 for an owning partition and an operating system initializes accelerator integration circuit 3136 for an owning process when graphics acceleration module 3146 is assigned.

In operation, a WD fetch unit 3191 in accelerator integration slice 3190 fetches next WD 3184 which includes an indication of work to be done by one or more graphics processing engines of graphics acceleration module 3146. Data from WD 3184 may be stored in registers 3145 and used by MMU 3139, interrupt management circuit 3147 and/or context management circuit 3148 as illustrated. For example, one embodiment of MMU 3139 includes segment/page walk circuitry for accessing segment/page tables 3186 within OS virtual address space 3185. Interrupt management circuit 3147 may process interrupt events 3192 received from graphics acceleration module 3146. When performing graphics operations, an effective address 3193 generated by a graphics processing engine 3131-3132, N is translated to a real address by MMU 3139.

In one embodiment, a same set of registers 3145 are duplicated for each graphics processing engine 3131-3132, N and/or graphics acceleration module 3146 and may be initialized by a hypervisor or operating system. Each of these duplicated registers may be included in an accelerator integration slice 3190. Exemplary registers that may be initialized by a hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 3184 is specific to a particular graphics acceleration module 3146 and/or graphics processing engines 3131-3132, N. It contains all information required by a graphics processing engine 3131-3132, N to do work or it can be a pointer to a memory location where an application has set up a command queue of work to be completed.

Figure 31E:
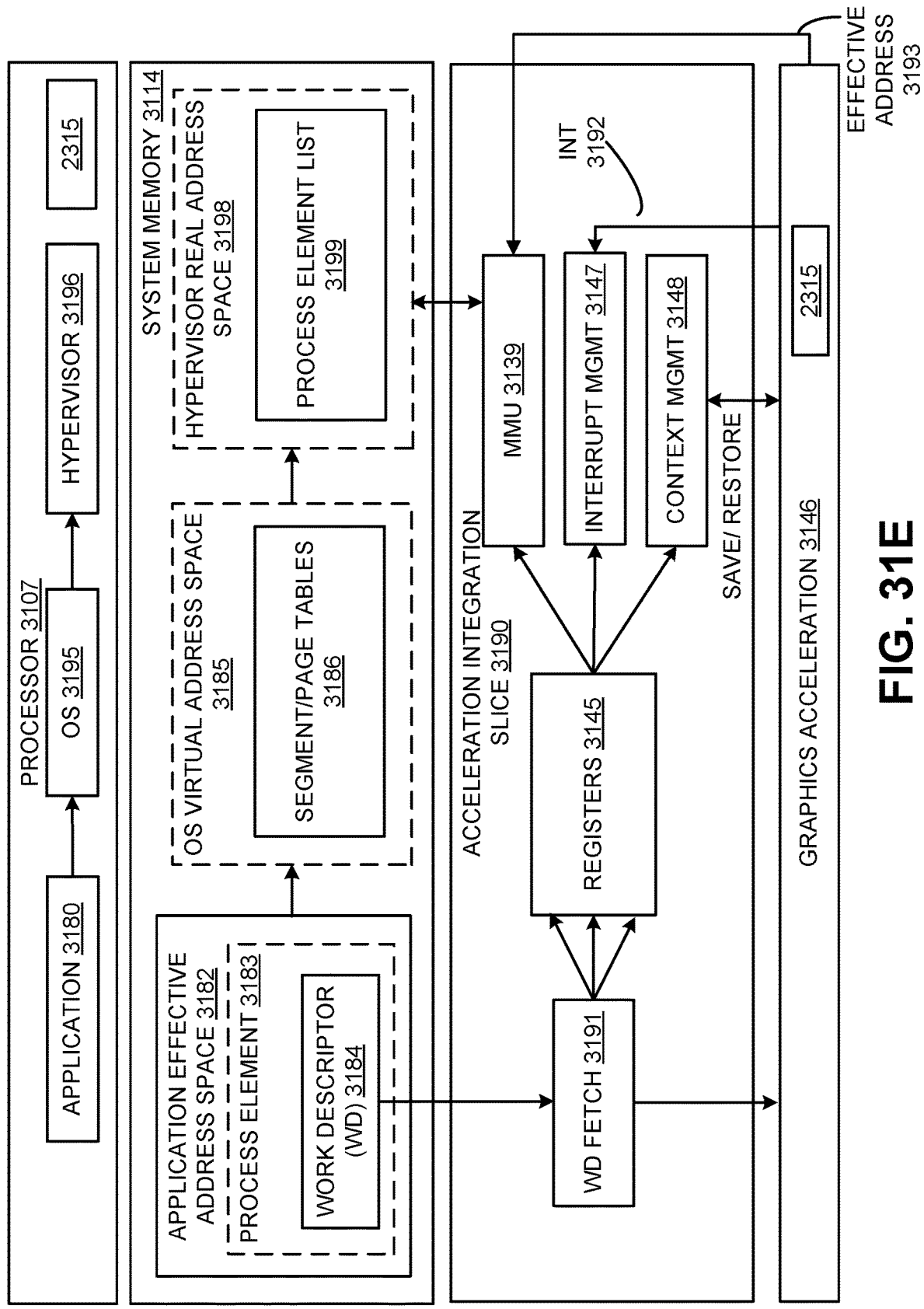
FIGS. 31E and 31F illustrate a shared programming model, according to at least one embodiment.

FIG. 31E illustrates additional details for one exemplary embodiment of a shared model. This embodiment includes a hypervisor real address space 3198 in which a process element list 3199 is stored. Hypervisor real address space 3198 is accessible via a hypervisor 3196 which virtualizes graphics acceleration module engines for operating system 3195.

In at least one embodiment, shared programming models allow for all or a subset of processes from all or a subset of partitions in a system to use a graphics acceleration module 3146. There are two programming models where graphics acceleration module 3146 is shared by multiple processes and partitions: time-sliced shared and graphics directed shared.

In this model, system hypervisor 3196 owns graphics acceleration module 3146 and makes its function available to all operating systems 3195. For a graphics acceleration module 3146 to support virtualization by system hypervisor 3196, graphics acceleration module 3146 may adhere to following: 1) An application's job request must be autonomous (that is, state does not need to be maintained between jobs), or graphics acceleration module 3146 must provide a context save and restore mechanism. 2) An application's job request is guaranteed by graphics acceleration module 3146 to complete in a specified amount of time, including any translation faults, or graphics acceleration module 3146 provides an ability to preempt processing of a job. 3) Graphics acceleration module 3146 must be guaranteed fairness between processes when operating in a directed shared programming model.

In at least one embodiment, application 3180 is required to make an operating system 3195 system call with a graphics acceleration module 3146 type, a work descriptor ("WD"), an authority mask register ("AMR") value, and a context save/restore area pointer ("CSRP"). In at least one embodiment, graphics acceleration module 3146 type describes a targeted acceleration function for a system call. In at least one embodiment, graphics acceleration module 3146 type may be a system-specific value. In at least one embodiment, WD is formatted specifically for graphics acceleration module 3146 and can be in a form of a graphics acceleration module 3146 command, an effective address pointer to a user-defined structure, an effective address pointer to a queue of commands, or any other data structure to describe work to be done by graphics acceleration module 3146. In one embodiment, an AMR value is an AMR state to use for a current process. In at least one embodiment, a value passed to an operating system is similar to an application setting an AMR. If accelerator integration circuit 3136 and graphics acceleration module 3146 implementations do not support a User Authority Mask Override Register ("UAMOR"), an operating system may apply a current UAMOR value to an AMR value before passing an AMR in a hypervisor call. Hypervisor 3196 may optionally apply a current Authority Mask Override Register ("AMOR") value before placing an AMR into process element 3183. In at least one embodiment, CSRP is one of registers 3145 containing an effective address of an area in an application's address space 3182 for graphics acceleration module 3146 to save and restore context state. This pointer is optional if no state is required to be saved between jobs or when a job is preempted. In at least one embodiment, context save/restore area may be pinned system memory.

Upon receiving a system call, operating system 3195 may verify that application 3180 has registered and been given authority to use graphics acceleration module 3146. Operating system 3195 then calls hypervisor 3196 with information shown in Table 3.

TABLE 3

| | OS to Hypervisor Call Parameters |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 3196 verifies that operating system 3195 has registered and been given authority to use graphics acceleration module 3146. Hypervisor 3196 then puts process element 3183 into a process element linked list for a corresponding graphics acceleration module 3146 type. A process element may include information shown in Table 4.

TABLE 4

| | Process Element Information |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 3190 registers 3145.

Figure 31F:
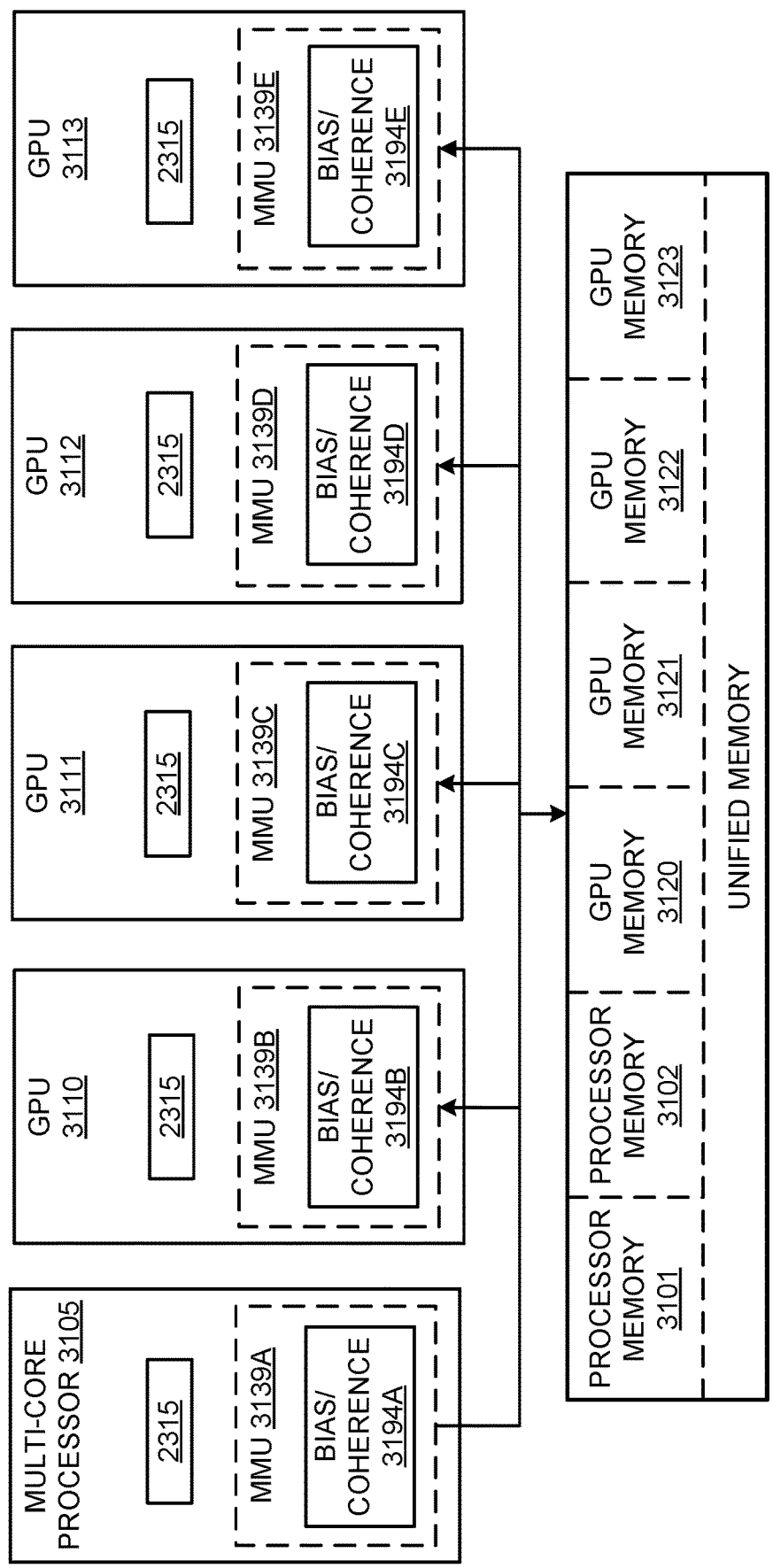

As illustrated in FIG. 31F, in at least one embodiment, a unified memory is used, addressable via a common virtual memory address space used to access physical processor memories 3101-3102 and GPU memories 3120-3123. In this implementation, operations executed on GPUs 3110-3113 utilize a same virtual/effective memory address space to access processor memories 3101-3102 and vice versa, thereby simplifying programmability. In one embodiment, a first portion of a virtual/effective address space is allocated to processor memory 3101, a second portion to second processor memory 3102, a third portion to GPU memory 3120, and so on. In at least one embodiment, an entire virtual/effective memory space (sometimes referred to as an effective address space) is thereby distributed across each of processor memories 3101-3102 and GPU memories 3120-3123, allowing any processor or GPU to access any physical memory with a virtual address mapped to that memory.

In one embodiment, bias/coherence management circuitry 3194A-3194E within one or more of MMUs 3139A-3139E ensures cache coherence between caches of one or more host processors (e.g., 3105) and GPUs 3110-3113 and implements biasing techniques indicating physical memories in which certain types of data should be stored. While multiple instances of bias/coherence management circuitry 3194A-3194E are illustrated in FIG. 31F, bias/coherence circuitry may be implemented within an MMU of one or more host processors 3105 and/or within accelerator integration circuit 3136.

One embodiment allows GPU-attached memory 3120-3123 to be mapped as part of system memory, and accessed using shared virtual memory (SVM) technology, but without suffering performance drawbacks associated with full system cache coherence. In at least one embodiment, an ability for GPU-attached memory 3120-3123 to be accessed as system memory without onerous cache coherence overhead provides a beneficial operating environment for GPU offload. This arrangement allows host processor 3105 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 3120-3123 without cache coherence overheads can be critical to execution time of an offloaded computation. In cases with substantial streaming write memory traffic, for example, cache coherence overhead can significantly reduce an effective write bandwidth seen by a GPU 3110-3113. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 3120-3123, with or without a bias cache in GPU 3110-3113 (e.g., to cache frequently/recently used entries of a bias table). Alternatively, an entire bias table may be maintained within a GPU.

In at least one embodiment, a bias table entry associated with each access to GPU-attached memory 3120-3123 is accessed prior to actual access to a GPU memory, causing following operations. First, local requests from GPU 3110-3113 that find their page in GPU bias are forwarded directly to a corresponding GPU memory 3120-3123. Local requests from a GPU that find their page in host bias are forwarded to processor 3105 (e.g., over a high-speed link as discussed above). In one embodiment, requests from processor 3105 that find a requested page in host processor bias complete a request like a normal memory read. Alternatively, requests directed to a GPU-biased page may be forwarded to GPU 3110-3113. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 3105 bias to GPU bias, but is not for an opposite transition.

In one embodiment, cache coherency is maintained by temporarily rendering GPU-biased pages uncacheable by host processor 3105. To access these pages, processor 3105 may request access from GPU 3110 which may or may not grant access right away. Thus, to reduce communication between processor 3105 and GPU 3110 it is beneficial to ensure that GPU-biased pages are those which are required by a GPU but not host processor 3105 and vice versa.

Hardware structure(s) 2315 are used to perform one or more embodiments. Details regarding hardware structure(x) 2315 are provided herein in conjunction with FIGS. 23A and/or 23B.

Figure 32:
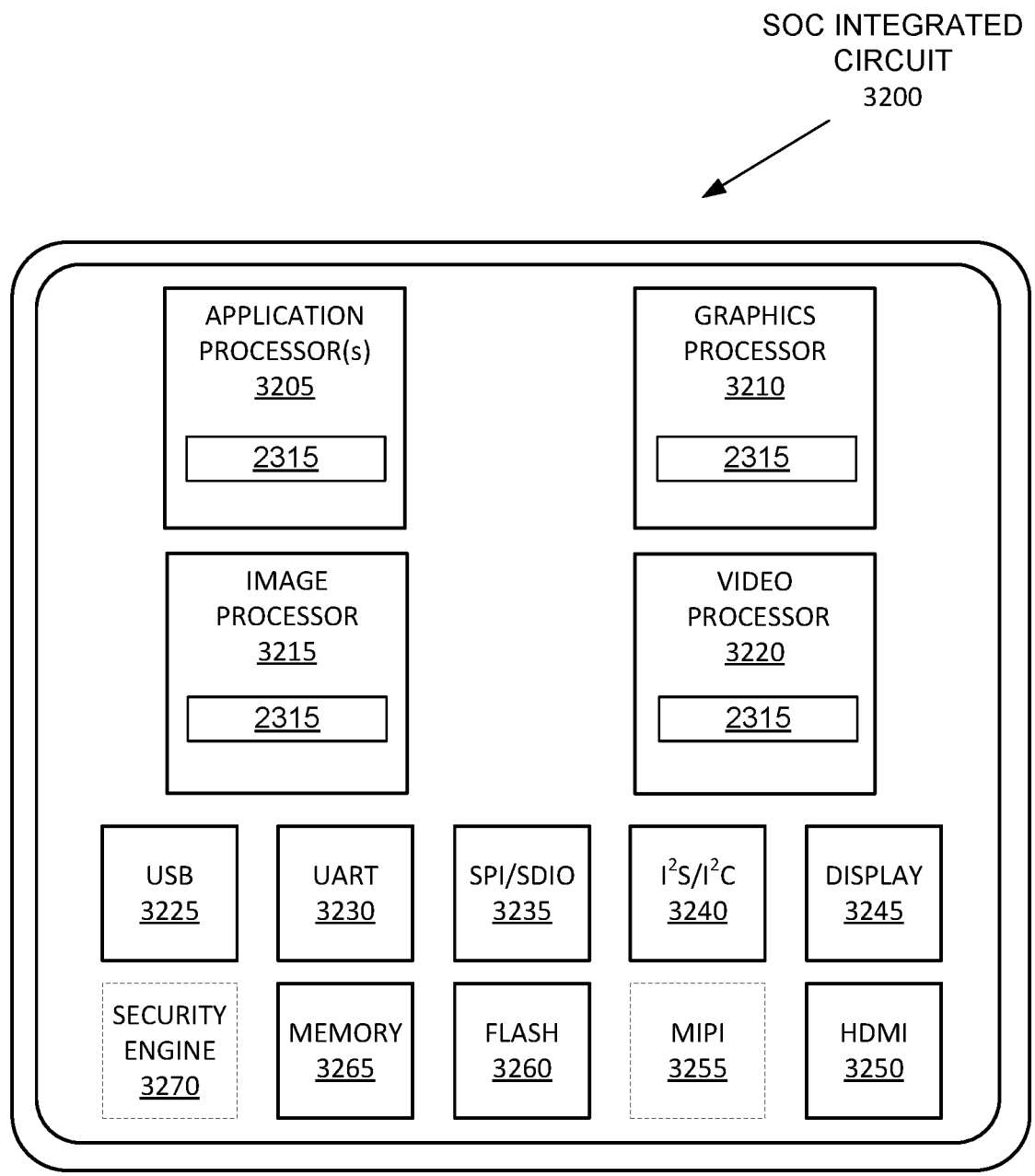
FIG. 32 illustrates exemplary integrated circuits and associated graphics processors, according to at least one embodiment.

FIG. 32 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 32 is a block diagram illustrating an exemplary system on a chip integrated circuit 3200 that may be fabricated using one or more IP cores, according to at least one embodiment. In at least one embodiment, integrated circuit 3200 includes one or more application processor(s) 3205 (e.g., CPUs), at least one graphics processor 3210, and may additionally include an image processor 3215 and/or a video processor 3220, any of which may be a modular IP core. In at least one embodiment, integrated circuit 3200 includes peripheral or bus logic including a USB controller 3225, UART controller 3230, an SPI/SDIO controller 3235, and an $I^2S/I^2C$ controller 3240. In at least one embodiment, integrated circuit 3200 can include a display device 3245 coupled to one or more of a high-definition multimedia interface (HDMI) controller 3250 and a mobile industry processor interface (MIPI) display interface 3255. In at least one embodiment, storage may be provided by a flash memory subsystem 3260 including flash memory and a flash memory controller. In at least one embodiment, memory interface may be provided via a memory controller 3265 for access to SDRAM or SRAM memory devices. In at least one embodiment, some integrated circuits additionally include an embedded security engine 3270.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in integrated circuit 3200 for inferencing or predicting operations based, at least in part, on weight parameters calculated using neural network training operations, neural network functions and/or architectures, or neural network use cases described herein. In at least one embodiment, a robotic grasping system may use a graphics processor as described above to control a tactile hand.

Figure 33A:
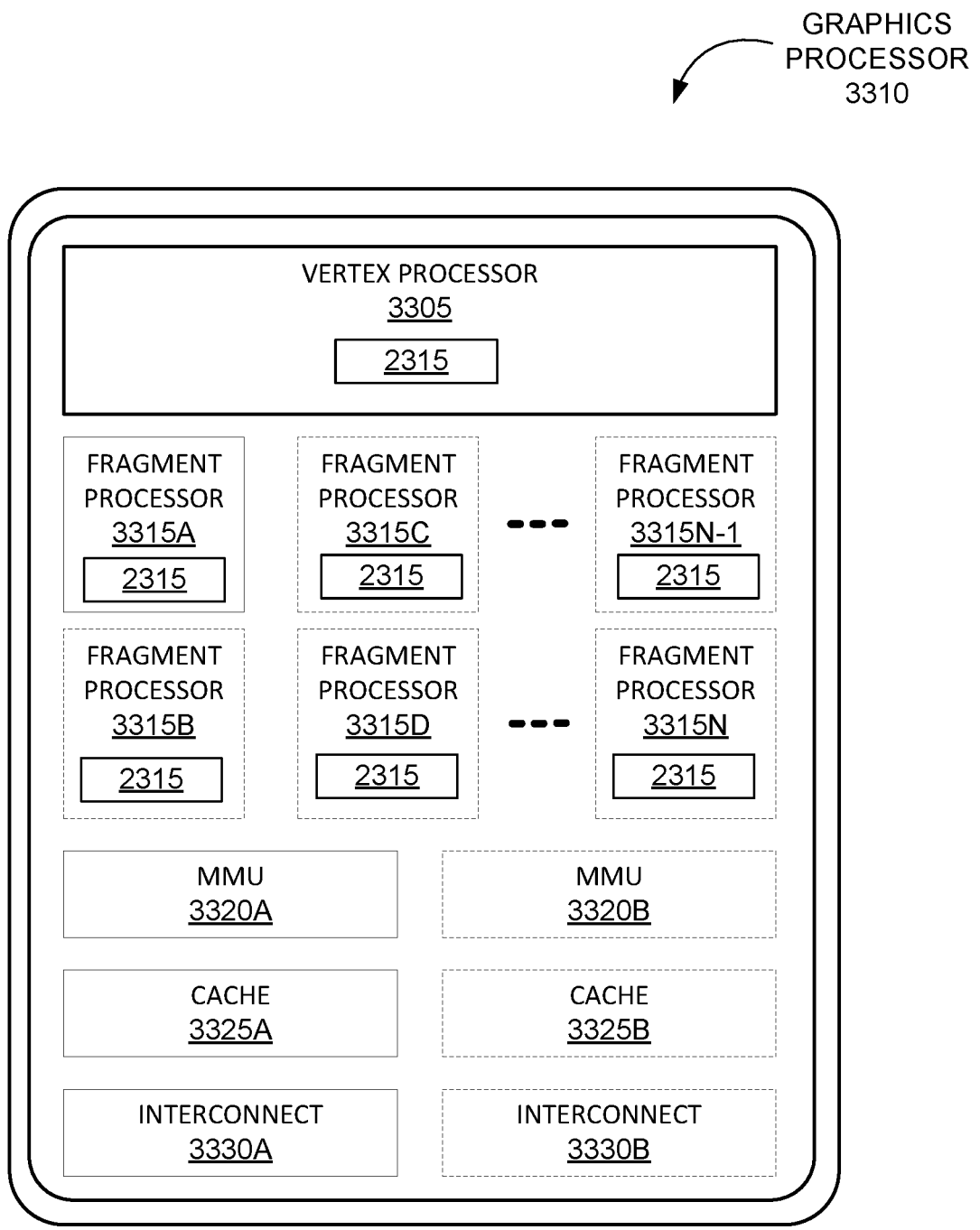
FIGS. 33A and 33B illustrate exemplary integrated circuits and associated graphics processors, according to at least one embodiment.
Figure 33B:
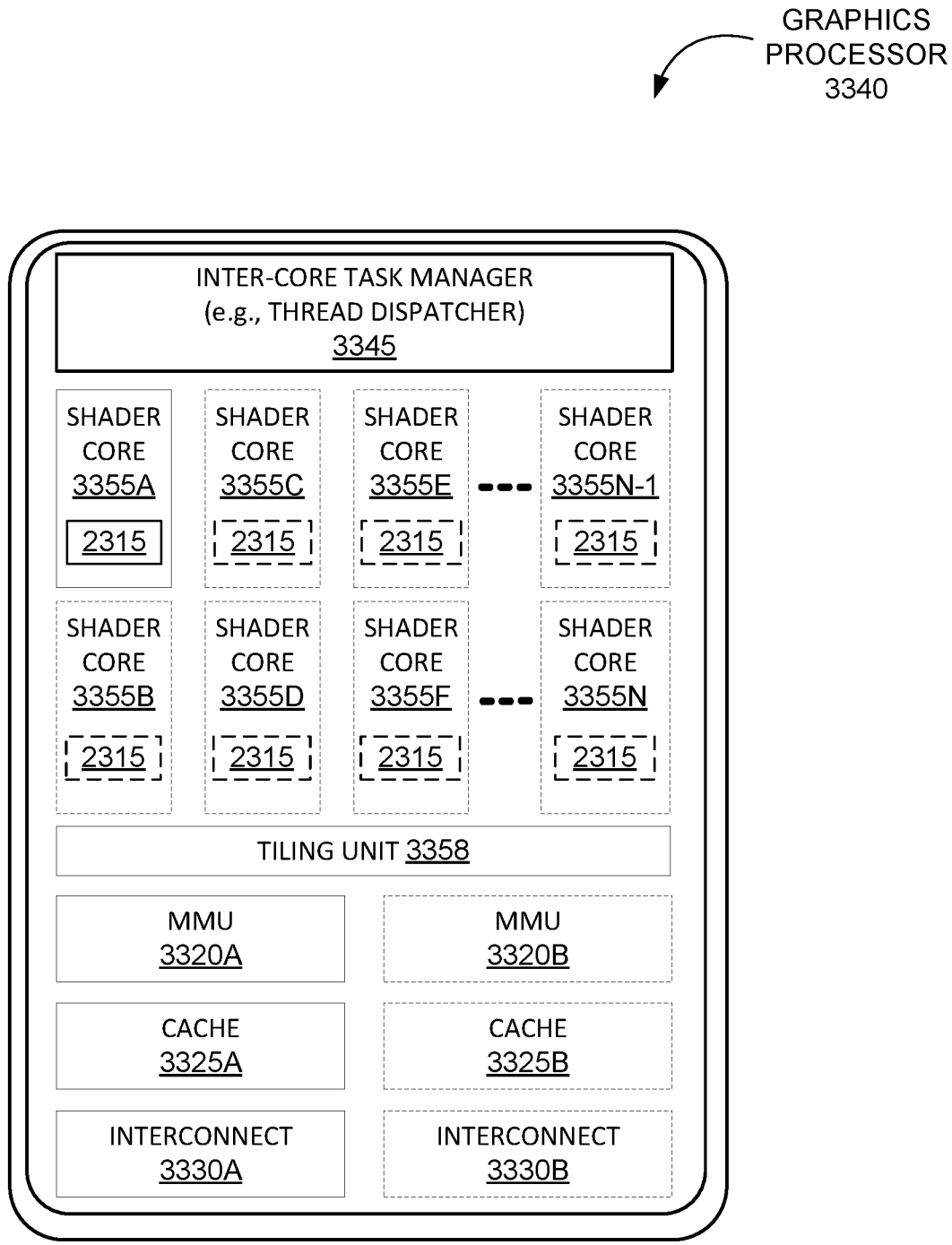

FIGS. 33A-33B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 33A-33B are block diagrams illustrating exemplary graphics processors for use within an SoC, according to embodiments described herein. FIG. 33A illustrates an exemplary graphics processor 3310 of a system on a chip integrated circuit that may be fabricated using one or more IP cores, according to at least one embodiment. FIG. 33B illustrates an additional exemplary graphics processor 3340 of a system on a chip integrated circuit that may be fabricated using one or more IP cores, according to at least one embodiment. In at least one embodiment, graphics processor 3310 of FIG. 33A is a low power graphics processor core. In at least one embodiment, graphics processor 3340 of FIG. 33B is a higher performance graphics processor core. In at least one embodiment, each of graphics processors 3310, 3340 can be variants of graphics processor 3210 of FIG. 32.

In at least one embodiment, graphics processor 3310 includes a vertex processor 3305 and one or more fragment processor(s) 3315A-3315N (e.g., 3315A, 3315B, 3315C, 3315D, through 3315N-1, and 3315N). In at least one embodiment, graphics processor 3310 can execute different shader programs via separate logic, such that vertex processor 3305 is optimized to execute operations for vertex shader programs, while one or more fragment processor(s) 3315A-3315N execute fragment (e.g., pixel) shading operations for fragment or pixel shader programs. In at least one embodiment, vertex processor 3305 performs a vertex processing stage of a 3D graphics pipeline and generates primitives and vertex data. In at least one embodiment, fragment processor(s) 3315A-3315N use primitive and vertex data generated by vertex processor 3305 to produce a framebuffer that is displayed on a display device. In at least one embodiment, fragment processor(s) 3315A-3315N are optimized to execute fragment shader programs as provided for in an OpenGL API, which may be used to perform similar operations as a pixel shader program as provided for in a Direct 3D API.

In at least one embodiment, graphics processor 3310 additionally includes one or more memory management units (MMUs) 3320A-3320B, cache(s) 3325A-3325B, and circuit interconnect(s) 3330A-3330B. In at least one embodiment, one or more MMU(s) 3320A-3320B provide for virtual to physical address mapping for graphics processor 3310, including for vertex processor 3305 and/or fragment processor(s) 3315A-3315N, which may reference vertex or image/texture data stored in memory, in addition to vertex or image/texture data stored in one or more cache(s) 3325A-3325B. In at least one embodiment, one or more MMU(s) 3320A-3320B may be synchronized with other MMUs within system, including one or more MMUs associated with one or more application processor(s) 3205, image processors 3215, and/or video processors 3220 of FIG. 32, such that each processor 3205-3220 can participate in a shared or unified virtual memory system. In at least one embodiment, one or more circuit interconnect(s) 3330A-3330B enable graphics processor 3310 to interface with other IP cores within SoC, either via an internal bus of SoC or via a direct connection.

In at least one embodiment, graphics processor 3340 includes one or more MMU(s) 3320A-3320B, caches 3325A-3325B, and circuit interconnects 3330A-3330B of graphics processor 3310 of FIG. 33A. In at least one embodiment, graphics processor 3340 includes one or more shader core(s) 3355A-3355N (e.g., 3355A, 3355B, 3355C, 3355D, 3355E, 3355F, through 3355N-1, and 3355N), which provides for a unified shader core architecture in which a single core or type of core can execute all types of programmable shader code, including shader program code to implement vertex shaders, fragment shaders, and/or compute shaders. In at least one embodiment, number of shader cores can vary. In at least one embodiment, graphics processor 3340 includes an inter-core task manager 3345, which acts as a thread dispatcher to dispatch execution threads to one or more shader cores 3355A-3355N and a tiling unit 3358 to accelerate tiling operations for tile-based rendering, in which rendering operations for a scene are subdivided in image space, for example to exploit local spatial coherence within a scene or to optimize use of internal caches.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in integrated circuit 33A and/or 33B for inferencing or predicting operations based, at least in part, on weight parameters calculated using neural network training operations, neural network functions and/or architectures, or neural network use cases described herein. In at least one embodiment, a robotic grasping system may use a multi-core processor as described above to control a tactile hand.

Figure 34A:
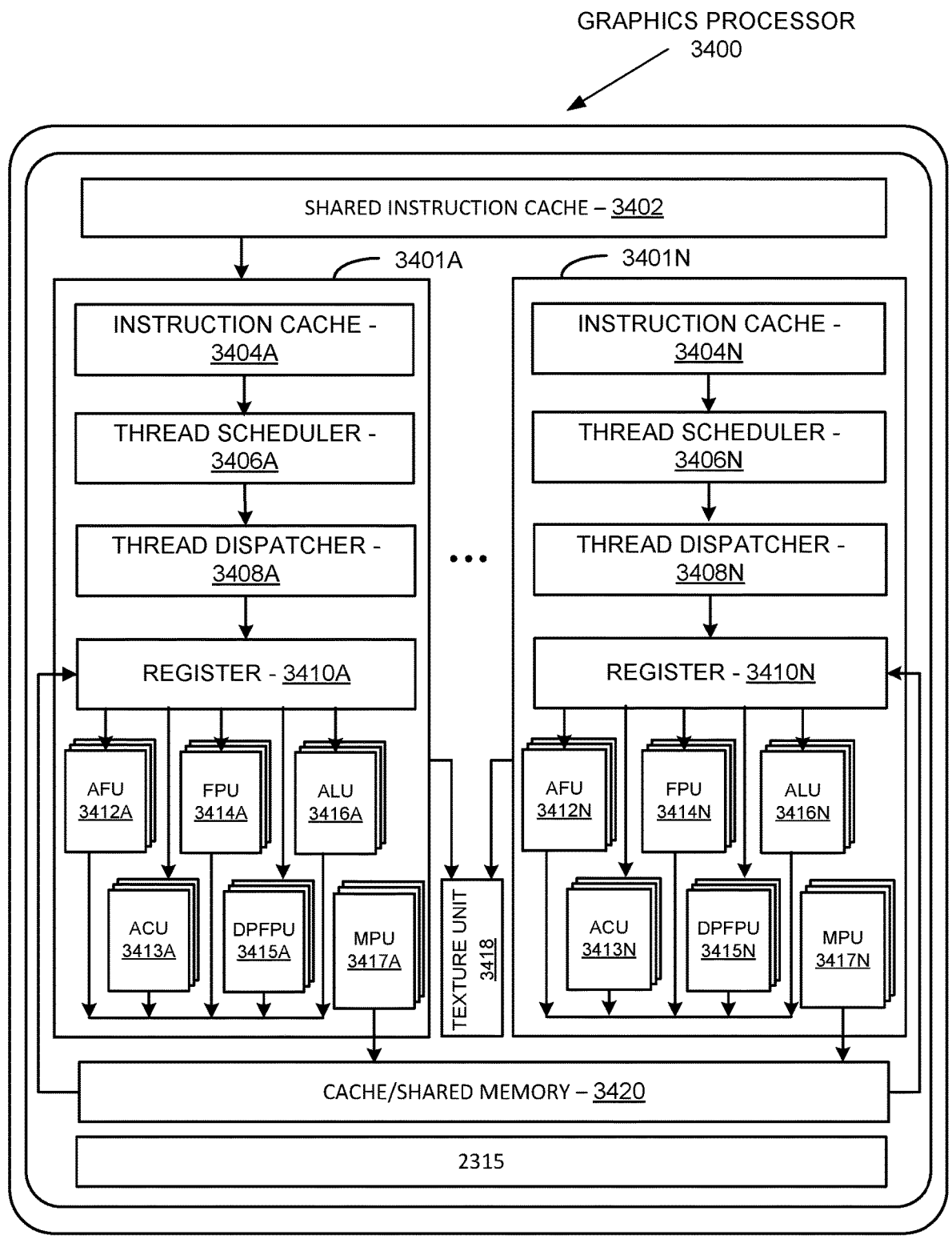
FIGS. 34A and 34B illustrate additional exemplary graphics processor logic according to at least one embodiment.
Figure 34B:
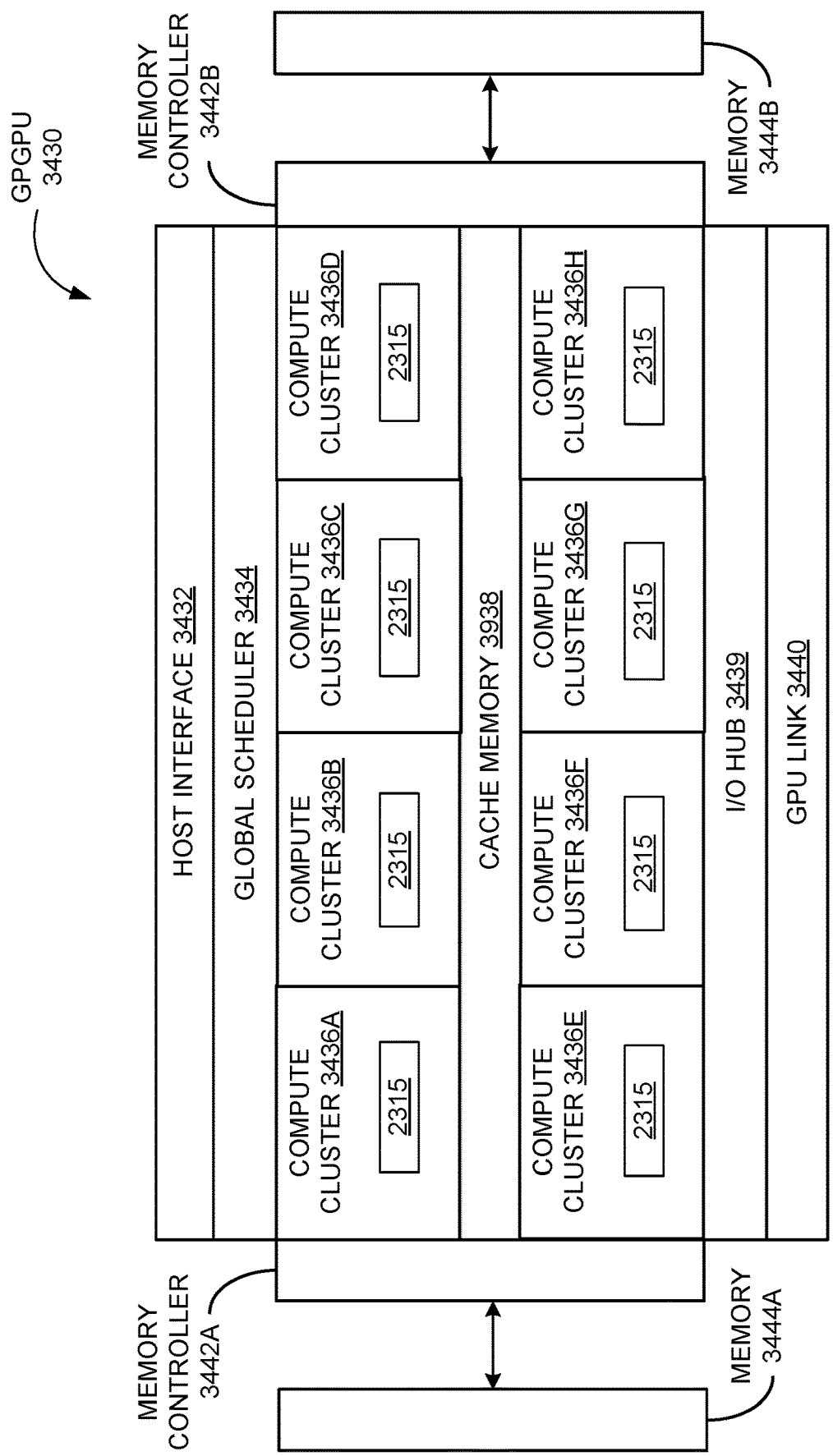

FIGS. 34A-34B illustrate additional exemplary graphics processor logic according to embodiments described herein. FIG. 34A illustrates a graphics core 3400 that may be included within graphics processor 3210 of FIG. 32, in at least one embodiment, and may be a unified shader core 3355A-3355N as in FIG. 33B in at least one embodiment. FIG. 34B illustrates a highly-parallel general-purpose graphics processing unit 3430 suitable for deployment on a multi-chip module in at least one embodiment.

In at least one embodiment, graphics core 3400 includes a shared instruction cache 3402, a texture unit 3418, and a cache/shared memory 3420 that are common to execution resources within graphics core 3400. In at least one embodiment, graphics core 3400 can include multiple slices 3401A-3401N or partition for each core, and a graphics processor can include multiple instances of graphics core 3400. Slices 3401A-3401N can include support logic including a local instruction cache 3404A-3404N, a thread scheduler 3406A-3406N, a thread dispatcher 3408A-3408N, and a set of registers 3410A-3410N. In at least one embodiment, slices 3401A-3401N can include a set of additional function units (AFUs 3412A-3412N), floating-point units (FPU 3414A-3414N), integer arithmetic logic units (ALUs 3416-3416N), address computational units (ACU 3413A-3413N), double-precision floating-point units (DPFPU 3415A-3415N), and matrix processing units (MPU 3417A-3417N).

In at least one embodiment, FPUs 3414A-3414N can perform single-precision (32-bit) and half-precision (16-bit) floating point operations, while DPFPUs 3415A-3415N perform double precision (64-bit) floating point operations. In at least one embodiment, ALUs 3416A-3416N can perform variable precision integer operations at 8-bit, 16-bit, and 32-bit precision, and can be configured for mixed precision operations. In at least one embodiment, MPUs 3417A-3417N can also be configured for mixed precision matrix operations, including half-precision floating point and 8-bit integer operations. In at least one embodiment, MPUs 3417-3417N can perform a variety of matrix operations to accelerate machine learning application frameworks, including enabling support for accelerated general matrix to matrix multiplication ("GEMM"). In at least one embodiment, AFUs 3412A-3412N can perform additional logic operations not supported by floating-point or integer units, including trigonometric operations (e.g., Sine, Cosine, etc.).

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in graphics core 3400 for inferencing or predicting operations based, at least in part, on weight parameters calculated using neural network training operations, neural network functions and/or architectures, or neural network uses described herein. In at least one embodiment, a robotic grasping system may use a graphics processor as described above to control a tactile hand.

FIG. 34B illustrates a general-purpose processing unit (GPGPU) 3430 that can be configured to enable highly-parallel compute operations to be performed by an array of graphics processing units, in at least one embodiment. In at least one embodiment, GPGPU 3430 can be linked directly to other instances of GPGPU 3430 to create a multi-GPU cluster to improve training speed for deep neural networks. In at least one embodiment, GPGPU 3430 includes a host interface 3432 to enable a connection with a host processor. In at least one embodiment, host interface 3432 is a PCI Express interface. In at least one embodiment, host interface 3432 can be a vendor specific communications interface or communications fabric. In at least one embodiment, GPGPU 3430 receives commands from a host processor and uses a global scheduler 3434 to distribute execution threads associated with those commands to a set of compute clusters 3436A-3436H. In at least one embodiment, compute clusters 3436A-3436H share a cache memory 3438. In at least one embodiment, cache memory 3438 can serve as a higher-level cache for cache memories within compute clusters 3436A-3436H.

In at least one embodiment, GPGPU 3430 includes memory 3444A-3444B coupled with compute clusters 3436A-3436H via a set of memory controllers 3442A-3442B. In at least one embodiment, memory 3444A-3444B can include various types of memory devices including dynamic random access memory ("DRAM") or graphics random access memory, such as synchronous graphics random access memory ("SGRAM"), including graphics double data rate ("GDDR") memory.

In at least one embodiment, compute clusters 3436A-3436H each include a set of graphics cores, such as graphics core 3400 of FIG. 34A, which can include multiple types of integer and floating point logic units that can perform computational operations at a range of precisions including suited for machine learning computations. For example, in at least one embodiment, at least a subset of floating point units in each of compute clusters 3436A-3436H can be configured to perform 16-bit or 32-bit floating point operations, while a different subset of floating point units can be configured to perform 64-bit floating point operations.

In at least one embodiment, multiple instances of GPGPU 3430 can be configured to operate as a compute cluster. In at least one embodiment, communication used by compute clusters 3436A-3436H for synchronization and data exchange varies across embodiments. In at least one embodiment, multiple instances of GPGPU 3430 communicate over host interface 3432. In at least one embodiment, GPGPU 3430 includes an I/O hub 3439 that couples GPGPU 3430 with a GPU link 3440 that enables a direct connection to other instances of GPGPU 3430. In at least one embodiment, GPU link 3440 is coupled to a dedicated GPU-to-GPU bridge that enables communication and synchronization between multiple instances of GPGPU 3430. In at least one embodiment GPU link 3440 couples with a high speed interconnect to transmit and receive data to other GPGPUs or parallel processors. In at least one embodiment, multiple instances of GPGPU 3430 are located in separate data processing systems and communicate via a network device that is accessible via host interface 3432. In at least one embodiment GPU link 3440 can be configured to enable a connection to a host processor in addition to or as an alternative to host interface 3432.

In at least one embodiment, GPGPU 3430 can be configured to train neural networks. In at least one embodiment, GPGPU 3430 can be used within an inferencing platform. In at least one embodiment, in which GPGPU 3430 is used for inferencing, GPGPU may include fewer compute clusters 3436A-3436H relative to when GPGPU is used for training a neural network. In at least one embodiment, memory technology associated with memory 3444A-3444B may differ between inferencing and training configurations, with higher bandwidth memory technologies devoted to training configurations. In at least one embodiment, inferencing configuration of GPGPU 3430 can support inferencing specific instructions. For example, in at least one embodiment, an inferencing configuration can provide support for one or more 8-bit integer dot product instructions, which may be used during inferencing operations for deployed neural networks.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in GPGPU 3430 for inferencing or predicting operations based, at least in part, on weight parameters calculated using neural network training operations, neural network functions and/or architectures, or neural network use cases described herein. In at least one embodiment, a robotic grasping system may use a graphics processor as described above to control a tactile hand.

Figure 35:
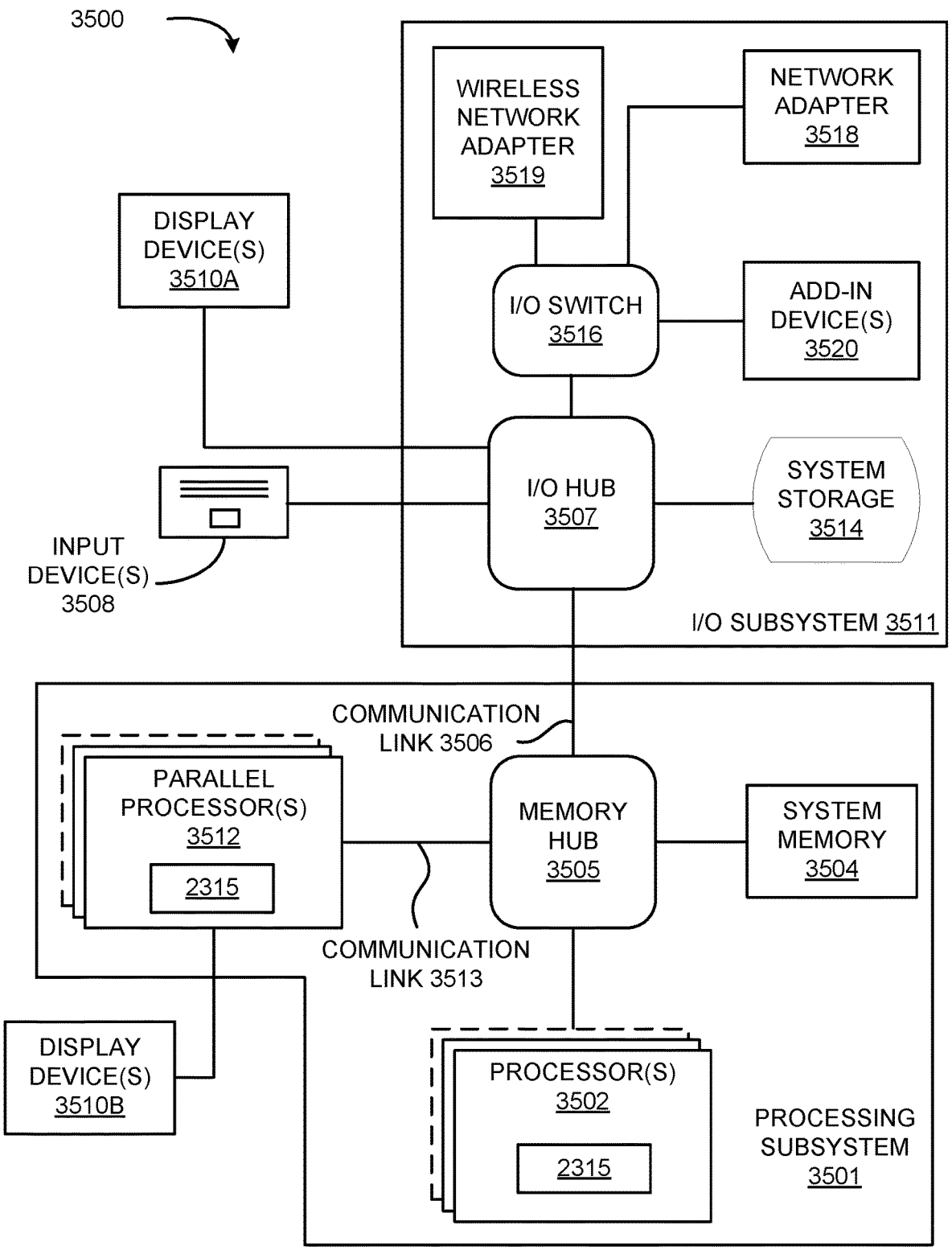
FIG. 35 illustrates a computer system, according to at least one embodiment.

FIG. 35 is a block diagram illustrating a computing system 3500 according to at least one embodiment. In at least one embodiment, computing system 3500 includes a processing subsystem 3501 having one or more processor(s) 3502 and a system memory 3504 communicating via an interconnection path that may include a memory hub 3505.

In at least one embodiment, memory hub 3505 may be a separate component within a chipset component or may be integrated within one or more processor(s) 3502. In at least one embodiment, memory hub 3505 couples with an I/O subsystem 3511 via a communication link 3506. In at least one embodiment, I/O subsystem 3511 includes an I/O hub 3507 that can enable computing system 3500 to receive input from one or more input device(s) 3508. In at least one embodiment, I/O hub 3507 can enable a display controller, which may be included in one or more processor(s) 3502, to provide outputs to one or more display device(s) 3510A. In at least one embodiment, one or more display device(s) 3510A coupled with I/O hub 3507 can include a local, internal, or embedded display device.

In at least one embodiment, processing subsystem 3501 includes one or more parallel processor(s) 3512 coupled to memory hub 3505 via a bus or other communication link 3513. In at least one embodiment, communication link 3513 may be one of any number of standards based communication link technologies or protocols, such as, but not limited to PCI Express, or may be a vendor specific communications interface or communications fabric. In at least one embodiment, one or more parallel processor(s) 3512 form a computationally focused parallel or vector processing system that can include a large number of processing cores and/or processing clusters, such as a many integrated core ("MIC") processor. In at least one embodiment, one or more parallel processor(s) 3512 form a graphics processing subsystem that can output pixels to one of one or more display device(s) 3510A coupled via I/O Hub 3507. In at least one embodiment, one or more parallel processor(s) 3512 can also include a display controller and display interface (not shown) to enable a direct connection to one or more display device(s) 3510B.

In at least one embodiment, a system storage unit 3514 can connect to I/O hub 3507 to provide a storage mechanism for computing system 3500. In at least one embodiment, an I/O switch 3516 can be used to provide an interface mechanism to enable connections between I/O hub 3507 and other components, such as a network adapter 3518 and/or wireless network adapter 3519 that may be integrated into platform, and various other devices that can be added via one or more add-in device(s) 3520. In at least one embodiment, network adapter 3518 can be an Ethernet adapter or another wired network adapter. In at least one embodiment, wireless network adapter 3519 can include one or more of a Wi-Fi, Bluetooth, near field communication (NFC), or other network device that includes one or more wireless radios.

In at least one embodiment, computing system 3500 can include other components not explicitly shown, including USB or other port connections, optical storage drives, video capture devices and like, may also be connected to I/O hub 3507. In at least one embodiment, communication paths interconnecting various components in FIG. 35 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 3512 incorporate circuitry optimized for graphics and video processing, including, for example, video output circuitry, and constitutes a graphics processing unit (GPU). In at least one embodiment, one or more parallel processor(s) 3512 incorporate circuitry optimized for general purpose processing. In at least embodiment, components of computing system 3500 may be integrated with one or more other system elements on a single integrated circuit. For example, in at least one embodiment, one or more parallel processor(s) 3512, memory hub 3505, processor(s) 3502, and I/O hub 3507 can be integrated into a system on chip (SoC) integrated circuit. In at least one embodiment, components of computing system 3500 can be integrated into a single package to form a system in package (SIP) configuration. In at least one embodiment, at least a portion of components of computing system 3500 can be integrated into a multi-chip module (MCM), which can be interconnected with other multi-chip modules into a modular computing system.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in system 3500 for inferencing or predicting operations based, at least in part, on weight parameters calculated using neural network training operations, neural network functions and/or architectures, or neural network use cases described herein. In at least one embodiment, a processor as described herein may be used to control a robotic hand equipped with tactile sensors, as described above.

Processors

Figure 36A:
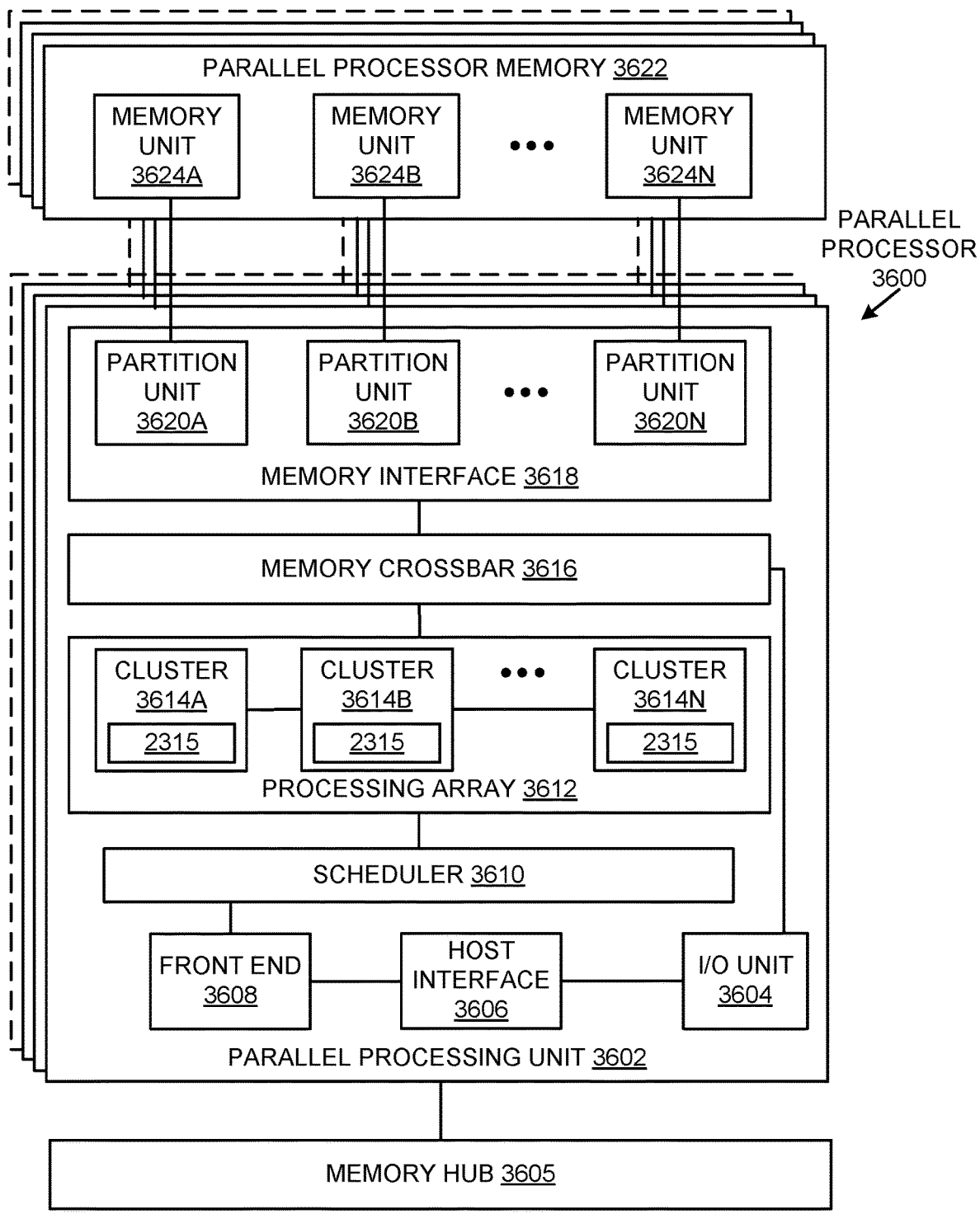
FIG. 36A illustrates a parallel processor, according to at least one embodiment.

FIG. 36A illustrates a parallel processor 3600 according to at least on embodiment. In at least one embodiment, various components of parallel processor 3600 may be implemented using one or more integrated circuit devices, such as programmable processors, application specific integrated circuits (ASICs), or field programmable gate arrays (FPGA). In at least one embodiment, illustrated parallel processor 3600 is a variant of one or more parallel processor(s) 3512 shown in FIG. 35 according to an exemplary embodiment.

In at least one embodiment, parallel processor 3600 includes a parallel processing unit 3602. In at least one embodiment, parallel processing unit 3602 includes an I/O unit 3604 that enables communication with other devices, including other instances of parallel processing unit 3602. In at least one embodiment, I/O unit 3604 may be directly connected to other devices. In at least one embodiment, I/O unit 3604 connects with other devices via use of a hub or switch interface, such as memory hub 3605. In at least one embodiment, connections between memory hub 3505 and I/O unit 3604 form a communication link 3513. In at least one embodiment, I/O unit 3604 connects with a host interface 3606 and a memory crossbar 3616, where host interface 3606 receives commands directed to performing processing operations and memory crossbar 3616 receives commands directed to performing memory operations.

In at least one embodiment, when host interface 3606 receives a command buffer via I/O unit 3604, host interface 3606 can direct work operations to perform those commands to a front end 3608. In at least one embodiment, front end 3608 couples with a scheduler 3610, which is configured to distribute commands or other work items to a processing cluster array 3612. In at least one embodiment, scheduler 3610 ensures that processing cluster array 3612 is properly configured and in a valid state before tasks are distributed to processing cluster array 3612 of processing cluster array 3612. In at least one embodiment, scheduler 3610 is implemented via firmware logic executing on a microcontroller. In at least one embodiment, microcontroller implemented scheduler 3610 is configurable to perform complex scheduling and work distribution operations at coarse and fine granularity, enabling rapid preemption and context switching of threads executing on processing array 3612. In at least one embodiment, host software can prove workloads for scheduling on processing array 3612 via one of multiple graphics processing doorbells. In at least one embodiment, workloads can then be automatically distributed across processing array 3612 by scheduler 3610 logic within a microcontroller including scheduler 3610.

In at least one embodiment, processing cluster array 3612 can include up to "N" processing clusters (e.g., cluster 3614A, cluster 3614B, through cluster 3614N). In at least one embodiment, each cluster 3614A-3614N of processing cluster array 3612 can execute a large number of concurrent threads. In at least one embodiment, scheduler 3610 can allocate work to clusters 3614A-3614N of processing cluster array 3612 using various scheduling and/or work distribution algorithms, which may vary depending on workload arising for each type of program or computation. In at least one embodiment, scheduling can be handled dynamically by scheduler 3610, or can be assisted in part by compiler logic during compilation of program logic configured for execution by processing cluster array 3612. In at least one embodiment, different clusters 3614A-3614N of processing cluster array 3612 can be allocated for processing different types of programs or for performing different types of computations.

In at least one embodiment, processing cluster array 3612 can be configured to perform various types of parallel processing operations. In at least one embodiment, processing cluster array 3612 is configured to perform general-purpose parallel compute operations. For example, in at least one embodiment, processing cluster array 3612 can include logic to execute processing tasks including filtering of video and/or audio data, performing modeling operations, including physics operations, and performing data transformations.

In at least one embodiment, processing cluster array 3612 is configured to perform parallel graphics processing operations. In at least one embodiment, processing cluster array 3612 can include additional logic to support execution of such graphics processing operations, including, but not limited to texture sampling logic to perform texture operations, as well as tessellation logic and other vertex processing logic. In at least one embodiment, processing cluster array 3612 can be configured to execute graphics processing related shader programs such as, but not limited to vertex shaders, tessellation shaders, geometry shaders, and pixel shaders. In at least one embodiment, parallel processing unit 3602 can transfer data from system memory via I/O unit 3604 for processing. In at least one embodiment, during processing, transferred data can be stored to on-chip memory (e.g., parallel processor memory 3622) during processing, then written back to system memory.

In at least one embodiment, when parallel processing unit 3602 is used to perform graphics processing, scheduler 3610 can be configured to divide a processing workload into approximately equal sized tasks, to better enable distribution of graphics processing operations to multiple clusters 3614A-3614N of processing cluster array 3612. In at least one embodiment, portions of processing cluster array 3612 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3614A-3614N may be stored in buffers to allow intermediate data to be transmitted between clusters 3614A-3614N for further processing.

In at least one embodiment, processing cluster array 3612 can receive processing tasks to be executed via scheduler 3610, which receives commands defining processing tasks from front end 3608. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3610 may be configured to fetch indices corresponding to tasks or may receive indices from front end 3608. In at least one embodiment, front end 3608 can be configured to ensure processing cluster array 3612 is configured to a valid state before a workload specified by incoming command buffers (e.g., batch-buffers, push buffers, etc.) is initiated.

In at least one embodiment, each of one or more instances of parallel processing unit 3602 can couple with parallel processor memory 3622. In at least one embodiment, parallel processor memory 3622 can be accessed via memory crossbar 3616, which can receive memory requests from processing cluster array 3612 as well as I/O unit 3604. In at least one embodiment, memory crossbar 3616 can access parallel processor memory 3622 via a memory interface 3618. In at least one embodiment, memory interface 3618 can include multiple partition units (e.g., partition unit 3620A, partition unit 3620B, through partition unit 3620N) that can each couple to a portion (e.g., memory unit) of parallel processor memory 3622. In at least one embodiment, a number of partition units 3620A-3620N is configured to be equal to a number of memory units, such that a first partition unit 3620A has a corresponding first memory unit 3624A, a second partition unit 3620B has a corresponding memory unit 3624B, and an Nth partition unit 3620N has a corresponding Nth memory unit 3624N. In at least one embodiment, a number of partition units 3620A-3620N may not be equal to a number of memory devices.

In at least one embodiment, memory units 3624A-3624N can include various types of memory devices, including dynamic random access memory (DRAM) or graphics random access memory, such as synchronous graphics random access memory (SGRAM), including graphics double data rate (GDDR) memory. In at least one embodiment, memory units 3624A-3624N may also include 3D stacked memory, including but not limited to high bandwidth memory (HBM). In at least one embodiment, render targets, such as frame buffers or texture maps may be stored across memory units 3624A-3624N, allowing partition units 3620A-3620N to write portions of each render target in parallel to efficiently use available bandwidth of parallel processor memory 3622. In at least one embodiment, a local instance of parallel processor memory 3622 may be excluded in favor of a unified memory design that utilizes system memory in conjunction with local cache memory.

In at least one embodiment, any one of clusters 3614A-3614N of processing cluster array 3612 can process data that will be written to any of memory units 3624A-3624N within parallel processor memory 3622. In at least one embodiment, memory crossbar 3616 can be configured to transfer an output of each cluster 3614A-3614N to any partition unit 3620A-3620N or to another cluster 3614A-3614N, which can perform additional processing operations on an output. In at least one embodiment, each cluster 3614A-3614N can communicate with memory interface 3618 through memory crossbar 3616 to read from or write to various external memory devices. In at least one embodiment, memory crossbar 3616 has a connection to memory interface 3618 to communicate with I/O unit 3604, as well as a connection to a local instance of parallel processor memory 3622, enabling processing units within different processing clusters 3614A-3614N to communicate with system memory or other memory that is not local to parallel processing unit 3602. In at least one embodiment, memory crossbar 3616 can use virtual channels to separate traffic streams between clusters 3614A-3614N and partition units 3620A-3620N.

In at least one embodiment, multiple instances of parallel processing unit 3602 can be provided on a single add-in card, or multiple add-in cards can be interconnected. In at least one embodiment, different instances of parallel processing unit 3602 can be configured to inter-operate even if different instances have different numbers of processing cores, different amounts of local parallel processor memory, and/or other configuration differences. For example, in at least one embodiment, some instances of parallel processing unit 3602 can include higher precision floating point units relative to other instances. In at least one embodiment, systems incorporating one or more instances of parallel processing unit 3602 or parallel processor 3600 can be implemented in a variety of configurations and form factors, including but not limited to desktop, laptop, or handheld personal computers, servers, workstations, game consoles, and/or embedded systems.

Figure 36B:
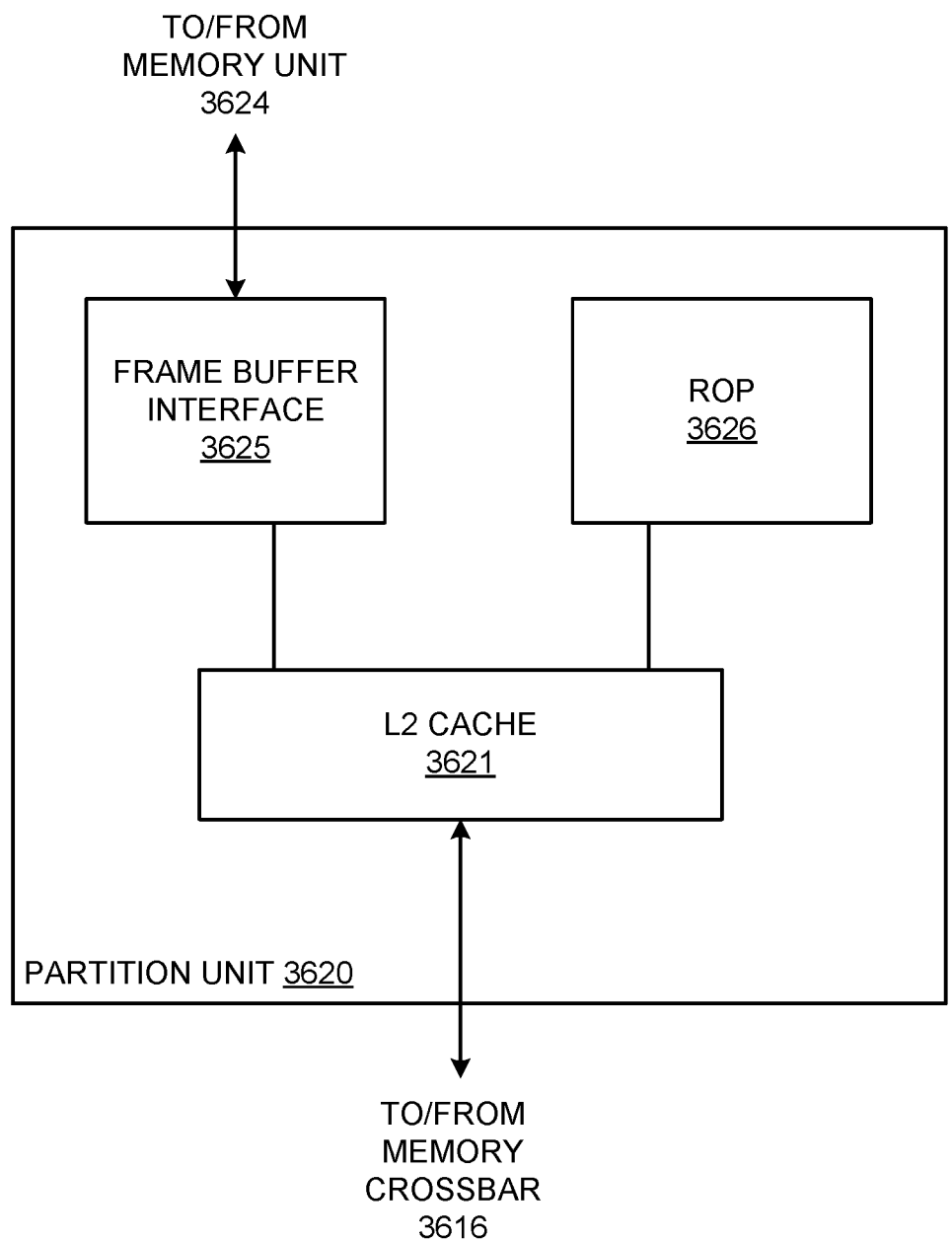
FIG. 36B illustrates a partition unit, according to at least one embodiment.

FIG. 36B is a block diagram of a partition unit 3620 according to at least one embodiment. In at least one embodiment, partition unit 3620 is an instance of one of partition units 3620A-3620N of FIG. 36A. In at least one embodiment, partition unit 3620 includes an L2 cache 3621, a frame buffer interface 3625, and a ROP 3626 (raster operations unit). L2 cache 3621 is a read/write cache that is configured to perform load and store operations received from memory crossbar 3616 and ROP 3626. In at least one embodiment, read misses and urgent write-back requests are output by L2 cache 3621 to frame buffer interface 3625 for processing. In at least one embodiment, updates can also be sent to a frame buffer via frame buffer interface 3625 for processing. In at least one embodiment, frame buffer interface 3625 interfaces with one of memory units in parallel processor memory, such as memory units 3624A-3624N of FIG. 36 (e.g., within parallel processor memory 3622).

In at least one embodiment, ROP 3626 is a processing unit that performs raster operations such as stencil, z test, blending, and like. In at least one embodiment, ROP 3626 then outputs processed graphics data that is stored in graphics memory. In at least one embodiment, ROP 3626 includes compression logic to compress depth or color data that is written to memory and decompress depth or color data that is read from memory. In at least one embodiment, compression logic can be lossless compression logic that makes use of one or more of multiple compression algorithms. Type of compression that is performed by ROP 3626 can vary based on statistical characteristics of data to be compressed. For example, in at least one embodiment, delta color compression is performed on depth and color data on a per-tile basis.

In In at least one embodiment, ROP 3626 is included within each processing cluster (e.g., cluster 3614A-3614N of FIG. 36) instead of within partition unit 3620. In at least one embodiment, read and write requests for pixel data are transmitted over memory crossbar 3616 instead of pixel fragment data. In at least one embodiment, processed graphics data may be displayed on a display device, such as one of one or more display device(s) 3510 of FIG. 35, routed for further processing by processor(s) 3502, or routed for further processing by one of processing entities within parallel processor 3600 of FIG. 36A.

Figure 36C:
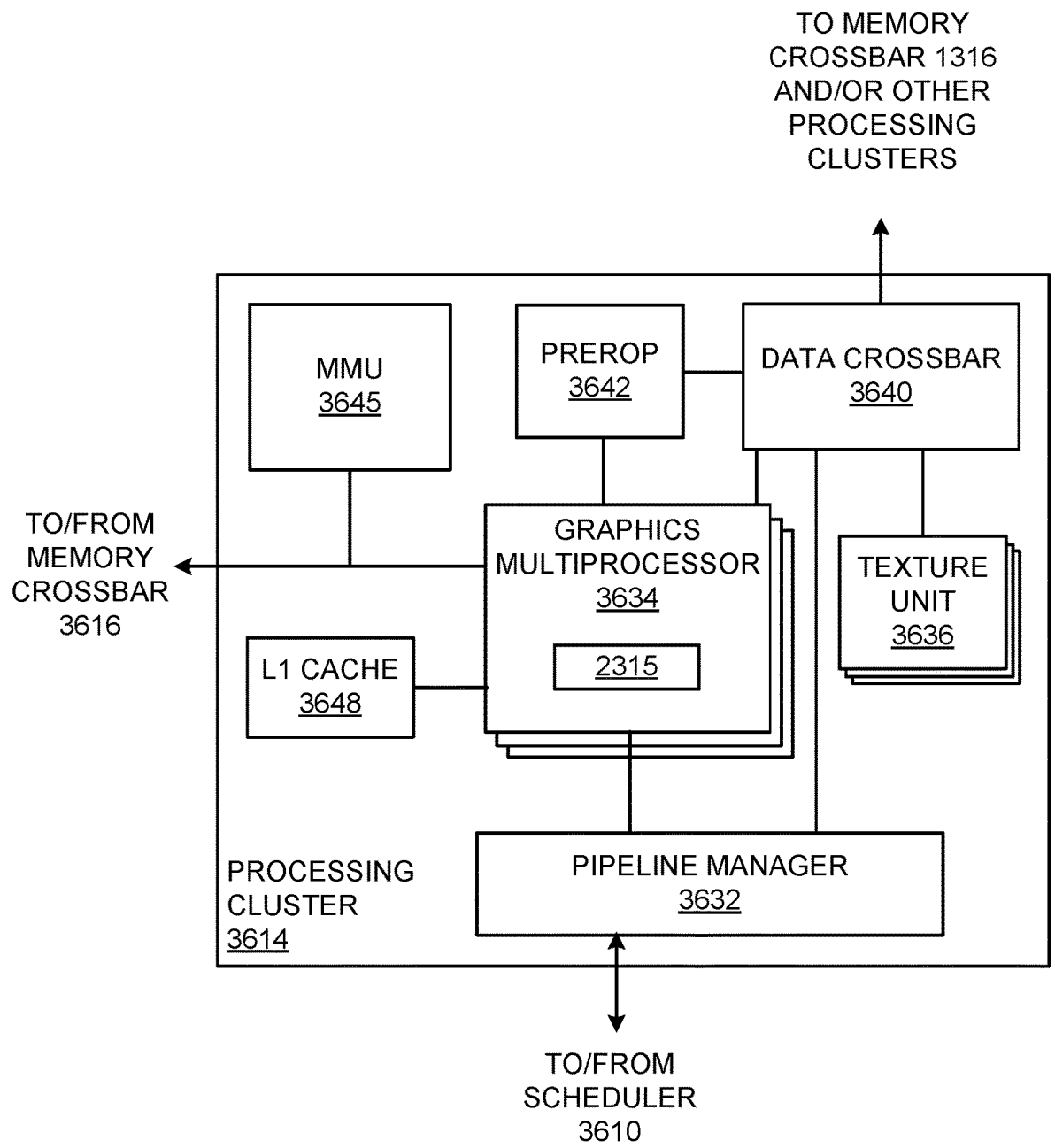
FIG. 36C illustrates a processing cluster, according to at least one embodiment.

FIG. 36C is a block diagram of a processing cluster 3614 within a parallel processing unit according to at least one embodiment. In at least one embodiment, a processing cluster is an instance of one of processing clusters 3614A-3614N of FIG. 36. In at least one embodiment, processing cluster 3614 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 3614 can be controlled via a pipeline manager 3632 that distributes processing tasks to SIMT parallel processors. In at least one embodiment, pipeline manager 3632 receives instructions from scheduler 3610 of FIG. 36 and manages execution of those instructions via a graphics multiprocessor 3634 and/or a texture unit 3636. In at least one embodiment, graphics multiprocessor 3634 is an exemplary instance of a SIMT parallel processor. However, in at least one embodiment, various types of SIMT parallel processors of differing architectures may be included within processing cluster 3614. In at least one embodiment, one or more instances of graphics multiprocessor 3634 can be included within a processing cluster 3614. In at least one embodiment, graphics multiprocessor 3634 can process data and a data crossbar 3640 can be used to distribute processed data to one of multiple possible destinations, including other shader units. In at least one embodiment, pipeline manager 3632 can facilitate distribution of processed data by specifying destinations for processed data to be distributed vis data crossbar 3640.

In at least one embodiment, each graphics multiprocessor 3634 within processing cluster 3614 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3614 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 3634. In at least one embodiment, a thread group may include fewer threads than a number of processing engines within graphics multiprocessor 3634. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3634. In at least one embodiment, when a thread group includes more threads than number of processing engines within graphics multiprocessor 3634, processing can be performed over consecutive clock cycles. In at least one embodiment, multiple thread groups can be executed concurrently on a graphics multiprocessor 3634.

In at least one embodiment, graphics multiprocessor 3634 includes an internal cache memory to perform load and store operations. In at least one embodiment, graphics multiprocessor 3634 can forego an internal cache and use a cache memory (e.g., L1 cache 3648) within processing cluster 3614. In at least one embodiment, each graphics multiprocessor 3634 also has access to L2 caches within partition units (e.g., partition units 3620A-3620N of FIG. 36) that are shared among all processing clusters 3614 and may be used to transfer data between threads. In at least one embodiment, graphics multiprocessor 3634 may also access off-chip global memory, which can include one or more of local parallel processor memory and/or system memory. In at least one embodiment, any memory external to parallel processing unit 3602 may be used as global memory. In at least one embodiment, processing cluster 3614 includes multiple instances of graphics multiprocessor 3634 can share common instructions and data, which may be stored in L1 cache 3648.

In at least one embodiment, each processing cluster 3614 may include an MMU 3645 (memory management unit) that is configured to map virtual addresses into physical addresses. In at least one embodiment, one or more instances of MMU 3645 may reside within memory interface 3618 of FIG. 36. In at least one embodiment, MMU 3645 includes a set of page table entries (PTEs) used to map a virtual address to a physical address of a tile (talk more about tiling) and optionally a cache line index. In at least one embodiment, MMU 3645 may include address translation lookaside buffers (TLB) or caches that may reside within graphics multiprocessor 3634 or L1 cache or processing cluster 3614. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 3614 may be configured such that each graphics multiprocessor 3634 is coupled to a texture unit 3636 for performing texture mapping operations, e.g., determining texture sample positions, reading texture data, and filtering texture data. In at least one embodiment, texture data is read from an internal texture L1 cache (not shown) or from an L1 cache within graphics multiprocessor 3634 and is fetched from an L2 cache, local parallel processor memory, or system memory, as needed. In at least one embodiment, each graphics multiprocessor 3634 outputs processed tasks to data crossbar 3640 to provide processed task to another processing cluster 3614 for further processing or to store processed task in an L2 cache, local parallel processor memory, or system memory via memory crossbar 3616. In at least one embodiment, preROP 3642 (pre-raster operations unit) is configured to receive data from graphics multiprocessor 3634, direct data to ROP units, which may be located with partition units as described herein (e.g., partition units 3620A-3620N of FIG. 36). In at least one embodiment, PreROP 3642 unit can perform optimizations for color blending, organize pixel color data, and perform address translations.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in graphics processing cluster 3614 for inferencing or predicting operations based, at least in part, on weight parameters calculated using neural network training operations, neural network functions and/or architectures, or neural network use cases described herein. In at least one embodiment, a processor as described herein may be used to control a robotic hand equipped with tactile sensors, as described above.

Figure 36D:
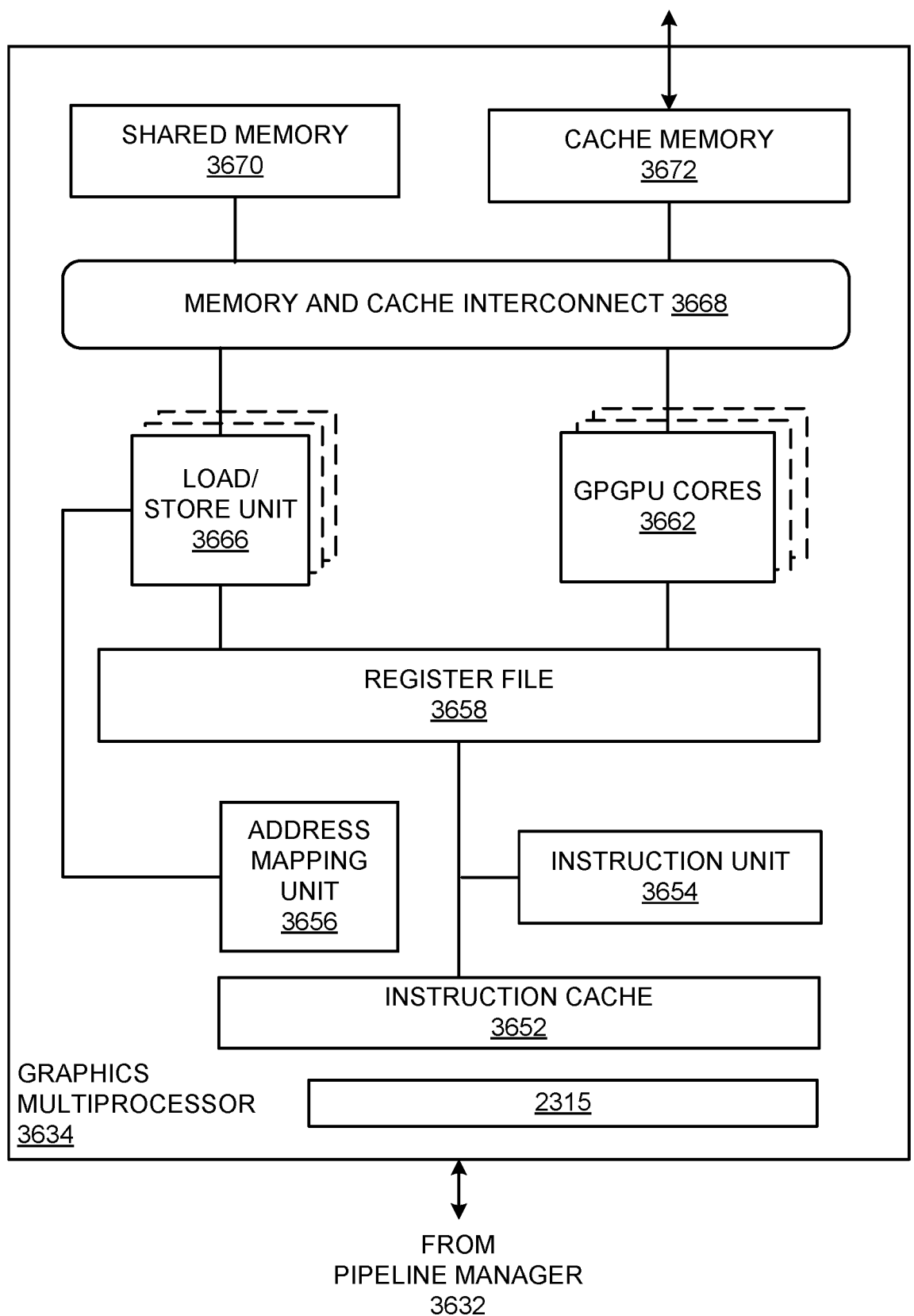
FIG. 36D illustrates a graphics multiprocessor, according to at least one embodiment.

FIG. 36D shows a graphics multiprocessor 3634 according to at least one embodiment. In at least one embodiment, graphics multiprocessor 3634 couples with pipeline manager 3632 of processing cluster 3614. In at least one embodiment, graphics multiprocessor 3634 has an execution pipeline including but not limited to an instruction cache 3652, an instruction unit 3654, an address mapping unit 3656, a register file 3658, one or more general purpose graphics processing unit (GPGPU) cores 3662, and one or more load/store units 3666. GPGPU cores 3662 and load/store units 3666 are coupled with cache memory 3672 and shared memory 3670 via a memory and cache interconnect 3668.

In at least one embodiment, instruction cache 3652 receives a stream of instructions to execute from pipeline manager 3632. In at least one embodiment, instructions are cached in instruction cache 3652 and dispatched for execution by instruction unit 3654. In at least one embodiment, instruction unit 3654 can dispatch instructions as thread groups (e.g., warps), with each thread of thread group assigned to a different execution unit within GPGPU core 3662. In at least one embodiment, an instruction can access any of a local, shared, or global address space by specifying an address within a unified address space. In at least one embodiment, address mapping unit 3656 can be used to translate addresses in a unified address space into a distinct memory address that can be accessed by load/store units 3666.

In at least one embodiment, register file 3658 provides a set of registers for functional units of graphics multiprocessor 3634. In at least one embodiment, register file 3658 provides temporary storage for operands connected to data paths of functional units (e.g., GPGPU cores 3662, load/store units 3666) of graphics multiprocessor 3634. In at least one embodiment, register file 3658 is divided between each of functional units such that each functional unit is allocated a dedicated portion of register file 3658. In at least one embodiment, register file 3658 is divided between different warps being executed by graphics multiprocessor 3634.

In at least one embodiment, GPGPU cores 3662 can each include floating point units (FPUs) and/or integer arithmetic logic units (ALUs) that are used to execute instructions of graphics multiprocessor 3634. GPGPU cores 3662 can be similar in architecture or can differ in architecture. In at least one embodiment, a first portion of GPGPU cores 3662 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 3634 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 3662 include SIMD logic capable of performing a single instruction on multiple sets of data. In at least one embodiment GPGPU cores 3662 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 3668 is an interconnect network that connects each functional unit of graphics multiprocessor 3634 to register file 3658 and to shared memory 3670. In at least one embodiment, memory and cache interconnect 3668 is a crossbar interconnect that allows load/store unit 3666 to implement load and store operations between shared memory 3670 and register file 3658. In at least one embodiment, register file 3658 can operate at a same frequency as GPGPU cores 3662, thus data transfer between GPGPU cores 3662 and register file 3658 is very low latency. In at least one embodiment, shared memory 3670 can be used to enable communication between threads that execute on functional units within graphics multiprocessor 3634. In at least one embodiment, cache memory 3672 can be used as a data cache for example, to cache texture data communicated between functional units and texture unit 3636. In at least one embodiment, shared memory 3670 can also be used as a program managed cached. In at least one embodiment, threads executing on GPGPU cores 3662 can programmatically store data within shared memory in addition to automatically cached data that is stored within cache memory 3672.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in graphics multiprocessor 3634 for inferencing or predicting operations based, at least in part, on weight parameters calculated using neural network training operations, neural network functions and/or architectures, or neural network use cases described herein. In at least one embodiment, a multi-GPE computing system as described herein may be used to control a robotic hand equipped with tactile sensors, as described above.

Figure 37:
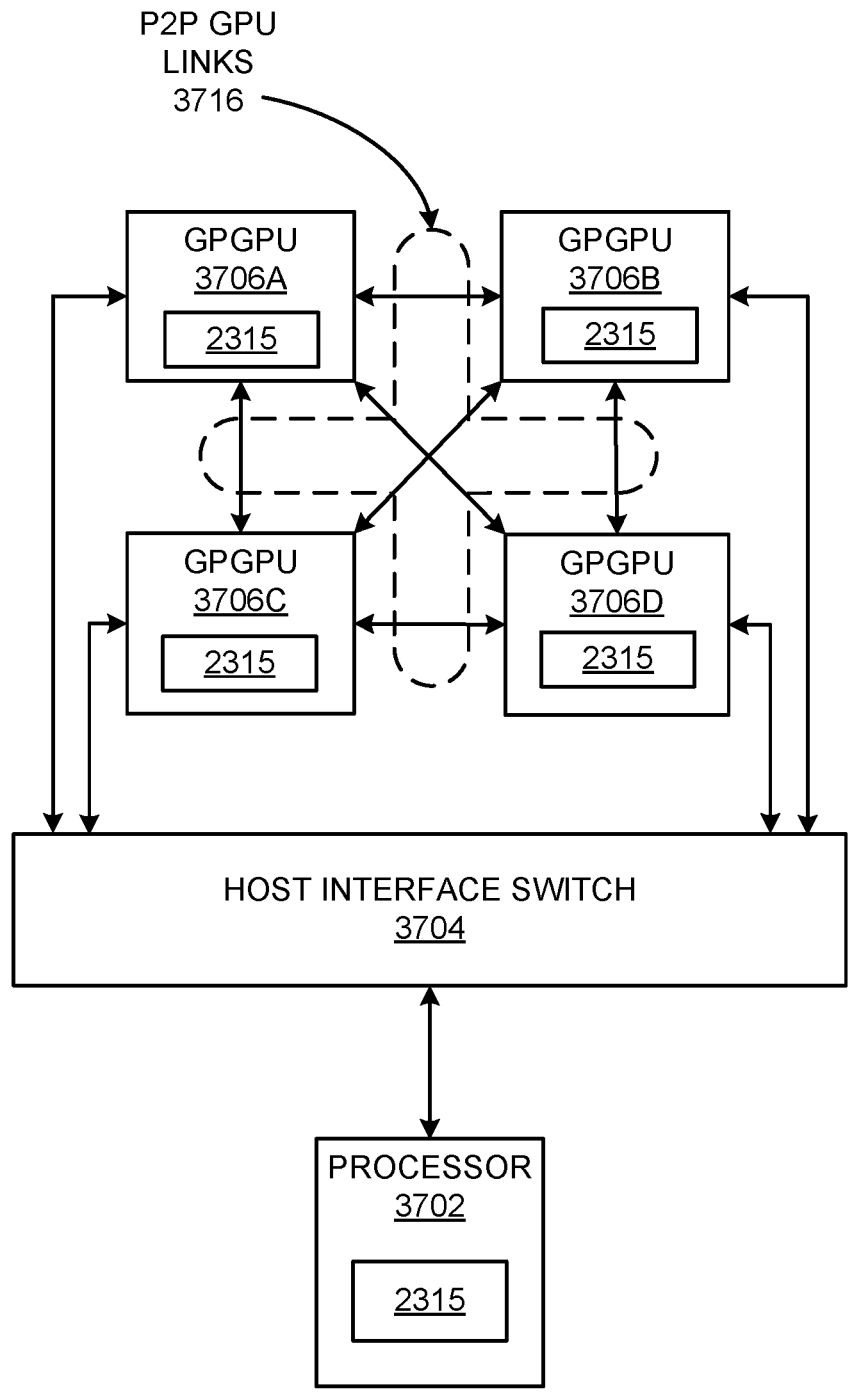
FIG. 37 illustrates a multi-graphics processing unit (GPU) system, according to at least one embodiment.

FIG. 37 illustrates a multi-GPU computing system 3700, according to at least one embodiment. In at least one embodiment, multi-GPU computing system 3700 can include a processor 3702 coupled to multiple general purpose graphics processing units (GPGPUs) 3706A-D via a host interface switch 3704. In at least one embodiment, host interface switch 3704 is a PCI express switch device that couples processor 3702 to a PCI express bus over which processor 3702 can communicate with GPGPUs 3706A-D. GPGPUs 3706A-D can interconnect via a set of high-speed point to point GPU to GPU links 3716. In at least one embodiment, GPU to GPU links 3716 connect to each of GPGPUs 3706A-D via a dedicated GPU link. In at least one embodiment, P2P GPU links 3716 enable direct communication between each of GPGPUs 3706A-D without requiring communication over host interface bus 3704 to which processor 3702 is connected. In at least one embodiment, with GPU-to-GPU traffic directed to P2P GPU links 3716, host interface bus 3704 remains available for system memory access or to communicate with other instances of multi-GPU computing system 3700, for example, via one or more network devices. While in at least one embodiment GPGPUs 3706A-D connect to processor 3702 via host interface switch 3704, in at least one embodiment processor 3702 includes direct support for P2P GPU links 3716 and can connect directly to GPGPUs 3706A-D.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in multi-GPU computing system 3700 for inferencing or predicting operations based, at least in part, on weight parameters calculated using neural network training operations, neural network functions and/or architectures, or neural network use cases described herein. In at least one embodiment, a graphics processor as described herein may be used to control a robotic hand equipped with tactile sensors, as described above.

Figure 38:
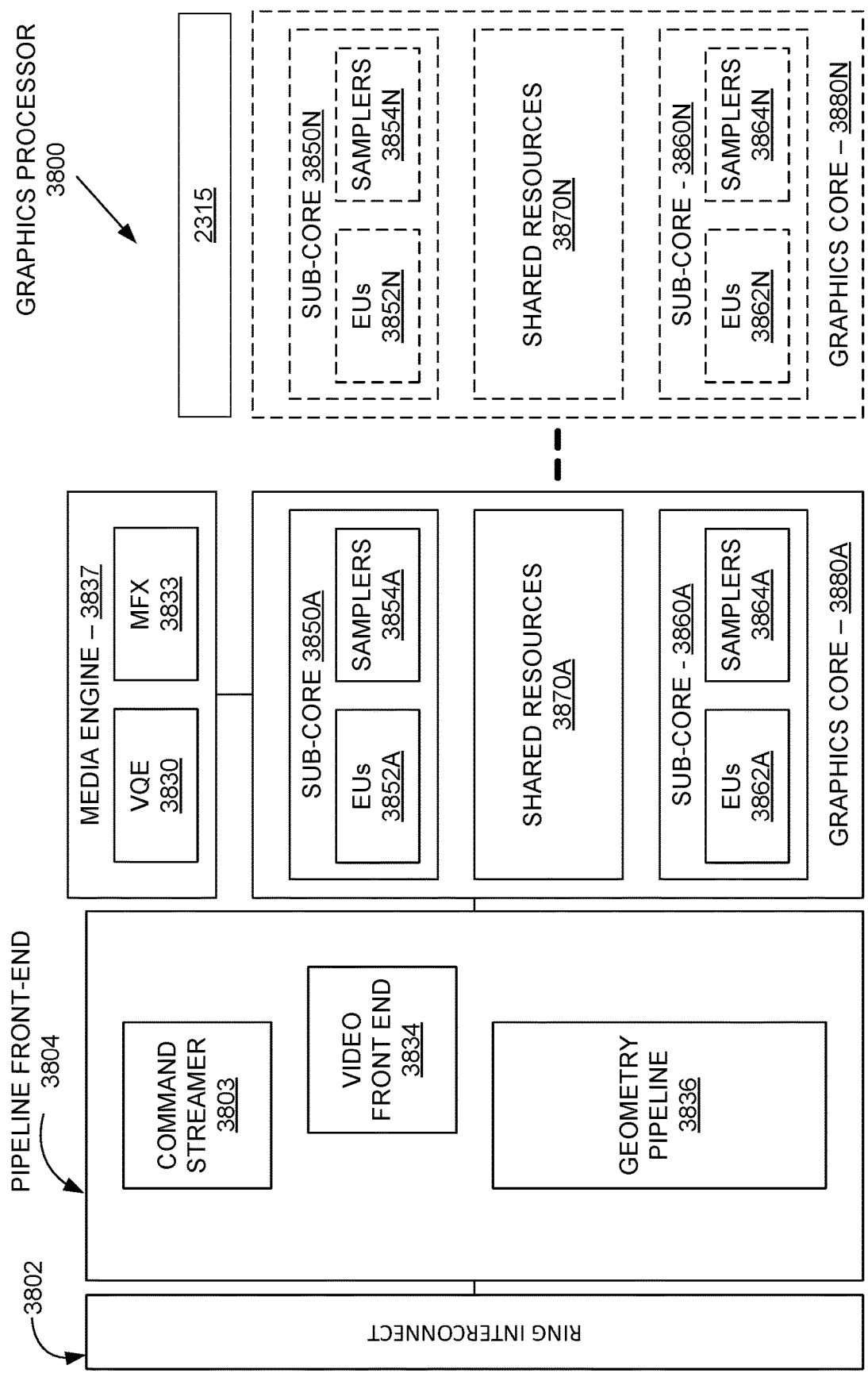
FIG. 38 illustrates a graphics processor, according to at least one embodiment.

FIG. 38 is a block diagram of a graphics processor 3800, according to at least one embodiment. In at least one embodiment, graphics processor 3800 includes a ring interconnect 3802, a pipeline front-end 3804, a media engine 3837, and graphics cores 3880A-3880N. In at least one embodiment, ring interconnect 3802 couples graphics processor 3800 to other processing units, including other graphics processors or one or more general-purpose processor cores. In at least one embodiment, graphics processor 3800 is one of many processors integrated within a multi-core processing system.

In at least one embodiment, graphics processor 3800 receives batches of commands via ring interconnect 3802. In at least one embodiment, incoming commands are interpreted by a command streamer 3803 in pipeline front-end 3804. In at least one embodiment, graphics processor 3800 includes scalable execution logic to perform 3D geometry processing and media processing via graphics core(s) 3880A-3880N. In at least one embodiment, for 3D geometry processing commands, command streamer 3803 supplies commands to geometry pipeline 3836. In at least one embodiment, for at least some media processing commands, command streamer 3803 supplies commands to a video front end 3834, which couples with a media engine 3837. In at least one embodiment, media engine 3837 includes a Video Quality Engine (VQE) 3830 for video and image post-processing and a multi-format encode/decode (MFX) 3833 engine to provide hardware-accelerated media data encode and decode. In at least one embodiment, geometry pipeline 3836 and media engine 3837 each generate execution threads for thread execution resources provided by at least one graphics core 3880A.

In at least one embodiment, graphics processor 3800 includes scalable thread execution resources featuring modular cores 3880A-3880N (sometimes referred to as core slices), each having multiple sub-cores 3850A-550N, 3860A-3860N (sometimes referred to as core sub-slices). In at least one embodiment, graphics processor 3800 can have any number of graphics cores 3880A through 3880N. In at least one embodiment, graphics processor 3800 includes a graphics core 3880A having at least a first sub-core 3850A and a second sub-core 3860A. In at least one embodiment, graphics processor 3800 is a low power processor with a single sub-core (e.g., 3850A). In at least one embodiment, graphics processor 3800 includes multiple graphics cores 3880A-3880N, each including a set of first sub-cores 3850A-3850N and a set of second sub-cores 3860A-3860N. In at least one embodiment, each sub-core in first sub-cores 3850A-3850N includes at least a first set of execution units 3852A-3852N and media/texture samplers 3854A-3854N. In at least one embodiment, each sub-core in second sub-cores 3860A-3860N includes at least a second set of execution units 3862A-3862N and samplers 3864A-3864N. In at least one embodiment, each sub-core 3850A-3850N, 3860A-3860N shares a set of shared resources 3870A-3870N. In at least one embodiment, shared resources include shared cache memory and pixel operation logic.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, inference and/or training logic 2315 may be used in graphics processor 3800 for inferencing or predicting operations based, at least in part, on weight parameters calculated using neural network training operations, neural network functions and/or architectures, or neural network use cases described herein. In at least one embodiment, a micro-architecture processor as described herein may be used to control a robotic hand equipped with tactile sensors, as described above.

Figure 39:
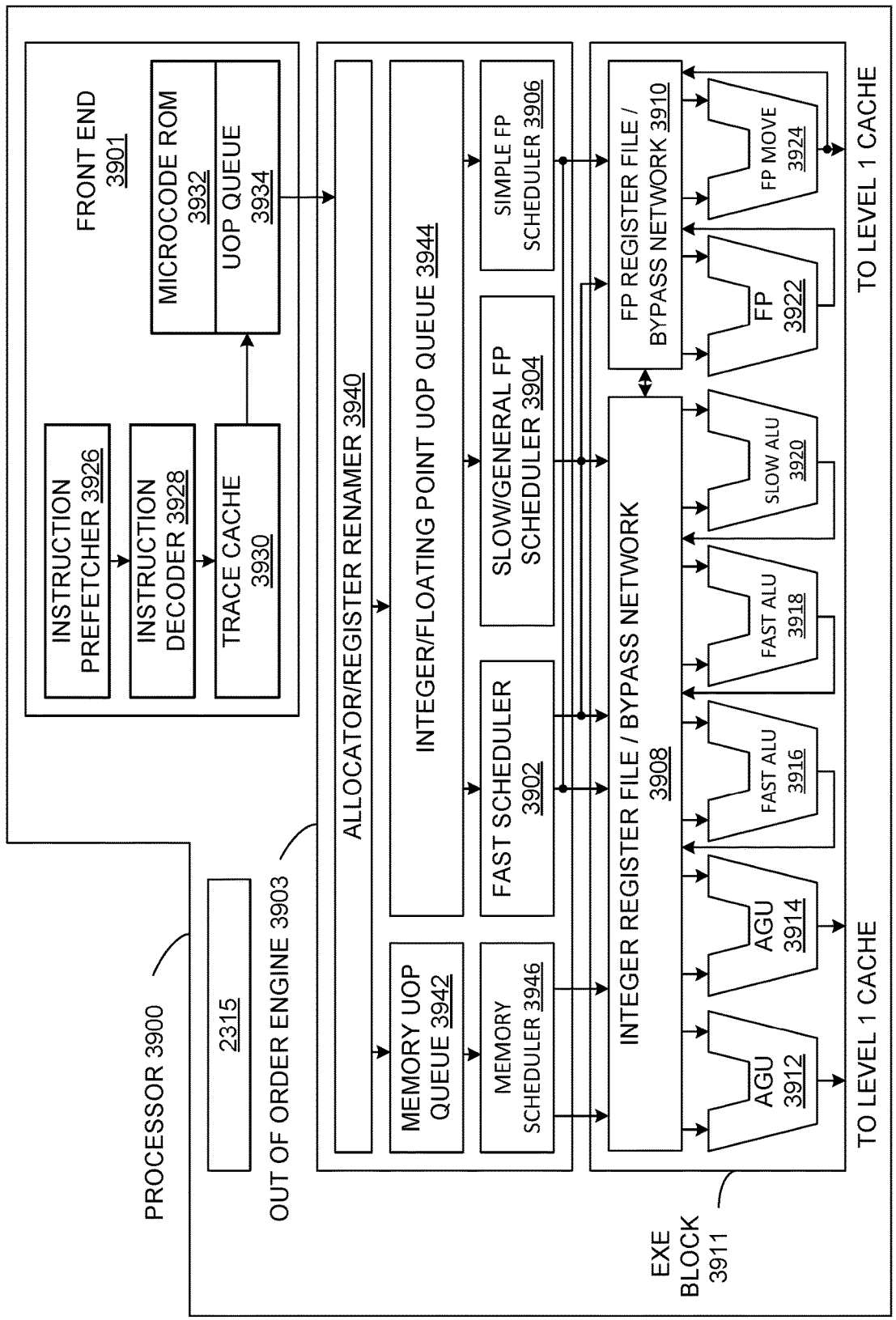
FIG. 39 is a block diagram illustrating a micro-architecture for a processor, according to at least one embodiment.

FIG. 39 is a block diagram illustrating micro-architecture for a processor 3900 that may include logic circuits to perform instructions, according to at least one embodiment. In at least one embodiment, processor 3900 may perform instructions, including x86 instructions, ARM instructions, specialized instructions for application-specific integrated circuits (ASICs), etc. In at least one embodiment, processor 3910 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3910 may perform instructions to accelerate machine learning or deep learning algorithms, training, or inferencing.

In at least one embodiment, processor 3900 includes an in-order front end ("front end") 3901 to fetch instructions to be executed and prepare instructions to be used later in processor pipeline. In at least one embodiment, front end 3901 may include several units. In at least one embodiment, an instruction prefetcher 3926 fetches instructions from memory and feeds instructions to an instruction decoder 3928 which in turn decodes or interprets instructions. For example, in at least one embodiment, instruction decoder 3928 decodes a received instruction into one or more operations called "micro-instructions" or "micro-operations" (also called "micro ops" or "uops") that machine may execute. In at least one embodiment, instruction decoder 3928 parses instruction into an opcode and corresponding data and control fields that may be used by micro-architecture to perform operations in accordance with at least one embodiment. In at least one embodiment, a trace cache 3930 may assemble decoded uops into program ordered sequences or traces in a uop queue 3934 for execution. In at least one embodiment, when trace cache 3930 encounters a complex instruction, a microcode ROM 3932 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3928 may access microcode ROM 3932 to perform instruction. In at least one embodiment, an instruction may be decoded into a small number of micro-ops for processing at instruction decoder 3928. In at least one embodiment, an instruction may be stored within microcode ROM 3932 should a number of micro-ops be needed to accomplish operation. In at least one embodiment, trace cache 3930 refers to an entry point programmable logic array ("PLA") to determine a correct micro-instruction pointer for reading microcode sequences to complete one or more instructions from microcode ROM 3932 in accordance with at least one embodiment. In at least one embodiment, after microcode ROM 3932 finishes sequencing micro-ops for an instruction, front end 3901 of machine may resume fetching micro-ops from trace cache 3930.

In at least one embodiment, out-of-order execution engine ("out of order engine") 3903 may prepare instructions for execution. In at least one embodiment, out-of-order execution logic has a number of buffers to smooth out and re-order flow of instructions to optimize performance as they go down pipeline and get scheduled for execution. out-of-order execution engine 3903 includes, without limitation, an allocator/register renamer 3940, a memory uop queue 3942, an integer/floating point uop queue 3944, a memory scheduler 3946, a fast scheduler 3902, a slow/general floating point scheduler ("slow/general FP scheduler") 3904, and a simple floating point scheduler ("simple FP scheduler") 3906. In at least one embodiment, fast schedule 3902, slow/general floating point scheduler 3904, and simple floating point scheduler 3906 are also collectively referred to herein as "uop schedulers 3902, 3904, 3906." allocator/register renamer 3940 allocates machine buffers and resources that each uop needs in order to execute. In at least one embodiment, allocator/register renamer 3940 renames logic registers onto entries in a register file. In at least one embodiment, allocator/register renamer 3940 also allocates an entry for each uop in one of two uop queues, memory uop queue 3942 for memory operations and integer/floating point uop queue 3944 for non-memory operations, in front of memory scheduler 3946 and uop schedulers 3902, 3904, 3906. In at least one embodiment, uop schedulers 3902, 3904, 3906, determine when a uop is ready to execute based on readiness of their dependent input register operand sources and availability of execution resources uops need to complete their operation. In at least one embodiment, fast scheduler 3902 of at least one embodiment may schedule on each half of main clock cycle while slow/general floating point scheduler 3904 and simple floating point scheduler 3906 may schedule once per main processor clock cycle. In at least one embodiment, uop schedulers 3902, 3904, 3906 arbitrate for dispatch ports to schedule uops for execution.

In at least one embodiment, execution block b11 includes, without limitation, an integer register file/bypass network 3908, a floating point register file/bypass network ("FP register file/bypass network") 3910, address generation units ("AGUs") 3912 and 3914, fast Arithmetic Logic Units (ALUs) ("fast ALUs") 3916 and 3918, a slow Arithmetic Logic Unit ("slow ALU") 3920, a floating point ALU ("FP") 3922, and a floating point move unit ("FP move") 3924. In at least one embodiment, integer register file/bypass network 3908 and floating point register file/bypass network 3910 are also referred to herein as "register files 3908, 3910." In at least one embodiment, AGUSs 3912 and 3914, fast ALUs 3916 and 3918, slow ALU 3920, floating point ALU 3922, and floating point move unit 3924 are also referred to herein as "execution units 3912, 3914, 3916, 3918, 3920, 3922, and 3924." In at least one embodiment, execution block b11 may include, without limitation, any number (including zero) and type of register files, bypass networks, address generation units, and execution units, in any combination.

In at least one embodiment, register files 3908, 3910 may be arranged between uop schedulers 3902, 3904, 3906, and execution units 3912, 3914, 3916, 3918, 3920, 3922, and 3924. In at least one embodiment, integer register file/bypass network 3908 performs integer operations. In at least one embodiment, floating point register file/bypass network 3910 performs floating point operations. In at least one embodiment, each of register files 3908, 3910 may include, without limitation, a bypass network that may bypass or forward just completed results that have not yet been written into register file to new dependent uops. In at least one embodiment, register files 3908, 3910 may communicate data with each other. In at least one embodiment, integer register file/bypass network 3908 may include, without limitation, two separate register files, one register file for low-order thirty-two bits of data and a second register file for high order thirty-two bits of data. In at least one embodiment, floating point register file/bypass network 3910 may include, without limitation, 128-bit wide entries because floating point instructions typically have operands from 64 to 128 bits in width.

In at least one embodiment, execution units 3912, 3914, 3916, 3918, 3920, 3922, 3924 may execute instructions. In at least one embodiment, register files 3908, 3910 store integer and floating point data operand values that microinstructions need to execute. In at least one embodiment, processor 3900 may include, without limitation, any number and combination of execution units 3912, 3914, 3916, 3918, 3920, 3922, 3924. In at least one embodiment, floating point ALU 3922 and floating point move unit 3924, may execute floating point, MMX, SIMD, AVX and SSE, or other operations, including specialized machine learning instructions. In at least one embodiment, floating point ALU 3922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3916, 3918. In at least one embodiment, fast ALUS 3916, 3918 may execute fast operations with an effective latency of half a clock cycle. In at least one embodiment, most complex integer operations go to slow ALU 3920 as slow ALU 3920 may include, without limitation, integer execution hardware for long-latency type of operations, such as a multiplier, shifts, flag logic, and branch processing. In at least one embodiment, memory load/store operations may be executed by AGUS 3912, 3914. In at least one embodiment, fast ALU 3916, fast ALU 3918, and slow ALU 3920 may perform integer operations on 64-bit data operands. In at least one embodiment, fast ALU 3916, fast ALU 3918, and slow ALU 3920 may be implemented to support a variety of data bit sizes including sixteen, thirty-two, 128, 256, etc. In at least one embodiment, floating point ALU 3922 and floating point move unit 3924 may be implemented to support a range of operands having bits of various widths. In at least one embodiment, floating point ALU 3922 and floating point move unit 3924 may operate on 128-bit wide packed data operands in conjunction with SIMD and multimedia instructions.

In at least one embodiment, uop schedulers 3902, 3904, 3906, dispatch dependent operations before parent load has finished executing. In at least one embodiment, as uops may be speculatively scheduled and executed in processor 3900, processor 3900 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment portions or all of inference and/or training logic 2315 may be incorporated into EXE Block 3911 and other memory or registers shown or not shown. For example, in at least one embodiment, training and/or inferencing techniques described herein may use one or more of ALUs illustrated in EXE Block 3911. Moreover, weight parameters may be stored in on-chip or off-chip memory and/or registers (shown or not shown) that configure ALUs of EXE Block 3911 to perform one or more machine learning algorithms, neural network architectures, use cases, or training techniques described herein.

Figure 40:
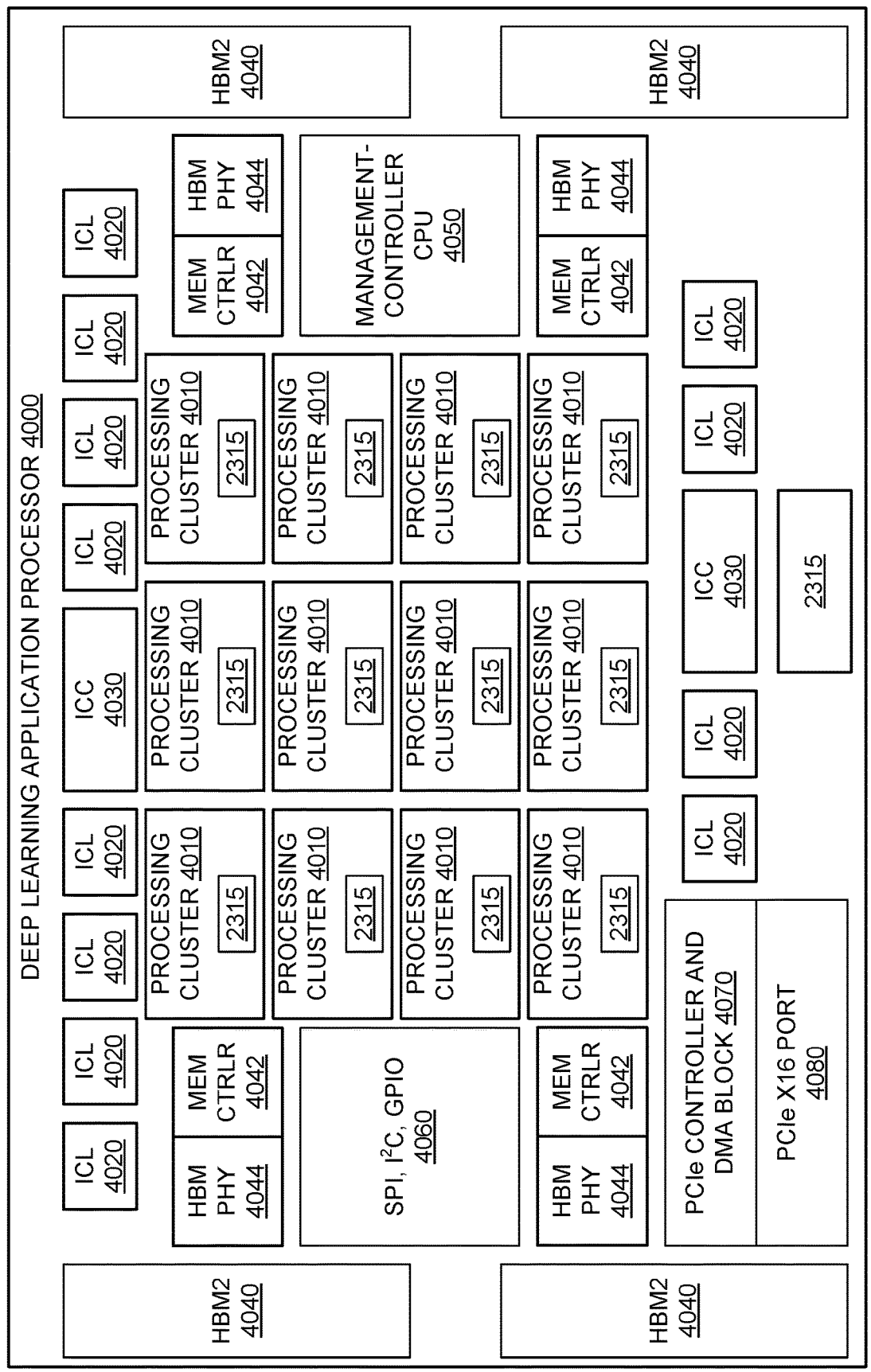
FIG. 40 illustrates a deep learning application processor, according to at least one embodiment.

FIG. 40 illustrates a deep learning application processor 4000, according to at least one embodiment. In at least one embodiment, deep learning application processor 4000 uses instructions that, if executed by deep learning application processor 4000, cause deep learning application processor 4000 to perform some or all of processes and techniques described throughout this disclosure. In at least one embodiment, deep learning application processor 4000 is an application-specific integrated circuit (ASIC). In at least one embodiment, application processor 4000 performs matrix multiply operations either "hard-wired" into hardware as a result of performing one or more instructions or both. In at least one embodiment, deep learning application processor 4000 includes, without limitation, processing clusters 4010(1)-4010(12), Inter-Chip Links ("ICLs") 4020(1)-4020(12), Inter-Chip Controllers ("ICCs") 4030(1)-4030(2), high bandwidth memory second generation ("HBM2") 4040(1)-4040(4), memory controllers ("Mem Ctrlrs") 4042(1)-4042(4), high bandwidth memory physical layer ("HBM PHY") 4044(1)-4044(4), a management-controller central processing unit ("management-controller CPU") 4050, a Serial Peripheral Interface, Inter-Integrated Circuit, and General Purpose Input/Output block ("SPI, I2C, GPIO") 4060, a peripheral component interconnect express controller and direct memory access block ("PCIe Controller and DMA") 4070, and a sixteen-lane peripheral component interconnect express port ("PCI Express×16") 4080.

In at least one embodiment, processing clusters 4010 may perform deep learning operations, including inference or prediction operations based on weight parameters calculated one or more training techniques, including those described herein. In at least one embodiment, each processing cluster 4010 may include, without limitation, any number and type of processors. In at least one embodiment, deep learning application processor 4000 may include any number and type of processing clusters 4000. In at least one embodiment, Inter-Chip Links 4020 are bi-directional. In at least one embodiment, Inter-Chip Links 4020 and Inter-Chip Controllers 4030 enable multiple deep learning application processors 4000 to exchange information, including activation information resulting from performing one or more machine learning algorithms embodied in one or more neural networks. In at least one embodiment, deep learning application processor 4000 may include any number (including zero) and type of ICLs 4020 and ICCs 4030.

In at least one embodiment, HBM2s 4040 provide a total of 32 Gigabytes (GB) of memory. HBM2 4040(i) is associated with both memory controller 4042(i) and HBM PHY 4044(i). In at least one embodiment, any number of HBM2s 4040 may provide any type and total amount of high bandwidth memory and may be associated with any number (including zero) and type of memory controllers 4042 and HBM PHYs 4044. In at least one embodiment, SPI, I2C, GPIO 4060, PCIe Controller and DMA 4070, and/or PCIe 4080 may be replaced with any number and type of blocks that enable any number and type of communication standards in any technically feasible fashion.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, deep learning application processor is used to train a machine learning model, such as a neural network, to predict or infer information provided to deep learning application processor 4000. In at least one embodiment, deep learning application processor 4000 is used to infer or predict information based on a trained machine learning model (e.g., neural network) that has been trained by another processor or system or by deep learning application processor 4000. In at least one embodiment, processor 4000 may be used to perform one or more neural network use cases described herein.

Figure 41:
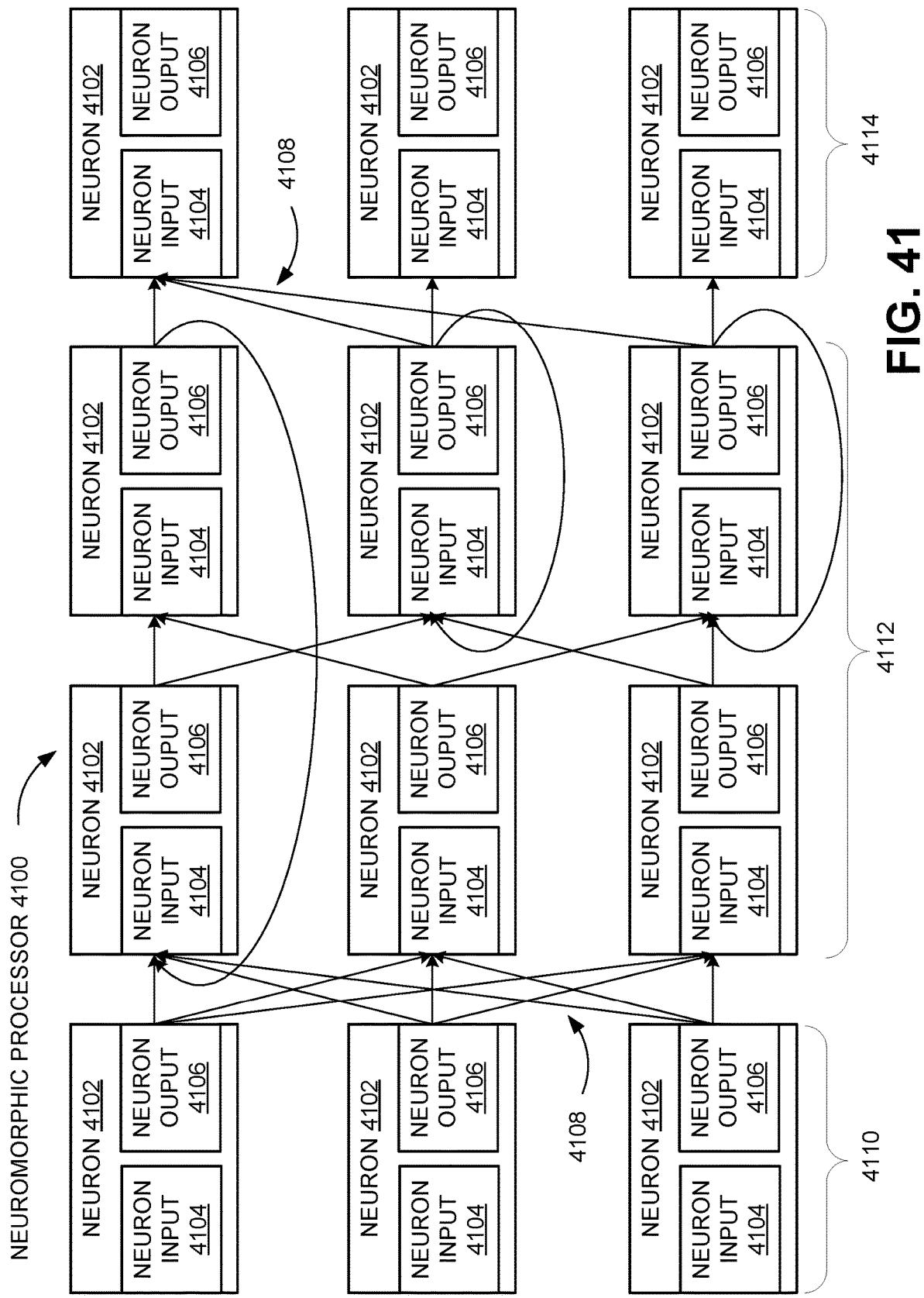
FIG. 41 is a block diagram illustrating an example neuromorphic processor, according to at least one embodiment.

FIG. 41 is a block diagram of a neuromorphic processor 4100, according to at least one embodiment. In at least one embodiment, neuromorphic processor 4100 may receive one or more inputs from sources external to neuromorphic processor 4100. In at least one embodiment, these inputs may be transmitted to one or more neurons 4102 within neuromorphic processor 4100. In at least one embodiment, neurons 4102 and components thereof may be implemented using circuitry or logic, including one or more arithmetic logic units (ALUs). In at least one embodiment, neuromorphic processor 4100 may include, without limitation, thousands or millions of instances of neurons 4102, but any suitable number of neurons 4102 may be used. In at least one embodiment, each instance of neuron 4102 may include a neuron input 4104 and a neuron output 4106. In at least one embodiment, neurons 4102 may generate outputs that may be transmitted to inputs of other instances of neurons 4102. For example, in at least one embodiment, neuron inputs 4104 and neuron outputs 4106 may be interconnected via synapses 4108.

In at least one embodiment, neurons 4102 and synapses 4108 may be interconnected such that neuromorphic processor 4100 operates to process or analyze information received by neuromorphic processor 4100. In at least one embodiment, neurons 4102 may transmit an output pulse (or "fire" or "spike") when inputs received through neuron input 4104 exceed a threshold. In at least one embodiment, neurons 4102 may sum or integrate signals received at neuron inputs 4104. For example, in at least one embodiment, neurons 4102 may be implemented as leaky integrate-and-fire neurons, wherein if a sum (referred to as a "membrane potential") exceeds a threshold value, neuron 4102 may generate an output (or "fire") using a transfer function such as a sigmoid or threshold function. In at least one embodiment, a leaky integrate-and-fire neuron may sum signals received at neuron inputs 4104 into a membrane potential and may also apply a decay factor (or leak) to reduce a membrane potential. In at least one embodiment, a leaky integrate-and-fire neuron may fire if multiple input signals are received at neuron inputs 4104 rapidly enough to exceed a threshold value (i.e., before a membrane potential decays too low to fire). In at least one embodiment, neurons 4102 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 4102 may include, without limitation, comparator circuits or logic that generate an output spike at neuron output 4106 when result of applying a transfer function to neuron input 4104 exceeds a threshold. In at least one embodiment, once neuron 4102 fires, it may disregard previously received input information by, for example, resetting a membrane potential to 0 or another suitable default value. In at least one embodiment, once membrane potential is reset to 0, neuron 4102 may resume normal operation after a suitable period of time (or refractory period).

In at least one embodiment, neurons 4102 may be interconnected through synapses 4108. In at least one embodiment, synapses 4108 may operate to transmit signals from an output of a first neuron 4102 to an input of a second neuron 4102. In at least one embodiment, neurons 4102 may transmit information over more than one instance of synapse 4108. In at least one embodiment, one or more instances of neuron output 4106 may be connected, via an instance of synapse 4108, to an instance of neuron input 4104 in same neuron 4102. In at least one embodiment, an instance of neuron 4102 generating an output to be transmitted over an instance of synapse 4108 may be referred to as a "presynaptic neuron" with respect to that instance of synapse 4108. In at least one embodiment, an instance of neuron 4102 receiving an input transmitted over an instance of synapse 4108 may be referred to as a "post-synaptic neuron" with respect to that instance of synapse 4108. Because an instance of neuron 4102 may receive inputs from one or more instances of synapse 4108, and may also transmit outputs over one or more instances of synapse 4108, a single instance of neuron 4102 may therefore be both a "presynaptic neuron" and "post-synaptic neuron," with respect to various instances of synapses 4108, in at least one embodiment.

In at least one embodiment, neurons 4102 may be organized into one or more layers. Each instance of neuron 4102 may have one neuron output 4106 that may fan out through one or more synapses 4108 to one or more neuron inputs 4104. In at least one embodiment, neuron outputs 4106 of neurons 4102 in a first layer 4110 may be connected to neuron inputs 4104 of neurons 4102 in a second layer 4112. In at least one embodiment, layer 4110 may be referred to as a "feed-forward layer." In at least one embodiment, each instance of neuron 4102 in an instance of first layer 4110 may fan out to each instance of neuron 4102 in second layer 4112. In at least one embodiment, first layer 4110 may be referred to as a "fully connected feed-forward layer." In at least one embodiment, each instance of neuron 4102 in an instance of second layer 4112 may fan out to fewer than all instances of neuron 4102 in a third layer 4114. In at least one embodiment, second layer 4112 may be referred to as a "sparsely connected feed-forward layer." In at least one embodiment, neurons 4102 in second layer 4112 may fan out to neurons 4102 in multiple other layers, including to neurons 4102 in (same) second layer 4112. In at least one embodiment, second layer 4112 may be referred to as a "recurrent layer" neuromorphic processor 4100 may include, without limitation, any suitable combination of recurrent layers and feed-forward layers, including, without limitation, both sparsely connected feed-forward layers and fully connected feed-forward layers.

In at least one embodiment, neuromorphic processor 4100 may include, without limitation, a reconfigurable interconnect architecture or dedicated hard wired interconnects to connect synapse 4108 to neurons 4102. In at least one embodiment, neuromorphic processor 4100 may include, without limitation, circuitry or logic that allows synapses to be allocated to different neurons 4102 as needed based on neural network topology and neuron fan-in/out. For example, in at least one embodiment, synapses 4108 may be connected to neurons 4102 using an interconnect fabric, such as network-on-chip, or with dedicated connections. In at least one embodiment, synapse interconnections and components thereof may be implemented using circuitry or logic.

Figure 42:
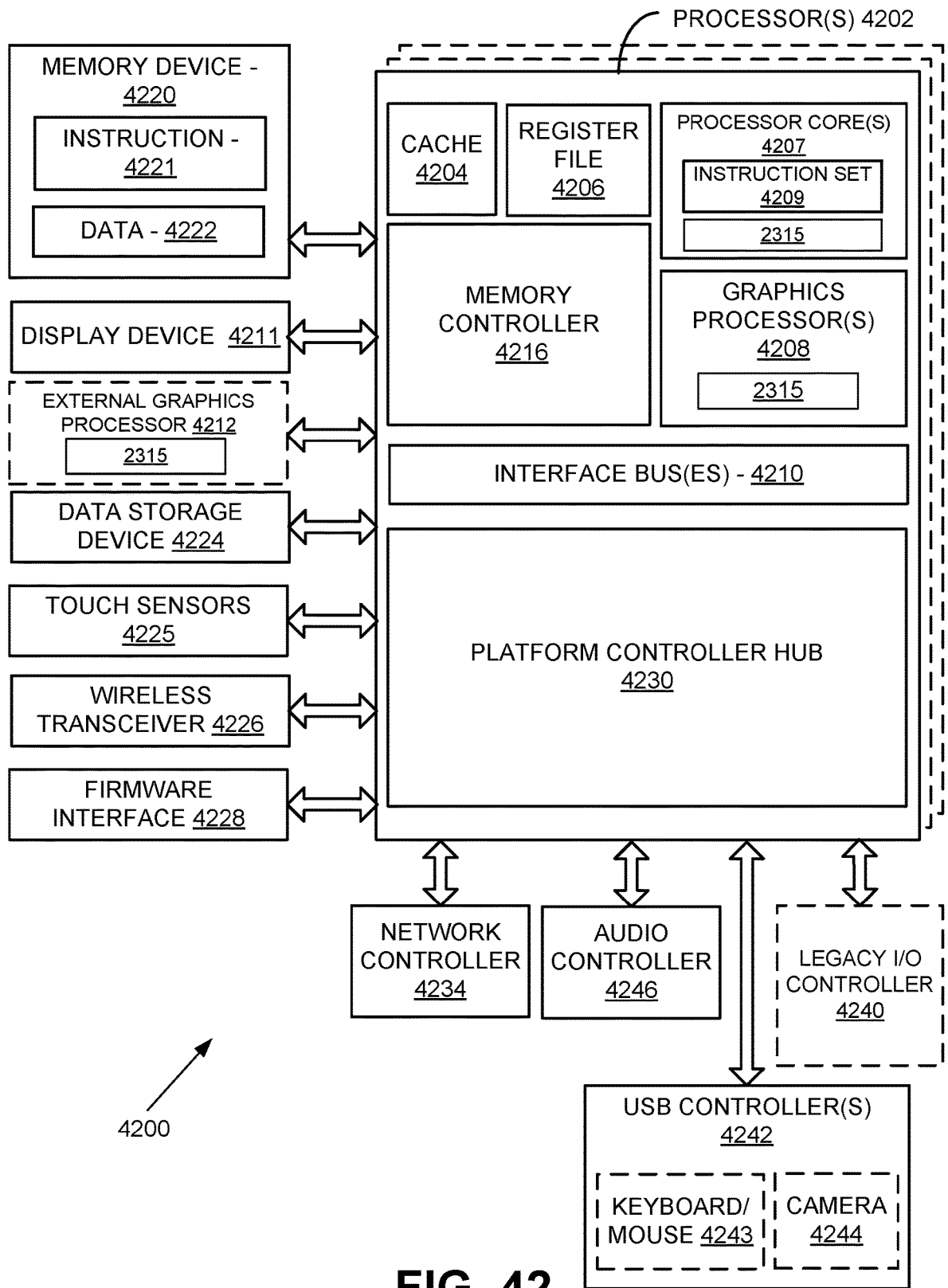
FIG. 42 illustrates at least portions of a graphics processor, according to one or more embodiments.

FIG. 42 is a block diagram of a processing system, according to at least one embodiment. In at least one embodiment, system 4200 includes one or more processors 4202 and one or more graphics processors 4208, and may be a single processor desktop system, a multiprocessor workstation system, or a server system having a large number of processors 4202 or processor cores 4207. In at least one embodiment, system 4200 is a processing platform incorporated within a system-on-a-chip (SoC) integrated circuit for use in mobile, handheld, or embedded devices.

In at least one embodiment, system 4200 can include, or be incorporated within a server-based gaming platform, a game console, including a game and media console, a mobile gaming console, a handheld game console, or an online game console. In at least one embodiment, system 4200 is a mobile phone, smart phone, tablet computing device or mobile Internet device. In at least one embodiment, processing system 4200 can also include, couple with, or be integrated within a wearable device, such as a smart watch wearable device, smart eyewear device, augmented reality device, or virtual reality device. In at least one embodiment, processing system 4200 is a television or set top box device having one or more processors 4202 and a graphical interface generated by one or more graphics processors 4208.

In at least one embodiment, one or more processors 4202 each include one or more processor cores 4207 to process instructions which, when executed, perform operations for system and user software. In at least one embodiment, each of one or more processor cores 4207 is configured to process a specific instruction set 4209. In at least one embodiment, instruction set 4209 may facilitate Complex Instruction Set Computing (CISC), Reduced Instruction Set Computing (RISC), or computing via a Very Long Instruction Word (VLIW). In at least one embodiment, processor cores 4207 may each process a different instruction set 4209, which may include instructions to facilitate emulation of other instruction sets. In at least one embodiment, processor core 4207 may also include other processing devices, such a Digital Signal Processor (DSP).

In at least one embodiment, processor 4202 includes cache memory 4204. In at least one embodiment, processor 4202 can have a single internal cache or multiple levels of internal cache. In at least one embodiment, cache memory is shared among various components of processor 4202. In at least one embodiment, processor 4202 also uses an external cache (e.g., a Level-3 (L3) cache or Last Level Cache (LLC)) (not shown), which may be shared among processor cores 4207 using known cache coherency techniques. In at least one embodiment, register file 4206 is additionally included in processor 4202 which may include different types of registers for storing different types of data (e.g., integer registers, floating point registers, status registers, and an instruction pointer register). In at least one embodiment, register file 4206 may include general-purpose registers or other registers.

In at least one embodiment, one or more processor(s) 4202 are coupled with one or more interface bus(es) 4210 to transmit communication signals such as address, data, or control signals between processor 4202 and other components in system 4200. In at least one embodiment interface bus 4210, in one embodiment, can be a processor bus, such as a version of a Direct Media Interface (DMI) bus. In at least one embodiment, interface 4210 is not limited to a DMI bus, and may include one or more Peripheral Component Interconnect buses (e.g., PCI, PCI Express), memory buses, or other types of interface buses. In at least one embodiment processor(s) 4202 include an integrated memory controller 4216 and a platform controller hub 4230. In at least one embodiment, memory controller 4216 facilitates communication between a memory device and other components of system 4200, while platform controller hub (PCH) 4230 provides connections to I/O devices via a local I/O bus.

In at least one embodiment, memory device 4220 can be a dynamic random access memory (DRAM) device, a static random access memory (SRAM) device, flash memory device, phase-change memory device, or some other memory device having suitable performance to serve as process memory. In at least one embodiment memory device 4220 can operate as system memory for system 4200, to store data 4222 and instructions 4221 for use when one or more processors 4202 executes an application or process. In at least one embodiment, memory controller 4216 also couples with an optional external graphics processor 4212, which may communicate with one or more graphics processors 4208 in processors 4202 to perform graphics and media operations. In at least one embodiment, a display device 4211 can connect to processor(s) 4202. In at least one embodiment display device 4211 can include one or more of an internal display device, as in a mobile electronic device or a laptop device or an external display device attached via a display interface (e.g., DisplayPort, etc.). In at least one embodiment, display device 4211 can include a head mounted display (HMD) such as a stereoscopic display device for use in virtual reality (VR) applications or augmented reality (AR) applications.

In at least one embodiment, platform controller hub 4230 enables peripherals to connect to memory device 4220 and processor 4202 via a high-speed I/O bus. In at least one embodiment, I/O peripherals include, but are not limited to, an audio controller 4246, a network controller 4234, a firmware interface 4228, a wireless transceiver 4226, touch sensors 4225, a data storage device 4224 (e.g., hard disk drive, flash memory, etc.). In at least one embodiment, data storage device 4224 can connect via a storage interface (e.g., SATA) or via a peripheral bus, such as a Peripheral Component Interconnect bus (e.g., PCI, PCI Express). In at least one embodiment, touch sensors 4225 can include touch screen sensors, pressure sensors, or fingerprint sensors. In at least one embodiment, wireless transceiver 4226 can be a Wi-Fi transceiver, a Bluetooth transceiver, or a mobile network transceiver such as a 3G, 4G, or Long Term Evolution (LTE) transceiver. In at least one embodiment, firmware interface 4228 enables communication with system firmware, and can be, for example, a unified extensible firmware interface (UEFI). In at least one embodiment, network controller 4234 can enable a network connection to a wired network. In at least one embodiment, a high-performance network controller (not shown) couples with interface bus 4210. In at least one embodiment, audio controller 4246 is a multi-channel high definition audio controller. In at least one embodiment, system 4200 includes an optional legacy I/O controller 4240 for coupling legacy (e.g., Personal System 2 (PS/2)) devices to system. In at least one embodiment, platform controller hub 4230 can also connect to one or more Universal Serial Bus (USB) controllers 4242 connect input devices, such as keyboard and mouse 4243 combinations, a camera 4244, or other USB input devices.

In at least one embodiment, an instance of memory controller 4216 and platform controller hub 4230 may be integrated into a discreet external graphics processor, such as external graphics processor 4212. In at least one embodiment, platform controller hub 4230 and/or memory controller 4216 may be external to one or more processor(s) 4202. For example, in at least one embodiment, system 4200 can include an external memory controller 4216 and platform controller hub 4230, which may be configured as a memory controller hub and peripheral controller hub within a system chipset that is in communication with processor(s) 4202.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment portions or all of inference and/or training logic 2315 may be incorporated into graphics processor 4200. For example, in at least one embodiment, training and/or inferencing techniques described herein may use one or more of ALUs embodied in 3D pipeline 4212. Moreover, in at least one embodiment, inferencing and/or training operations described herein may be done using logic other than logic illustrated in FIG. 23A or 23B. In at least one embodiment, weight parameters may be stored in on-chip or off-chip memory and/or registers (shown or not shown) that configure ALUs of graphics processor 4200 to perform one or more machine learning algorithms, neural network architectures, use cases, or training techniques described herein.

Figure 43:
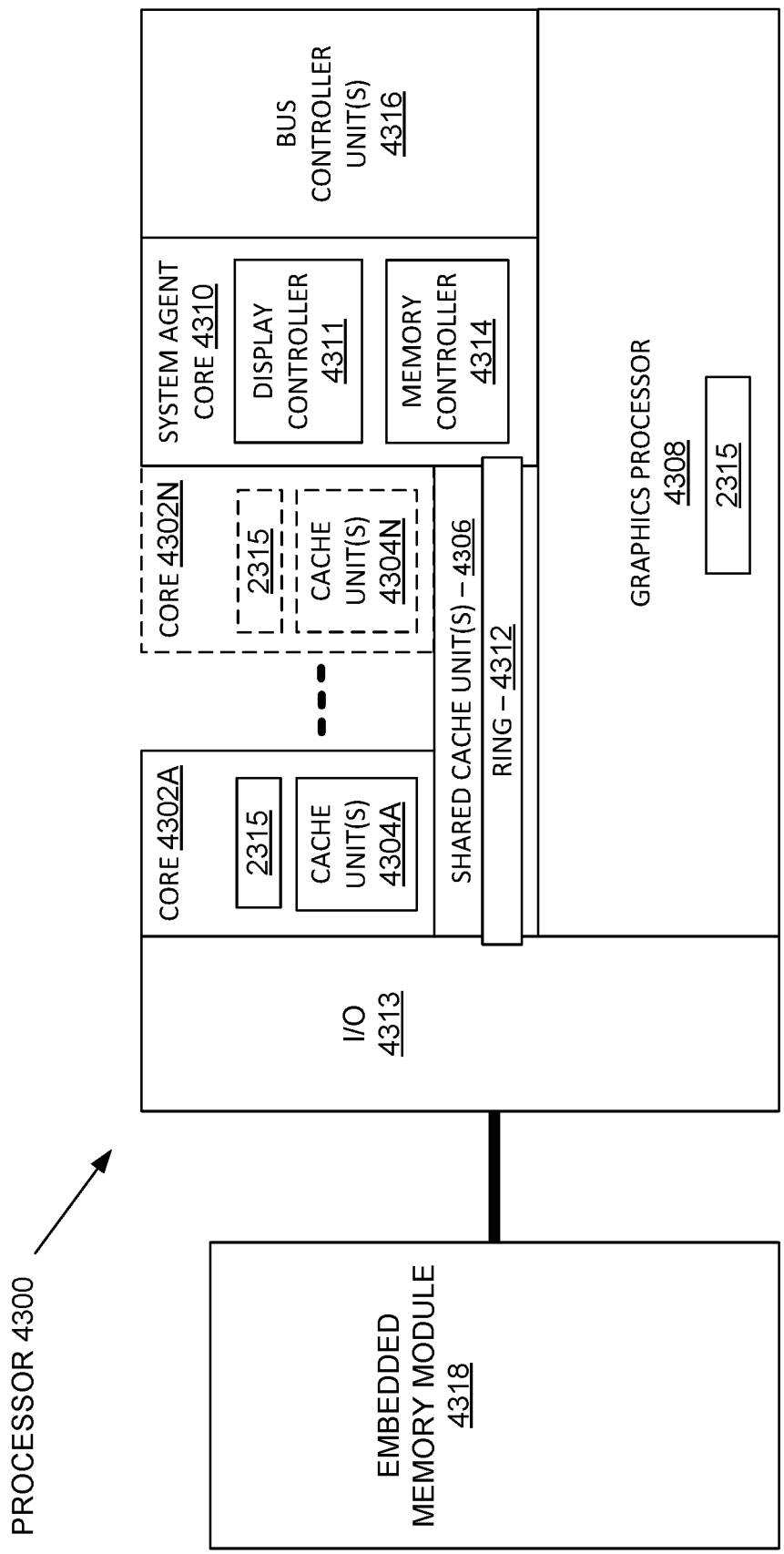
FIG. 43 illustrates at least portions of a graphics processor, according to one or more embodiments.

FIG. 43 is a block diagram of a processor 4300 having one or more processor cores 4302A-4302N, an integrated memory controller 4314, and an integrated graphics processor 4308, according to at least one embodiment. In at least one embodiment, processor 4300 can include additional cores up to and including additional core 4302N represented by dashed lined boxes. In at least one embodiment, each of processor cores 4302A-4302N includes one or more internal cache units 4304A-4304N. In at least one embodiment, each processor core also has access to one or more shared cached units 4306.

In at least one embodiment, internal cache units 4304A-4304N and shared cache units 4306 represent a cache memory hierarchy within processor 4300. In at least one embodiment, cache memory units 4304A-4304N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 4306 and 4304A-4304N.

In at least one embodiment, processor 4300 may also include a set of one or more bus controller units 4316 and a system agent core 4310. In at least one embodiment, one or more bus controller units 4316 manage a set of peripheral buses, such as one or more PCI or PCI express buses. In at least one embodiment, system agent core 4310 provides management functionality for various processor components. In at least one embodiment, system agent core 4310 includes one or more integrated memory controllers 4314 to manage access to various external memory devices (not shown).

In at least one embodiment, one or more of processor cores 4302A-4302N include support for simultaneous multi-threading. In at least one embodiment, system agent core 4310 includes components for coordinating and operating cores 4302A-4302N during multi-threaded processing. In at least one embodiment, system agent core 4310 may additionally include a power control unit (PCU), which includes logic and components to regulate one or more power states of processor cores 4302A-4302N and graphics processor 4308.

In at least one embodiment, processor 4300 additionally includes graphics processor 4308 to execute graphics processing operations. In at least one embodiment, graphics processor 4308 couples with shared cache units 4306, and system agent core 4310, including one or more integrated memory controllers 4314. In at least one embodiment, system agent core 4310 also includes a display controller 4311 to drive graphics processor output to one or more coupled displays. In at least one embodiment, display controller 4311 may also be a separate module coupled with graphics processor 4308 via at least one interconnect, or may be integrated within graphics processor 4308.

In at least one embodiment, a ring based interconnect unit 4312 is used to couple internal components of processor 4300. In at least one embodiment, an alternative interconnect unit may be used, such as a point-to-point interconnect, a switched interconnect, or other techniques. In at least one embodiment, graphics processor 4308 couples with ring interconnect 4312 via an I/O link 4313.

In at least one embodiment, I/O link 4313 represents at least one of multiple varieties of I/O interconnects, including an on package I/O interconnect which facilitates communication between various processor components and a high-performance embedded memory module 4318, such as an eDRAM module. In at least one embodiment, each of processor cores 4302A-4302N and graphics processor 4308 use embedded memory modules 4318 as a shared Last Level Cache.

In at least one embodiment, processor cores 4302A-4302N are homogenous cores executing a common instruction set architecture. In at least one embodiment, processor cores 4302A-4302N are heterogeneous in terms of instruction set architecture (ISA), where one or more of processor cores 4302A-4302N execute a common instruction set, while one or more other cores of processor cores 4302A-43-02N executes a subset of a common instruction set or a different instruction set. In at least one embodiment, processor cores 4302A-4302N are heterogeneous in terms of microarchitecture, where one or more cores having a relatively higher power consumption couple with one or more power cores having a lower power consumption. In at least one embodiment, processor 4300 can be implemented on one or more chips or as an SoC integrated circuit.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment portions or all of inference and/or training logic 2315 may be incorporated into graphics processor 4310. For example, in at least one embodiment, training and/or inferencing techniques described herein may use one or more of ALUs embodied in 3D pipeline 4212, graphics core(s) 4315A, shared function logic 4316, graphics core(s) 4315B, shared function logic 4320, or other logic in FIG. 43. Moreover, in at least one embodiment, inferencing and/or training operations described herein may be done using logic other than logic illustrated in FIG. 23A or 23B. In at least one embodiment, weight parameters may be stored in on-chip or off-chip memory and/or registers (shown or not shown) that configure ALUs of graphics processor 4310 to perform one or more machine learning algorithms, neural network architectures, use cases, or training techniques described herein.

Figure 44:
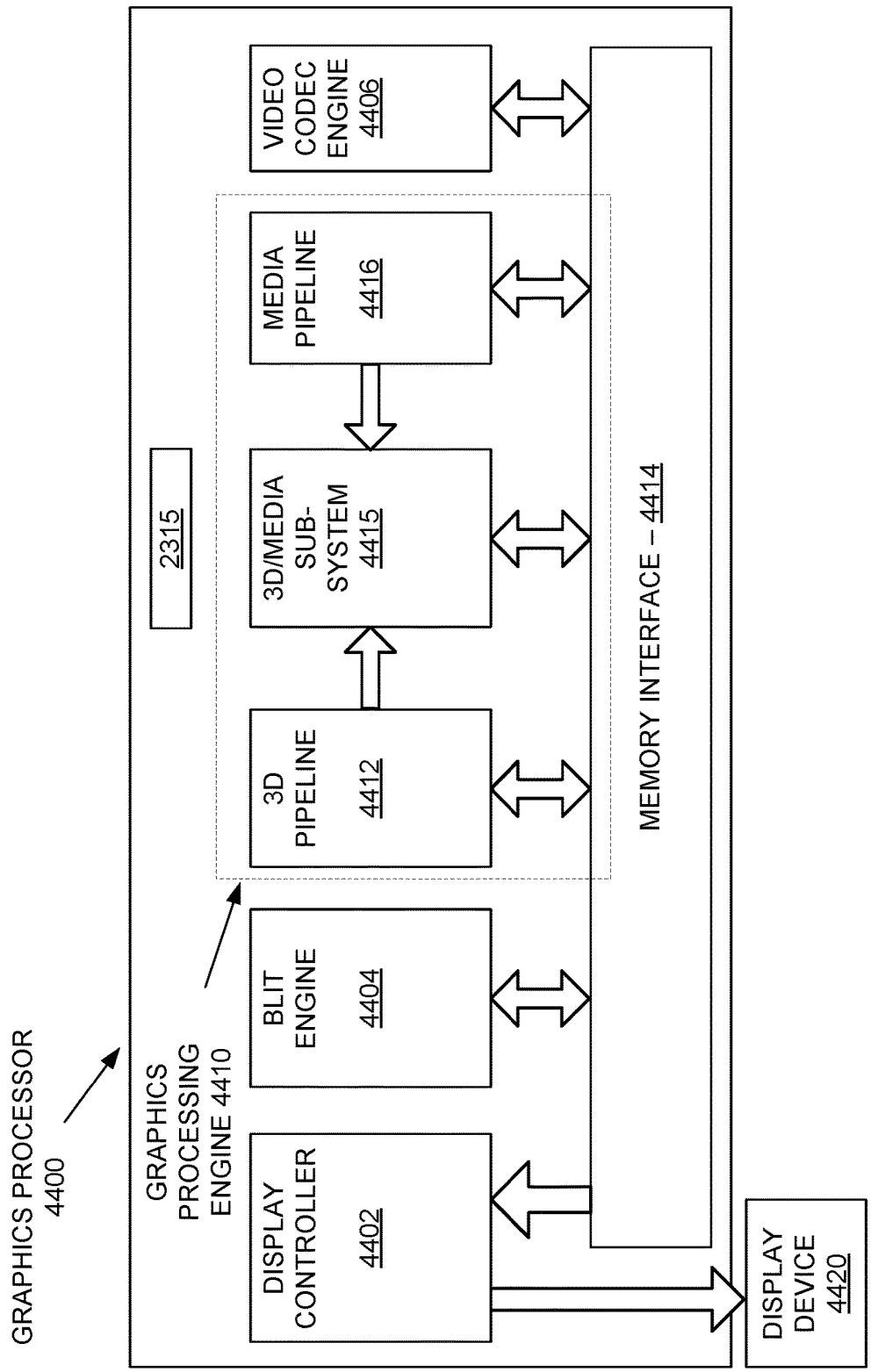
FIG. 44 illustrates at least portions of a graphics processor, according to one or more embodiments.

FIG. 44 is a block diagram of a graphics processor 4400, which may be a discrete graphics processing unit, or may be a graphics processor integrated with a plurality of processing cores. In at least one embodiment, graphics processor 4400 communicates via a memory mapped I/O interface to registers on graphics processor 4400 and with commands placed into memory. In at least one embodiment, graphics processor 4400 includes a memory interface 4414 to access memory. In at least one embodiment, memory interface 4414 is an interface to local memory, one or more internal caches, one or more shared external caches, and/or to system memory.

In at least one embodiment, graphics processor 4400 also includes a display controller 4402 to drive display output data to a display device 4420. In at least one embodiment, display controller 4402 includes hardware for one or more overlay planes for display device 4420 and composition of multiple layers of video or user interface elements. In at least one embodiment, display device 4420 can be an internal or external display device. In at least one embodiment, display device 4420 is a head mounted display device, such as a virtual reality (VR) display device or an augmented reality (AR) display device. In at least one embodiment, graphics processor 4400 includes a video codec engine 4406 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 4400 includes a block image transfer (BLIT) engine 4404 to perform two-dimensional (2D) rasterizer operations including, for example, bit-boundary block transfers. However, in at least one embodiment, 2D graphics operations are performed using one or more components of graphics processing engine (GPE) 4410. In at least one embodiment, GPE 4410 is a compute engine for performing graphics operations, including three-dimensional (3D) graphics operations and media operations.

In at least one embodiment, GPE 4410 includes a 3D pipeline 4412 for performing 3D operations, such as rendering three-dimensional images and scenes using processing functions that act upon 3D primitive shapes (e.g., rectangle, triangle, etc.). 3D pipeline 4412 includes programmable and fixed function elements that perform various tasks and/or spawn execution threads to a 3D/Media subsystem 4415. While 3D pipeline 4412 can be used to perform media operations, in at least one embodiment, GPE 4410 also includes a media pipeline 4416 that is used to perform media operations, such as video post-processing and image enhancement.

In at least one embodiment, media pipeline 4416 includes fixed function or programmable logic units to perform one or more specialized media operations, such as video decode acceleration, video de-interlacing, and video encode acceleration in place of, or on behalf of video codec engine 4406. In at least one embodiment, media pipeline 4416 additionally includes a thread spawning unit to spawn threads for execution on 3D/Media sub-system 4415. In at least one embodiment, spawned threads perform computations for media operations on one or more graphics execution units included in 3D/Media sub-system 4415.

In at least one embodiment, 3D/Media subsystem 4415 includes logic for executing threads spawned by 3D pipeline 4412 and media pipeline 4416. In at least one embodiment, 3D pipeline 4412 and media pipeline 4416 send thread execution requests to 3D/Media subsystem 4415, which includes thread dispatch logic for arbitrating and dispatching various requests to available thread execution resources. In at least one embodiment, execution resources include an array of graphics execution units to process 3D and media threads. In at least one embodiment, 3D/Media subsystem 4415 includes one or more internal caches for thread instructions and data. In at least one embodiment, subsystem 4415 also includes shared memory, including registers and addressable memory, to share data between threads and to store output data.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment portions or all of inference and/or training logic 2315 may be incorporated into graphics processor 4400. For example, in at least one embodiment, training and/or inferencing techniques described herein may use one or more of ALUs embodied in 3D pipeline 4412. Moreover, in at least one embodiment, inferencing and/or training operations described herein may be done using logic other than logic illustrated in FIG. 23A or 23B. In at least one embodiment, weight parameters may be stored in on-chip or off-chip memory and/or registers (shown or not shown) that configure ALUs of graphics processor 4400 to perform one or more machine learning algorithms, neural network architectures, use cases, or training techniques described herein.

Figure 45:
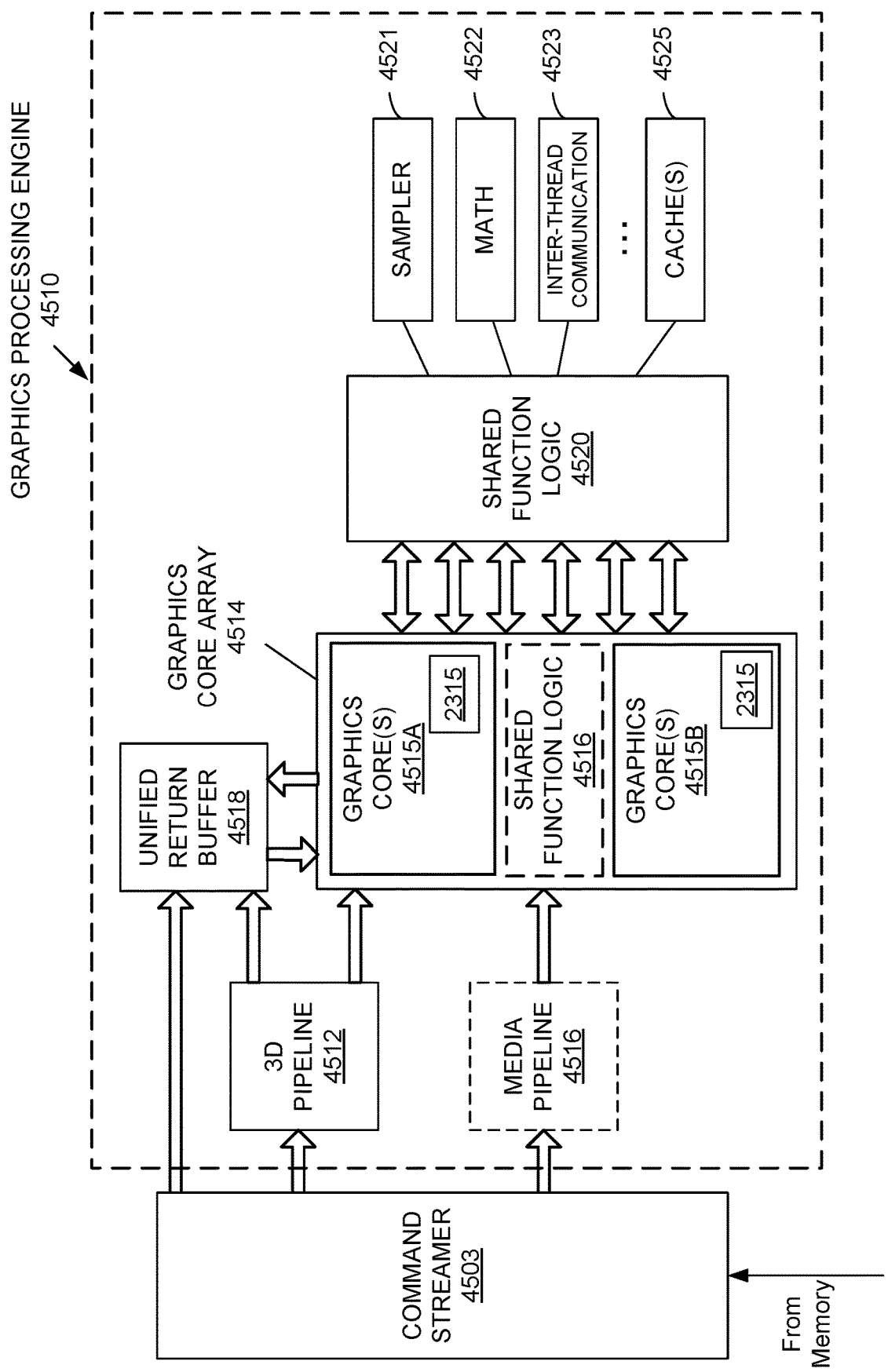
FIG. 45 is a block diagram of a graphics processing engine 4510 of a graphics processor in accordance with at least one embodiment.

FIG. 45 is a block diagram of a graphics processing engine 4510 of a graphics processor in accordance with at least one embodiment. In at least one embodiment, graphics processing engine (GPE) 4510 is a version of GPE 4410 shown in FIG. 44. In at least one embodiment, media pipeline 4416 is optional and may not be explicitly included within GPE 4510. In at least one embodiment, a separate media and/or image processor is coupled to GPE 4510.

In at least one embodiment, GPE 4510 is coupled to or includes a command streamer 4503, which provides a command stream to 3D pipeline 4412 and/or media pipelines 4416. In at least one embodiment, command streamer 4503 is coupled to memory, which can be system memory, or one or more of internal cache memory and shared cache memory. In at least one embodiment, command streamer 4503 receives commands from memory and sends commands to 3D pipeline 4412 and/or media pipeline 4416. In at least one embodiment, commands are instructions, primitives, or micro-operations fetched from a ring buffer, which stores commands for 3D pipeline 4412 and media pipeline 4416. In at least one embodiment, a ring buffer can additionally include batch command buffers storing batches of multiple commands. In at least one embodiment, commands for 3D pipeline 4412 can also include references to data stored in memory, such as but not limited to vertex and geometry data for 3D pipeline 4412 and/or image data and memory objects for media pipeline 4416. In at least one embodiment, 3D pipeline 4412 and media pipeline 4416 process commands and data by performing operations or by dispatching one or more execution threads to a graphics core array 4514. In at least one embodiment graphics core array 4514 includes one or more blocks of graphics cores (e.g., graphics core(s) 4515A, graphics core(s) 4515B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 2315 in FIG. 23A and FIG. 23B.

In at least one embodiment, 3D pipeline 4412 includes fixed function and programmable logic to process one or more shader programs, such as vertex shaders, geometry shaders, pixel shaders, fragment shaders, compute shaders, or other shader programs, by processing instructions and dispatching execution threads to graphics core array 4514. In at least one embodiment, graphics core array 4514 provides a unified block of execution resources for use in processing shader programs. In at least one embodiment, multi-purpose execution logic (e.g., execution units) within graphics core(s) 4515A-4515B of graphic core array 4514 includes support for various 3D API shader languages and can execute multiple simultaneous execution threads associated with multiple shaders.

In at least one embodiment, graphics core array 4514 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 4514 can output data to memory in a unified return buffer (URB) 4518. URB 4518 can store data for multiple threads. In at least one embodiment, URB 4518 may be used to send data between different threads executing on graphics core array 4514. In at least one embodiment, URB 4518 may additionally be used for synchronization between threads on graphics core array 4514 and fixed function logic within shared function logic 4520.

In at least one embodiment, graphics core array 4514 is scalable, such that graphics core array 4514 includes a variable number of graphics cores, each having a variable number of execution units based on a target power and performance level of GPE 4510. In at least one embodiment, execution resources are dynamically scalable, such that execution resources may be enabled or disabled as needed.

In at least one embodiment, graphics core array 4514 is coupled to shared function logic 4520 that includes multiple resources that are shared between graphics cores in graphics core array 4514. In at least one embodiment, shared functions performed by shared function logic 4520 are embodied in hardware logic units that provide specialized supplemental functionality to graphics core array 4514. In at least one embodiment, shared function logic 4520 includes but is not limited to sampler 4521, math 4522, and inter-thread communication (ITC) 4523 logic. In at least one embodiment, one or more cache(s) 4525 are in included in or couple to shared function logic 4520.

In at least one embodiment, a shared function is used if demand for a specialized function is insufficient for inclusion within graphics core array 4514. In at least one embodiment, a single instantiation of a specialized function is used in shared function logic 4520 and shared among other execution resources within graphics core array 4514. In at least one embodiment, specific shared functions within shared function logic 4520 that are used extensively by graphics core array 4514 may be included within shared function logic 4516 within graphics core array 4514. In at least one embodiment, shared function logic 4516 within graphics core array 4514 can include some or all logic within shared function logic 4520. In at least one embodiment, all logic elements within shared function logic 4520 may be duplicated within shared function logic 4516 of graphics core array 4514. In at least one embodiment, shared function logic 4520 is excluded in favor of shared function logic 4516 within graphics core array 4514.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment portions or all of inference and/or training logic 2315 may be incorporated into graphics processor 4510. For example, in at least one embodiment, training and/or inferencing techniques described herein may use one or more of ALUs embodied in 3D pipeline 4412, graphics core(s) 4515A, shared function logic 4516, graphics core(s) 4515B, shared function logic 4520, or other logic in FIG. 45. Moreover, in at least one embodiment, inferencing and/or training operations described herein may be done using logic other than logic illustrated in FIG. 23A or 23B. In at least one embodiment, weight parameters may be stored in on-chip or off-chip memory and/or registers (shown or not shown) that configure ALUs of graphics processor 4510 to perform one or more machine learning algorithms, neural network architectures, use cases, or training techniques described herein.

Figure 46:
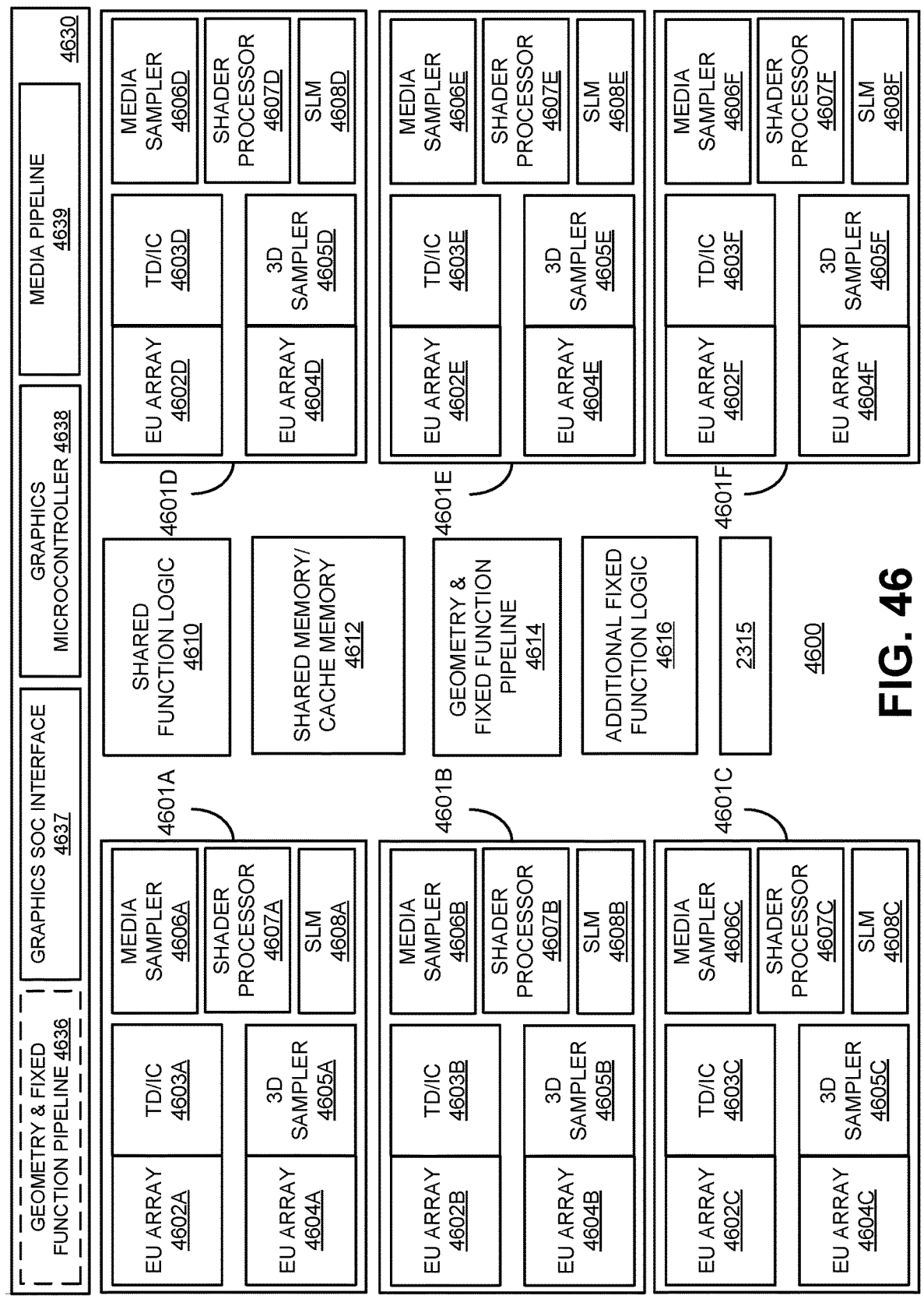
FIG. 46 is a block diagram of at least portions of a graphics processor core, according to at least one embodiment.

FIG. 46 is a block diagram of hardware logic of a graphics processor core 4600, according to at least one embodiment described herein. In at least one embodiment, graphics processor core 4600 is included within a graphics core array. In at least one embodiment, graphics processor core 4600, sometimes referred to as a core slice, can be one or multiple graphics cores within a modular graphics processor. In at least one embodiment, graphics processor core 4600 is exemplary of one graphics core slice, and a graphics processor as described herein may include multiple graphics core slices based on target power and performance envelopes. In at least one embodiment, each graphics core 4600 can include a fixed function block 4630 coupled with multiple sub-cores 4601A-4601F, also referred to as sub-slices, that include modular blocks of general-purpose and fixed function logic.

In at least one embodiment, fixed function block 4630 includes a geometry/fixed function pipeline 4636 that can be shared by all sub-cores in graphics processor 4600, for example, in lower performance and/or lower power graphics processor implementations. In at least one embodiment, geometry/fixed function pipeline 4636 includes a 3D fixed function pipeline, a video front-end unit, a thread spawner and thread dispatcher, and a unified return buffer manager, which manages unified return buffers.

In at least one embodiment fixed function block 4630 also includes a graphics SoC interface 4637, a graphics microcontroller 4638, and a media pipeline 4639. Graphics SoC interface 4637 provides an interface between graphics core 4600 and other processor cores within a system on a chip integrated circuit. In at least one embodiment, graphics microcontroller 4638 is a programmable sub-processor that is configurable to manage various functions of graphics processor 4600, including thread dispatch, scheduling, and pre-emption. In at least one embodiment, media pipeline 4639 includes logic to facilitate decoding, encoding, pre-processing, and/or post-processing of multimedia data, including image and video data. In at least one embodiment, media pipeline 4639 implement media operations via requests to compute or sampling logic within sub-cores 4601-4601F.

In at least one embodiment, SoC interface 4637 enables graphics core 4600 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 4637 can also enable communication with fixed function devices within an SoC, such as camera imaging pipelines, and enables use of and/or implements global memory atomics that may be shared between graphics core 4600 and CPUs within an SoC. In at least one embodiment, SoC interface 4637 can also implement power management controls for graphics core 4600 and enable an interface between a clock domain of graphic core 4600 and other clock domains within an SoC. In at least one embodiment, SoC interface 4637 enables receipt of command buffers from a command streamer and global thread dispatcher that are configured to provide commands and instructions to each of one or more graphics cores within a graphics processor. In at least one embodiment, commands and instructions can be dispatched to media pipeline 4639, when media operations are to be performed, or a geometry and fixed function pipeline (e.g., geometry and fixed function pipeline 4636, geometry and fixed function pipeline 4614) when graphics processing operations are to be performed.

In at least one embodiment, graphics microcontroller 4638 can be configured to perform various scheduling and management tasks for graphics core 4600. In at least one embodiment, graphics microcontroller 4638 can perform graphics and/or compute workload scheduling on various graphics parallel engines within execution unit (EU) arrays 4602A-4602F, 4604A-4604F within sub-cores 4601A-4601F. In at least one embodiment, host software executing on a CPU core of an SoC including graphics core 4600 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 4638 can also facilitate low-power or idle states for graphics core 4600, providing graphics core 4600 with an ability to save and restore registers within graphics core 4600 across low-power state transitions independently from an operating system and/or graphics driver software on a system.

In at least one embodiment, graphics core 4600 may have greater than or fewer than illustrated sub-cores 4601A-4601F, up to N modular sub-cores. For each set of N sub-cores, in at least one embodiment, graphics core 4600 can also include shared function logic 4610, shared and/or cache memory 4612, a geometry/fixed function pipeline 4614, as well as additional fixed function logic 4616 to accelerate various graphics and compute processing operations. In at least one embodiment, shared function logic 4610 can include logic units (e.g., sampler, math, and/or inter-thread communication logic) that can be shared by each N sub-core within graphics core 4600. Shared and/or cache memory 4612 can be a last-level cache for N sub-cores 4601A-4601F within graphics core 4600 and can also serve as shared memory that is accessible by multiple sub-cores. In at least one embodiment, geometry/fixed function pipeline 4614 can be included instead of geometry/fixed function pipeline 4636 within fixed function block 4630 and can include same or similar logic units.

In at least one embodiment, graphics core 4600 includes additional fixed function logic 4616 that can include various fixed function acceleration logic for use by graphics core 4600. In at least one embodiment, additional fixed function logic 4616 includes an additional geometry pipeline for use in position only shading. In position-only shading, at least two geometry pipelines exist, whereas in a full geometry pipeline within geometry/fixed function pipeline 4616, 4636, and a cull pipeline, which is an additional geometry pipeline which may be included within additional fixed function logic 4616. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 4616 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 4616 can also include machine-learning acceleration logic, such as fixed function matrix multiplication logic, for implementations including optimizations for machine learning training or inferencing.

In at least one embodiment, within each graphics sub-core 4601A-4601F includes a set of execution resources that may be used to perform graphics, media, and compute operations in response to requests by graphics pipeline, media pipeline, or shader programs. In at least one embodiment, graphics sub-cores 4601A-4601F include multiple EU arrays 4602A-4602F, 4604A-4604F, thread dispatch and inter-thread communication (TD/IC) logic 4603A-4603F, a 3D (e.g., texture) sampler 4605A-4605F, a media sampler 4606A-4606F, a shader processor 4607A-4607F, and shared local memory (SLM) 4608A-4608F. EU arrays 4602A-4602F, 4604A-4604F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 4603A-4603F performs local thread dispatch and thread control operations for execution units within a sub-core and facilitate communication between threads executing on execution units of a sub-core. In at least one embodiment, 3D sampler 4605A-4605F can read texture or other 3D graphics related data into memory. In at least one embodiment, 3D sampler can read texture data differently based on a configured sample state and texture format associated with a given texture. In at least one embodiment, media sampler 4606A-4606F can perform similar read operations based on a type and format associated with media data. In at least one embodiment, each graphics sub-core 4601A-4601F can alternately include a unified 3D and media sampler. In at least one embodiment, threads executing on execution units within each of sub-cores 4601A-4601F can make use of shared local memory 4608A-4608F within each sub-core, to enable threads executing within a thread group to execute using a common pool of on-chip memory.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, portions or all of inference and/or training logic 2315 may be incorporated into graphics processor 4610. For example, in at least one embodiment, training and/or inferencing techniques described herein may use one or more of ALUs embodied in 3D pipeline 4610, graphics microcontroller 4638, geometry & fixed function pipeline 4614 and 4636, or other logic in FIG. 43. Moreover, in at least one embodiment, inferencing and/or training operations described herein may be done using logic other than logic illustrated in FIG. 23A or 23B. In at least one embodiment, weight parameters may be stored in on-chip or off-chip memory and/or registers (shown or not shown) that configure ALUs of graphics processor 4600 to perform one or more machine learning algorithms, neural network architectures, use cases, or training techniques described herein.

Figure 47A:
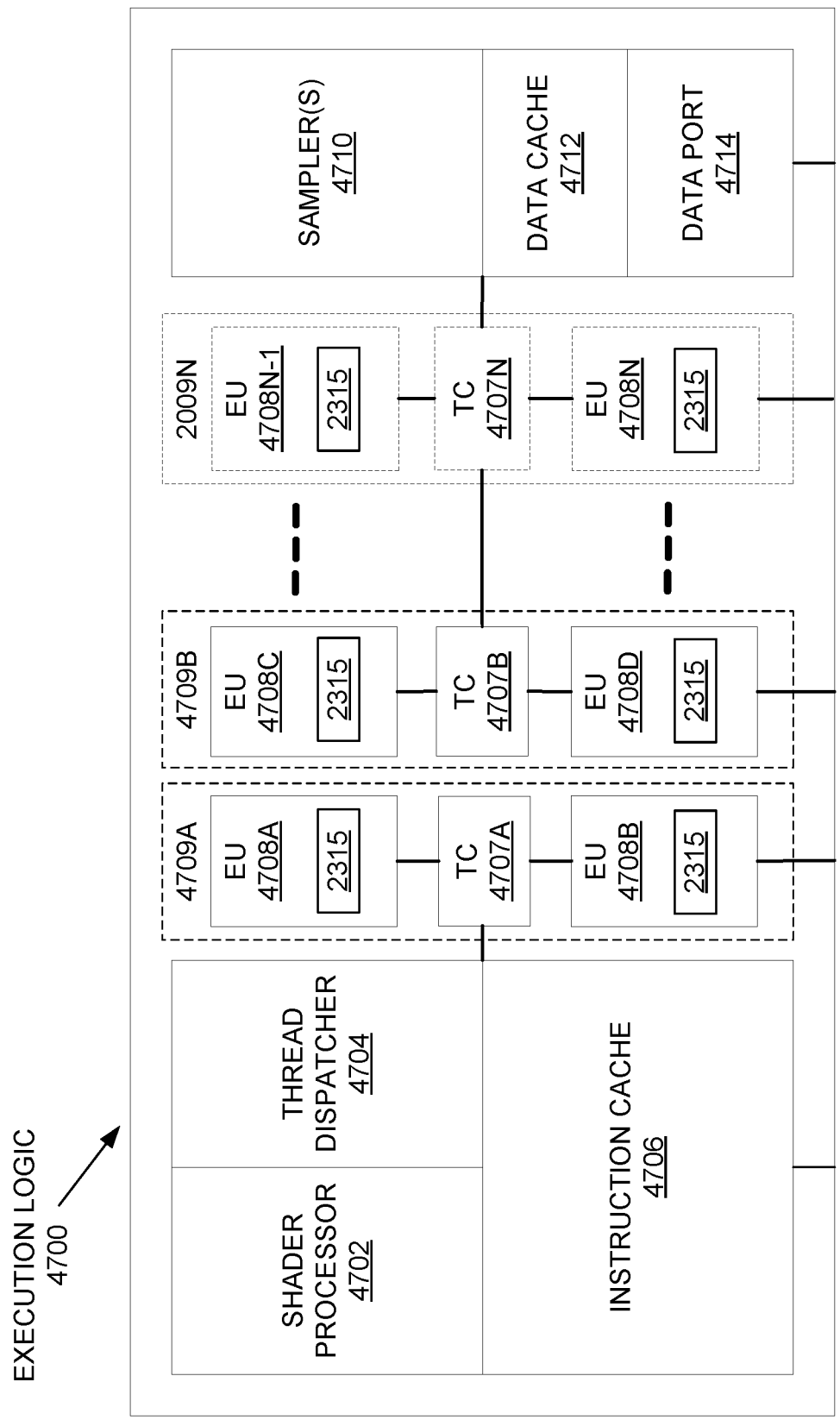
FIGS. 47A-47B illustrate thread execution logic 4700 including an array of processing elements of a graphics processor core according to at least one embodiment.
Figure 47B:
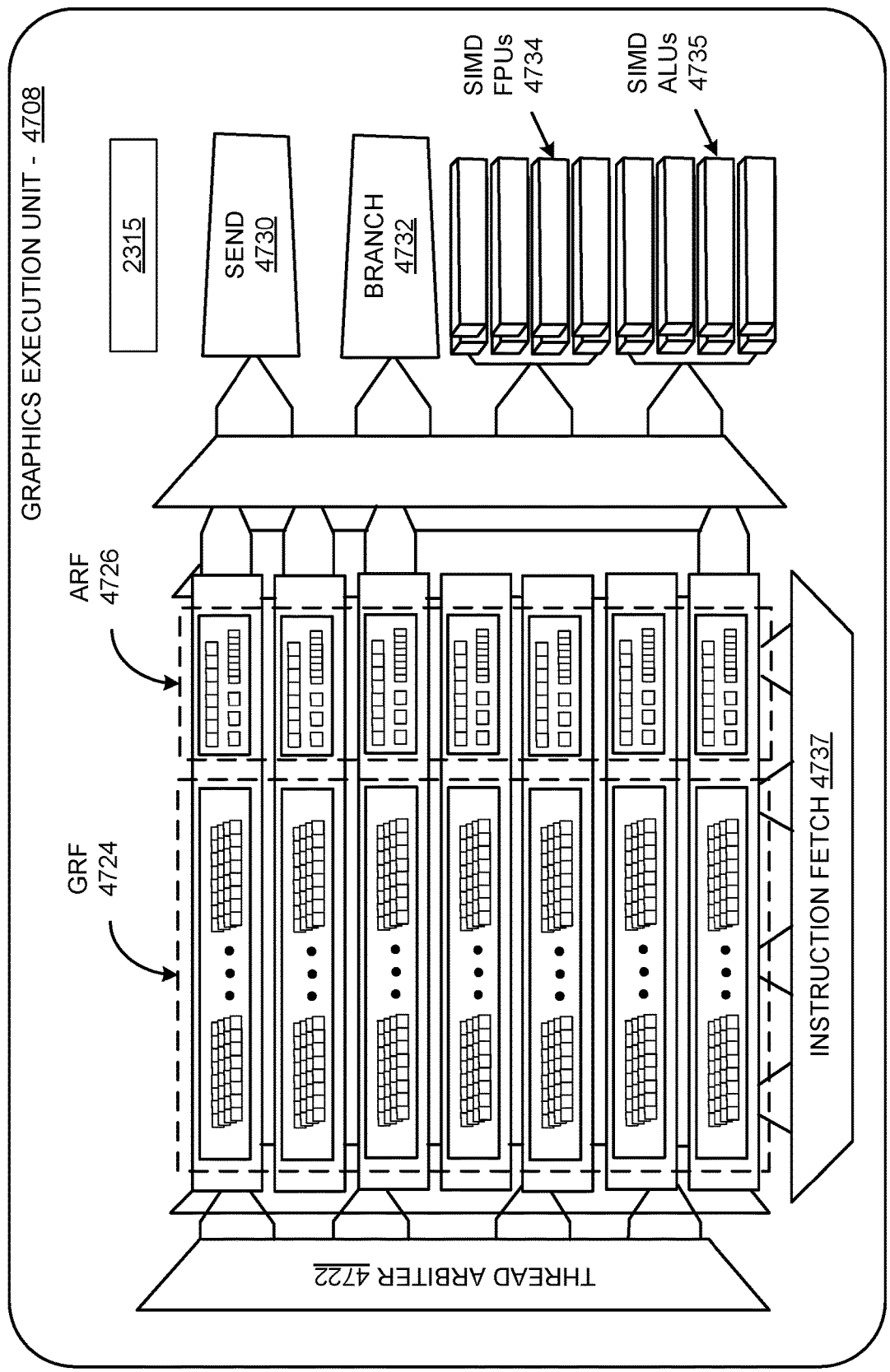

FIGS. 47A-47B illustrate thread execution logic 4700 including an array of processing elements of a graphics processor core according to at least one embodiment. FIG. 47A illustrates at least one embodiment, in which thread execution logic 4700 is used. FIG. 47B illustrates exemplary internal details of an execution unit, according to at least one embodiment.

As illustrated in FIG. 47A, in at least one embodiment, thread execution logic 4700 includes a shader processor 4702, a thread dispatcher 4704, instruction cache 4706, a scalable execution unit array including a plurality of execution units 4708A-4708N, a sampler 4710, a data cache 4712, and a data port 4714. In at least one embodiment a scalable execution unit array can dynamically scale by enabling or disabling one or more execution units (e.g., any of execution unit 4708A, 4708B, 4708C, 4708D, through 4708N-1 and 4708N) based on computational requirements of a workload, for example. In at least one embodiment, scalable execution units are interconnected via an interconnect fabric that links to each of execution unit. In at least one embodiment, thread execution logic 4700 includes one or more connections to memory, such as system memory or cache memory, through one or more of instruction cache 4706, data port 4714, sampler 4710, and execution units 4708A-4708N. In at least one embodiment, each execution unit (e.g., 4708A) is a stand-alone programmable general-purpose computational unit that is capable of executing multiple simultaneous hardware threads while processing multiple data elements in parallel for each thread. In at least one embodiment, array of execution units 4708A-4708N is scalable to include any number individual execution units.

In at least one embodiment, execution units 4708A-4708N are primarily used to execute shader programs. In at least one embodiment, shader processor 4702 can process various shader programs and dispatch execution threads associated with shader programs via a thread dispatcher 4704. In at least one embodiment, thread dispatcher 4704 includes logic to arbitrate thread initiation requests from graphics and media pipelines and instantiate requested threads on one or more execution units in execution units 4708A-4708N. For example, in at least one embodiment, a geometry pipeline can dispatch vertex, tessellation, or geometry shaders to thread execution logic for processing. In at least one embodiment, thread dispatcher 4704 can also process runtime thread spawning requests from executing shader programs.

In at least one embodiment, execution units 4708A-4708N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 4708A-4708N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 4708A-4708N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 4708A-4708N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 4708A-4708N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 4709A-4709N having thread control logic (4707A-4707N) that is common to fused EUs. In at least one embodiment, multiple EUs can be fused into an EU group. In at least one embodiment, each EU in fused EU group can be configured to execute a separate SIMD hardware thread. A number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 4709A-4709N includes at least two execution units. For example, in at least one embodiment, fused execution unit 4709A includes a first EU 4708A, second EU 4708B, and thread control logic 4707A that is common to first EU 4708A and second EU 4708B. In at least one embodiment, thread control logic 4707A controls threads executed on fused graphics execution unit 4709A, allowing each EU within fused execution units 4709A-4709N to execute using a common instruction pointer register.

In at least one embodiment, one or more internal instruction caches (e.g., 4706) are included in thread execution logic 4700 to cache thread instructions for execution units. In at least one embodiment, one or more data caches (e.g., 4712) are included to cache thread data during thread execution. In at least one embodiment, a sampler 4710 is included to provide texture sampling for 3D operations and media sampling for media operations. In at least one embodiment, sampler 4710 includes specialized texture or media sampling functionality to process texture or media data during sampling process before providing sampled data to an execution unit.

During execution, in at least one embodiment, graphics and media pipelines send thread initiation requests to thread execution logic 4700 via thread spawning and dispatch logic. In at least one embodiment, once a group of geometric objects has been processed and rasterized into pixel data, pixel processor logic (e.g., pixel shader logic, fragment shader logic, etc.) within shader processor 4702 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 4702 then executes an application programming interface (API)-supplied pixel or fragment shader program. In at least one embodiment, to execute a shader program, shader processor 4702 dispatches threads to an execution unit (e.g., 4708A) via thread dispatcher 4704. In at least one embodiment, shader processor 4702 uses texture sampling logic in sampler 4710 to access texture data in texture maps stored in memory. In at least one embodiment, arithmetic operations on texture data and input geometry data compute pixel color data for each geometric fragment, or discards one or more pixels from further processing.

In at least one embodiment, data port 4714 provides a memory access mechanism for thread execution logic 4700 to output processed data to memory for further processing on a graphics processor output pipeline. In at least one embodiment, data port 4714 includes or couples to one or more cache memories (e.g., data cache 4712) to cache data for memory access via a data port.

As illustrated in FIG. 47B, in at least one embodiment, a graphics execution unit 4708 can include an instruction fetch unit 4737, a general register file array (GRF) 4724, an architectural register file array (ARF) 4726, a thread arbiter 4722, a send unit 4730, a branch unit 4732, a set of SIMD floating point units (FPUs) 4734, and In at least one embodiment a set of dedicated integer SIMD ALUs 4735. In at least one embodiment, GRF 4724 and ARF 4726 includes a set of general register files and architecture register files associated with each simultaneous hardware thread that may be active in graphics execution unit 4708. In at least one embodiment, per thread architectural state is maintained in ARF 4726, while data used during thread execution is stored in GRF 4724. In at least one embodiment, execution state of each thread, including instruction pointers for each thread, can be held in thread-specific registers in ARF 4726.

In at least one embodiment, graphics execution unit 4708 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 4708 can co-issue multiple instructions, which may each be different instructions. In at least one embodiment, thread arbiter 4722 of graphics execution unit thread 4708 can dispatch instructions to one of send unit 4730, branch unit 4742, or SIMD FPU(s) 4734 for execution. In at least one embodiment, each execution thread can access 128 general-purpose registers within GRF 4724, where each register can store 32 bytes, accessible as a SIMD 8-element vector of 32-bit data elements. In at least one embodiment, each execution unit thread has access to 4 Kbytes within GRF 4724, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 4724 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 4730. In at least one embodiment, branch instructions are dispatched to a dedicated branch unit 4732 to facilitate SIMD divergence and eventual convergence.

In at least one embodiment graphics execution unit 4708 includes one or more SIMD floating point units (FPU(s)) 4734 to perform floating-point operations. In at least one embodiment, FPU(s) 4734 also support integer computation. In at least one embodiment FPU(s) 4734 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 4735 are also present, and may be specifically optimized to perform operations associated with machine learning computations.

In at least one embodiment, arrays of multiple instances of graphics execution unit 4708 can be instantiated in a graphics sub-core grouping (e.g., a sub-slice). In at least one embodiment execution unit 4708 can execute instructions across a plurality of execution channels. In at least one embodiment, each thread executed on graphics execution unit 4708 is executed on a different channel.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, portions or all of inference and/or training logic 2315 may be incorporated into execution logic 4700. Moreover, in at least one embodiment, inferencing and/or training operations described herein may be done using logic other than logic illustrated in FIG. 23A or 23B. In at least one embodiment, weight parameters may be stored in on-chip or off-chip memory and/or registers (shown or not shown) that configure ALUs of execution logic 4700 to perform one or more machine learning algorithms, neural network architectures, use cases, or training techniques described herein.

Figure 48:
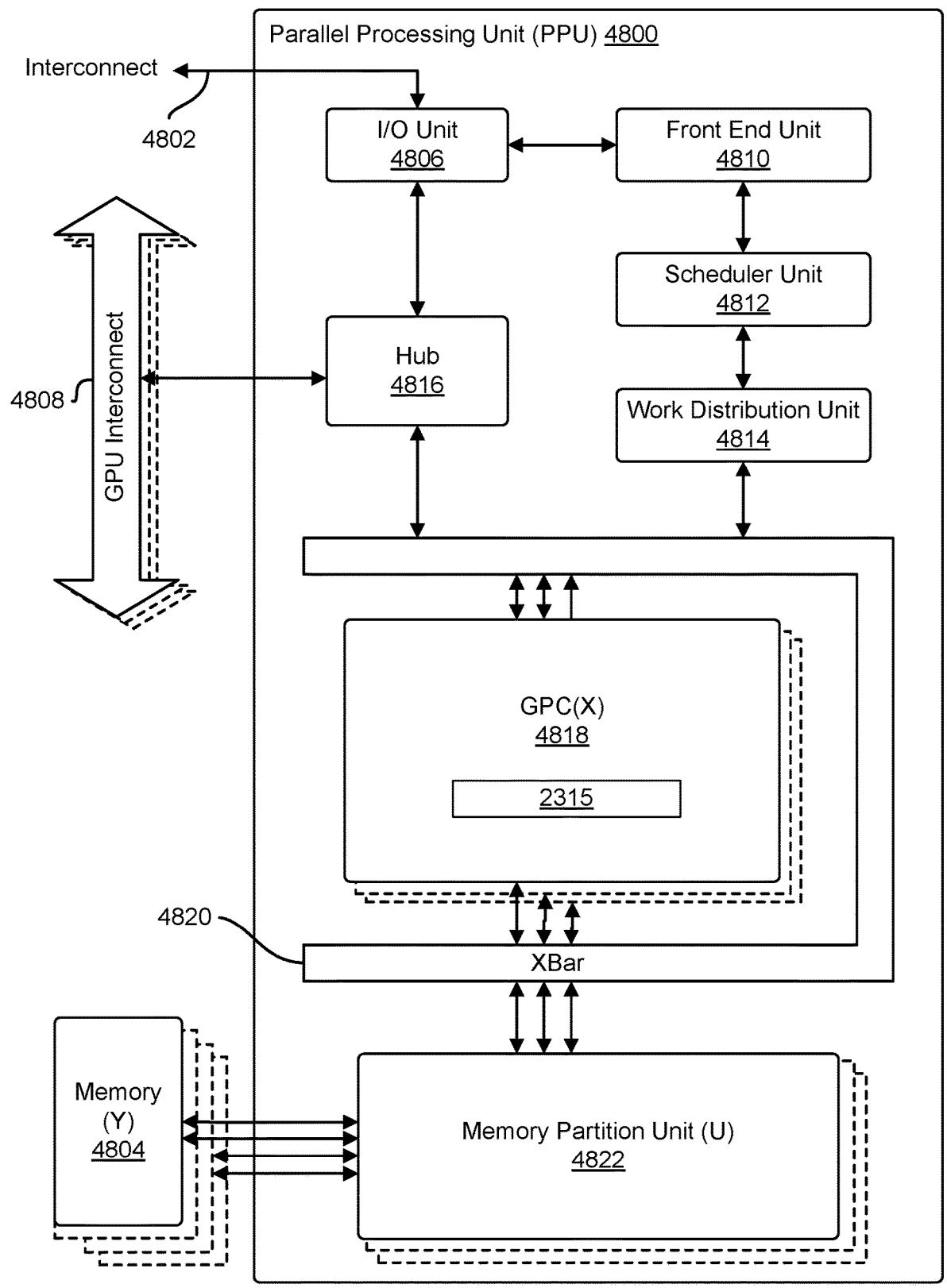
FIG. 48 illustrates a parallel processing unit ("PPU"), according to at least one embodiment.

FIG. 48 illustrates a parallel processing unit ("PPU") 4800, according to at least one embodiment. In at least one embodiment, PPU 4800 is configured with machine-readable code that, if executed by PPU 4800, causes PPU 4800 to perform some or all of processes and techniques described throughout this disclosure. In at least one embodiment, PPU 4800 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4800. In at least one embodiment, PPU 4800 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4800 is utilized to perform computations such as linear algebra operations and machine-learning operations. FIG. 48 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4800 are configured to accelerate High Performance Computing ("HPC"), data center, and machine learning applications. In at least one embodiment, PPU 4800 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4800 includes, without limitation, an Input/Output ("I/O") unit 4806, a front-end unit 4810, a scheduler unit 4812, a work distribution unit 4814, a hub 4816, a crossbar ("Xbar") 4820, one or more general processing clusters ("GPCs") 4818, and one or more partition units ("memory partition units") 4822. In at least one embodiment, PPU 4800 is connected to a host processor or other PPUs 4800 via one or more high-speed GPU interconnects ("GPU interconnects") 4808. In at least one embodiment, PPU 4800 is connected to a host processor or other peripheral devices via an interconnect 4802. In at least one embodiment, PPU 4800 is connected to a local memory comprising one or more memory devices ("memory") 4804. In at least one embodiment, memory devices 4804 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4808 may refer to a wire-based multi-lane communications link that is used by systems to scale and include one or more PPUs 4800 combined with one or more central processing units ("CPUs"), supports cache coherence between PPUs 4800 and CPUs, and CPU mastering. In at least one embodiment, data and/or commands are transmitted by high-speed GPU interconnect 4808 through hub 4816 to/from other units of PPU 4800 such as one or more copy engines, video encoders, video decoders, power management units, and other components which may not be explicitly illustrated in FIG. 48.

In at least one embodiment, I/O unit 4806 is configured to transmit and receive communications (e.g., commands, data) from a host processor (not illustrated in FIG. 48) over system bus 4802. In at least one embodiment, I/O unit 4806 communicates with host processor directly via system bus 4802 or through one or more intermediate devices such as a memory bridge. In at least one embodiment, I/O unit 4806 may communicate with one or more other processors, such as one or more of PPUs 4800 via system bus 4802. In at least one embodiment, I/O unit 4806 implements a Peripheral Component Interconnect Express ("PCIe") interface for communications over a PCIe bus. In at least one embodiment, I/O unit 4806 implements interfaces for communicating with external devices.

In at least one embodiment, I/O unit 4806 decodes packets received via system bus 4802. In at least one embodiment, at least some packets represent commands configured to cause PPU 4800 to perform various operations. In at least one embodiment, I/O unit 4806 transmits decoded commands to various other units of PPU 4800 as specified by commands. In at least one embodiment, commands are transmitted to front-end unit 4810 and/or transmitted to hub 4816 or other units of PPU 4800 such as one or more copy engines, a video encoder, a video decoder, a power management unit, etc. (not explicitly illustrated in FIG. 48). In at least one embodiment, I/O unit 4806 is configured to route communications between and among various logical units of PPU 4800.

In at least one embodiment, a program executed by host processor encodes a command stream in a buffer that provides workloads to PPU 4800 for processing. In at least one embodiment, a workload comprises instructions and data to be processed by those instructions. In at least one embodiment, buffer is a region in a memory that is accessible (e.g., read/write) by both host processor and PPU 4800—a host interface unit may be configured to access buffer in a system memory connected to system bus 4802 via memory requests transmitted over system bus 4802 by I/O unit 4806. In at least one embodiment, host processor writes command stream to buffer and then transmits a pointer to start of command stream to PPU 4800 such that front-end unit 4810 receives pointers to one or more command streams and manages one or more command streams, reading commands from command streams and forwarding commands to various units of PPU 4800.

In at least one embodiment, front-end unit 4810 is coupled to scheduler unit 4812 that configures various GPCs 4818 to process tasks defined by one or more command streams. In at least one embodiment, scheduler unit 4812 is configured to track state information related to various tasks managed by scheduler unit 4812 where state information may indicate which of GPCs 4818 a task is assigned to, whether task is active or inactive, a priority level associated with task, and so forth. In at least one embodiment, scheduler unit 4812 manages execution of a plurality of tasks on one or more of GPCs 4818.

In at least one embodiment, scheduler unit 4812 is coupled to work distribution unit 4814 that is configured to dispatch tasks for execution on GPCs 4818. In at least one embodiment, work distribution unit 4814 tracks a number of scheduled tasks received from scheduler unit 4812 and work distribution unit 4814 manages a pending task pool and an active task pool for each of GPCs 4818. In at least one embodiment, pending task pool comprises a number of slots (e.g., 32 slots) that contain tasks assigned to be processed by a particular GPC 4818; active task pool may comprise a number of slots (e.g., 4 slots) for tasks that are actively being processed by GPCs 4818 such that as one of GPCs 4818 completes execution of a task, that task is evicted from active task pool for GPC 4818 and one of other tasks from pending task pool is selected and scheduled for execution on GPC 4818. In at least one embodiment, if an active task is idle on GPC 4818, such as while waiting for a data dependency to be resolved, then active task is evicted from GPC 4818 and returned to pending task pool while another task in pending task pool is selected and scheduled for execution on GPC 4818.

In at least one embodiment, work distribution unit 4814 communicates with one or more GPCs 4818 via XBar 4820. In at least one embodiment, XBar 4820 is an interconnect network that couples many of units of PPU 4800 to other units of PPU 4800 and can be configured to couple work distribution unit 4814 to a particular GPC 4818. In at least one embodiment, one or more other units of PPU 4800 may also be connected to XBar 4820 via hub 4816.

In at least one embodiment, tasks are managed by scheduler unit 4812 and dispatched to one of GPCs 4818 by work distribution unit 4814. GPC 4818 is configured to process task and generate results. In at least one embodiment, results may be consumed by other tasks within GPC 4818, routed to a different GPC 4818 via XBar 4820, or stored in memory 4804. In at least one embodiment, results can be written to memory 4804 via partition units 4822, which implement a memory interface for reading and writing data to/from memory 4804. In at least one embodiment, results can be transmitted to another PPU 4804 or CPU via high-speed GPU interconnect 4808. In at least one embodiment, PPU 4800 includes, without limitation, a number U of partition units 4822 that is equal to number of separate and distinct memory devices 4804 coupled to PPU 4800. In at least one embodiment, partition unit 4822 will be described in more detail herein in conjunction with FIG. 50.

In at least one embodiment, a host processor executes a driver kernel that implements an application programming interface ("API") that enables one or more applications executing on host processor to schedule operations for execution on PPU 4800. In at least one embodiment, multiple compute applications are simultaneously executed by PPU 4800 and PPU 4800 provides isolation, quality of service ("QoS"), and independent address spaces for multiple compute applications. In at least one embodiment, an application generates instructions (e.g., in form of API calls) that cause driver kernel to generate one or more tasks for execution by PPU 4800 and driver kernel outputs tasks to one or more streams being processed by PPU 4800. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 50.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, deep learning application processor is used to train a machine learning model, such as a neural network, to predict or infer information provided to PPU 4800. In at least one embodiment, deep learning application processor 4800 is used to infer or predict information based on a trained machine learning model (e.g., neural network) that has been trained by another processor or system or by PPU 4800. In at least one embodiment, PPU 4800 may be used to perform one or more neural network use cases described herein.

Figure 49:
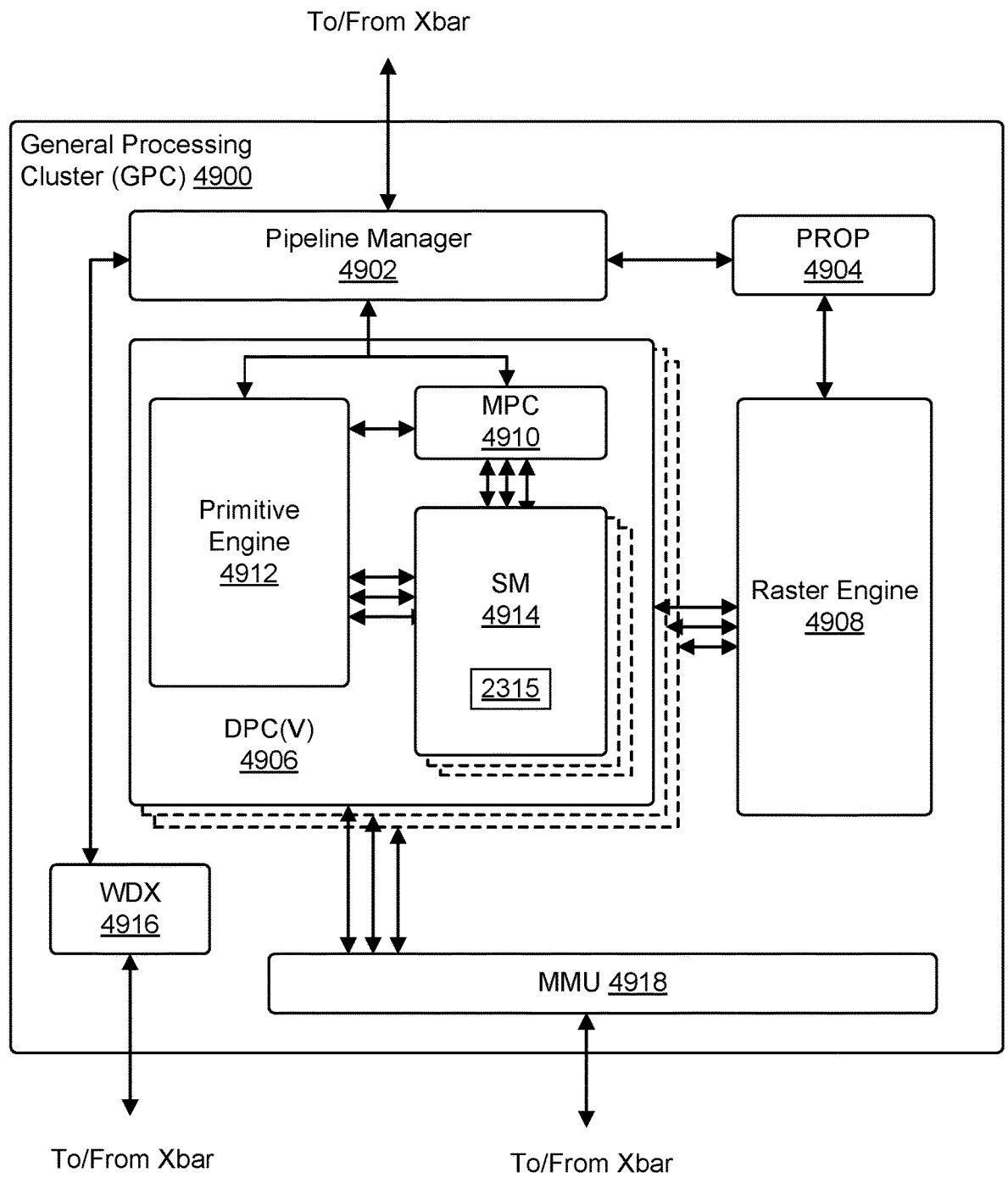
FIG. 49 illustrates a general processing cluster ("GPC"), according to at least one embodiment.

FIG. 49 illustrates a general processing cluster ("GPC") 4900, according to at least one embodiment. In at least one embodiment, GPC 4900 is GPC 4818 of FIG. 48. In at least one embodiment, each GPC 4900 includes, without limitation, a number of hardware units for processing tasks and each GPC 4900 includes, without limitation, a pipeline manager 4902, a pre-raster operations unit ("PROP") 4904, a raster engine 4908, a work distribution crossbar ("WDX") 4916, a memory management unit ("MMU") 4918, one or more Data Processing Clusters ("DPCs") 4906, and any suitable combination of parts.

In at least one embodiment, operation of GPC 4900 is controlled by pipeline manager 4902. In at least one embodiment, pipeline manager 4902 manages configuration of one or more DPCs 4906 for processing tasks allocated to GPC 4900. In at least one embodiment, pipeline manager 4902 configures at least one of one or more DPCs 4906 to implement at least a portion of a graphics rendering pipeline. In at least one embodiment, DPC 4906 is configured to execute a vertex shader program on a programmable streaming multi-processor ("SM") 4914. In at least one embodiment, pipeline manager 4902 is configured to route packets received from a work distribution unit to appropriate logical units within GPC 4900, in at least one embodiment, and some packets may be routed to fixed function hardware units in PROP 4904 and/or raster engine 4908 while other packets may be routed to DPCs 4906 for processing by a primitive engine 4912 or SM 4914. In at least one embodiment, pipeline manager 4902 configures at least one of DPCs 4906 to implement a neural network model and/or a computing pipeline.

In at least one embodiment, PROP unit 4904 is configured, in at least one embodiment, to route data generated by raster engine 4908 and DPCs 4906 to a Raster Operations ("ROP") unit in partition unit 4822, described in more detail above in conjunction with FIG. 48. In at least one embodiment, PROP unit 4904 is configured to perform optimizations for color blending, organize pixel data, perform address translations, and more. In at least one embodiment, raster engine 4908 includes, without limitation, a number of fixed function hardware units configured to perform various raster operations, in at least one embodiment, and raster engine 4908 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4908 comprises fragments to be processed by any suitable entity such as by a fragment shader implemented within DPC 4906.

In at least one embodiment, each DPC 4906 included in GPC 4900 comprise, without limitation, an M-Pipe Controller ("MPC") 4910; primitive engine 4912; one or more SMs 4914; and any suitable combination thereof. In at least one embodiment, MPC 4910 controls operation of DPC 4906, routing packets received from pipeline manager 4902 to appropriate units in DPC 4906. In at least one embodiment, packets associated with a vertex are routed to primitive engine 4912, which is configured to fetch vertex attributes associated with vertex from memory; in contrast, packets associated with a shader program may be transmitted to SM 4914.

In at least one embodiment, SM 4914 comprises, without limitation, a programmable streaming processor that is configured to process tasks represented by a number of threads. In at least one embodiment, SM 4914 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4914 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4914 are described in more detail herein.

In at least one embodiment, MMU 4918 provides an interface between GPC 4900 and memory partition unit (e.g., partition unit 4822 of FIG. 48) and MMU 4918 provides translation of virtual addresses into physical addresses, memory protection, and arbitration of memory requests. In at least one embodiment, MMU 4918 provides one or more translation lookaside buffers ("TLBs") for performing translation of virtual addresses into physical addresses in memory.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, deep learning application processor is used to train a machine learning model, such as a neural network, to predict or infer information provided to GPC 4900. In at least one embodiment, GPC 4900 is used to infer or predict information based on a trained machine learning model (e.g., neural network) that has been trained by another processor or system or by GPC 4900. In at least one embodiment, GPC 4900 may be used to perform one or more neural network use cases described herein.

Figure 50:
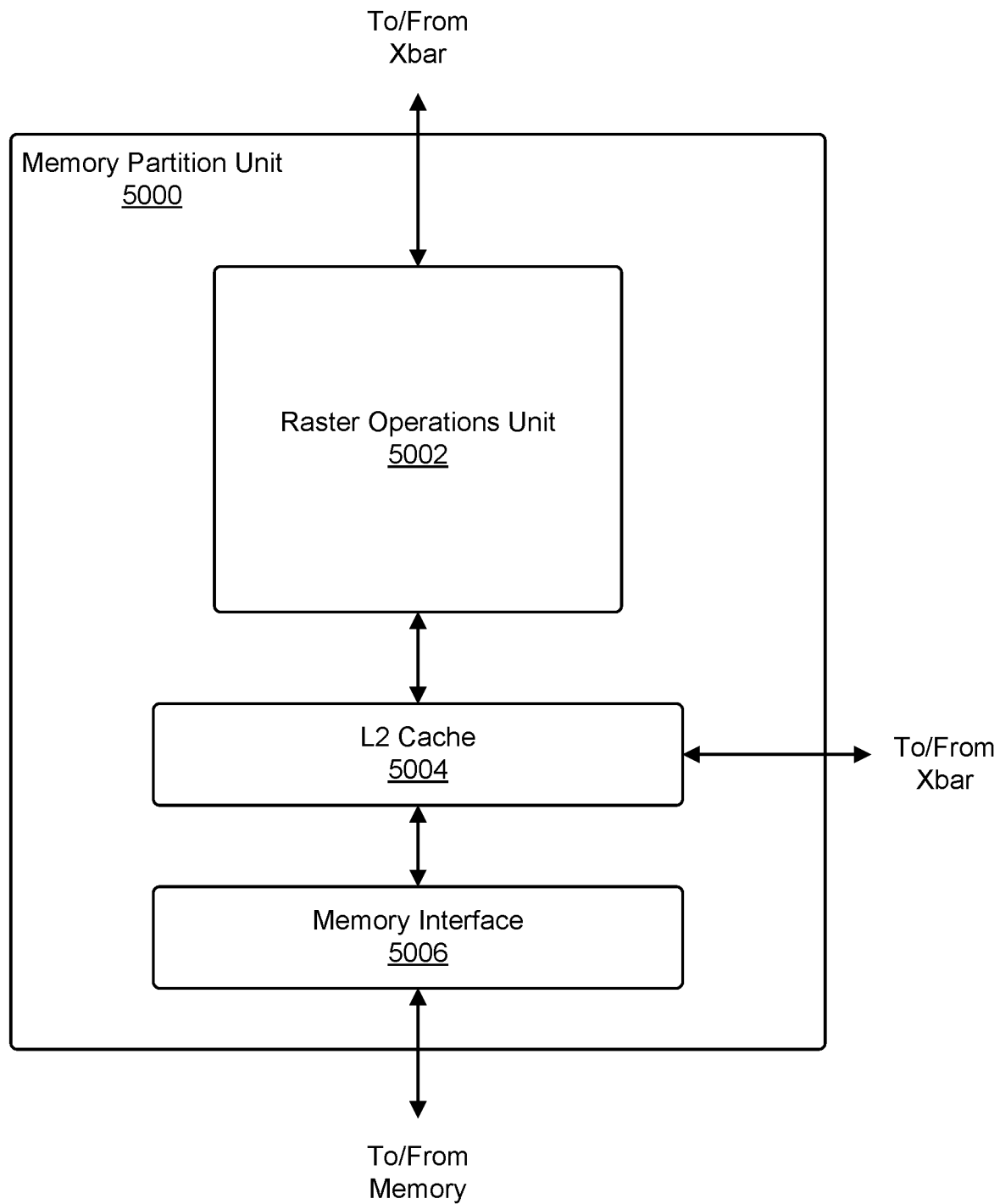
FIG. 50 illustrates a memory partition unit of a parallel processing unit ("PPU"), according to at least one embodiment.

FIG. 50 illustrates a memory partition unit 5000 of a parallel processing unit ("PPU"), in accordance with at least one embodiment. In at least one embodiment, memory partition unit 5000 includes, without limitation, a Raster Operations ("ROP") unit 5002; a level two ("L2") cache 5004; a memory interface 5006; and any suitable combination thereof. Memory interface 5006 is coupled to memory. Memory interface 5006 may implement 32, 64, 128, 1024-bit data buses, or like, for high-speed data transfer. In at least one embodiment, PPU incorporates U memory interfaces 5006, one memory interface 5006 per pair of partition units 5000, where each pair of partition units 5000 is connected to a corresponding memory device. For example, in at least one embodiment, PPU may be connected to up to Y memory devices, such as high bandwidth memory stacks or graphics double-data-rate, version 5, synchronous dynamic random a50ess memory ("GDDR5 SDRAM").

In at least one embodiment, memory interface 5006 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 5000 supports a unified memory to provide a single unified virtual address space for central processing unit ("CPU") and PPU memory, enabling data sharing between virtual memory systems. In at least one embodiment frequency of a50esses by a PPU to memory located on other processors is traced to ensure that memory pages are moved to physical memory of PPU that is a50essing pages more frequently. In at least one embodiment, high-speed GPU interconnect 4808 supports address translation services allowing PPU to directly a50ess a CPU's page tables and providing full a50ess to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 5000 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4804 of FIG. 48 or other system memory is fetched by memory partition unit 5000 and stored in L2 cache 5004, which is located on-chip and is shared between various GPCs, in a50ordance with at least one embodiment. Each memory partition unit 5000, in at least one embodiment, includes, without limitation, at least a portion of L2 cache associated with a corresponding memory device. In at least one embodiment, lower level caches are implemented in various units within GPCs. In at least one embodiment, each of SMs 4914 may implement a level one ("L1") cache wherein L1 cache is private memory that is dedicated to a particular SM 4914 and data from L2 cache 5004 is fetched and stored in each of L1 caches for processing in functional units of SMs 4914. In at least one embodiment, L2 cache 5004 is coupled to memory interface 5006 and XBar 4820.

ROP unit 5002 performs graphics raster operations related to pixel color, such as color compression, pixel blending, and more, in at least one embodiment. ROP unit 5002, in at least one embodiment, implements depth testing in conjunction with raster engine 4908, receiving a depth for a sample location associated with a pixel fragment from culling engine of raster engine 4908. In at least one embodiment, depth is tested against a corresponding depth in a depth buffer for a sample location associated with fragment. In at least one embodiment, if fragment passes depth test for sample location, then ROP unit 5002 updates depth buffer and transmits a result of depth test to raster engine 4908. It will be appreciated that number of partition units 5000 may be different than number of GPCs and, therefore, each ROP unit 5002 can, in at least one embodiment, be coupled to each of GPCs. In at least one embodiment, ROP unit 5002 tracks packets received from different GPCs and determines which that a result generated by ROP unit 5002 is routed to through XBar 4820.

Figure 51:
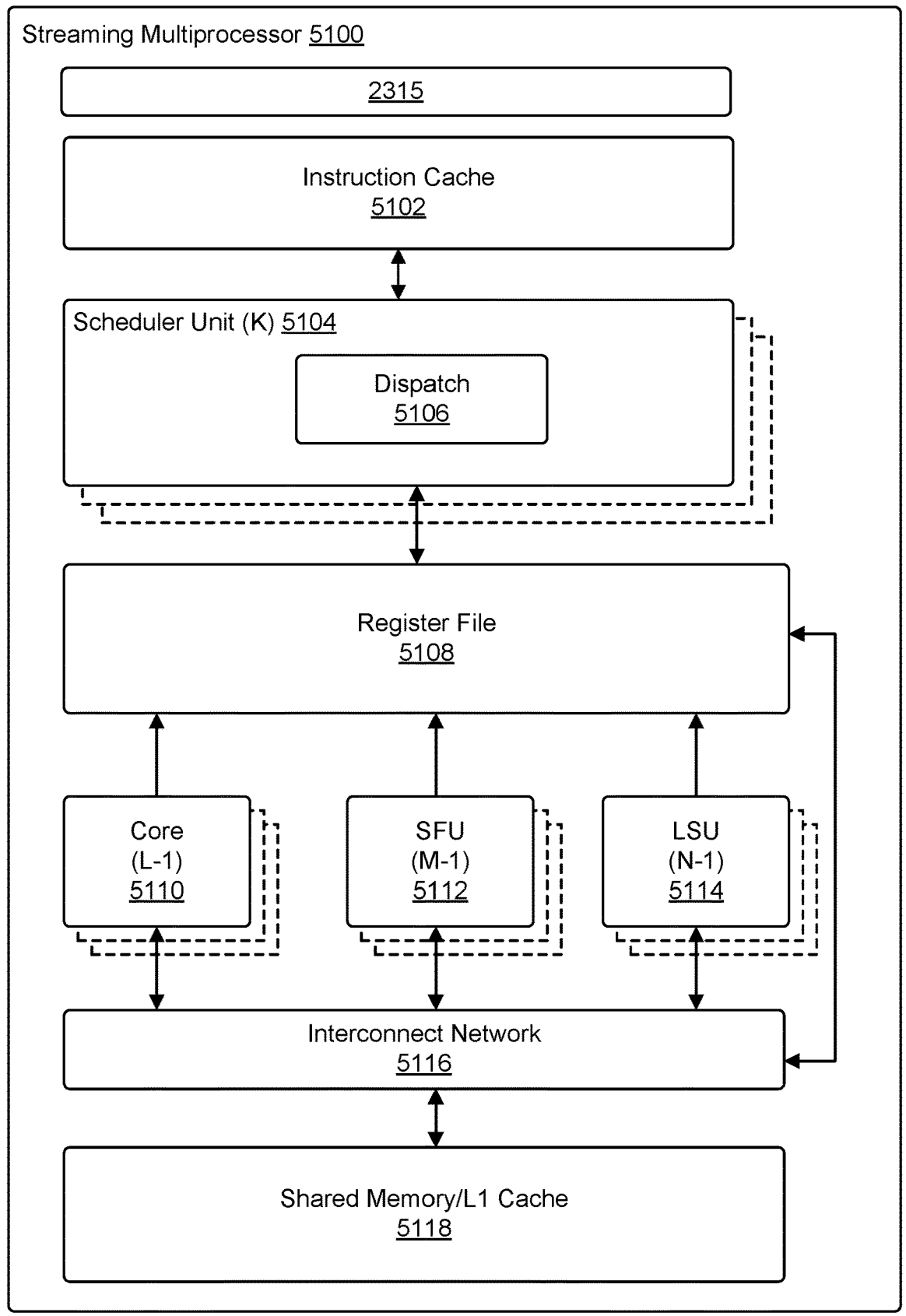
FIG. 51 illustrates a streaming multi-processor, according to at least one embodiment.

FIG. 51 illustrates a streaming multi-processor ("SM") 5100, according to at least one embodiment. In at least one embodiment, SM 5100 is SM of FIG. 49. In at least one embodiment, SM 5100 includes, without limitation, an instruction cache 5102; one or more scheduler units 5104; a register file 5108; one or more processing cores ("cores") 5110; one or more special function units ("SFUs") 5112; one or more load/store units ("LSUs") 5114; an interconnect network 5116; a shared memory/level one ("L1") cache 5118; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 5100. In at least one embodiment, scheduler unit 5104 receives tasks from work distribution unit and manages instruction scheduling for one or more thread blocks assigned to SM 5100. In at least one embodiment, scheduler unit 5104 schedules thread blocks for execution as warps of parallel threads, wherein each thread block is allocated at least one warp. In at least one embodiment, each warp executes threads. In at least one embodiment, scheduler unit 5104 manages a plurality of different thread blocks, allocating warps to different thread blocks and then dispatching instructions from plurality of different cooperative groups to various functional units (e.g., processing cores 5110, SFUs 5112, and LSUs 5114) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. Programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 5106 is configured to transmit instructions to one or more of functional units and scheduler unit 5104 includes, without limitation, two dispatch units 5106 that enable two different instructions from same warp to be dispatched during each clock cycle. In at least one embodiment, each scheduler unit 5104 includes a single dispatch unit 5106 or a51itional dispatch units 5106.

In at least one embodiment, each SM 5100, in at least one embodiment, includes, without limitation, register file 5108 that provides a set of registers for functional units of SM 5100. In at least one embodiment, register file 5108 is divided between each of functional units such that each functional unit is allocated a dedicated portion of register file 5108. In at least one embodiment, register file 5108 is divided between different warps being executed by SM 5100 and register file 5108 provides temporary storage for operands connected to data paths of functional units. In at least one embodiment, each SM 5100 comprises, without limitation, a plurality of L processing cores 5110. In at least one embodiment, SM 5100 includes, without limitation, a large number (e.g., 128 or more) of distinct processing cores 5110. In at least one embodiment, each processing core 5110, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 5110 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 5110. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a51ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 5100 comprises, without limitation, M SFUs 5112 that perform special functions (e.g., attribute evaluation, reciprocal square root, and like). In at least one embodiment, SFUs 5112 include, without limitation, a tree traversal unit configured to traverse a hierarchical tree data structure. In at least one embodiment, SFUs 5112 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 5100. In at least one embodiment, texture maps are stored in shared memory/L1 cache 5118. In at least one embodiment, texture units implement texture operations such as filtering operations using mip-maps (e.g., texture maps of varying levels of detail), in accordance with at least one embodiment. In at least one embodiment, each SM 5100 includes, without limitation, two texture units.

Each SM 5100 comprises, without limitation, N LSUs 5114 that implement load and store operations between shared memory/L1 cache 5118 and register file 5108, in at least one embodiment. Each SM 5100 includes, without limitation, interconnect network 5116 that connects each of functional units to register file 5108 and LSU 5114 to register file 5108 and shared memory/L1 cache 5118 in at least one embodiment. In at least one embodiment, interconnect network 5116 is a crossbar that can be configured to connect any of functional units to any of registers in register file 5108 and connect LSUs 5114 to register file 5108 and memory locations in shared memory/L1 cache 5118.

In at least one embodiment, shared memory/L1 cache 5118 is an array of on-chip memory that allows for data storage and communication between SM 5100 and primitive engine and between threads in SM 5100, in at least one embodiment. In at least one embodiment, shared memory/L1 cache 5118 comprises, without limitation, 128 KB of storage capacity and is in path from SM 5100 to partition unit. In at least one embodiment, shared memory/L1 cache 5118, in at least one embodiment, is used to cache reads and writes. In at least one embodiment, one or more of shared memory/L1 cache 5118, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 5118 enables shared memory/L1 cache 5118 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 5100 to execute program and perform calculations, shared memory/L1 cache 5118 to communicate between threads, and LSU 5114 to read and write global memory through shared memory/L1 cache 5118 and memory partition unit. In at least one embodiment, when configured for general purpose parallel computation, SM 5100 writes commands that scheduler unit 5104 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. Graphics card may be configured to interface with a PCIe slot on a motherboard of a desktop computer. In at least one embodiment, PPU may be an integrated graphics processing unit ("iGPU") included in chipset of motherboard.

Inference and/or training logic 2315 are used to perform inferencing and/or training operations associated with one or more embodiments. Details regarding inference and/or training logic 2315 are provided herein in conjunction with FIGS. 23A and/or 23B. In at least one embodiment, deep learning application processor is used to train a machine learning model, such as a neural network, to predict or infer information provided to SM 5100. In at least one embodiment, SM 5100 is used to infer or predict information based on a trained machine learning model (e.g., neural network) that has been trained by another processor or system or by SM 5100. In at least one embodiment, SM 5100 may be used to perform one or more neural network use cases described herein.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2904 and/or secondary storage. Computer programs, if executed by one or more processors, enable system 2900 to perform various functions in accordance with at least one embodiment. Memory 2904, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2902; parallel processing system 2912; an integrated circuit capable of at least a portion of capabilities of both CPU 2902; parallel processing system 2912; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2900 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2912 includes, without limitation, a plurality of parallel processing units ("PPUs") 2914 and associated memories 2916. In at least one embodiment, PPUs 2914 are connected to a host processor or other peripheral devices via an interconnect 2918 and a switch 2920 or multiplexer. In at least one embodiment, parallel processing system 2912 distributes computational tasks across PPUs 2914 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2914, although such shared memory may incur performance penalties relative to use of local memory and registers resident to a PPU 2914. In at least one embodiment, operation of PPUs 2914 is synchronized through use of a command such as _syncthreads( ), wherein all threads in a block (e.g., executed across multiple PPUs 2914) to reach a certain point of execution of code before proc29ding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing claims.

What is claimed is:

1. One or more processors comprising: circuitry to enable one or more robotic devices to grasp one or more objects by:
   identifying, in one or more images depicting a scene that includes the one or more objects, one or more bounding volumes enclosing the one or more objects;
   using one or more neural networks to identify a target pose of one or more robotic devices to interact with the one or more objects based, at least in part, on one or more measurements from one or more tactile sensors attached to the one or more robotic devices and the bounding volumes enclosing the one or more objects identified in the one or more images; and
   causing the one or more robotic devices to grasp the one or more objects based, at least in part, on the identified target pose.

2. The one or more processors of claim 1 wherein:
   the one or more neural networks are to be trained based, at least in part, on tactile sensor data from the one or more tactile sensors of the one or more robotic devices.

3. The one or more processors of claim 2, wherein the circuitry is to:
   obtain the one or more images of the one or more objects to be grasped;
   estimate a 6d pose of the one or more objects using the obtained one or more images; and
   generate the one or more bounding volumes, based at least in part, on the 6d pose of the one or more objects.

4. The one or more processors of claim 3, wherein the one or more bounding volumes are generated based, at least in part, on a point cloud of the one or more objects.

5. The one or more processors of claim 1, wherein the identification of the target pose of the robotic device is further based, at least in part, on one or more second objects having a volume substantially equal to or less than the volume of one or more first objects that the robotic device grasps.

6. The one or more processors of claim 1, wherein:
   the one or more robotic devices is a robotic hand having a plurality of digits; and each digit of the plurality of digits is equipped with the one or more tactile sensors.

7. The one or more processors of claim 1, wherein:
   the one or more neural networks are to be trained based, at least in part, on one or more images of a human hand performing a grasp; and
   the one or more images of the human hand performing the grasp are a component of a reward function.

8. A system, comprising:
   one or more circuits to enable one or more robotic devices to grasp one or more objects by:
      identifying, in one or more images depicting a scene that includes the one or more objects, one or more bounding volumes enclosing the one or more objects;
      using one or more neural networks to identify a target pose of one or more robotic devices to interact with the one or more objects based, at least in part, on one or more measurements from one or more tactile sensors attached to the one or more robotic devices and the bounding volumes enclosing the one or more objects identified in the one or more images; and
      causing the one or more robotic devices to grasp the one or more objects based, at least in part, on the identified target pose; and
   one or more memories to store the one or more neural networks.

9. The system of claim 8, wherein:
the one or more neural networks are to be trained based, at least in part, on tactile sensor data from the one or more tactile sensors of the one or more robotic devices.

10. The system of claim 8, wherein the one or more neural networks are to be trained based, at least in part, on human demonstrations of grasping an object provided to the system.

11. The system of claim 8, wherein the one or more tactile sensors provide force-sensing information indicating contact with the one or more objects.

12. The system of claim 8, wherein:
one or more robotic grasping mechanisms of the one or more robotic devices has a plurality of fingers with a plurality of articulated joints; and
an action space for the system is defined as a position of each of the plurality of articulated joints.

13. The system of claim 8, wherein:
the one or more neural networks are to be trained using a reward function; and
the reward function is based at least in part on the pose of the one or more robotic devices with respect to the one or more objects.

14. The system of claim 13, wherein:
the reward function is based at least in part on a demonstration of a motion of a human hand; and
the reward function is based at least in part on a difference between positions of tips of fingers of the human hand and tips of fingers of the one or more robotic devices.

15. The system of claim 13, wherein the reward function is based at least in part on an ability of the one or more robotic devices to lift the one or more objects.

16. One or more processors comprising: circuitry to enable one or more robotic devices to grasp one or more objects by:
identifying, in one or more images depicting a scene that includes the one or more objects, one or more bounding volumes enclosing the one or more objects;
training one or more neural networks to identify a target pose of one or more robotic devices to interact with the one or more objects based, at least in part, on one or more measurements from one or more tactile sensors attached to the one or more robotic devices and the bounding volumes enclosing the one or more objects identified in the one or more images; and
causing the one or more robotic devices to grasp the one or more objects based, at least in part, on the identified target pose.

17. The one or more processors of claim 16, wherein:
the one or more neural networks are to be trained based, at least in part, on tactile sensor data from the one or more tactile sensors of the one or more robotic devices.

18. The one or more processors of claim 16, wherein:
one or more robotic grasping mechanisms of the one or more robotic devices are equipped with a plurality of digits; and
each digit of the plurality of digits has a tactile sensor that indicates contact with a respective digit.

19. The one or more processors of claim 16, wherein the one or more processors are part of a computer system that:
obtains an image of one or more objects with a camera;
estimates a bounding cuboid that encompasses the one or more objects; and identifies the target pose of the one or more robotic devices based, at least in part, on the bounding cuboid.

20. The one or more processors of claim 16, wherein:
the circuitry is to train the one or more neural networks based, at least in part, on a reward function; and
the reward function is based at least in part on the identified target pose of the one or more robotic devices to successfully lift a grasped object.

21. The one or more processors of claim 20, wherein the reward function is based at least in part on a comparison between a grasp style of a human hand and a grasp style of a robotic hand.

22. The one or more processors of claim 16, wherein the circuitry is to cause one or more robotic grasping mechanisms to grasp one or more first objects based, at least in part, on one or more second objects having a volume substantially equal to or less than the volume of the one or more first objects, wherein the one or more first objects of arbitrary shape are located within a cuboid bounding box.

23. The one or more processors of claim 16, wherein training the one or more neural networks are formulated as a contextual policy search problem.

24. A robotic picking system, comprising:
a robotic hand equipped with one or more tactile sensors;
one or more processors; and
memory to store executable instructions that, as a result of being executed by the one or more processors, enable the robotic picking system to grasp one or more objects by:
identifying, in one or more images depicting a scene that includes the one or more objects, one or more bounding volumes enclosing the one or more objects;
using one or more neural networks to identify a target pose of the robotic hand to interact with the one or more objects based, at least in part, on one or more measurements from the one or more tactile sensors attached to the robotic picking system and the bounding volumes enclosing the one or more objects identified in the one or more images; and
causing the robotic picking system to grasp the one or more objects based, at least in part, on the identified target pose.

25. The robotic picking system of claim 24, wherein the robotic picking system grasps an object having a different shape than objects that the one or more neural networks are to be trained with.

26. The robotic picking system of claim 24, wherein the one or more neural networks are to be trained to emphasize information obtained from the one or more tactile sensors over positioning of the robotic hand.

27. The robotic picking system of claim 24, wherein positioning of the robotic hand is modeled after a sample grasp demonstrated using a human hand.

28. The robotic picking system of claim 24, wherein the robotic picking system grasps an object from a bin containing objects with a variety of different shapes.

29. The robotic picking system of claim 28, wherein the robotic picking system places the one or more grasped objects into a container.

* * * * *